(12) United States Patent
Cohen et al.

(10) Patent No.: US 11,797,928 B2
(45) Date of Patent: Oct. 24, 2023

(54) DUAL-ANTENNA, FOUR-ARMED IDENTIFICATION TAG

(71) Applicant: NEXITE LTD., Tel-Aviv Yafo (IL)

(72) Inventors: Raviv Cohen, Hod Hasharon (IL); Igor Golubov, Tel Aviv (IL); Eran Rosenberg, Beit She'arim (IL); Eli Schwartz, Tel Aviv (IL); Itzik Ben Bassat, Kiryat Ono (IL); Lior Shakedd, Rishon Lezion (IL)

(73) Assignee: NEXITE LTD., Tel-Aviv Yafo (IL)

( * ) Notice: Subject to any disclaimer, the term of this patent is extended or adjusted under 35 U.S.C. 154(b) by 0 days.

(21) Appl. No.: 18/165,428

(22) Filed: Feb. 7, 2023

(65) Prior Publication Data
US 2023/0187811 A1 Jun. 15, 2023

Related U.S. Application Data

(63) Continuation of application No. PCT/IB2022/062140, filed on Dec. 13, 2022.
(Continued)

(51) Int. Cl.
*H01Q 1/24* (2006.01)
*G06Q 10/087* (2023.01)
(Continued)

(52) U.S. Cl.
CPC ....... *G06Q 10/087* (2013.01); *G06K 7/10128* (2013.01); *G06K 7/10366* (2013.01);
(Continued)

(58) Field of Classification Search
CPC ...... H01Q 1/2216; H01Q 1/2225; H01Q 9/26; G06K 19/025; G06K 7/10128;
(Continued)

(56) References Cited

U.S. PATENT DOCUMENTS

| 3,231,834 A | 1/1966 | Watanabe |
| 4,688,026 A | 8/1987 | Scribner |

(Continued)

FOREIGN PATENT DOCUMENTS

| CN | 108471948 A | 8/2018 |
| EP | 3279836 A1 | 2/2018 |

(Continued)

OTHER PUBLICATIONS

Extended European Search Report for European Application No. 21207656.6, dated Feb. 7, 2022 (13 pages).
(Continued)

*Primary Examiner* — Thien M Le
(74) *Attorney, Agent, or Firm* — FINNEGAN, HENDERSON, FARABOW, GARRETT & DUNNER LLP

(57) ABSTRACT

Consistent with disclosed embodiments, systems, methods, and computer readable media pertaining to a battery-less identification tag for embedding into products may be provided. Embodiments may include a flexible substrate; a first differential antenna on the flexible substrate, the first differential antenna including a first meandering arm and a second meandering arm, and the first differential antenna being of a first size; a second differential antenna on the flexible substrate, the second differential antenna including a third meandering arm and fourth meandering arm, and the second differential antenna being of a second size smaller than the first size; and at least one communications chip connected to the first differential antenna and the second differential antenna.

19 Claims, 24 Drawing Sheets

Related U.S. Application Data

(60) Provisional application No. 63/330,727, filed on Apr. 13, 2022, provisional application No. 63/265,298, filed on Dec. 13, 2021.

(51) Int. Cl.
*G06K 7/10* (2006.01)
*G06K 7/14* (2006.01)
*G06Q 30/0201* (2023.01)
*G06Q 10/0875* (2023.01)
*G06Q 30/0601* (2023.01)
*G08B 13/24* (2006.01)
*G06K 19/02* (2006.01)
*G06Q 30/0251* (2023.01)
*H01Q 1/22* (2006.01)

(52) U.S. Cl.
CPC ....... *G06K 7/10386* (2013.01); *G06K 7/1417* (2013.01); *G06K 19/025* (2013.01); *G06Q 10/0875* (2013.01); *G06Q 30/0201* (2013.01); *G06Q 30/0261* (2013.01); *G06Q 30/0639* (2013.01); *G08B 13/2482* (2013.01); *H01Q 1/2216* (2013.01); *G06K 2007/10524* (2013.01)

(58) Field of Classification Search
CPC ........... G06K 7/10366; G06K 7/10386; G06K 19/0723; G06K 19/07749; G06K 19/07798; G06Q 30/0201; G06Q 30/0261; G06Q 10/0875; G06Q 30/0639
See application file for complete search history.

(56) References Cited

U.S. PATENT DOCUMENTS

| | | | |
|---|---|---|---|
| 6,097,301 A | 8/2000 | Tuttle |
| 6,476,708 B1 | 11/2002 | Johnson |
| 6,609,198 B1 | 8/2003 | Wood |
| 6,617,962 B1 | 9/2003 | Horwitz |
| 6,693,599 B1 | 2/2004 | Chia |
| 6,927,637 B1 | 8/2005 | Koh |
| 7,034,683 B2 | 4/2006 | Ghazarian |
| 7,170,201 B2 | 1/2007 | Hamel |
| 7,187,299 B2 | 3/2007 | Kunerth |
| 7,233,958 B2 | 6/2007 | Weng |
| 7,242,306 B2 | 7/2007 | Wildman |
| 7,298,264 B1 | 11/2007 | Kuzma |
| 7,400,298 B2 | 7/2008 | Fogg |
| 7,518,511 B1 | 4/2009 | Panja |
| 7,521,890 B2 | 4/2009 | Lee |
| 7,551,137 B2 | 6/2009 | Gagnon |
| 7,620,568 B1 | 11/2009 | Parker-Malchak |
| 7,633,378 B2 | 12/2009 | Rodgers |
| 7,940,224 B2 | 5/2011 | Kato |
| 8,232,868 B2 | 7/2012 | Steeves |
| 8,242,907 B2 | 8/2012 | Butler |
| 8,457,757 B2 | 6/2013 | Cauller |
| 8,459,541 B2 | 6/2013 | Yoo |
| 8,668,139 B2 | 3/2014 | Yoo |
| 9,087,281 B2 | 7/2015 | Maguire |
| 9,396,447 B2 | 7/2016 | Dalley, Jr. |
| 9,436,923 B1 | 9/2016 | Sriram |
| 9,680,533 B2 | 6/2017 | Gudan |
| 9,740,895 B1 | 8/2017 | Liu |
| 9,767,230 B2 | 9/2017 | Kimchi |
| 10,127,486 B2 | 11/2018 | Glaser |
| 10,128,857 B1 | 11/2018 | Elkholy |
| 10,158,401 B2 | 12/2018 | Hull |
| 10,681,133 B2 | 6/2020 | Puleston |
| 10,805,130 B2 | 10/2020 | Shakedd |
| 10,922,939 B1 | 2/2021 | Shakedd |
| 10,930,128 B2 | 2/2021 | Shakedd |
| 10,991,220 B2 | 4/2021 | Shakedd |
| 10,997,840 B2 | 5/2021 | Shakedd |
| 11,107,336 B2 | 8/2021 | Shakedd |
| 11,138,851 B2 | 10/2021 | Shakedd |
| 11,170,620 B2 | 11/2021 | Shakedd |
| 11,217,077 B2 | 1/2022 | Shakedd |
| 11,238,714 B2 | 2/2022 | Shakedd |
| 11,288,939 B2 | 3/2022 | Shakedd et al. |
| 11,288,940 B2 | 3/2022 | Shakedd et al. |
| 11,295,592 B2 | 4/2022 | Shakedd et al. |
| 11,341,828 B2 | 5/2022 | Shakedd et al. |
| 11,398,144 B2 | 7/2022 | Shakedd et al. |
| 11,508,225 B2 | 11/2022 | Shakedd et al. |
| 11,551,537 B2 | 1/2023 | Shakedd et al. |
| 2002/0008633 A1 | 1/2002 | Heller |
| 2002/0017979 A1 | 2/2002 | Krause |
| 2002/0019761 A1 | 2/2002 | Lidow |
| 2002/0190845 A1 | 12/2002 | Moore |
| 2003/0104848 A1 | 6/2003 | Brideglall |
| 2003/0151511 A1 | 8/2003 | Duncan |
| 2004/0078662 A1 | 4/2004 | Hamel |
| 2004/0100359 A1 | 5/2004 | Reade |
| 2004/0155755 A1 | 8/2004 | Bui |
| 2004/0188531 A1 | 9/2004 | Gengel |
| 2004/0199428 A1 | 10/2004 | Silverbrook et al. |
| 2004/0242201 A1 | 12/2004 | Sasakura |
| 2004/0266481 A1 | 12/2004 | Patel |
| 2005/0017602 A1 | 1/2005 | Arms |
| 2005/0040961 A1 | 2/2005 | Tuttle |
| 2005/0052281 A1 | 3/2005 | Bann |
| 2005/0110641 A1 | 5/2005 | Mendolia |
| 2005/0110674 A1 | 5/2005 | Mendolia |
| 2005/0113138 A1 | 5/2005 | Mendolia |
| 2005/0159187 A1 | 7/2005 | Mendolia |
| 2005/0179551 A1 | 8/2005 | Lian |
| 2005/0207848 A1 | 9/2005 | Kunerth |
| 2005/0253686 A1 | 11/2005 | Shafer |
| 2005/0263591 A1 | 12/2005 | Smith |
| 2006/0028378 A1* | 2/2006 | Gaucher ............... H01Q 1/2283 343/872 |
| 2006/0038658 A1 | 2/2006 | Jarvis |
| 2006/0049947 A1 | 3/2006 | Forster |
| 2006/0109109 A1 | 5/2006 | Rajapakse |
| 2006/0114109 A1 | 6/2006 | Geissler |
| 2006/0143452 A1 | 6/2006 | Numao et al. |
| 2006/0145814 A1 | 7/2006 | Son |
| 2006/0158316 A1 | 7/2006 | Eckstein |
| 2006/0229113 A1 | 10/2006 | Rowse |
| 2006/0230232 A1 | 10/2006 | Yokomizo |
| 2006/0255917 A1 | 11/2006 | Park |
| 2006/0276206 A1 | 12/2006 | Shiatsu |
| 2007/0001812 A1 | 1/2007 | Powell |
| 2007/0016942 A1 | 1/2007 | Sakai et al. |
| 2007/0024423 A1 | 2/2007 | Nikitin |
| 2007/0046470 A1 | 3/2007 | Pempsell |
| 2007/0090185 A1 | 4/2007 | Lewkowitz |
| 2007/0103303 A1 | 5/2007 | Shoarinejad |
| 2007/0159338 A1 | 7/2007 | Beber |
| 2007/0159400 A1* | 7/2007 | DeJean ................ H01Q 19/005 343/846 |
| 2007/0179978 A1 | 8/2007 | Lee |
| 2007/0188342 A1 | 8/2007 | Valeriano |
| 2007/0229268 A1 | 10/2007 | Swan |
| 2007/0282716 A1 | 12/2007 | Branigan |
| 2008/0048863 A1 | 2/2008 | Copeland |
| 2008/0048867 A1 | 2/2008 | Oliver |
| 2008/0100423 A1 | 5/2008 | Geissler |
| 2008/0100446 A1 | 5/2008 | Shintani |
| 2008/0122584 A1 | 5/2008 | Ltasaki |
| 2008/0143482 A1 | 6/2008 | Shoarinejad |
| 2008/0169909 A1 | 7/2008 | Park |
| 2008/0237339 A1 | 10/2008 | Stawar |
| 2008/0284600 A1 | 11/2008 | Drzaic |
| 2008/0297324 A1 | 12/2008 | Tuttle |
| 2008/0309490 A1 | 12/2008 | Honkanen |
| 2008/0311861 A1 | 12/2008 | Lepek |
| 2009/0058614 A1 | 3/2009 | Roz |
| 2009/0066516 A1 | 3/2009 | Lazo |
| 2009/0073070 A1* | 3/2009 | Rofougaran ......... H04B 5/0012 343/866 |

(56) References Cited

U.S. PATENT DOCUMENTS

| | | |
|---|---|---|
| 2009/0085745 A1 | 4/2009 | Gupta |
| 2009/0085746 A1 | 4/2009 | Erickson |
| 2009/0115578 A1 | 5/2009 | Geissler |
| 2009/0117872 A1 | 5/2009 | Jorgenson |
| 2009/0121828 A1 | 5/2009 | Suzuki |
| 2009/0146791 A1 | 6/2009 | Jantunen |
| 2009/0146816 A1 | 6/2009 | Patel |
| 2009/0189739 A1 | 7/2009 | Wang |
| 2009/0192647 A1 | 7/2009 | Nishiyama |
| 2009/0251286 A1 | 10/2009 | Black |
| 2009/0256680 A1 | 10/2009 | Kilian |
| 2009/0295543 A1 | 12/2009 | Kita |
| 2010/0019035 A1 | 1/2010 | Larson |
| 2010/0026467 A1 | 2/2010 | Van Eeden |
| 2010/0052865 A1 | 3/2010 | Eckstein |
| 2010/0059595 A1 | 3/2010 | Longfu |
| 2010/0121862 A1 | 5/2010 | Twitchell, Jr. |
| 2010/0250305 A1 | 9/2010 | Lee |
| 2010/0271187 A1 | 10/2010 | Uysal |
| 2011/0029997 A1 | 2/2011 | Wolinsky |
| 2011/0148409 A1* | 6/2011 | Aerts .......... A61B 5/0806 324/307 |
| 2011/0156968 A1* | 6/2011 | Qi .......... H01Q 7/00 343/702 |
| 2011/0181392 A1 | 7/2011 | Cha |
| 2011/0223874 A1 | 9/2011 | Callaway, Jr. |
| 2011/0285511 A1 | 11/2011 | Maguire |
| 2012/0126945 A1 | 5/2012 | Kim |
| 2012/0127047 A1* | 5/2012 | Gertenbach .......... H01Q 1/2283 343/788 |
| 2012/0161931 A1 | 6/2012 | Karmakar |
| 2012/0217307 A1 | 8/2012 | Martin |
| 2012/0286930 A1 | 11/2012 | Kim |
| 2013/0105584 A1 | 5/2013 | Forster |
| 2013/0194100 A1 | 8/2013 | Granhed |
| 2013/0214044 A1 | 8/2013 | Sperduti et al. |
| 2013/0231760 A1 | 9/2013 | Rosen |
| 2014/0097254 A1 | 4/2014 | Downie |
| 2014/0111338 A1 | 4/2014 | Bergman |
| 2014/0266727 A1 | 9/2014 | Padula |
| 2014/0279204 A1 | 9/2014 | Roketenetz |
| 2014/0279294 A1 | 9/2014 | Field-Darragh |
| 2015/0048682 A1 | 2/2015 | Murley |
| 2015/0097716 A1 | 4/2015 | Wisherd |
| 2015/0145680 A1 | 5/2015 | Favier |
| 2015/0186692 A1 | 7/2015 | Stengel |
| 2015/0235237 A1 | 8/2015 | Shaw |
| 2015/0269818 A1 | 9/2015 | Jain |
| 2015/0302475 A1 | 10/2015 | Zachariah et al. |
| 2015/0307245 A1 | 10/2015 | Puccini |
| 2016/0019766 A1 | 1/2016 | Padula |
| 2016/0026837 A1 | 1/2016 | Good |
| 2016/0035197 A1 | 2/2016 | Soto |
| 2016/0049030 A1 | 2/2016 | G |
| 2016/0049058 A1 | 2/2016 | Allen |
| 2016/0050530 A1 | 2/2016 | Corbalis |
| 2016/0055730 A1 | 2/2016 | Bergman |
| 2016/0064946 A1 | 3/2016 | Cho |
| 2016/0098730 A1 | 4/2016 | Feeney |
| 2016/0098907 A1 | 4/2016 | Noone |
| 2016/0132532 A1 | 5/2016 | German |
| 2016/0148150 A1 | 5/2016 | Curtat |
| 2016/0180126 A1 | 6/2016 | Saleem |
| 2016/0210483 A1 | 7/2016 | Glaser |
| 2016/0284014 A1 | 9/2016 | Adel |
| 2016/0307013 A1 | 10/2016 | Uysal |
| 2017/0067983 A1 | 3/2017 | Teicher |
| 2017/0075346 A1 | 3/2017 | Oya |
| 2017/0078851 A1 | 3/2017 | Agrawal |
| 2017/0117634 A1* | 4/2017 | Park .......... H01Q 9/285 |
| 2017/0131222 A1 | 5/2017 | Zalbide Agirrezabalaga |
| 2017/0140330 A1 | 5/2017 | Rinzler |
| 2017/0208545 A1 | 7/2017 | Siann |
| 2017/0228566 A1 | 8/2017 | Sengstaken, Jr. |
| 2017/0330066 A1 | 11/2017 | Gibson |
| 2018/0089475 A1 | 3/2018 | Hattori |
| 2018/0096566 A1 | 4/2018 | Blair, II |
| 2018/0189725 A1 | 7/2018 | Mattingly et al. |
| 2018/0254640 A1 | 9/2018 | Jung |
| 2018/0293543 A1 | 10/2018 | Tiwari et al. |
| 2018/0300671 A1 | 10/2018 | Richardson |
| 2019/0005283 A1 | 1/2019 | Nikitin |
| 2019/0084525 A1 | 3/2019 | Ignaczak et al. |
| 2019/0096209 A1 | 3/2019 | Chen |
| 2019/0102586 A1 | 4/2019 | Miller |
| 2019/0120471 A1 | 4/2019 | Witty |
| 2019/0165826 A1 | 5/2019 | Goto |
| 2019/0188545 A1 | 6/2019 | Locke |
| 2019/0325503 A1 | 10/2019 | Fein |
| 2020/0004995 A1 | 1/2020 | Kawaguchi |
| 2020/0057885 A1 | 2/2020 | Rao |
| 2020/0068720 A1* | 2/2020 | Takashima .......... H01Q 1/2283 |
| 2020/0090481 A1 | 3/2020 | Huang |
| 2020/0096599 A1 | 3/2020 | Hewett |
| 2020/0175462 A1 | 6/2020 | Tan et al. |
| 2020/0200892 A1 | 6/2020 | Rajab |
| 2020/0226333 A1 | 7/2020 | Riggert |
| 2020/0226544 A1 | 7/2020 | Savage et al. |
| 2020/0226900 A1 | 7/2020 | Ho |
| 2020/0227813 A1 | 7/2020 | Yehezkely |
| 2020/0250958 A1 | 8/2020 | Wilson |
| 2020/0273013 A1 | 8/2020 | Garner |
| 2020/0320476 A1 | 10/2020 | Ellis |
| 2020/0327782 A1 | 10/2020 | Wong |
| 2020/0372521 A1 | 11/2020 | Norby |
| 2021/0019766 A1 | 1/2021 | Shakedd |
| 2021/0020012 A1 | 1/2021 | Shakedd |
| 2021/0027608 A1 | 1/2021 | Shakedd |
| 2021/0027616 A1 | 1/2021 | Shakedd |
| 2021/0103708 A1 | 4/2021 | Tanriover |
| 2021/0174655 A1 | 6/2021 | Born et al. |
| 2021/0233157 A1 | 7/2021 | Crutchfield, Jr. |
| 2021/0295128 A1* | 9/2021 | Jelken .......... G06K 19/07773 |
| 2021/0304124 A1 | 9/2021 | Kawaguti |
| 2021/0350448 A1 | 11/2021 | Phillips et al. |
| 2021/0398163 A1 | 12/2021 | Nelsen |
| 2022/0156773 A1 | 5/2022 | Warzelhan |
| 2022/0416428 A1* | 12/2022 | Zhou .......... H01Q 13/10 |

FOREIGN PATENT DOCUMENTS

| | | |
|---|---|---|
| GB | 2396781 A | 6/2004 |
| GB | 2541257 B | 4/2020 |
| JP | 2004-500760 A | 1/2004 |
| JP | 2018-124767 A | 8/2018 |
| KR | 2020-0056180 A | 5/2020 |
| WO | WO 2001/006444 A1 | 1/2001 |
| WO | WO 2002/001467 A2 | 1/2002 |
| WO | WO 2020/208412 A1 | 10/2020 |
| WO | WO 2020/208412 A1 | 10/2020 |

OTHER PUBLICATIONS

First Examination Report for Indian Application No. 202147051724, dated Jan. 18, 2022 (7 pages).

G. Barmpalias et al., *Algorithmic Randomness of Closed Sets* (available Jun. 3, 2007) accessed on Apr. 27, 2022 from https://www.rweber.net/mathpapers/randclosedsets.pdf (24 pages).

International Search Report and Written Opinion of the International Searching Authority from the European Patent Office for corresponding International Application No. PCT/IB2020/000254, dated Aug. 10, 2020 (43 pages).

International Search Report and Written Opinion of the International Searching Authority for International Application No. PCT/IB2022/000004, dated Apr. 25, 2022 (10 pages).

Ferracuti et al., A business application of RTLS technology in Intelligent Retail Environment: Defining the shopper's preferred path and its segmentation, Journal of Retailing and Consumer Services 47, pp. 184-194 (Mar. 2019) (11 pages).

(56) References Cited

OTHER PUBLICATIONS

International Search Report and Written Opinion of the International Searching Authority for International Application No. PCT/IB2022/062140, dated May 15, 2023 (15 pages).

* cited by examiner

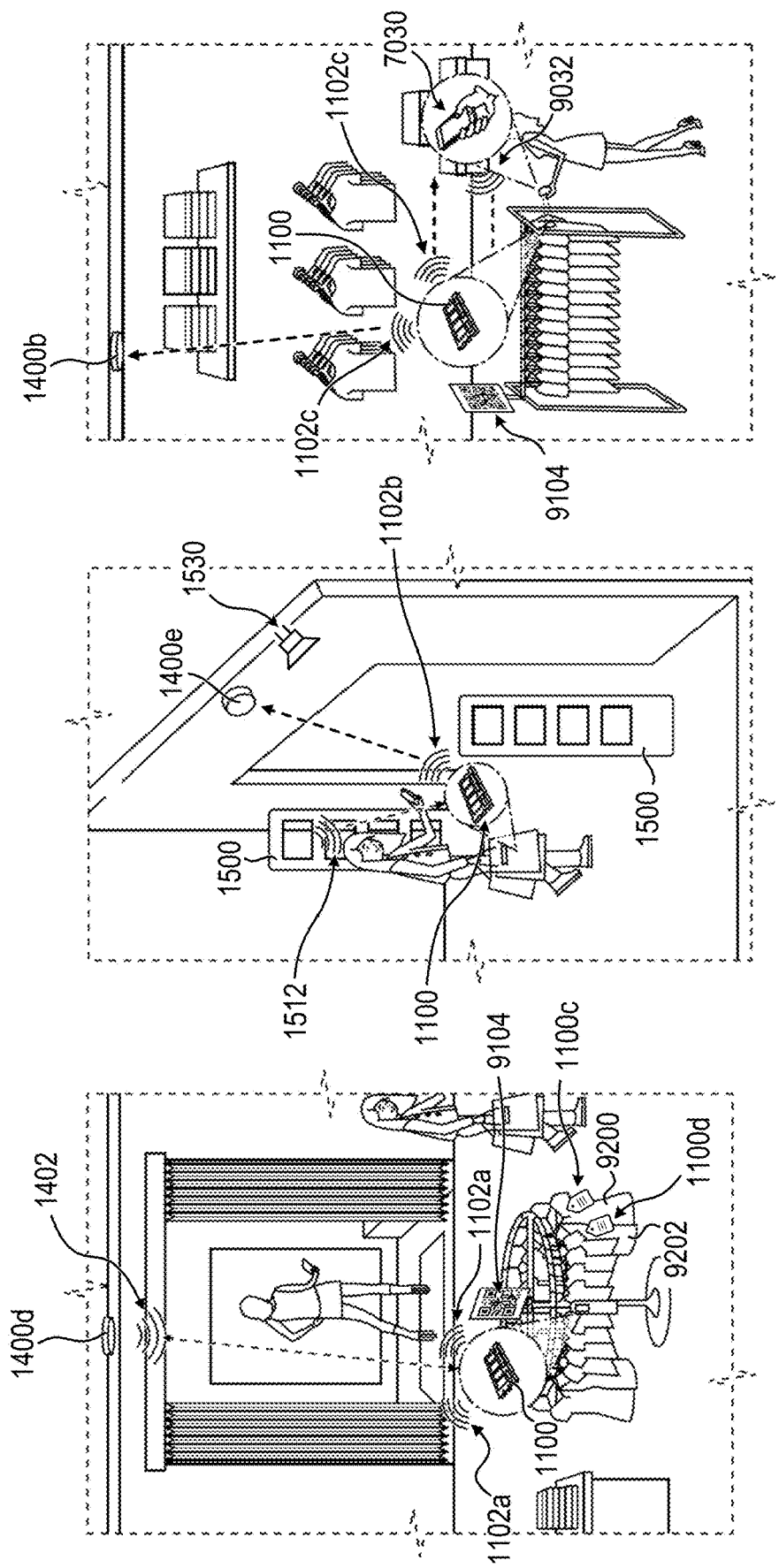

| Product 1510 | Wireless Tag 1512 | Product Family 1514 | |
|---|---|---|---|
| Product_1416A | Wireless_Tag_1418A | Family_A | ← 1520A |
| Product_1416B | Wireless_Tag_1418B | Family_A | ← 1520B |
| Product_1416C | Wireless_Tag_1418C | Family_B | ← 1520C |
| Product_1416D | Wireless_Tag_1418D | Family_C | ← 1520D |
| Product_1416E | Wireless_Tag_1418E | Family_C | ← 1520E |
| Product_1416F | Wireless_Tag_1418F | Family_C | ← 1520F |

| Product Family 1610 | Engagement Count 1612 | Sale Count 1614 | Conversion Score 1616 | |
|---|---|---|---|---|
| Family_A | 13 | 6 | 6/13 (46%) | 1620A |
| Family_B | 43 | 3 | 3/43 (7%) | 1620B |
| Family_C | 27 | 6 | 6/27 (22%) | 1620C |

| 1910 | 1914 | 1916 |
|---|---|---|
| 1 | 👖 | Clothing |
| 2 | 👕 | Clothing |
| 3 | 💍 | Jewelry |
| 4 | 📎 | Office Supplies |
| 5 | 🪑 | Office Supplies |

FIG. 19

大ANTENNA, FOUR-ARMED IDENTIFICATION TAG

CROSS-REFERENCE TO RELATED APPLICATIONS

This application is a continuation of and claims the benefit of priority to International Application No. PCT/IB2022/062140, filed Dec. 13, 2022, which claims the benefit of priority of U.S. Provisional Patent Application No. 63/265,298, filed Dec. 13, 2021, and U.S. Provisional Patent Application No. 63/330,727, filed Apr. 13, 2022, each of which is hereby incorporated by reference in its entirety.

TECHNICAL FIELD

The disclosed embodiments generally relate to wireless tags for association with products and systems and methods for tracking product inventory and human traffic in retail establishments with wireless tags.

BACKGROUND

Recent years have shown the exponential growth of e-commerce as an additional venue for retail, in addition to physical stores. In many market segments, the convenience of e-commerce and its contact-free nature have shifted many customers from physical to digital channels. These trends are especially evident in the aftermath of the recent global pandemic, which has arguably accelerated the proliferation of e-commerce.

From the perspective of retailers, one advantage of current e-commerce platforms is the wealth of data that is generated each time a customer visits the retailer's website or mobile application ("app"), browses merchandise, or completes a purchase or return. Valuable insights about the retailer, merchandise, and even the consumers can be gleaned from this data. Retailers can use this data to adjust various aspects of their business including product inventory and pricing, advertising, and their e-commerce platforms, thus increasing profitability and reducing waste.

Currently, the abundance of data in e-commerce is not available in physical retail stores. Indeed, the only data that is easily available for most retail stores is bottom-line sales data, which provides no insight to the customer journey prior to the moment of the sale. Additionally, bottom-line sales data does not account for customers' browsing habits or for the numerous customers who enter the store and engage with the merchandise, but who do not buy anything. Thus, there is a need for systems and methods for generating customer journey data in physical stores without inconveniencing shoppers, intruding into individual's privacy, or interfering with store operations. In addition, there is also a need for providing other benefits of e-commerce to the physical shopping experience, including quick and contact-free transactions and improved techniques for tracking movement of products throughout establishments and retail networks.

SUMMARY

Embodiments consistent with the present disclosure provide systems and methods generally relating to wireless tags for association with products. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer readable storage media may store program instructions, which are executable by at least one processing device and perform any of the steps and/or methods described herein.

Consistent with disclosed embodiments, devices, systems, methods, and computer readable media related to battery-less identification tags for embedding into products are disclosed. Embodiments may include a flexible substrate. Embodiments may also include a first differential antenna on the flexible substrate, the first differential antenna including a first meandering arm and a second meandering arm, and the first differential antenna being of a first size. The embodiments may also include a second differential antenna on the flexible substrate, the second differential antenna include a third meandering arm and fourth meandering arm, and the second differential antenna being of a second size smaller than the first size. Embodiments may also include at least one communications chip connected to the first differential antenna and the second differential antenna.

Consistent with disclosed embodiments, devices, systems, methods, and computer readable media for electronically tracking conversion scores of wirelessly tagged products are disclosed. Embodiments may include accessing a retail establishment layout, wherein at least one location in the retail establishment layout is designated as a fitting room. Embodiments may also include receiving via at least one wireless receiver in the retail establishment, wireless signals from a plurality of wireless tags, wherein each wireless tag is attached to an associated product. Embodiments may also include accessing a data structure linking each of the associated products with one of the plurality of wireless tags, wherein the data structure also links each of the associated products with a product family. Embodiments may also include determining, based on the wireless signals, each particular associated product that is newly in the at least one location designated as a fitting room. Embodiments may also include for each particular associated product that is newly in the at least one location designated as a fitting room, increasing an engagement count for the associated product family. Embodiments may also include for each associated product family, receiving an indication of each sale in the associated product family and increase a sale count for the associated product family. Embodiments may also include calculating, from the engagement count and the sale count, a conversion score for each associated product family.

Consistent with disclosed embodiments, devices, systems, methods, and computer readable media for presence accuracy enhancement in a wireless tag tracking environment are disclosed. Embodiments may include accessing a data structure linking each of a plurality of wireless identification tags with an associated product, wherein each associated product is linked to an associated product family. Embodiments may also include receiving in a first time period, first identification transmissions from a first set of at least some of the plurality of wireless identification tags. Embodiments may also include determining locations of the first set of wireless identification tags during the first time period based on the received first identification transmissions. Embodiments may also include receiving in a second time period, following the first time period, second identification transmissions from a second set of at least some of the plurality of wireless identification tags. Embodiments may also include determining locations of the second set of wireless identification tags during the second time period based on the received second identification transmissions. Embodiments may also include determining, based on a difference between the first identification transmissions and the second identification transmissions, a cessation of reception of a missing wireless identification tag. Embodiments may also include determining a likelihood that the missing wireless identification tag remains present at a particular location of the missing wireless identification tag, the particular location being a determined location of the missing wireless identification tag during the first time period, wherein determining the likelihood is based on at least two of the particular location of the missing wireless identification tag during the first time period, other products detected during the second time period in proximity to a previously known location of the missing wireless identification tag, locations determined during the second time period of other wireless identification tags linked to associated products of a same product family as the missing wireless identification tag, identification transmissions received during the second time period from other wireless identification tags linked to associated products of the same product family as the missing wireless identification tag whose identification transmissions were not received during the first time period, structures in proximity to the particular location of the missing wireless identification tag during the first time period, a total number of other products in the product family of the missing wireless identification tag detected during the second time period, or a total number of products in the product family of the missing wireless identification tag expected to be present during the second time period. Embodiments may also include adjusting an inventory based on the determined likelihood.

Consistent with disclosed embodiments, devices, systems, methods, and computer readable media for detecting human traffic based on reception of wireless identification signals transmitted by a plurality of wireless tags are disclosed. Embodiments may include receiving, during a first period of limited traffic activity, first signals transmitted from a plurality of wireless tags to a plurality of receivers within an establishment. Embodiments may also include determining, based on the first signals, baseline signal characteristics for at least one location within the establishment. Embodiments may also include receiving, during a second period of increased traffic activity, second signals transmitted from the plurality of wireless tags to the plurality of receivers within the establishment. Embodiments may also include determining, based on the second signals, signal characteristics for the at least one location during the second period. Embodiments may also include comparing the baseline signal characteristics to the signal characteristics during the second period to determine deviations from the baseline signal characteristics in the at least one location. Embodiments may also include estimating, based on the deviations from the baseline signal characteristics in the at least one location, a level of traffic activity in each location of the at least one location.

Consistent with disclosed embodiments, devices, systems, methods, and computer readable media for unassisted purchasing of wirelessly tagged products in a retail establishment are disclosed. Embodiments may include receiving from a mobile communications device, scanned data of a printed code associated with a particular item to be purchased. Embodiments may also include accessing at least one data structure linking each of a plurality of wireless identification tags with an associated item available for purchase in the retail establishment, wherein the printed code is linked to at least one particular wireless identification tag. Embodiments may also include causing generation of at least one trigger signal for triggering the at least one particular wireless identification tag to transmit a responsive identification signal. Embodiments may also include receiving the transmitted identification signal from the at least one particular wireless identification tag. Embodiments may also include determining, based on the received identification signal, an identity of the particular wireless identification tag associated with the particular item to be purchased. Embodiments may also include processing a sale of the particular item by updating the at least one data structure to account for removal of the particular item from an inventory.

The forgoing summary provides certain examples of disclosed embodiments to provide a flavor for this disclosure and is not intended to summarize all aspects of the disclosed embodiments. Additional features and advantages of the disclosed embodiments will be set forth in part in the description that follows, and in part will be apparent from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

The accompanying drawings, which are incorporated in and constitute a part of this disclosure, illustrate various disclosed embodiments. In the drawings:

FIG. 9A depicts an example of a wireless tag operating in an infrastructure-excitable mode, consistent with disclosed embodiments.

FIG. 9B depicts an example of a wireless tag operating in a gate mode, consistent with disclosed embodiments.

FIG. 9C depicts an example of a wireless tag operating in a user-excitable mode, consistent with disclosed embodiments.

FIG. 15 shows an example of a data structure, consistent with disclosed embodiments.

FIG. 16 shows examples of conversion scores, consistent with disclosed embodiments.

FIG. 19 illustrates an example of a data structure linking a plurality of wireless identification tags with an associated product and an associated product family, consistent with disclosed embodiments.

DETAILED DESCRIPTION

Figure 1:
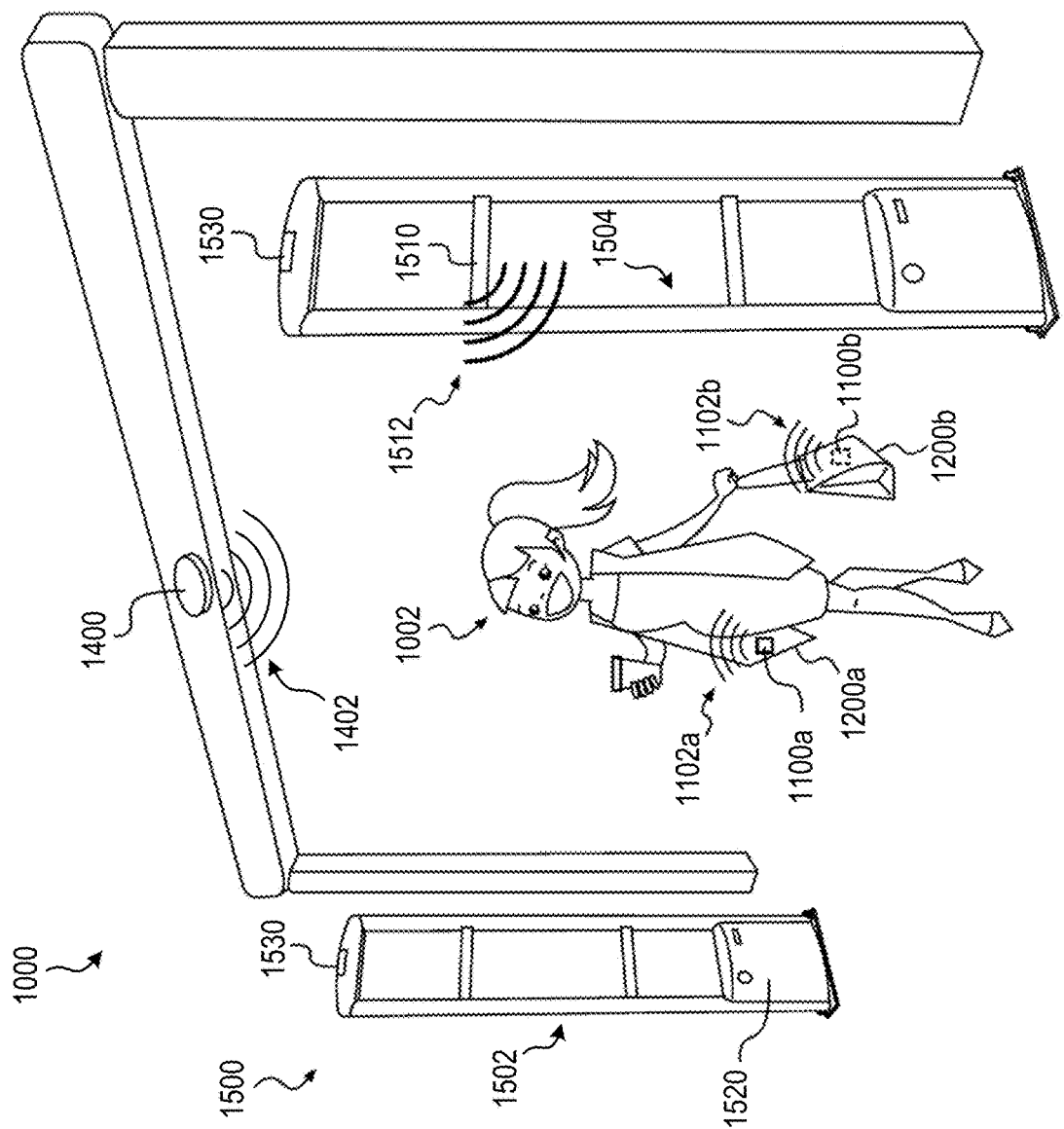
FIG. 1 is a perspective view of an example of an electronic tracking system including a security gate, a first wireless tag incorporated into an item worn by a user, and a second wireless tag incorporated into an item held by the user, consistent with disclosed embodiments.

Exemplary embodiments are described with reference to the accompanying drawings. In the figures, which are not necessarily drawn to scale, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used in the present disclosure and in the appended claims, the singular forms "a," "an," and "the" include plural references unless the context clearly dictates otherwise.

Unless specifically stated otherwise, as apparent from the following description, throughout the specification discussions utilizing terms such as "processing," "calculating," "computing," "determining," "generating," "setting," "configuring," "selecting," "defining," "applying," "obtaining," "monitoring," "providing," "identifying," "segmenting," "classifying," "analyzing," "associating," "extracting," "storing," "receiving," "transmitting," or the like, include actions and/or processes of a computer that manipulate and/or transform data into other data, the data represented as physical quantities, for example such as electronic quantities, and/or the data representing physical objects. The terms "computer," "processor," "controller," "processing unit," "computing unit," and "processing module" should be expansively construed to cover any kind of electronic device, component or unit with data processing capabilities, including, by way of non-limiting example, a personal computer, a wearable computer, smart glasses, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as," "for instance" and variants thereof describe non-limiting embodiments of the presently disclosed subject matter. Reference in the specification to features of "embodiments," "one case," "some cases," "other cases" or variants thereof means that a particular feature, structure or characteristic described may be included in at least one embodiment of the presently disclosed subject matter. Thus the appearance of such terms does not necessarily refer to the same embodiment(s). As used herein, the term "and/or" includes any and all combinations of one or more of the associated listed items.

Features of the presently disclosed subject matter are, for brevity, described in the context of particular embodiments. However, it is to be understood that features described in connection with one embodiment are also applicable to other embodiments. Likewise, features described in the context of a specific combination may be considered separate embodiments, either alone or in a context other than the specific combination.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

Examples of the presently disclosed subject matter are not limited in application to the details of construction and the arrangement of the components set forth in the following description or illustrated in the drawings. The subject matter may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings. The drawings in this document may not be to any scale. Different figures may use different scales and different scales can be used even within the same drawing, for example different scales for different views of the same object or different scales for the two adjacent objects.

Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random-Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Disclosed embodiments generally relate to wireless communication tags configured to be embedded within, attached to, or otherwise associated with physical items in order to digitally represent each item on an exemplary digital platform. In some embodiments, an exemplary tag may be configured to harvest ambient energy and to use the harvested energy to send an identification signal to a receiver. The identification signal may include various types of data, including product, location, history, status, ownership, and/or characteristic data. Such data may be conveyed to a receiver associated with various types of platforms, depending on intended use. The platform may be, for example, a software program, running on one or more servers, for accomplishing one or more types of product tracking and/or authentication. Examples of platforms with which disclosed embodiments may be employed include, but are not limited to, inventory management systems in business establishments such as stores and warehouses; systems for tracking human traffic through retail businesses and other establishments; manufacturing systems for tracking components used during the manufacture of products; transportation and distribution systems for tracking parcels and other deliverables through transit and delivery; other supply chain management; wardrobe management systems for tracking clothing items stored in wardrobes and closets; clothing laundering systems for tracking the cleaning of clothing items and/or receipt of clothing to be laundered and the return of clothing to either a customer or a designated location such as a closet or wardrobe; food delivery systems; systems for managing ownership of goods transferred to differing owners; security systems for retail establishments and other businesses; systems for authenticating goods to prevent counterfeiting; vehicle tracking systems; systems for tracking materials and or persons in vehicles and/or in public and private domains; waste management systems; and all other systems where it may be beneficial to track and/or authenticate people, animals, or objects.

In some embodiments, the exemplary tag may be configured to harvest energy without a designated battery and to operate, in both an active transmission state and an idle state, while consuming minimum amounts of power. Advantageously, the configuration of the exemplary tag may enable radio performance comparable to commercial battery-powered devices, at a power envelope comparable to a passive RFID device.

FIG. 1 illustrates a non-limiting embodiment of an electronic tracking system 1000 including two wireless tags 1100a and 1100b in an environment of a transmitting-receiving device 1400 and a security gate 1500, such as an Electronic Article Surveillance (EAS) gate. In some embodiments, one or both of tags 1100a and 1100b may be wireless tags. Tag 1100a may be embedded, sewn, clipped, attached, or otherwise incorporated into an object, such as clothing item 1200a. Tag 1100b may be attached to, or otherwise incorporated with, an item purchased or otherwise procured by user 1002 and held within bag 1200b. Tags 1100a and 1100b may be configured to transmit wireless signals to, and receive wireless signals from, other features in system 1000, such as transmitting-receiving device 1400 and security gate 1500. For example, tags 1100a and 1100b may each include one or more antennae configured to transmit and receive data signals and/or energy via at least one wireless communication medium, such as Wi-Fi, Bluetooth, GSM, 3G, LTE, 5G, ZigBee, Z-wave, electromagnetic signals, magnetic signals, audio signals, or any other communication protocol. In some embodiments (and as discussed in further detail herein), tags 1100a and 1100b may be configured to harvest and store ambient energy, and to use the stored energy to power its operations, including the transmission of data signals to other devices.

In some embodiments, the system 1000 of FIG. 1 may include at least one transmitting-receiving device 1400 configured to receive broadcasts of signals from a plurality of wireless tags (such as signals 1102a and 1102b depicted in FIG. 1) and also configured to deliver energy to be harvested and stored by the wireless tags in order to power the wireless tags, as discussed in detail below. For example, device 1400 may include a transceiver, a router, a duplexer, or any other device configured to both transmit and receive wireless signals. In some alternative embodiments, the system 1000 may include a plurality of receivers configured to receive broadcasts of signals from the wireless tags, as well as a plurality of transmitters (e.g., a plurality of exciters) configured to deliver energy to be harvested and stored by the wireless tags. However, persons of ordinary skill will understand that systems described herein may include only transmitting-receiving devices (such as device 1400), only receiver devices and transmitting devices, or any desired combination thereof. Additionally, persons of ordinary skill will understand that transmitters and receivers described herein may be implemented as separate devices and/or as combination transmitting-receiving devices (such as transmitting-receiving device 1400), and vice versa.

Returning to FIG. 1, system 1000 may include additional infrastructure configured to wirelessly communicate with wireless tags 1100. For example, in the example shown in FIG. 1, system 1000 may include a security gate 1500 with a first pedestal 1502 and second pedestal 1504 positioned near an entryway or exit, or at any other location within, a retail establishment. One or both pedestals may include an EAS transmitter 1510 and an EAS receiver 1520 configured to wirelessly communicate with conventional security tags and/or with wireless tags. For example, EAS receiver 1520 may be configured to detect a conventional security tag and/or a wireless tag 1100 passing through security gate 1500 and may accordingly trigger an alarm 1530. As a result, attempted theft of merchandise from the retail establishment may be detected and indicated by the security gate 1500. Additionally, or alternatively, security gate 1500 may be configured to emit a signal 1512 that is detectable by wireless tag 1100, while wireless tag 1100 remains undetectable by the security gate. When wireless tag 1100 receives the signal 1512 emitted by the security gate 1500, the tag may respond by transmitting an identification (ID) signal 1102. This identification signal can then be received by transmitting-receiving device 1400, which may then relay the signal to a security system capable of determining whether wireless tag 1100 is allowed to pass through security gate 1500, and to trigger alarm 1530 when it is determined that the wireless tag 1100 is not authorized to pass through the gate 1500.

Wireless tags 1100 may be configured to receive radio signals in multiple frequency bands. In some embodiments, wireless tags 1100 may be configured to receive wireless signal 1402 from device 1400 within a frequency band around 900 MHz (e.g., an ultra-high frequency (UHF) signal) or within a frequency band around 2.4 GHz (e.g., Wi-Fi, Bluetooth Low Energy (BLE), or Classic Bluetooth, or other ISM signals). Additionally, or alternatively, wireless tags 1100 may be configured to receive EAS signal 1512 from the EAS transmitter 1510, with EAS signal 1512 including an electromagnetic field in an EAS frequency band such as 58-60 kHz (e.g., AM-EAS range) or 7-13 MHz (e.g., RF-EAS range).

In addition, wireless tags 1100 may be configured to transmit radio signals in one or more frequency bands. Wireless tags 1100 may also be configured to control other characteristics of their transmitted signals, such as the signal amplitude, duration, repetition period, and data communicated by the signals. In some embodiments, signals transmitted by tag 1100 may include a unique identifier (or ID) of that tag, such that the identity of a tag which transmitted a given signal may be determined. In the example depicted in FIG. 1, wireless tags 1100 may be configured to transmit a first signal 1102a periodically or in response to receiving a trigger signal from another device, such as a transmitter of system 1000 (e.g., transmitting-receiving device 1400) or mobile communications device 7030 of FIG. 7. Wireless tags 1100 may also be configured to transmit a second signal 1102b in response to receiving EAS signal 1512 from EAS transmitter 1510. Signals 1102a and 1102b may differ in at least one characteristic, such as transmission power, phase, amplitude, frequency, repetition period, or may be encoded with different data. In some embodiments, one or both of signals 1102a and 1102b may have a frequency within a frequency band around 2.4 GHz such that signals 1102a and 1102b are not detected by EAS sensor 1520 and therefore do not directly trigger alarm 1530 of security gate 1500.

Figure 4:
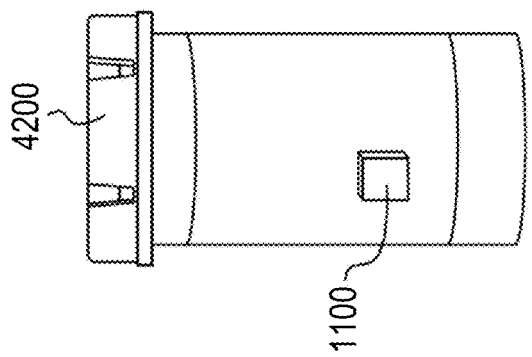
FIG. 4 depicts a wireless tag adhered to a container, consistent with disclosed embodiments.
Figure 3:
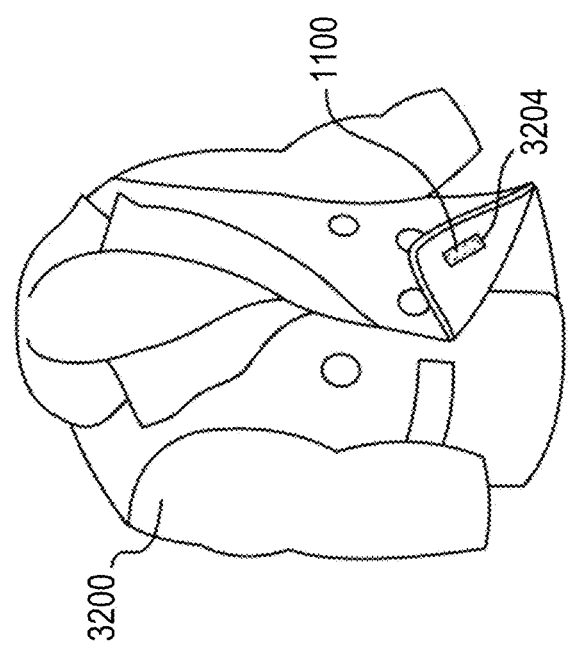
FIG. 3 depicts a wireless tag embedded into a clothing item, consistent with disclosed embodiments.
Figure 2:
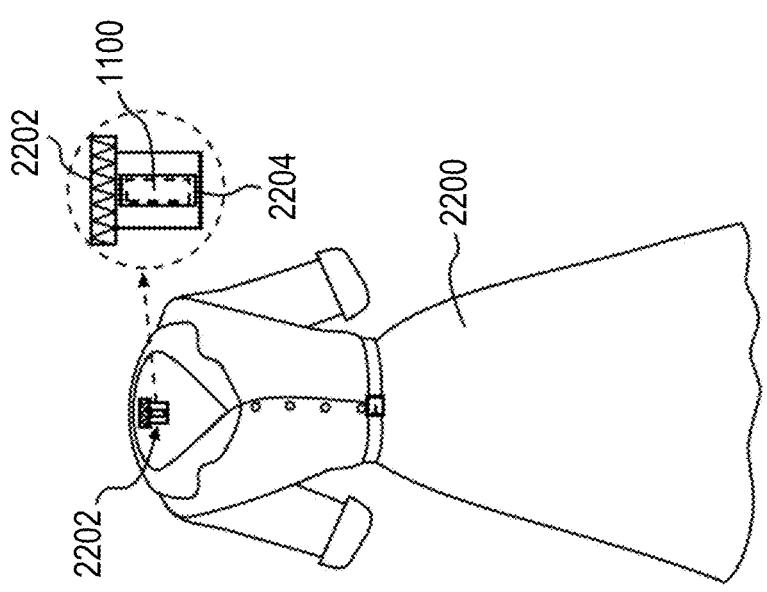
FIG. 2 depicts a wireless tag attached to a garment tag, consistent with disclosed embodiments.

FIGS. 2-4 illustrate non-limiting examples of a wireless tag 1100 attached to, or otherwise incorporated with, various items. For example, FIG. 2 depicts a garment, such as a dress 2200 with a garment tag 2202; garment tag 2202 may be a care tag (for example, with instructions for cleaning dress 2200) and/or a tag specifying the size and brand of the dress 2202. In the example of FIG. 2, tag 1100 may be affixed to the garment tag 2202 by any suitable means, such as stitching, adhesive, or a mechanical clamp or connector. Additionally, or alternatively, tag 1100 may be encapsulated within a fabric pocket 2204, which may be affixed to the garment tag 2202.

In another non-limiting embodiment, FIG. 3 depicts an embodiment of a wireless tag 1100 incorporated into layers of the material of a jacket 3200. The material layer may include fabric, other textiles, or any other material that may suitably be affixed to another material through sewing, such as leather, rubber, paper materials, and the like. The wireless tag 1100 may be partially incorporated, where a portion of the wireless tag may be exposed or uncovered (as shown in FIG. 3). Alternatively, the wireless tag 1100 may be completely incorporated, such that the wireless tag may be completely surrounded by the fabric and therefore not visible to the eye. In some embodiments, the wireless tag may be partially or completely incorporated into the fabric by sewing. For example, tag 1100, as depicted in FIG. 3, is encapsulated in fabric pocket 3204, which is affixed to jacket 3200 by stitching or other connection means.

By way of another example, as depicted in FIG. 4, tag 1100 may be adhered to a product or to a product's packaging, such as a container 4200. This affixation may be aided by one or more adhesive layers. Embodiments of adhesive layer may include glue of various types, tape, cement, wax, mucilage, paste, epoxy, sealants, elastomer, and other suitable materials that may promote cohesion between surfaces. For example, tag 1100 of FIG. 4 may include a substrate that supports the tag's electronic components, as well as an adhesive layer on a side of the substrate layer opposite the electronic components. The adhesive layer may enable the tag 1100 to be affixed to certain features, such as garment tag 2202 of FIG. 2, or directly to a product such as container 4200 of FIG. 4. The garments and container of FIGS. 2-4 are illustrated for illustrative purposes only. As previously described, the tag can be associated in virtually any way with virtually any item.

Electronic identification tags may facilitate tracking of merchandise. Disclosed embodiments include a battery-less identification tag to facilitate tracking of products using ambient energy, thereby precluding a need for energy from external sources, such as a battery or wall outlet. In some embodiments, ambient energy may be stored in a capacitor embedded in an identification tag, in place of a battery. The disclosed battery-less identification tag may include at least two differential antennae, each tuned to a different frequency band. For example, one differential antenna (e.g., tuned to the international UHF ISM band at 900 MHz) may be used primarily to harness ambient energy, and the other differential antenna (e.g., tuned to 2.4 GHz ISM band corresponding to the Bluetooth Low Energy protocol) may be used primarily for transmitting identification signals, e.g., for tracking purposes.

Some embodiments involve a battery-less identification tag for embedding into products. An identification tag may refer to a label, ticket, badge, or card including characterizing or distinguishing information (e.g., including one or more descriptors, alphanumeric characters, symbols, and/or graphic images (e.g., icons) or patterns, for example, a QR code and/or bar code, or a digital encoding of such descriptors) that allows for determining and/or establishing (e.g., uniquely determine and/or uniquely establish) an association between the identification tag and another entity or quantity (e.g., one or more of a product, a person, an account, a location, an establishment, a computing device, or any other entity that may be associated with an identification tag). For example, an identification tag attached to a product may include information about the product and/or an identifying code (e.g., a uniquely identifying code) allowing retrieval of information about the product, for example, from a database. Examples of information about a product that may be obtained using a battery-less identification tag may include one or more of a uniquely identifying code, a proprietor (e.g., a vendor), a state of transfer of ownership (e.g., from a vendor to a customer), a type, a size, a season, a location, a discount or promotion, care instructions, one or more product materials, a product origin, marketing or promotional slogans, inventory data, and/or any other information about the product attached thereto. In some embodiments, an identification tag may be configured to perform one or more operations requiring energy, such as to communicate with one or more electronic devices (e.g., as an "active" tag), and/or perform one or more logical operations, as described in greater detail herein. For example, an identification tag may emit identification signals to allow tracking a product attached thereto.

In some embodiments, the tag is encapsulated in a flexible, electrically insulating material. Encapsulated may include contained within or surrounded by, e.g., a substance. An electrically insulating material may refer to a substance that does not allow electric current to flow freely, e.g., due to tightly bound electrons in the substance. Examples of electrically insulating materials may include plastic, rubber, or glass, although other insulating materials may also be used. For instance, encapsulating a tag in an electrically insulating material may prevent ambient electric and/or magnetic fields from interfering with one or more electronic components (e.g., electronic circuit) included in the tag.

A battery may refer to device containing at least one electric cell for storing energy convertible to electrical power (e.g., by converting chemical energy to electrical energy), for example by providing energy as DC current via one or more connectors or contacts. For example, some identification tags (e.g., conventional identification tags) may draw energy from a battery to perform one or more energy demanding operations. A battery-less identification tag may refer to an identification tag configured to operate in absence of a battery, e.g., capable of performing one or more energy demanding operations, for example, communicating with one or more electronic devices and/or performing one or more logical operations, without drawing energy from a battery. Embedding may include inserting, integrating, encasing, and/or enclosing an object at least partially with another object. For example, a battery-less identification tag may be partially or completely surrounded by material of another object, and may be invisible to the eye, and/or partially or completely incorporated into a material by sewing or an adhesive. A product may refer to a tangible or physical article or substance produced or manufactured for trade (e.g., as merchandise). A battery-less identification tag for embedding into products may include a label, a ticket, or card including characterizing information attached to and/or integrated within or inside a product to allow the product to be associated with characterizing information included in and/or accessible via the battery-less identification tag, and/or to retrieve information associated with the product. For example, a unique product identifier included in a battery-less identification tag embedded with a product may allow querying for additional information about the product, (e.g., without requiring energy from a battery). As another example, location information may be derived from transmissions of a battery-less identification tag embedded with a product and may enable tracking the product (e.g., without requiring energy from a battery).

By way of a non-limiting example, FIG. 2 shows a battery-less identification tag 1100 affixed to garment tag 2202 of dress 2200 using stitching, adhesive, or a mechanical clamp or connector. As another non-limiting example, FIG. 3 shows battery-less identification tag 1100 incorporated into jacket 3200. As a further non-limiting example, FIG. 4 shows battery-less identification tag 1100 adhered to container 4200.

Some embodiments involve an identification tag including a flexible substrate. A substrate may refer to a substance forming an underlying layer, e.g., for integrating an electronic circuit. Examples of substrates may include layers of FR4, PET, or other insulating materials suitable for attaching components onto, and to otherwise add circuits to (e.g. through printing, etching, photolithography or other methods) and, additionally, which do not interfere with the properties of an electrical circuit assembled on the substrate. It is contemplated, however, that substrates may include other materials made of plastic, polymers, or any other type of material. Flexible may refer to malleable, or capable of bending, twisting, stretching, and or compressing (e.g., without breaking, or becoming irreversibly deformed). A flexible substrate may refer to a layer of a material that may be malleable, bendable, twistable, stretchable, and/or compressible, e.g., within a range of freedom that may not interfere with proper operation of electronics components included therein. Examples of flexible substrates may include plastic, metal foil, paper, fabric, Polyimide, flex glass, eutectic gallium—indium (eGaIn), eGaIn nanoparticles, and/or tungsten disulphide. In some embodiments, the substrate is formed of a material including PET (e.g., Polyethylene terephthalate, or thermoplastic polymer resin). For example, a flexible substrate may include electronic circuitry components including one or more transistors, diodes, capacitors, inductors, resistors, wires, wave guides, antennae, and/or any other electronic circuit component, similar to a conventional FR4 or other Printed Circuit Board (PCB) substrate. In some embodiments, a flexible substrate may be more flexible than a rigid or brittle substrate but may provide sufficient structure to allow multiple microelectronic components embedded in the flexible substrate to operate properly.

An identification tag including a flexible substrate may refer to an identification tag attached, affixed, or embedded therein, a flexible substrate. In some embodiments, an identification tag may be formed entirely of a flexible substrate. For example, an identification tag may be a tab or ticket of flexible substrate having a region for connecting to a product and another region for embedding componentry for an electronic circuit. In some embodiments, a region of a flexible substrate for connecting to a product may include one or more components of an electronic circuit (e.g., a tamper-detection circuit) embedded therein, for example, to detect detachment of the identification tag from the product. A circuit may refer to a combination of components and/or devices, implemented as part of a silicon chip, as part of a printed-circuit board, as part of a connectorized system or as a combination of any of the above, connected in a manner enabling the performance of a desired function or reaction as a response to some inputs, stimuli and/or triggers, generated internally inside the circuit or external to it. The function or reaction may include but is not limited to control of other circuits, generating visual, audible, or otherwise communicable alerts or signals, and/or performing predefined coded operations. For example, the components and/or devices may include (but are not limited to) resistors, capacitors, inductors, conductors, transistors, diodes, transmission lines, inverters, buffers, logic gates, latches, flip-flops, amplifiers, comparators, voltage sources, current sources, switches etc. The inputs, stimuli and/or triggers may include (but are not limited to) a voltage level change, a current level change, a frequency, amplitude or phase change of a received signal, a digital input, a digital pulse, a control word etc. The operation of a circuit relies both on the set of components and/or devices, and on the unique manner in which they are connected to each other and to the various inputs and outputs of the circuit.

By way of a non-limiting example, reference is made to FIG. 1 illustrating a perspective view of an example of an electronic tracking system 1000 including a security gate 1500, a first wireless identification tag 1100a incorporated into an item 1200a worn by a user 1002, and a second wireless identification tag 1100b incorporated into an item 1200b held by the user, consistent with disclosed embodiments. Item 1200a may be made of a flexible material (e.g., fabric) that may be stretched, relaxed, folded, and/or twisted without being torn. First wireless identification tag 1100a may be made of a flexible substrate, allowing wireless identification tag 1100a to be maneuvered and manipulated together with maneuvering and manipulating item 1200a, e.g., without breaking, tearing, or otherwise damaging wireless identification tag 1100a, and/or without interfering with the operations of electronic components included therein.

Figure 5:
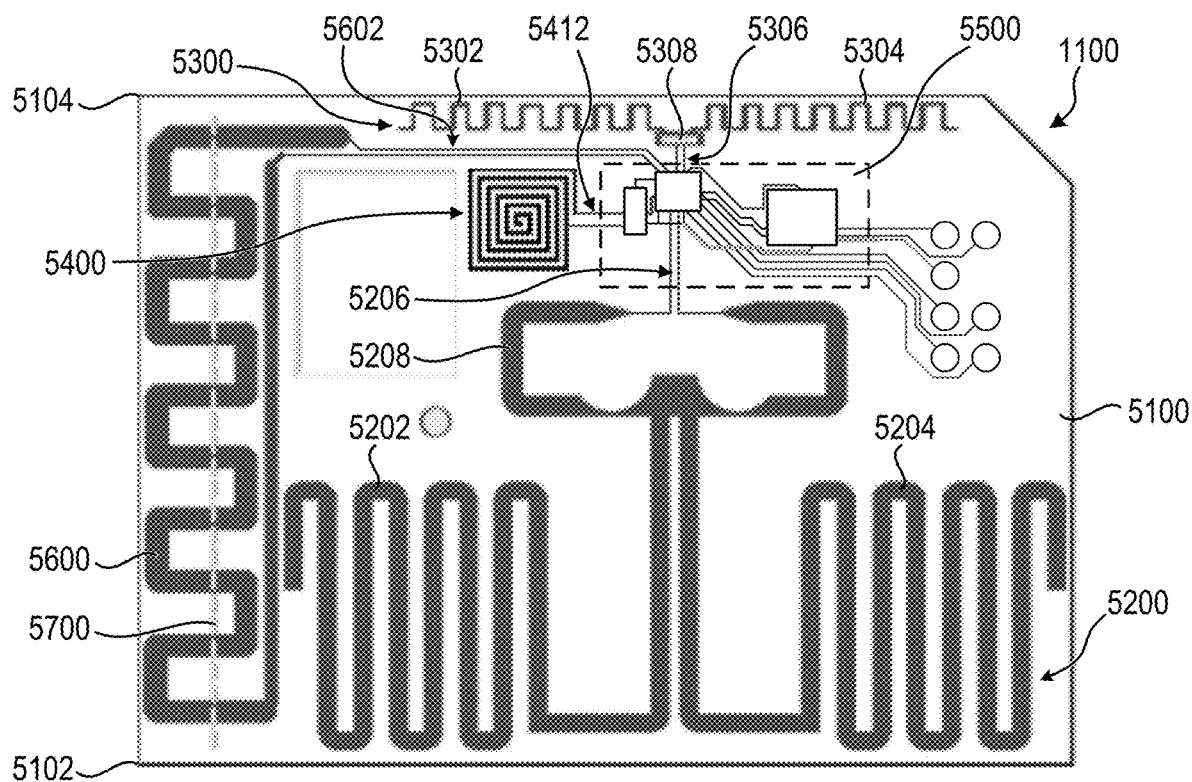
FIG. 5 depicts an example of architecture for a wireless tag, consistent with disclosed embodiments.

FIG. 5 depicts an example of the architecture of wireless identification tag 100, consistent with disclosed embodiments. FIG. 5 illustrates a tag 1100 which may correspond to first wireless identification tag 1100a and/or second wireless identification tag 1100b shown in FIG. 1. Tag 1100 may include a flexible substrate 5100 supporting one or more electronic components. Additionally, tag 1100 may include a first antenna 5200, a second antenna 5300, an inductive coil 5400, a component assembly area 5500 (shown in detail in FIG. 6A), and a tamper trace 5600, some or all of which may be formed on substrate 5100. Substrate 5100 may be flexible such that the tag 1100 may function despite flexing or movement that might occur, for example, when the tag is affixed to an item, such as the various items illustrated in FIGS. 2-4. In some embodiments, tag 1100 may include mechanical elements that limit or control its flexing, bending, or movement. These mechanical elements may include one or more of stiffeners, molds, coatings, encapsulation, or other layered or local elements incorporated into the mechanical design of the tag. In some embodiments, the mechanical elements may be arranged around portions of the tag where the performance or durability of the tag may be impacted by excessive flexing, bending or similar movement. For example, mechanical elements may be provided in areas of the tag where discrete components are assembled on the tag's substrate (e.g., by glue or another adhesive (conductive, non-isotropic conductive, or otherwise), soldering, using manual means or SMT (Surface Mount Technology) processes, and the like). Tag 1100 may additionally include at least one means for attaching the tag to a product or packaging. In the example shown, tag 1100 may include a marking 5700 provided on substrate 5100 which indicates to a manufacturer or user where stitching may be performed for attaching the tag 1100 to a product or packaging. Tag 1100 may additionally or alternatively include other attaching means, such as an adhesive. In some embodiments, tag 1100 may include an adhesive layer for attaching tag 1100 to a product.

In the example shown, wireless tag 1100 may include at least two antennae 5200 and 5300, each of which may be configured to send and/or receive wireless signals to/from other devices. The first antenna 5200 may be provided with a first meandering arm 5202 and a second meandering arm 5204, each of which may be curved or bent into a repeating pattern, such as an undulating shape, a sinusoid, or a zigzag pattern. Similarly, the second antenna 5300 may be provided with a third meandering arm 5302 and a fourth meandering arm 5304, each of which may be curved or bent into a repeating pattern, such as an undulating shape, a sinusoid, or a zigzag pattern.

Some embodiments involve an identification tag including a first differential antenna on the flexible substrate, the first differential antenna including a first meandering arm and a second meandering arm, and the first differential antenna being of a first size. An antenna may refer to a circuit used to transform a signal from a conducted input to a radiated output (in transmission) and/or to transform a signal from a radiated input to a conducted output (in reception). The radiated form may include any combination of electromagnetic radiation, electric fields, and/or magnetic fields, and the conducted form may be a time-varying voltage or current signal over a physical connection such as a metal wire or printed circuit (also known as a conductor). In other cases the radiated form may be acoustic (such as in sonar applications) or optical (such as in laser applications). An antenna may be passive (e.g., no external power may be needed other than the signal to be transmitted or received) or active (e.g., an external power source may be needed to power the active circuits). A passive antenna may be implemented as a series of conductors printed on a PCB (printed circuit board) and connected to one or more other circuit components either through direct connection or through electrical or magnetic coupling. An antenna may be designed as a Single Ended antenna or a Differential antenna. A Single Ended antenna may include a radiating element and a ground plane, where the ground plane may serve as a reference point for the electromagnetic fields emanating from the radiating element. A differential antenna may include two radiating elements, where the electromagnetic fields is generated between a "positive" element and a "negative" element, without a ground reference. A differential antenna may be constructed as a symmetrical structure, such that the "positive" and "negative" radiated elements are mirror images of each other, and a virtual "ground reference" may be shown to exist at a plane (or line) of symmetry between the mirrored elements. In some cases, e.g., in a device including a conducting chassis larger in relation to a typical wavelength at which an antenna may be designed to operate, a Single Ended antenna may be used, as the chassis may be used to form the ground plane. In other cases, e.g., where an environment surrounding a device may include conducting or isolating elements of unknown size and shape, a differential antenna may be used. For example, a differential antenna may be less prone to be affected by environmental elements.

Disclosed embodiments may include an antenna designed to receive a signal at a particular frequency or range of frequencies (e.g., a specific frequency band), or multiple different ranges of frequencies (e.g., multiband). For example, an antenna may include a pattern that may repeat at a regular frequency (e.g., an oscillating pattern) allowing the antenna to resonate at corresponding frequencies (e.g., multiples of the frequency of the repeating pattern) to produce a standing wave, such that the antenna may be tunable to the corresponding frequencies. Additionally or alternatively, the wavelength of the tuned frequency may correlate with the overall length of the arm, and the meandering pattern may be used to compress the antenna into a smaller printed area than would have been needed had it been stretched. In some embodiments, a differential antenna may offer advantages over a single ended antenna. For example, a differential antenna may eliminate the need for a ground plane and may reduce sensitivity to environmental interferences. For instance, a symmetry line of a differential antenna may serve as a virtual ground and provide resistance to electromagnetic interference and reduce electronic crosstalk. Additionally, a differential antenna may inherently cancel even order harmonics to reduce distortion, eliminate noise and reduce radiation, thereby contributing to overall resilience and efficiency.

A differential antenna on a flexible substrate may refer to a microelectronic component configured to operate as a differential antenna element embedded in a flexible substrate, e.g., included in a battery-less tag configured to connect to a product. For example, a differential antenna may be fabricated using photolithography, printing, etching and/or deposition to print a pattern of conducting material forming a differential antenna on a flexible substrate, e.g., together with other microelectronic components, such as logic gates, capacitors, resistors, inductors, and conducting wires or fiber printed using photolithography, printing, etching and/or deposition. Meandering may refer to an oscillating, undulating, repeating or zig-zag pattern. In some embodiments, a meandering pattern may be regular, such as a sinusoidal (e.g., curved) wave, a repeating square wave, a repeating round-cornered square wave, a repeating sawtooth pattern, a repeating triangular wave pattern, and/or any other type of repeating pattern. In some embodiments, a meandering pattern may include one or more irregularities (e.g., random, non-uniform and/or non-patterned sections). An arm may refer to a branch, extension, or protruding member (e.g., an elongated member). A meandering arm may refer to a branch or protruding member having an undulating or oscillating pattern. For example, a meandering arm may include a pattern corresponding to a frequency or wavelength (e.g., of electromagnetic radiation). A first meandering arm and a second meandering arm may refer to two separate meandering arms, e.g., sharing a common point, for example at the center (e.g., together forming a candelabra-like shape).

In some embodiments, the first and second meandering arms are symmetrical. Symmetrical items or objects may refer to items or objects that are equivalent, balanced, or mirrored. For example, the first meandering arm and the second meandering arms may be mirror images of each other (e.g., opposite copies, within a predefined tolerance for variations) such that positioning an end of the first meandering arm adjacent to an end of the second meandering produces a symmetric form. For instance, the first meandering arm may function as a positive element, the second meandering arm may function as a negative element, and the shared point (e.g., the end of the first meandering arm adjacent to the second meandering arm) may function as a virtual ground reference of a differential antenna formed by the first and second meandering arms.

A size may refer to a one or more physical dimensions of an object. In some embodiments, a size may refer to an amount of space (e.g., "real estate") taken by a microelectronic component embedded in a substrate (e.g., a flexible substrate), such as a percent of a substrate used for embedding a microelectronic component. In some embodiments, a size of a differential antenna may be associated with one or more of a number, density, height, width, thickness, area, volume, material (e.g., the dielectric constant of the material), spacing, and/or frequency of undulations of meandering arms, and/or a total length and/or total height and/or the total area and/or the total volume of meandering arms of a differential antenna. In some embodiments, a size of a differential antenna may cause a differential antenna to be tuned to a specific wavelength or frequency of signals. For example, the spacing, size, thickness, material, and/or frequency of undulations of the meandering arms of a differential antenna may correspond to a frequency or range of frequencies of signals receivable and transmissible by the differential antenna. In general, a first antenna having a larger size may operate at a lower frequency than a second antenna having a smaller size, e.g., where the first antenna is larger than the second antenna. For example, a size of the first differential antenna may tune the first differential antenna to receive ambient RFID or 900 MHz ISM signals (e.g., under 1 GHz, or in a frequency band around 900 MHz). In some embodiments, first differential antenna 5200 may be tuned to frequencies corresponding to cellular communication (e.g., around 700 MHz, or around 1.8 to 2.1 GHz), satellite communication (e.g., 1 GHz to 1.5 GHz or 12 GHz to 15 GHz), or any other frequency or frequency range corresponding to ambient electromagnetic radiation (EMR).

By way of a non-limiting example, in FIG. 5, wireless identification tag 1100 may include a flexible substrate 5100, such as plastic, fabric, paper, or polyimide. Flexible substrate 5100 of identification tag 1100 may include a first differential antenna 5200 including a first meandering arm 5202 and a second meandering arm 5204. For instance, first meandering arm 5202 and second meandering arm 5204 may be mirror images of each other and may be arranged symmetrically about a vertical axis functioning as a virtual ground reference. In some embodiments, first meandering arm 5202 may function as a positive element and second meandering arm 5204 may function as a negative element, or the reverse. First differential antenna 5200 may be of a size, for example, occupying between one quarter to one half of the real estate of wireless identification tag 1100. In some embodiments, first differential antenna 5200 may be tuned (e.g., based on a size of first differential antenna 5200) to receive signals at a frequency below 1 GHz (e.g., energy in a frequency band in a range of 900 MHz), e.g., associated with background or ambient EMR.

Some embodiments involve an identification tag including a second differential antenna on the flexible substrate, the second differential antenna include a third meandering arm and fourth meandering arm, and the second differential antenna being of a second size smaller than the first size. A second differential antenna on a flexible substrate may refer to an additional electronic component configured to operate as a differential antenna and embedded in a substrate including another (e.g., first) differential antenna. For instance, both the first differential antenna and the second differential antenna may be embedded on a flexible substrate using photolithography, printing, etching and/or deposition. A second differential antenna including a third meandering arm and a fourth meandering arm may refer to a structure for a second antenna similar to a structure for a first antenna including a first meandering and a second meandering arm. A second differential antenna being of a second size smaller than a first size may refer to one or more physical dimensions and/or features of the second differential antenna being smaller than one or more corresponding dimensions and/or features of the first differential antenna. For instance, any of a height, width, area, volume, and/or spacing between undulations, and/or a total length and/or total height of the meandering arms of the second differential antenna (e.g., the third and fourth meandering arms) may be smaller than one or more of a height, width, area, volume, and/or spacing between undulations, and/or a total length and/or total height of the first and second meandering arms of the first differential antenna. In some embodiments, a number and/or density of undulations of the third and fourth meandering arms of the second differential antenna may be greater than a number and/or density of undulations of the first and second meandering arms of the first differential antenna, e.g., due to a smaller spacing between undulations. In some embodiments, the second size of the second differential antenna may cause the second differential antenna to be tuned to a different frequency (e.g., a higher frequency) than the first differential antenna of the first size. For instance, the second differential antenna may be tuned to receive and transmit signals within a frequency band in a range of 2.4 GHz (e.g., corresponding to a Bluetooth Low Energy protocol, or BLE). In some embodiments, the second differential antenna may be tuned to receive and transmit Wi-Fi signals, cellular communications signals, and/or other communication signals. In some embodiments, a second differential antenna may be similar in length to a first differential antenna (e.g., with the first and second differential antennae arranged on opposite sides of a battery-less identification tag and occupying substantially similar real estate measured along the length of the tag, e.g., along the x-axis of FIG. 5) but the second differential antenna may be shorter or thinner (e.g., occupying substantially less space measured along the width of tag) than the first differential antenna. In some embodiments, the third and fourth meandering arms (e.g., of the second differential antenna) are symmetrical, where symmetrical may be understood as described earlier. In some embodiments, the first differential antenna and the second differential antenna are formed of at least one of aluminum or copper (e.g., a conductive metal). In some embodiments, a size of the first differential antenna may be more than double, more than three times, more than four times, more than five times, or more than n times (where n is an integer) a size of the second differential antenna.

By way of a non-limiting example, in FIG. 5, identification tag 1100 may include a second differential antenna 5300 on flexible substrate 5100. Second differential antenna 5300 may include a third meandering arm 5302 and fourth meandering arm 5304. For instance, third meandering arm 5302 and fourth meandering arm 5304 may be mirror images of each other and may be arranged symmetrically about a vertical axis functioning as a virtual ground reference. In some embodiments, third meandering arm 5302 may function as a positive element and fourth meandering arm 5304 may function as a negative element, or the reverse. In some embodiments, second differential antenna 5300 may be smaller than first differential antenna 5200. For example, undulations of third meandering arm 5302 and fourth meandering arm 5304 may be shorter, narrower, and/or denser than undulations of first meandering arm 5202 and second meandering arm 5204. The second (e.g., smaller) size of second differential antenna 5300 may cause second differential antenna 5300 to be tuned to a higher frequency (e.g., to receive and transmit signals a range of 2.4 GHz) than first differential antenna 5200 (e.g., tuned to receive and transmit signals in a range of 900 MHz). For example, second differential antenna 5300 may occupy between one fifth and one twentieth of the real estate of wireless identification tag 1100.

In some embodiments, the first differential antenna and the second differential antenna are formed on the substrate through at least one of printing, depositing, etching, photolithography, or milling Printing may refer to a process for reproducing multiple copies of a pattern (e.g., a graphic design, images, and/or text) based on a template, stencil, or mask. Depositing may include placing or positioning a material on another material. For example, one or more thin films of material may be deposited on a semi-conducting wafer for printing one or more microelectronic components based on a template. Etching may include engraving, carving, or inscribing. For instance, a pattern may be etched into a semi-conducting wafer using a mask embedded with the pattern to expose selected areas of a semi-conducting wafer to light (e.g., UV light) such that subsequently immersing the semi-conducting wafer in an etching material (e.g., acid)

may engrave the pattern into the semi-conducting wafer. Photolithography may include one or more techniques using light to produce a patterned films (e.g., a thin film) on a substrate (e.g., a silicon wafer, a Printed Circuit Board (PCB), or a flexible Polyimide substrate). For example, photolithography may be used to manufacture a microelectronic circuit using a mask to expose selected regions of a substrate to light, deposit one or more materials on a substrate, and etch a pattern into a substrate using an etching material (e.g., acid). Milling may include removing areas of a substance to create one or more structures. For example, copper may be milled from a sheet of printed circuit board (PCB) material to create structures (e.g., connecting pads, wires, or signal traces) of circuit board plan.

In some embodiments, at least one of the first differential antenna and second differential antenna is configured for energy harvesting, and at least one of the first differential antenna and second differential antenna is configured to transmit wireless signals using the harvested energy. That is, each of the first and second differential antennae may be configured for energy harvesting alone, for transmitting wireless signals using harvested energy alone, or for both energy harvesting and transmitting wireless signals using harvested energy. Harvesting may include collecting, capturing, accumulating, and/or amassing, e.g., resources. Energy harvesting (e.g., power harvesting, energy scavenging, or ambient power) may include capturing ambient energy present in the environment and converting the captured energy to electrical energy, e.g., to power an electronic circuit. Examples of ambient energy may include solar, wind, or thermal energy, and/or electromagnetic energy resulting from background radio, cellular, and television signals, or from transmitters (e.g., exciters) placed in a location in order to transmit energy for harvesting. For example, stray EMR (e.g., radio waves) may be converted to a DC current using a rectenna (e.g., a dipole antenna coupled to an RF diode serving as a rectifier) to harvest ambient energy. As another example, visible or infrared light may be converted to a DC current using an optical rectenna (e.g., an antenna coupled to a metal-insulator-metal, or MIM diode functioning as a high frequency rectifier), to harvest ambient energy. An antenna configured for energy harvesting may include an antenna tuned to receive ambient EMR signals and convert received EMR signals to an electrical signal (e.g., an AC electrical signal). In some embodiments, an AC electrical signal may be converted to a DC electrical signal using a rectifier. In some embodiments, a DC electrical signal (e.g., derived from EMR signals) may be used to charge a capacitor to store electrical energy, e.g., for subsequently powering a circuit. Wireless signals may include signals that may be transmitted in the absence of a conducting wire. Examples of wireless signals may include EMR signals, such as radio signals, optical signals, infrared signals, microwave signals, or any other signal in the EMR spectrum. Using harvested energy may include receiving harvested energy from an energy source (e.g., a capacitor) and applying harvested energy to perform work (e.g., to power a circuit). Transmitting wireless signals may include using a circuit (e.g., powered by harvested energy) to perform operations including one or more of retrieving information (e.g., an identifying code encoded as a sequence of bytes), converting information to an information-bearing waveform, modulating a carrier signal with an information-bearing waveform, and conveying a carrier signal modulated with an information-bearing waveform to an antenna (e.g., a differential antenna) tuned to the underlying carrier signal, thereby converting information to a wireless signal for broadcasting via an antenna.

For example, a first differential antenna may be tuned to harvest ambient EMR signals. The first differential antenna may be connected through a harvesting circuit to a capacitor to store the harvested EMR signals as electrical energy (e.g., after converting harvested EMR signals to a DC current). The electrical energy stored in the capacitor may be used (e.g., by an electronic circuit) to retrieve information, convert the retrieved information to an information-bearing waveform, modulate a carrier signal associated with a second differential antenna with the information-bearing waveform, and provide the modulated carrier signal to the second differential antenna tuned for transmission. In some embodiments, the first and second differential antennae may be both be tuned to harvest ambient EMR signals (e.g., each tuned to different frequency ranges of the EMR spectrum). In some embodiments, the first and second differential antennae may be tuned to a carrier frequency for transmitting a wireless signal (e.g., at different frequency ranges of the EMR spectrum).

In some embodiments, the wireless tag 1100 depicted in FIG. 5 may be configured to harvest energy in one or more frequency bands, and to power its operations using the harvested energy. For example, tag 1100 may include one antenna for harvesting energy, two antennae for harvesting energy, three antennae for harvesting energy, or any other number of antennae to harvest energy in a desired number of frequency bands. In some embodiments, tag 1100 may be configured to harvest energy in a frequency band around 900 MHz WW ISM (e.g., an ultra-high frequency RFID band between 860 MHz and 960 MHz). For example, FIG. 5 illustrates an embodiment of tag 1100 including a first differential antenna 5200 and second differential antenna 5300. By way of a non-limiting example, in FIG. 5, least one of first differential antenna 5200 and second differential antenna 5300 may be configured for energy harvesting. For example, first differential antenna 5200 may be tuned to receive ambient EMR signals in a frequency band below 1 GHz or around 900 MHz (e.g., corresponding to non-line-of-sight communication, Radio-frequency identification or RFID applications, Supervisory Control and Data Acquisition or SCADA applications) and may convey the harvested energy to an energy storage component, such as a capacitor 6010 (see FIG. 6A). Additionally, second differential antenna 5300 may be tuned to receive ambient EMR signals at a frequency band around 2.4 GHz (e.g., corresponding to stray Bluetooth and/or Wi-Fi signals) and may convey the harvested energy to an energy storage component, such as capacitor 6010. In some embodiments, the harvested energy may be stored in a capacitor (e.g., capacitor 6010 of FIG. 6A). Tag 1100 may be configured to use energy stored in capacitor 6010 to power transmissions of wireless signals to other devices and/or to perform other operations. Additionally, at least one of first differential antenna 5200 and second differential antenna 5300 may be configured to use the harvested energy to transmit wireless signals. For example, at least one of first differential antenna 5200 and second differential antenna 5300 may receive a wireless signal for transmission from an electronic circuit powered by the harvested energy.

As shown in FIG. 5, wireless tag 1100 may additionally or alternatively include at least one antenna configured to transmit a signal from the tag to one or more receivers; in some embodiments, the transmitted signal may include a unique identifier (or ID) of the tag which transmitted it. For example, tag 1100 may transmit a unique ID signal (optionally, along with status indicators and/or other data) in a frequency band around 2.4 GHz WW ISM. In some embodiments, an antenna configured to harvest energy may additionally be configured to transmit the tag's ID signal. For example, second antenna 5300 may be configured to wirelessly transmit signals having a frequency around 2.4 GHz; thus, second antenna 5300 may be configured to both harvest energy and to transmit tag signals in some embodiments.

As shown in FIG. 5, wireless tag 1100 may include an inductor 5400 configured to detect magnetic and/or electromagnetic fields, including fields generated by EAS systems such as security gate 1500 of FIG. 1. For example, as depicted in FIG. 5, tag 1100 may include an inductive coil 5400, which may be tuned to detect electromagnetic fields operating in one or more predetermined frequency bands. For example, inductive coil 5400 may be configured to detect electromagnetic fields in a frequency band between 7-13 MHz and/or fields in a frequency band between 58-60 kHz, such as EAS signal 1512 of FIG. 1. In some embodiments, inductive coil 5400 may be configured not to activate a nearby security gate, even when coil 5400 is placed in presence of an incident EAS field and detects the field. That is, unlike traditional EAS security tags that emit a detectable signal (or create a detectable interference) when they receive an incident EAS field, inductive coil 5400 may be configured to detect an EAS field (such as EAS signal 1512) without emitting a responsive signal that would be detected by EAS receiver 1520 to trigger the EAS alarm 1530. Additionally, or alternatively, inductor 5400 may perform other functions in the tag 1100, such as tuning internal circuits, or being configured to be part of a circuit inside communications chip 6020 (see FIG. 6A), e.g., as part of a voltage conversion circuit, or as part of a circuit used to transfer energy stored on one capacitor (e.g. an internal capacitor incorporated inside communications chip 6020) and another capacitor (e.g. capacitor 6010).

Some embodiments involve at least one communications chip connected to the first differential antenna and the second differential antenna. A communications chip may refer to a device that is fabricated of semiconducting material such as Silicon, Silicon-Germanium, Gallium-Arsenide or other semiconducting crystals or quasi-crystalline structures. A communications chip may be configured to perform telecommunications functions over a wired and/or wireless medium, e.g., using a proprietary or a standards-based protocol. When connected over an appropriate wired and/or wireless network to another device or devices operating using a complementary protocol, a communications chip may create a communications link with the other device or devices, enabling the transmission of data and/or other information therebetween. Transmission of data between a communications chip and one or more devices may be in a single direction (unidirectional communications) or in both directions (bi-directional communications). A communications chip supporting a wired, standards-based protocols may include USB chips, ethernet chips, DSL chips, as well as optical communications chips (supporting optical communications over fiber optic cables). A communications chip supporting wireless, standards-based protocols may include Wi-Fi chips, Bluetooth chips, LTE chips, as well as IR communications chips (such as used for remote control of some appliances such as TV's) using infra-red optical signals, and/or acoustic communications chips. A communications chip may require a source of electrical energy to operate (e.g., to generate, send and receive signals). Connected may refer to directly or indirectly linked, joined, or coupled. For example, two or more electronic components may be connected via one or more conducting wires (e.g., manufactured using wire bonding) or optical channels (e.g., waveguides) configured to convey signals there between. A communications chip connected to a first differential antenna and a second differential antenna may include one or more conducting wires electrically coupling (directly or via other components) a communications chip to a first differential antenna and a second differential antenna to allow signals to flow there between. For example, a communications chip may be printed with the first and second differential antenna with connecting wires there between on a flexible substrate (e.g., of a battery-less identification tag) in a single fabrication process (e.g., etched onto the flexible substrate based on a common design including the communications chip, the first and second differential antenna, and the connecting wires). As another example, the communications chip and the first and second differential antennae may be fabricated separately (e.g., using different photolithography processes) and connected with one or more conducting wires on a PCB in a separate manufacturing process.

By way of a non-limiting example, in FIG. 5, flexible substrate 5100 of identification tag 1100 may include a component assembly area 5500 (shown in detail in FIG. 6A), which may include components that are connected to first differential antenna 5200 via a first pair of wires 5206 (e.g., one wire of first pair of wires 5206 may connect communications chip 6020 to first meandering arm 5202 and the other wire of first pair of wires 5206 may connect communications chip 6020 to second meandering arm 5204). Components within area 5500 may be additionally connected to second differential antenna 5300 via a second pair of wires 5306 (e.g., one wire of first pair of wires 5306 may connect communications chip 6020 to first meandering arm 5302 and the other wire of first pair of wires 5306 may connect communications chip 6020 to second meandering arm 5304). For instance, one of wires 5206 or wires 5306 may carry a positive current while the other one of wires 5206 or 5306 may carry a negative current, and vice versa as the direction, phase and amplitude of current flow vary during the reception and/or transmission operation.

Figure 6A:
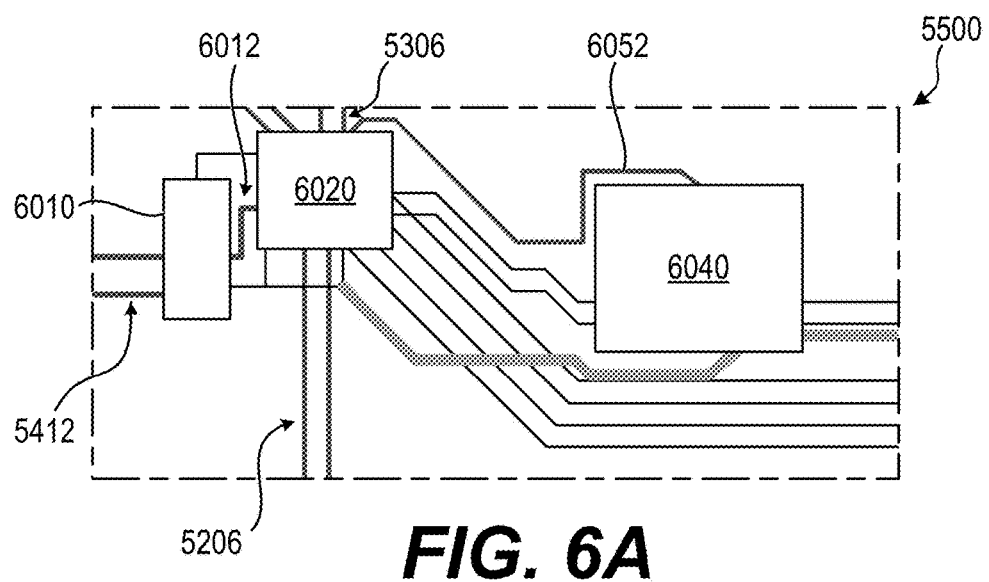
FIG. 6A is an enlarged view of the component assembly area of the wireless tag of FIG. 5, consistent with disclosed embodiments.

Reference is made to FIG. 6A, which depicts an enlarged view of a first example of component assembly area 5500 of wireless identification tag 1100 architecture of FIG. 5, consistent with disclosed embodiments. In some embodiments, component assembly area 5500 may include components (e.g., hardware components) for controlling the energy harvesting and signal transmitting operations of the wireless tag 1100. For example, component assembly area 5500 may include a communications chip 6020 connected to first differential antenna 5200 via first pair of wires 5206 and to second differential antenna 5300 via second pair of wires 5306. In some embodiments, components within area 5500 (e.g., including communications chip 6020) may be manufactured in the same fabrication process as first differential antenna 5200, second differential antenna 5300 and conducting wires connecting first differential antenna 5200 and second differential antenna 5300 to communications chip 6020.

As discussed in further detail below, component assembly area 5500 may include at least one capacitor 6010 configured as an energy storage component for the wireless tag 1100. Capacitor 6010 may be electrically connected to communications chip 6020, such that energy harvested from one or both of the first antenna 5200 and second antenna 5300 through communications chip 6020 may be received and stored by capacitor 6010. Capacitor 6010 may also be configured to discharge some or all of the stored energy for powering signal transmissions through the first antenna 5200 or second antenna 5300. While FIG. 6A depicts a single capacitor 6010 for energy storage, the wireless tag 1100 may, in some embodiments, include multiple storage capacitors for storing harvested energy. Additionally, or alternatively, component assembly area 5500 may include at least one transfer capacitor (not shown) to increase the efficiency of ambient energy harvesting.

Some embodiments involve at least one capacitor on the flexible substrate, the at least one capacitor electrically connected to the communications chip. A capacitor may refer to an electronic component configured to store electrostatic energy in an electric field by storing electric charge on two opposing surfaces (e.g., conducting plates) separated by an insulator (e.g., a dielectric medium). Applying an electric potential difference (e.g., a voltage) across the plates of a capacitor, may cause an electric field to develop across the dielectric medium, causing a net positive charge to accumulate on one plate and net negative charge to accumulate on the opposing plate, allowing for storage of electrical energy as a potential difference between the two plates. The plates of a capacitor may be connected to other circuit components (e.g., via contacts of the capacitor) allowing for integration of one or more capacitors into an electronic circuit. In some embodiments, a capacitor may function as a source of electrical energy (e.g., similar to a battery). However, a capacitor may be differentiated from a battery because a capacitor may lack a chemical reaction to receive, store and generate electrical energy. Moreover, a capacitor may be manufacturable on a microelectronic scale for integration with other microelectronic components, e.g., in a photolithographic process used to manufacture a communications chip. A capacitor on a flexible substrate may refer to a capacitor manufactured as a microelectronic component of an integrated circuit printed on a flexible substrate using techniques such as photolithography, printing, etching and/or deposition. Additionally, or alternatively, a capacitor on a flexible substrate may refer to a stand-alone capacitor attached to the flexible substrate e.g. by a Surface Mount Technology (SMT) assembly process, by a conductive adhesion process, by soldering, by attaching bond wires between the capacitor and the flexible substrate, or by any other means. A capacitor electrically connected to a communications chip may include one or more conducting wires electrically coupling a capacitor to a communications chip. For example, a capacitor may provide electrical energy as a DC current and/or voltage to power a communications chip (e.g., in place of a battery) via one or more connecting wires, allowing the communications chip to use the electrical energy to perform one or more operations (e.g., to read information from memory, generate an information-bearing signal and transmit an information bearing signal). In some embodiments, a capacitor may be printed with one or more conducting wires on a flexible substrate to connect the capacitor to a communications chip (e.g., manufactured separately from the capacitor). In some embodiments, a capacitor connected to a communications chip with one or more wires may be printed on a substrate in a photolithographic process (e.g., the capacitor, the communications chip and the wires may be manufactured together in the same photolithographic process). In some embodiments, one or more of the capacitor, communications chips, and connecting wires may be manufactured separately, and connected on a substrate forming a printed circuit board (PCB).

By way of a non-limiting example, FIG. 6A illustrates a capacitor 6010 and communications chip 6020 on flexible substrate 5100 of battery-less identification tag 1100. Capacitor 6010 may be electrically connected to communications chip 6020 via one or more electrically conducting wires 6012, e.g., configured to convey electrical energy stored in capacitor 6010 to communications chip 6020. Capacitor 6010 may be configured to discharge some or all of energy stored therein to power communications chip 6020 for transmitting one or more signals via first and second differential antennae 5200 and/or 5300.

In some embodiments the capacitor is incorporated within the communications chip. Incorporating within may include integrated or embodied inside or as a part of something. For example, one or more electronic components may be incorporated into an integrated circuit (IC) by including the one or more electronic components in a design for the IC such that fabricating the IC based on the design integrates the one or more electronic components in (e.g., incorporated within) the IC. A capacitor incorporated within a communications chip may refer to manufacturing a communications chip based on a design including a capacitor, e.g., using techniques such as photolithography or optical lithography to etch a circuit into a semiconducting substrate for a communications chip connected to a capacitor. For example, a pattern for a capacitor may be etched onto a semiconducting substrate together with patterns for other electronic components (e.g., transistors, diodes, resistors, wires, and/or inductors), collectively forming an integrated circuit for a communications chip electrically connected to a capacitor.

Figure 6B:
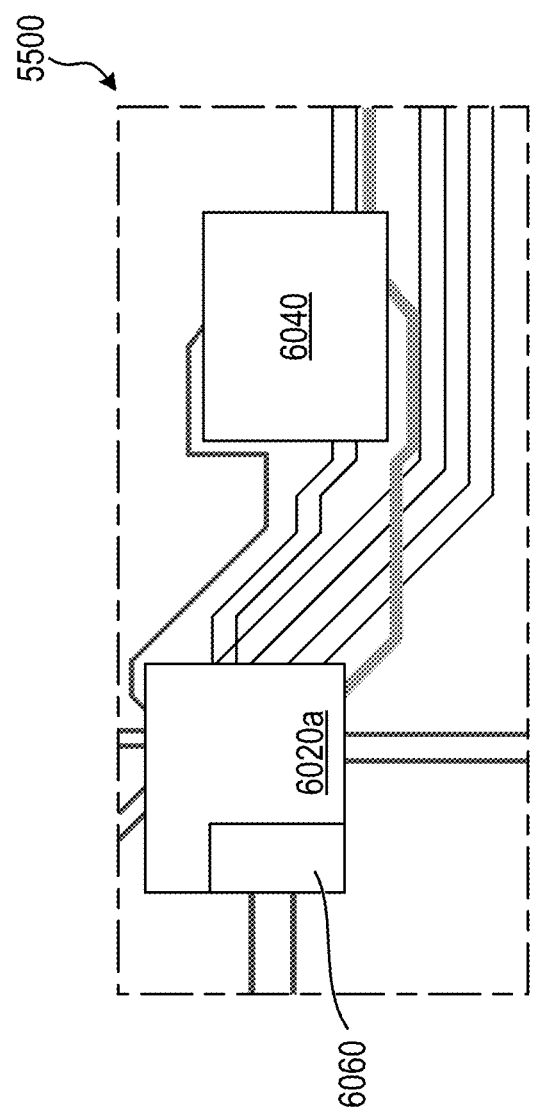
FIG. 6B is an enlarged view of an alternative embodiment of the component area of the wireless tag of FIG. 5, consistent with disclosed embodiments.

By way of a non-limiting example, reference is made to FIG. 6B illustrating an enlarged view of a second example of component assembly area 5500 of wireless identification tag 1100 architecture of FIG. 5, consistent with disclosed embodiments. Component assembly area 5500 depicted in FIG. 6B may include an exemplary communications chip 6020a incorporating a capacitor 6060, consistent with disclosed embodiments. For example, communications chip 6020a may be included in component assembly area 5500 of FIG. 5, e.g., in place of communications chip 5020. Capacitor 6060 may be manufactured in the same manufacturing process as other microelectronic components of communications chip 6020a, to incorporate capacitor 6060 within communications chip 6020a.

Some embodiments involve an inductor on the substrate, the inductor being electrically connected to the communications chip. An inductor may refer to a passive electrical component including a wire (e.g., a coiled wire) configured to store energy in the presence of a magnetic field when an electric current flows through the wire. A current flowing through an inductor may induce a corresponding magnetic field, and vice-versa such that characteristics of an electric field associated with the current (e.g., an AC current) may correspond to characteristics of the surrounding magnetic field (e.g., the direction of current induced by a changing magnetic field may create a magnetic field opposing changes in the initial magnetic field). An inductor on a substrate may refer to an inductor (e.g., including a coiled wire) embedded or otherwise attached to a substrate (e.g., a flexible substrate). For example, an inductor may be glued to a substrate with an adhesive (e.g., a conductive adhesive such as solder). As another example, the inductor is printed on the substrate and electrically connected to the communications chip. For instance, a pattern of an inductor (e.g., including a coiled wire) may be included in a design for manufacturing an integrated circuit including a plurality of microelectronic components on a flexible substrate using techniques such as photolithography and/or optical lithography. An inductor electrically connected to a communications chip may include one or more conducting wires electrically coupling one or more contacts of a conductor to a communications chip. For example, an inductor and a communications chip may be printed with connecting wires there between on a flexible substrate (e.g., of a battery-less identification tag) in a single fabrication process (e.g., etched onto the flexible substrate based on a common design including an inductor, a communications chip, and connecting wires). As another example, an inductor and a communications chip may be fabricated separately (e.g., using different photolithography processes) and connected with one or more conducting wires on a PCB in a separate manufacturing process. As another example, one of the two components (e.g. the communications chip) may be manufactured is a separate fabrication process than both the other component and the connecting wires (e.g. the inductor and the wires connecting the inductor to the communications chip), such that the first component is attached to a substrate which already includes printed on it both the other component and the connecting wires.

In some embodiments, an inductor connected to a communications chip on a battery-less identification tag may function as a sensor, e.g., to detect a signal from a security gate (e.g., EAS signal 1512 from EAS transmitter 1510 of FIG. 1), to detect a signal from a checkout counter or register (e.g., for purchasing a product connected to the battery-less identification tag), to detect a mobile communications device (e.g., mobile communications device 7030 scanning a battery-less identification tag). For instance, an inductor may be coupled to a capacitor in a resonating circuit tuned to detect signals from differing emitters (e.g., a security gate, a checkout, and/or a query by a mobile device).

By way of a non-limiting example, FIG. 5 shows an inductive coil 5400 on flexible substrate 5100 of battery-less identification tag 1100 electrically connected to communications chip 6020 using wires 5412 (e.g., via capacitor 6010). In some embodiments, inductive coil 5400 and wires 5412 may be printed on flexible substrate in the same photolithographic process. Inductive coil 5400 may be configured to detect EAS signal 1512 of FIG. 1 (e.g., electromagnetic fields ranging between 7-13 MHz and/or ranging between 58-60 kHz). In some embodiments, inductive coil 5400 may be configured not to activate a nearby security gate, even when coil 5400 detects an incident EAS field, for instance, based on a control signal indicating that a product attached to battery-less identification tag has been purchased.

In some embodiments, the communications chip is configured to sense a time varying magnetic field. A magnetic field may refer to a magnetic influence (e.g., measured in units of tesla) on moving electric charges, electric currents, and/or magnetic materials (e.g., Iron, cobalt, nickel, neodymium, strontium, and/or associated alloys). A magnetic field may surround a magnetized material and attract or repel other magnetic materials (e.g., based on polarity). In addition, a varying magnetic field may interact with outer atomic electrons of non-magnetic materials. A time varying magnetic field may refer to a dynamic magnetic field that may change with time. For example, a magnetic field may oscillate with time (e.g., by reversing polarities) according to a specific frequency or frequency band. A time varying magnetic field may induce a time varying electric field, and vice-versa. Thus, an AC signal (e.g., a time varying voltage or current signal) may induce a corresponding time varying magnetic field, and a time varying magnetic field may induce a corresponding time varying AC signal. Sense may include perceive, detect, identify, or discover, e.g., information. For example, a CMOS photodetector may sense an incident photon as an electric signal, a magnetometer (e.g., a compass) may sense a magnetic field, and a voltage meter may sense a time varying magnetic field as a corresponding time varying voltage. A communications chip configured to sense a time varying magnetic field may include an inductor for inducing a corresponding time varying electric signal from a time varying magnetic field and/or a magnetometer (e.g., embedded in the communications chip as a MEMS component or as a Hall Effect sensor). For example, a communications chip may be configured to sense a time varying electrical signal corresponding to a time varying magnetic field, e.g., by including an inductor coupled to a capacitor (e.g., in an oscillating circuit) configured to produce a time-varying electric signal corresponding to a time-varying magnetic field.

For example, moving a battery-less identification tag including an inductor connected to a communications chip towards security gate 1500 of FIG. 1 may produce variations in a magnetic field generated by security gate 1500, as sensed by the inductor (e.g., due to changing a location of the inductor). Additionally or alternatively, a magnetic field generated by security gate 1500 may vary with time (e.g., according to a frequency for an EAS signal, such as 7-13 MHz or 58-60 kHz), causing an inductor located inside the time-varying magnetic field to induce a corresponding time-varying electric signal detectable by a communications chip. In some embodiments, an inductor connected to a communications chip may be configured not to activate a nearby security gate on detecting an incident EAS field. For example, a communications chip may include logic circuitry to decide under what circumstances to activate a security gate (e.g., based on an ownership state of a product attached to or otherwise associated with the communications chip).

By way of a non-limiting example, in FIG. 5, inductor 5400 may be coupled to capacitor 6010 via wires 5412 to produce an oscillating circuit (e.g., an LC circuit) that may generate a time-varying electric signal from a time-varying magnetic field. The time-varying electric signal may be conveyed via one or more wires to a measuring device (e.g., having an infinite impedance or resistance) associated with communications chip 6020 allowing sensing of a time-varying magnetic field based on a corresponding time-varying electric signal. Additionally or alternatively, an inductor 5400 connected to communications chip 6020 may be used for other internal functions of communications chip 6020, such as DC 2 DC conversion, transferring harvested energy from one capacitor to another, tuning a transmitter circuit or a receiver circuit, forming part of an oscillator used as a time-base for the communications chip, or other functions.

Some embodiments involve a crystal, wherein the crystal is electrically connected to the communications chip. A crystal may refer to a form of solid material having a substantially constant, rigid, and/or repetitive structure over a distance significantly larger than a basic crystalline unit (e.g., an atom, a molecule, or a structure of several atoms). In an electrical engineering sense, a crystal may be a piece of crystalline material, cut into a particular size at a particular relation to the crystalline structure, such that mechanical vibrations in the crystalline structure may be translated into electrical oscillations that may be sensed or amplified using electronic circuits. One reason for using crystals (e.g., Quartz, or other materials) is that the crystalline structure may ensure that the frequency of oscillations may be accurately maintained, e.g., as long as the mechanical properties of the crystal itself are not altered. A combination of a crystal (often abbreviated to Xtal) connected to an electronic circuit may be referred to as a Crystal Oscillator, or XO. For instance, applying an electric signal to a crystal (e.g., a piezoelectric crystal) using electrodes attached thereto may cause the crystal to vibrate (e.g., at a regular frequency). The vibrations may be used by an electronic circuit to time and/or synchronize one or more operations, e.g., as a clock. In some embodiments, one or more capacitors may be provided with a crystal to provide feedback to regulate the vibrations and ensure the crystal oscillates at a specific or regular frequency. A crystal electrically connected to a communications chip may include one or more electrically conducting wires electrically coupling a crystal to a communications chip, allowing the communications chip to sense the vibrations, e.g., for synchronizing and/or timing one or more operations. For example, a crystal and a communications chip may be printed with connecting wires there between on a flexible substrate (e.g., of a battery-less identification tag) in a single fabrication process (e.g., etched onto the flexible substrate based on a common design including the crystal, the communications chip, and the connecting wires). As another example, a crystal and a communications chip may be fabricated separately (e.g., using different photolithography processes) and connected with one or more conducting wires on a PCB in a separate manufacturing process. For instance, a communications chip may use oscillations of a crystal to time a transmission of an identification signal (e.g., at regular intervals) and/or to coordinate a transmission of an identification signal with other events, for example receiving a signal from another communications chip and/or a detection of a magnetic field generated by a security gate.

For example, a communications chip associated with a battery-less identification tag may use a crystal to transmit a signal (e.g., first signal 1102a of FIG. 9A) periodically, and/or a signal at a low repetition period (e.g., ID signal 1102 transmitted at a minimum repetition period of 10 minutes, with an added randomized period of up to five minutes, resulting in one broadcast every 12.5 minutes on average), at a longer or shorter period (e.g., less than five minutes, hours, or days). As another example, a communications chip associated with a battery-less identification tag may use a crystal to time a duration for one or more signals (e.g., a duration of around 300 µs for ID signal 1102). However, the transmission duration may be longer or shorter in alternative embodiments.

By way of a non-limiting example, FIG. 6A shows component assembly area 5500 including a crystal 6050 electrically connected to communications chip 6020 via one or more conducting wires 6052.

Communications chip 6020 may use signals received from crystal 6050 to time and synchronize transmission of signals via differential antennae 5200 and/or 5300. In some embodiments, component assembly area 5500 may include compensation capacitors connected to crystal 6050, e.g., to regulate an oscillating frequency of crystal 6050, for example to improve accuracy for one or more timed and/or synchronized operations.

Some embodiments involve a trace connected to the communications chip, the trace passing through a portion of the tag configured to be connected to a product, and wherein the communications chip is configured to identify continuity of the trace. A trace may refer to a length of conducting material forming part of a larger electronic circuit. A trace may be printed, deposited and/or photolithographically etched on to an underlying substrate (a Printed Circuit Board or other substrate, inlay or basis carrying the electronic circuit) or between layers of such a substrate, in a manner connecting one or more elements of the electronic circuit. A trace may be used to either form a simple connection (electric "short" between circuit elements) or the electrical properties of the trace itself (e.g., its resistance and reactance) may be used as part of the electronic circuit. For example, a trace may be used to form a printed antenna, an inductor, a capacitor, or a resistor, depending on its dimensions, the material it is composed of, and the properties of the substrate on which it is formed. A trace connected to a communications chip may include one or more electrically conducting wires electrically coupling a trace to a communications chip, for example to allow the communications chip to sense a signal flowing through the trace. For example, a trace and a communications chip may be printed with connecting wires there between on a flexible substrate (e.g., of a battery-less identification tag) in a single fabrication process (e.g., etched onto the flexible substrate based on a common design including a trace, a communications chip, and connecting wires). As another example, a trace and a communications chip may be fabricated separately (e.g., using different photolithography processes) and connected with one or more conducting wires on a PCB in a separate manufacturing process.

A portion of a tag configured to be connected to a product may refer to a section (e.g., including an edge) of a tag attachable to a product, for instance using an adhesive, one or more staples, pins, string (e.g., for a hanging tag), and/or stitched or sewn to the product along a seam. For example, a tag may be sewn, glued, or stapled to a product along a length or width of the tag such that the portion connecting to the product is a line spanning a length or width of the tag. Passing through may include crossing, intersecting, cutting, or dividing something. A trace passing through a portion to the tag configured to be connected to a product may refer to positioning a trace on a tag such that the trace may intersect or cross a portion of the tag connected to a product (e.g., in at least one point). In some embodiments, a trace may intersect a portion of a tag for connecting to a product in a plurality of points. For example, a line may run across a tag indicating where to place a seam or adhesive for attaching the tag to a product. A trace having an undulating shape (e.g., a square wave or triangular wave) may be overlayed on the line, crossing the line at a plurality of points. Consequently, if the line remains intact, the trace may remain intact, and severing the line may sever the trace. Continuity may refer to uninterrupted or unbroken, e.g., to allow a steady flow therethrough. Continuity of a trace may refer to an uninterrupted or unbroken length of conducting material allowing an electrical signal to flow therethrough unhindered. Identifying continuity of a trace may include continually (e.g., steadily or repeatedly) sensing a signal flowing through a trace to determine an uninterrupted flow over time. A communications chip configured to identify continuity of a trace may include one or more conducting wires connecting a trace to a communications chip, allowing the communications chip to detect a signal flowing through the trace over a time period. For example, a tag including a trace connected to a communications chip may attach to a product at an area of the tag coated with an adhesive. The trace may pass through the adhesive allowing a communications chip to sense a signal flowing through the trace, including through the area connecting the tag to the product. A break in the signal may indicate a lack of continuity in the trace. For example, the lack of continuity may be due to a tear in an area of the tag connected to the product, indicating a detachment of the tag from the product.

By way of a non-limiting example, FIG. 5 illustrates a trace 5600 at an edge of flexible substrate 5100 of battery-less identification tag 1100. Trace 5600 may cross a stitching indication 5700 indicating where to place a stitching seam to attach tag 1100 to a product (e.g., a portion of the tag configured to be connected to the product). In the example shown, trace 5600 has a square wave shape crossing stitching indication 5700 at multiple points along the width of flexible substrate 1100 (e.g., along the y-axis). Trace 5600 may be connected to communications chip 6020 (FIG. 6A) via one or more wires 5602 and may cross (e.g., pass through) stitching indication 5700 at multiple points. Communications chip 6020 may send a signal through trace 5600 such that continually detecting the signal may identify continuity of trace 5600. For instance, tearing substrate 1100 along stitching indication 5700 (e.g., to detach substrate 1100 from the product) may sever trace 5600 and break the signal, indicating a discontinuity in trace 5600.

In some embodiments, the trace comprises a tamper trace around an edge of the tag. Tampering (e.g., tamper) may include changing, damaging, or interfering with something. A tamper trace may refer to a trace configured to detect a change, damage, or interference with an object associated with the trace, e.g., a tag. An edge of a tag may refer to a border or at least part of a perimeter marking an end of a tag. Around may include following or wrapped about a curve or an angle, e.g., a 90° angle. Around an edge of a tag may refer to a curved or bent path along an edge of a tag, e.g., including one or more corners of the tag. A tamper trace around an edge of a tag may include a length of conducting material following a curved or bent path along the edge of a tag, e.g., around one or more corners of a perimeter of a tag.

By way of a non-limiting example, FIG. 5 illustrates trace 5600 at an edge of substrate 1100 and following around corners 5102 and 5104 of substrate. Trace 5600 may be overlaid on stitching indication 5700 spanning along the width of substrate 1100 (e.g., along the y-axis) such that severing (e.g., tampering with) tag 1100 at stitching label 5700 may sever trace 5600, allowing communications chip 6020 to detect a break in a signal flowing through trace 5600.

In some embodiments, the trace includes a tamper trace that is wider than 1 mm so that puncture by a sewing needle of less than 1 mm is incapable of severing the tamper trace. Wider may include broader or thicker. For example, wider than 1 mm may be thicker or broader than 1 mm (e.g., 1.5 mm, 2 mm, or 2.5 mm). Less than 1 mm may be narrower, smaller, or thinner than 1 mm (e.g., 0.8 mm or 0.5 mm). A puncture may refer to a hole or perforation, e.g., penetrating through or rupturing something. A puncture by a sewing needle may include a hole or perforation caused by a sewing needle, e.g., while stitching a battery-less identification tag to a product along a stitching indication. Incapable may include unable, ineffective, or unfit, e.g., to cause an action. For example, a tamper trace may be substantially wider than a sewing needle such that perforating the tamper trace with the sewing needle leaves surrounding areas of the tamper trace intact, allowing an electric signal to flow therethrough, e.g., around the perforation. For instance, a sewing needle may be 0.8 mm thick, and a tamper trace overlaid may be 20 mm thick (e.g., 2 cm) allowing a signal to flow through intact areas of the tamper trace surrounding a perforation by the sewing needle.

By way of a non-limiting example, FIG. 5 illustrates trace 5600 (e.g., a tamper trace) being substantially wider than stitching indication 5700. For instance, a thickness or width (e.g., along the x-axis) of stitching indication 5700 may be 0.5 mm, corresponding to a thickness of a sewing needle, and a thickness of trace 5600 (e.g., along the x-axis) may be 150 mm. Consequently, puncturing trace 5600 with a 0.5 mm thick sewing needle may leave most of trace 5600 intact, allowing a signal to continue flowing through trace 5600, e.g., around the punctures by the sewing needle.

In some embodiments, the meandering arms of at least one of the first differential antenna and the second differential antenna are connected to a loop trace. A loop may refer to a bent or curved line at least partially enclosing a space. In some embodiments, a loop may include a line curved or bent to meet at two different points along the line, thereby enclosing a space defined by the section of the line between the two points. A loop trace may refer to a length of conducting material following a curved or bent path to form a closed curve. A loop trace connected to a differential antenna may refer to a differential loop antenna, which may improve performance by providing another resonance related to the size of the loop trace, which causes the operational bandwidth of the antenna to increase. A loop antenna may be printed onto a substrate using photolithography, printing, etching and/or deposition.

By way of a non-limiting example, FIG. 5 shows a first loop trace 5208 connected to meandering arms 5202 and 5204 of first differential antenna 5200, and a second loop trace 5308 connected to meandering arms 5302 and 5304 of second differential antenna 5300.

In some embodiments, a width of a trace of the first differential antenna is greater than a width of a trace of the second differential antenna. A width may refer to one of multiple dimensions for measuring an object. For instance, a two-dimensional object may have a length dimension and a perpendicular width dimension. In some embodiments, a width of a trace for a differential antenna may correspond to a size of meandering arms of the differential antenna. Thus a smaller differential antenna may have a smaller trace, and a larger differential antenna may have a larger trace. In some embodiments, a width of a trace of the first differential antenna may be more than double, more than three times, more than four times, or more than five times a width of a trace of the second differential antenna. The width of a trace of an antenna may contribute to determining the intrinsic impedance of the antenna, such that a wider trace may correspond to a lower series impedance (or a higher parallel impedance). In some embodiments, where the first differential antenna is used primarily for harvesting energy, and the second differential antenna is used primarily for transmission, it is advantageous for the first differential antenna to have a lower series impedance (or a higher parallel impedance) than the second differential antenna.

By way of a non-limiting example, FIG. 5 shows a first trace 5208 of first differential antenna 5200 and a second trace 5308 of second differential antenna 5300, where the width of trace 5208 (e.g., along the y-axis) may be greater than the width of trace 5308.

In disclosed embodiments, other hardware components or devices may be added to the wireless tag and may be electrically connected to one or more of the communications chip, the crystal, the capacitor, the antennae, the trace, or other elements of the wireless tag architecture. The other hardware components or devices added to the wireless tag may perform other functions not mentioned herein and/or may support and enhance features and capabilities of the wireless tag components in the present disclosure.

Figure 7:
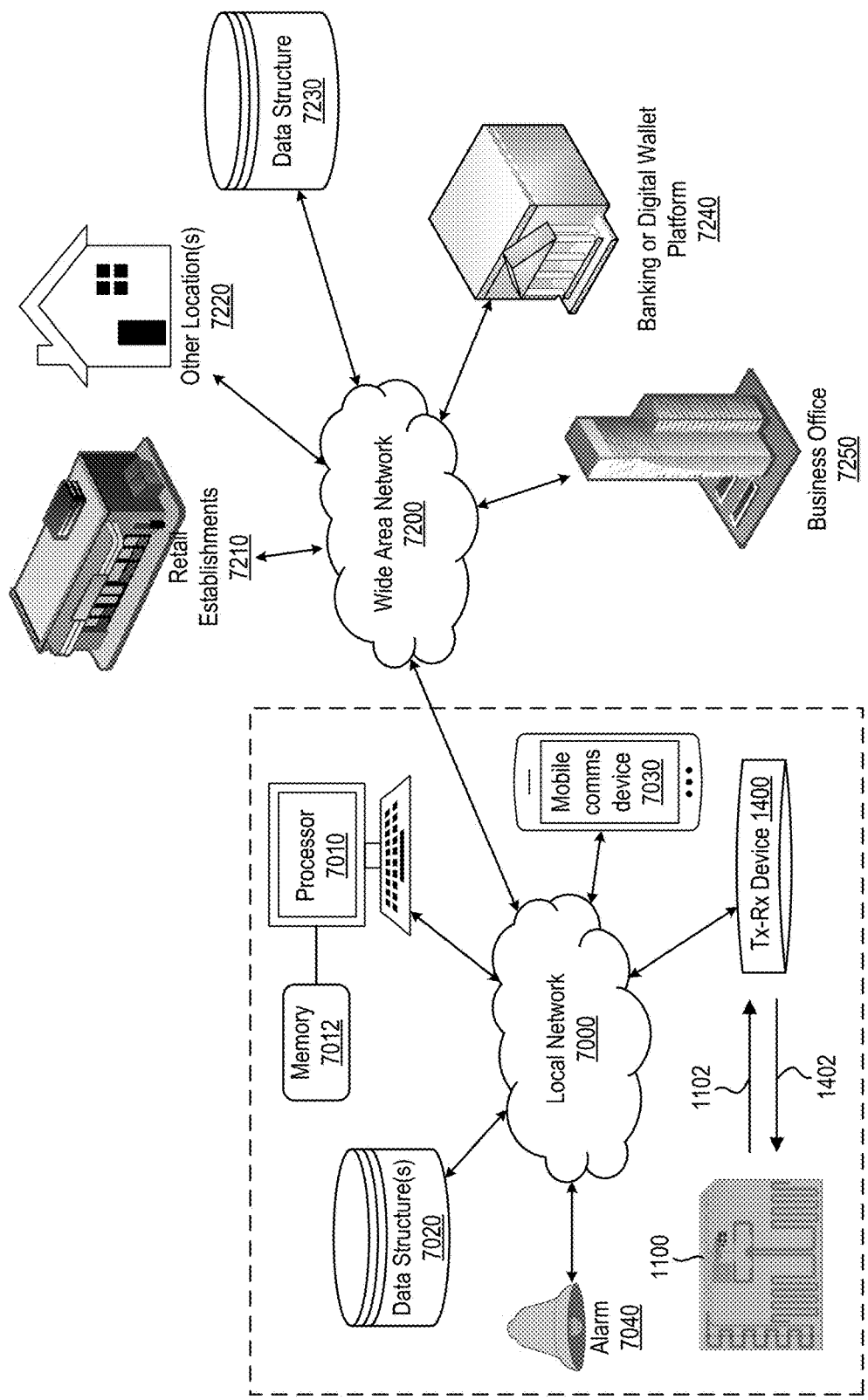
FIG. 7 is a diagram of local and wide area networks for communication with components of the electronic tracking system of FIG. 1, consistent with disclosed embodiments.

FIG. 7 depicts a local network 7000 and a wide area network (WAN) 7200 for connecting with components of electronic tracking system 1000, including wireless tags 1100 and transmitting-receiving devices 1400. In some embodiments, local network 7000 may be established within, or otherwise associated with, one or more specific retail establishments, such as a clothing store, pharmacy, or art gallery. Local network 7000 may enable the exchange of data and/or information between features such as processor(s) 7010, data structure(s) 7020, mobile communications device 7030, transmitting-receiving devices 1400 (or, additionally or alternatively, separate transmitting devices and receiving devices, as discussed above), and alarm mechanism 7040. Network 7000 may include any type of wired and/or wireless computer networking arrangement configured for exchanging data. As non-limiting examples, network 7000 may include a local Wi-Fi network within the retail establishment, a wired or wireless Local Area Network (LAN) connection, Bluetooth connection, Ethernet, or a Wide Area Network (WAN) connection.

Local network 7000 may include at least one processor 7010 configured to receive, store, and process information related to wireless tags 1100 and other components of local network 7000 and WAN 7200. For example, processor 7010 may receive and process information related to wireless tags 1100 (e.g., via transmitting-receiving devices 1400), receive and execute queries and searches, receive data from and transmit data to mobile communications device 7030 and other input/output, human interface, or processing devices, control the ability of alarm mechanism 7040 to initiate an alarm, relay information and notifications to users (e.g., via mobile communications device 7030), and access, look-up, read, add to, alter, delete, and share data in the local data structure 7020 or WAN data structure 7230. The at least one processor 7010 may include any physical device or group of devices having data processing capabilities, including and not limited to a server, PC workstation, cellular phone, smartphone, tablet, desktop computer, laptop computer, PDA, handheld scanner, wearable device, or another fixed or mobile computing device.

Processor 7010 may also be configured to communicate with components of WAN 7200, such as data structure 7230 and banking platform 7240. In some embodiments, the at least one processor 7010 may include a processing device operated by employees of an establishment 7210, such as a desktop computer, laptop, computing terminal or electronic register at a checkout station, or a tablet, scanner, or handheld device carried by an employee around establishment 7210. Additionally, or alternatively, the at least one processor 7010 may include a processing device operated by customers within establishment 7210, such as a self-checkout station or kiosk.

Local network 7000 may include at least one data structure 7020 for storing data, e.g., inventory information of establishment 7210 and other data of establishment 7210, its customers, and wireless tags 1100 within establishment 7210. In disclosed embodiments, the at least one data structure 7020 may include at least one database, such as a local database for storing local information related with a particular facility or store, a regional database, or a global database. The at least one data structure 7020 may contain data including, but not limited to, an inventory of products offered by the establishment, identifiers of specific products (e.g., barcodes or unique product names), information of specific products (e.g., product style, size, color, material, location, manufacturing and/or shipping history, and/or ownership information), purchase status of specific products (e.g., whether a specific product has been purchased, picked up from establishment 7210, or designated for return to establishment 7210), information of product families within retail establishment 7210, associations between specific products and specific product families, information of tags 1100, unique identifiers of tags 1100, associations between specific tags and specific products, encryption keys of tags 1100, a record of purchases, returns, and other transactions with establishment 7210, and/or information of purchasers of specific products. Information stored in the at least one data structure 7020 may be accessible to one or more processors 7010 directly or indirectly through network 7000.

Local network 7000 may include at least one mobile communications device 7030 configured for wired and/or wireless communication with network 7000. In some embodiments, mobile communications device 7030 may include a user device such as a cellular phone, smartphone, tablet, desktop, laptop, PDA, handheld scanner, wearable device, or other mobile computing device having computer programs (examples of applications) for controlling the operations of device 7030. In some embodiments, device 7030 may be configured to receive a user input and to transmit a corresponding signal to network 7000. For example, user input may be received via a user interface (e.g., a touchscreen, keypad, or microphone), by collecting at least one image with a camera of the device 7030 (e.g., capturing an image of a tag 1100 or of a barcode or QR code associated with a product or a package holding a product), by wired or wireless transmission of a user input to the mobile communications device 7030, or by any other means of conveying a user input to mobile communications device 7030. Additionally, or alternatively, device 7030 may include at least one user interface configured to output a notification signal to the user, such as an audible signal, a visual signal, a haptic signal, or another sensory signal; examples of a user interface may include a display screen or a speaker.

Local network 7000 may include at least one alarm mechanism 7040 configured to initiate an alarm when, for example, an unauthorized intrusion into the establishment, an attempted robbery or theft, or another loss is detected. For example, alarm mechanism 7040 may include EAS alarm 1530 depicted in FIG. 1. Alarm mechanism 7040 may include an audible alert (such as speakers or a siren), a visual alert (such as lights or graphic displays), a notification transmitted to a device (such as a mobile device operated by an employee or a computer operated by store security personnel), a haptic alert, a digital message, or any other transmission that conveys the desired information. In some embodiments, alarm mechanism 7040 may include fixed infrastructure within the establishment (such as speakers, lights, and/or graphic displays), which may include components arranged at strategic locations around the establishment such as at the entrance and/or exit, near a checkout counter or self-checkout kiosk, in a storage area, or next to the fitting rooms.

Local network 7000 may include one or more transmitting-receiving devices 1400 configured to receive broadcasts of signals from wireless tags 1100, to transmit signals to wireless tags 1100, and to exchange data and/or information with network 7000. In some embodiments, devices 1400 may also be configured as exciters for delivering energy to be collected and stored by the wireless tags 1100, such as in capacitor 6010. As discussed above, devices 1400 may be configured in some embodiments as separate transmitting devices and receiving devices, or as devices configured to both transmit and receive wireless and/or wired signals. In some embodiments, devices 1400 may be fixed at locations around the retail establishment, including on a sales floor, in fitting rooms, and in a storage area. Thus, devices 1400 may enable local network 7000 to communicate with wireless tags 1100 at any desired location within the establishment.

FIG. 7 also depicts a wide area network (WAN) 7200 for communicating with local network 7000 and other local networks in different geographical areas. In the example shown in FIG. 7, WAN 7200 may connect with multiple establishments 7210, each of which may have a wired or/or wireless network for local communications. In some embodiments, a corporation or other entity having multiple establishments across different locations may use WAN 7200 to provide communications between individual establishments, as well as additional points such as a business office 7250, a banking or digital wallet platform 7240, a data storage structure 7230 (e.g., a remote or cloud storage structure), and other locations 7220 such as, e.g., a customer's home or business, school, university, library, government building, or any other location from which access to the corporation's network may be sought. In various embodiments, the at least one processor 7010 and the mobile communications device 7030 may be situated in different locations (as a non-limiting example, the mobile communications device 7030 may be a mobile phone operated within a retail establishment while the at least one processor 7010 may be situated within a business office 7250). Data may be transmitted between the device 7030 and the processor 7010 via WAN 7200.

Wide Area Network (WAN) 7200 may be configured to communicate with a banking or digital wallet platform 7240. For example, platform 7240 may be linked to a specific bank or financial institution, to a financial instrument (e.g., credit card, debit card, or bank account), or to a digital wallet program such as PayPal, Venmo, Apple Pay, or Zelle. In some embodiments, a processor 7010 performing a purchase transaction for a purchaser within a local retail establishment may access a banking or digital wallet platform 7240 associated with the purchaser to access funds for completion of the purchase transaction. For example, the processor 7010 may be configured to transfer funds from a bank account or instrument of the purchaser to an account associated with the establishment. Additionally, a processor 7010 completing a product return transaction in a local retail establishment may be configured to transfer funds from an account associated with the establishment to a bank account or instrument of the customer making the return.

Figure 8:
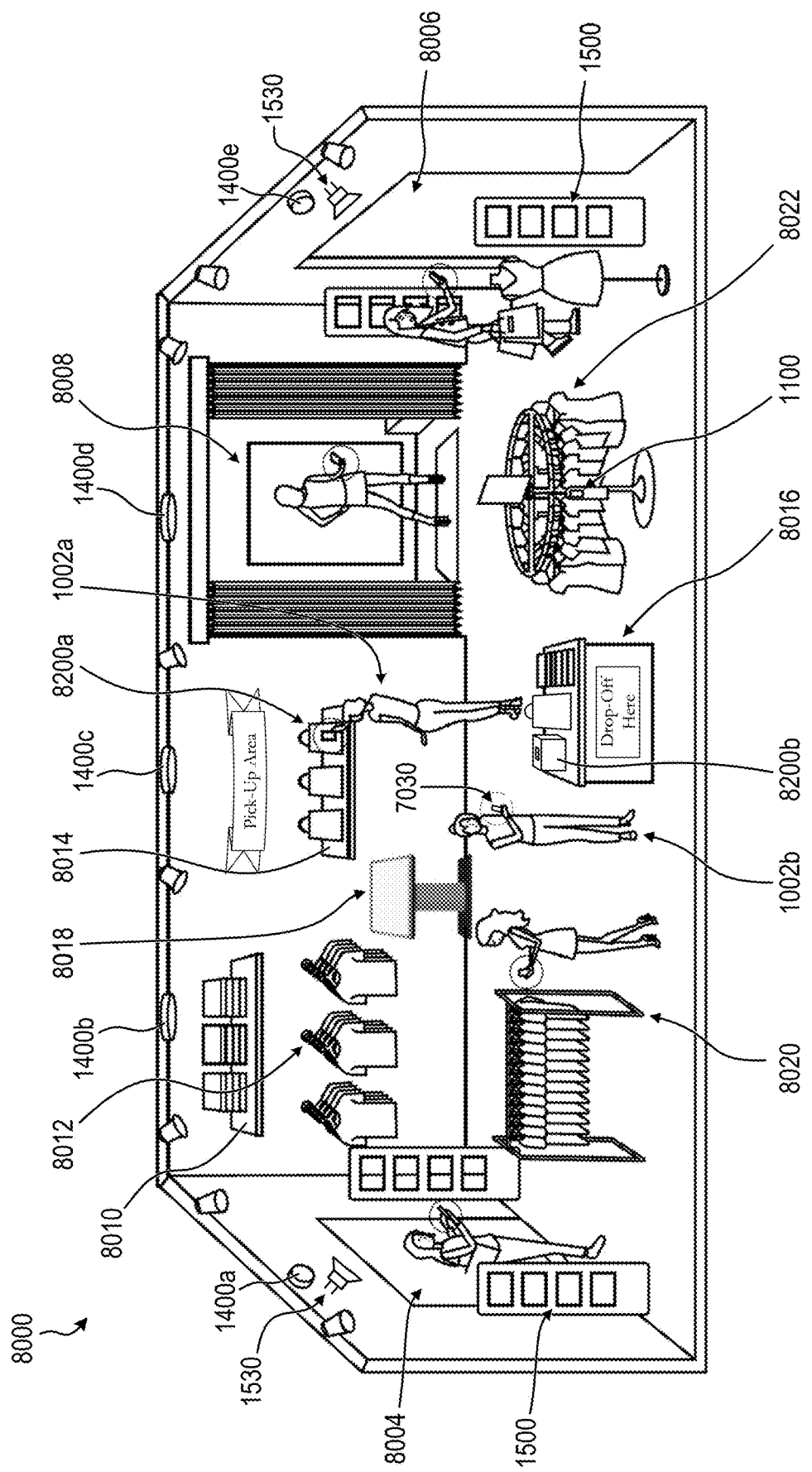
FIG. 8 is a perspective view of a retail establishment incorporating an electronic tracking system, consistent with disclosed embodiments.

FIG. 8 is a perspective view of an electronic tracking system 8000 in a retail establishment 7210, which may contain a plurality of items offered for purchase, each of which may be fixed to or otherwise associated with a wireless tag 1100. Within this establishment, there may be one or more locations designated for certain purposes, such as the storage and/or display of a particular item or the facilitation of other activities relating to operation of the establishment. For example, the establishment may contain racks 8012 and shelves 8010 that are designated for the storage and/or display of a certain item, such as a particular article of clothing. The establishment may also include other locations, such as a fitting room 8008, that are not associated with the storage and/or display of items but enable customers to perform certain activities within the establishment, such as trying on different clothing items.

In some embodiments, electronic tracking system 8000 may include security features for detecting, and raising an alert for, the attempted theft of items from the establishment. In the example shown, the establishment may include security gates 1500 situated at an entryway 8004 and at an exit 8006. As discussed above in reference to FIG. 1, the security gates 1500 may be configured to detect passage of a conventional security tag and/or wireless tag 1100 and may activate alarm 1530 as a result.

In the electronic tracking system 8000 illustrated in FIG. 8, a plurality of transmitting-receiving devices 1400*a-e* may be arranged throughout the establishment and may be configured to receive signal broadcasts from all of the tags 1100 within, or in proximity to, the establishment. Disclosed embodiments may include one or more devices 1400 fixed at designated locations within the establishment and configured to receive electromagnetic signals transmitted wirelessly and/or via a wired connection. For example, devices 1400 may be distributed throughout the establishment and affixed or otherwise attached to walls, ceilings, racks, displays, or any other fixtures or components, so that signals transmitted from any point within the establishment (e.g., by a tag 1100) may be received by at least one of the devices 1400. Additionally, or alternatively, embodiments may include one or more mobile transmitting-receiving devices (e.g., a wireless user device or a handheld device) which may be placed or held by a user, such as an employee, at a desired location within the establishment and/or which may be affixed to any other stationary or mobile structure. Each transmitting-receiving device 1400*a-e* may include at least one antenna tuned to receive energy at a frequency around 900 MHz (e.g., UHF or other RFID signals) or a frequency around 2.4 GHz (e.g., Wi-Fi, Bluetooth Low Energy (BLE), or Classic Bluetooth). Accordingly, devices 1400 may be configured to receive signals transmitted by one or both of the antennae 5200, 5300 of any given wireless tag 1100. In some embodiments, devices 1400 may be configured to receive data transmissions from wireless transmitting tags 1100 and to transmit the data to other devices or entities via local network 7000 and wide area network 7200 for processing, analysis, and/or storage (see, e.g., FIG. 7).

In disclosed embodiments, transmitting-receiving devices 1400*a-e* of FIG. 8 may additionally be configured to wirelessly send electromagnetic data signals and/or energy to wireless tags 1100. For example, devices 1400*a-e* may be configured to wirelessly send power to the wireless tags 1100 in the form of radio signals, a magnetic or electric field, an audible or ultrasound signal, a light signal, a mechanical vibration, or any other form of energy. In some embodiments, transmitting-receiving devices 1400*a-e* may each include an antenna tuned to wirelessly send energy to the wireless tags 1100 within one or more designated frequency bands; the antenna configured for wirelessly transmitting signals to the tags 1100 may be the same as, or may be different from, the antenna configured for receiving wireless signals from the tags 1100. For example, devices 1400 may transmit energy within a frequency band around 900 MHz (e.g., UHF or other RFID signals) and/or within a frequency band around 2.4 GHz (e.g., Wi-Fi, Bluetooth Low Energy (BLE), or Classic Bluetooth). In some embodiments, wireless tags 1100 may be configured to harvest the energy transmitted from the plurality of devices 1400, store the harvested energy (e.g., with capacitor 6010) and use the harvested energy to power its operations. In this way, tags 1100 may be configured to reliably operate in the establishment without a battery.

In the example shown in FIG. 8, electronic tracking system 8000 may include devices 1400 configured as both wireless receivers and wireless transmitters. However, in alternative embodiments, and as mentioned above in reference to FIG. 1, electronic tracking system 8000 may include a plurality of receivers configured to receive broadcasts of signals from the wireless tags 1100, as well as a plurality of transmitters configured to deliver energy to be harvested and stored by the wireless tags. Further, persons of ordinary skill will understand that electronic tracking system 8000 and other systems described herein may include only transmitting-receiving devices (such as device 1400), only separate transmitter devices and receiver devices, or any desired combination thereof.

Products sold in the establishment shown in FIG. 8 may have associated wireless tags, such as tags 1100. For example, some or all of the products offered for sale in the establishment may each have a respective tag 1100 attached to it, or otherwise associated with it. In some embodiments, customers may purchase products within the establishment, such as at a check-out counter (not shown in FIG. 8), via a processing device operated by employees (e.g., a tablet or handheld scanner), via self-service kiosk 8018, or by completing the purchase on a mobile device (e.g., mobile communications device 7030 of FIG. 7). Once the purchase of a tagged product is complete, electronic tracking system 8000 may be configured to disable alarm 1530 with respect to the tagged product, so that the customer may exit the establishment without interruption.

In some embodiments, customers may purchase products remotely (e.g., online, on an application, or via telephone) and come into the establishment to pick-up their purchased products. As a non-limiting example, FIG. 8 depicts an establishment having a shelf 8014 designated as a pick-up area for purchased products 8200a, which may be packaged by store employees and placed on shelf 8014. In some embodiments, purchased product 8200a may include a wireless tag 1100. Additionally, or alternatively, a wireless tag 1100 may be attached to, or placed inside, the package for product 8200a, or attached to, or placed inside, a package of an online order containing multiple items. A purchaser 1002a who previously completed an out-of-store product purchase may enter the establishment, identify the package on shelf 8014 holding her purchased product 8200a, and complete the pick-up using her mobile device 7030. For example, purchaser 1002a may use her mobile device 7030 to capture an image of a unique identifier on package and/or on the purchased product 8200a (e.g., a barcode or QR code). Additionally, or alternatively, mobile device 7030 may receive wireless signals from the wireless tag 1100 associated with the purchased product 8200a, which may be used to identify the tag 1100 and the associated product 8200a. A system processor (e.g., processor 7010) may use the data from mobile device 7030 to identify the purchased product 8200a and to indicate that the product is authorized to be picked-up from the establishment. As a result, electronic tracking system 8000 may disable alarm 1530 with respect to purchased product 8200a, so that the customer 1002a may take her purchased product 8200a from the establishment without interruption. Advantageously, this configuration may allow the purchaser to save time (since she is not required to search the store for her desired products or wait in a check-out line) and also to minimize interactions with store staff and others.

As also shown in FIG. 8, the establishment may include a designated drop-off area 8016 where customers may leave previously-purchased items 8200b in order to return the items to the establishment. Items may be returned alone or in a bag or package. In some embodiments, a customer returning an item 8200b to drop-off area 8016 may complete the return transaction using her mobile communications device 7030. For example, customer 1002b may use mobile device 7030 to scan a QR code or barcode on the product 8200b and/or on the package holding the product, and the mobile device 7030 and/or a processor 7010 of the establishment may identify the product 8200b associated with the scanned code and indicate that the product has been returned to the establishment. In some embodiments, security alarm 1530 may be controlled to forego initiating an alarm when the previously-purchased item 8200b is brought back into the establishment. However, once the customer indicates that the item has been returned to the establishment, system 8000 may re-activate security alarm 1530 with respect to the returned item 8200b, so that the alarm will be triggered if the returned item 8200b is detected passing through security gate 1500. Advantageously, this reactivation may prevent a thief from grabbing a returned product from returns area 8016 and removing it from the establishment. Once the return transaction is confirmed by the establishment (e.g., once store staff confirm the condition of returned products in drop-off area 8016), the electronic tracking system 8000 may automatically reimburse customer 1002b for the returned item(s). In some embodiments this reimbursement may be conducted through a financial transaction with banking or digital wallet platform 7240.

FIGS. 9A-9C depict operation modes of a wireless tag 1100 within electronic tracking system 8000 illustrated in FIG. 8. It is to be understood that the subject matter discussed below is merely exemplary and should not be regarded as limiting. The principles discussed below are applicable to the numerous other platforms listed elsewhere in the present disclosure. FIG. 9A illustrates tag 1100 operating in a first mode referred to herein as "infrastructure-excitable mode" (an example of which may include a store mode). FIG. 9B illustrates tag 1100 operating in a second mode referred to herein as "gate mode." FIG. 9C illustrates tag 1100 operating in a third mode referred to herein as "user-excitable mode" (an example of which may include an Internet of Things (IoT) mode).

In FIG. 9A, tag 1100 may be configured to operate in the infrastructure-excitable mode when the tag is powered by environmental exciters, such as transmitting-receiving devices 1400 arranged throughout the establishment. Although FIG. 9A only illustrates a single device 1400d, tag 1100 may be simultaneously powered by multiple transmitting devices. The environmental exciters (including, for example, transmitting-receiving device 1400d) may be configured to deliver energy signal 1402 to the tag 1100 in an RFID frequency band between 860-960 MHz. Signal 1402 may be received by an antenna of tag 1100 (e.g., by first antenna 5200) and the energy of signal 1402 may be harvested and stored in the tag's energy storage component (e.g., capacitor 6010) to power operation of the tag.

When infrastructure-excitable mode is triggered, tag 1100 may control the second antenna 5300 to broadcast the tag's ID signal 1102a in a frequency band around 2.4 GHz with a low repetition period. For example, tag 1100 may transmit ID signal 1102a with a minimum repetition period of 10 minutes, with an added randomized period of up to five minutes, resulting in one broadcast every 12.5 minutes on average. Alternatively, the repetition period for a tag may be longer or shorter (e.g., less than five minutes, hours, or days). In some cases, a transmission of the ID signal 1102a may have a duration of around 300 its; however, the transmission duration may be longer or shorter in alternative embodiments. Because tag 1100 may have a broadcast range of 10 meters or more (e.g., 15 meters in some cases or more), the transmitted ID signal 1102a may be received by multiple transmitting-receiving devices 1400, thus reducing the probability of signal misdetection. In other cases, one transmitting-receiving device 1400*d* may receive the broadcast of ID signal 1102*a*.

In FIG. 9B, tag 1100 may be configured to operate in the gate mode when the tag's inductive coil 5400 receives an EAS signal 1512 from security gate 1500, such as when a customer carries a product with a wireless tag 1100 through a gate 1500 at the establishment's exit. When gate mode is triggered, tag 1100 may control the second antenna 5300 to transmit a short, powerful burst of the tag's ID signal 1102*b*. For example, tag 1100 may transmit its ID signal 1102*b* at its full output power for a period of approximately 200 ms, with a repetition period of between 10-80 ms, such that multiple transmissions occur during a very short time-frame. The ID signal 1102*b* may be received by a dedicated transmitting-receiving device 1400*e* in proximity to the security gate 1500; however, the security gate itself (and, thus, alarm 1530) may not be triggered by the tag 1100 due to the configuration of inductive coil 5400 and its associated circuitry. In some embodiments, tag 1100 may be configured to operate in the gate mode for a predetermined length of time or for a predetermined number of transmissions of the ID signal 1102*b*, after which it may revert to the tag's previous operation mode or to a default mode (which may be, for example, infrastructure-excitable mode).

In FIG. 9C, tag 1100 may be configured to operate in the user-excitable mode when the tag is triggered by a user-operated device, such as mobile communications device 7030 or processor 7010. In the example shown, a user may trigger the user-excitable mode in a tag 1100 by scanning the tag with device 7030 or by controlling device 7030 to transmit a 2.4 GHz trigger signal 9032 to the tag, such as by operating a program or application on device 7030. In response to the trigger signal 9032, tag 1100 may broadcast its ID signal 1102*c* back to mobile device 7030 and/or to one or more transmitting-receiving devices 1400 around the establishment. In some embodiments, tag 1100 may transmit ID signal 1102*c* more promptly and/or with greater transmission power and/or shorter repetition period, relative to the infrastructure-excitable mode. Additionally, or alternatively, ID signal 1102*c* in the user-excitable mode may include different or additional data pertaining to the wireless tag 1100, relative to the infrastructure-excitable mode (for example, data identifying the transmission as being triggered by trigger signal 9032).

As referenced above in reference to FIGS. 5, 6, and 6B, in some embodiments, at least one of the first differential antenna and second differential antenna of the wireless tag is configured to receive ambient energy for storage in the capacitor. Energy may refer to a measurable property that when transferred to a body allows the body (e.g., a physical body) receiving the energy to do physical work. Types of energy may include thermal energy (e.g., heat or light), chemical energy (e.g., generated by a battery as a result of a chemical reaction), electrical energy (e.g., generated by voltage potential stored in a capacitor), and/or mechanical energy. Storing energy (e.g., in a capacitor or battery) may convert energy to potential energy, e.g., for subsequent use. Ambient may refer to something occurring or existing naturally in an environment (e.g., occurring or existing without deliberately performing work). For example, ambient pressure or temperature may refer to the pressure or temperature naturally occurring in the surrounding environment. Ambient energy may include energy existing in an environment, e.g., as background energy. Examples of ambient energy may include air heated by solar energy, air in motion (e.g., wind) due to environmental temperature differences, static electricity, and/or any other type of energy naturally present in an environment. For example, communications networks transmitting signals (e.g., including radio signals such as AM or FM radio, television signals, Wi-Fi, Bluetooth, Zigbee signals, cellular phone signals, satellite communication signals) may provide a source of EMR as ambient energy for harvesting. Transmitters (e.g., exciters) placed in a location in order to transmit energy for harvesting may also contribute to the ambient EMR energy present in said location. An antenna configured to receive ambient energy may refer to an antenna tuned to receive ambient radio waves (e.g., radio waves existing in an environment) and convert energy stored in the ambient radio waves to an AC signal. For example, an antenna may be tuned to receive ambient radio waves in a frequency band around 900 MHz, or alternatively, in a frequency band around 2.4 GHz. In some applications, an antenna may be tuned to receive ambient EMR used for cellular and/or satellite communication. An AC signal generated by an antenna may be converted to a DC signal using a rectifier (e.g., after matching impedances). The DC signal may be converted for storing in a battery or capacitor (or other energy storage component) for subsequent use, thereby converting ambient energy to potential energy. In some embodiments, one or more transmitters (such as exciters or EMR emitters) may be positioned in a location where one or more battery-less identification tags may be placed to deliver energy to one or more battery-less identification tags.

By way of a non-limiting example, in FIG. 5, at least one of first differential antenna 5200 and second differential antenna 5300 may receive ambient energy for storing in a capacitor (e.g., capacitor 6010 of FIG. 6A). For example, meandering arms 5202 and 5204 may include a pattern suited for receiving radio signals in a frequency band around 900 MHz, and meandering arms 5302 and 5304 may exhibit a pattern suited for receiving radio signals in a frequency band around 2.4 GHz, respectively. It may be noted that these frequency bands are exemplary only, and do not limit the invention from using other frequency bands. For instance, at least one of first differential antenna 5200 and second differential antenna 5300 may receive ambient energy from transmitting-receiving devices 1400 (see FIG. 8). For instance, devices 1400 may emit signals in in an RFID frequency band between 860-960 MHz for receiving by first differential antenna 5200 and storage in capacitor 6010. Upon receiving ambient radio signals, first differential antenna 5200 and/or second differential antenna 5300 may generate a corresponding AC signal, which may be converted to a DC signal using a rectifier. The DC signal may be adjusted (e.g., via a DC-to-DC converter) for compatibility with capacitor 6010, such that feeding the adjusted DC signal to capacitor 6010 may cause a corresponding DC voltage potential to be stored in capacitor 6010 as electrical energy.

In some embodiments, the communications chip is configured to be powered with the energy stored in the capacitor, to transmit identification signals via at least one of the first differential antenna and second differential antenna. Energy stored in a capacitor may refer to a DC voltage potential (e.g., electrical energy) maintained between two conducting plates of a capacitor separated by an insulating dielectric. For example, a capacitor may receive a DC signal as a rectified AC signal from an antenna receiving one or more EMR signals (e.g., ambient radio signals), and may store energy contained in the EMR signals as a DC voltage potential maintained between two conducting plates by a dielectric insulator. Powered may refer to receiving energy (e.g., electrical energy) for the purpose of doing work. For example, components of the identification tag may receive electrical energy from an energy source (e.g., a battery, a wall outlet, a capacitor, and/or any other energy source) via one or more conducting wires and may use the electrical energy to perform one or more processing operations (e.g., components of the identification tag may be powered by electrical energy to do work). A communications chip configured to be powered with energy stored in a capacitor may include a communications chip configured to receive a DC current (e.g., a form of electrical energy) via one or more conducting wires from a capacitor storing the electrical energy as a corresponding DC voltage potential.

The communications chip may use the received electrical energy to perform one or more operations, e.g., transmitting and/or receiving information, as described in greater detail herein below. For instance, a capacitor may replace a different energy source (e.g., a battery or wall outlet) for powering a communications chip. In some embodiments, the electrical energy (e.g., DC current) received from the capacitor may be adjusted for compatibility with a communications chip, e.g., using a DC-to-DC converter. In some embodiments, the communications chip may be designed for the purpose of being powered from a capacitor as an energy source, by limiting both the active current consumption and the standby current consumption of the communications chip. A signal may refer to information encoded for transmission via a physical medium. Examples of signals may include signals in the electromagnetic radiation spectrum (e.g., AM or FM radio, Wi-Fi, Bluetooth, radar, visible light, lidar, IR, Zigbee, Z-wave, and/or GPS signals), sound or ultrasonic signals, electrical signals (e.g., voltage, current, or electrical charge signals), electronic signals (e.g., as digital data), tactile signals (e.g., touch), and/or any other type of information encoded for transmission between two entities via a physical medium. An identification signal may include a signal carrying characterizing or distinguishing information (e.g., a distinguishing pattern) that may be used to determine or establish an association between an entity associated with emitting the identification signal and additional information (e.g., associated with the entity and/or absent from the identification signal). For example, identifying information included in an identification signal may be used to query a database for additional information associated with the device, such as a location, a state (e.g., an ownership state), a user, an account, a device type, an object or product associated (e.g., attached) to the device, and/or any other information retrievable using characterizing information. For example, a communications chip attached to a retail product may emit an identification signal carrying an identifying code that may be used to query a database to retrieve data about the retail product (e.g., a price, a size, a type, a discount, a promotion, an inventory level, an availability, a location (e.g., of a retail store, within a retail store, and/or at an entrance or exit of a retail store), an ownership, and/or any other data associated with a retail product).

By way of a non-limiting example, in FIG. 7, battery-less identification tag 1100 may transmit an identification signal 1102, which is then used in a query to data structure 7020 via transmitting receiving device 1400 and local network 7000 and/or submit a query to data structure 7230 additionally via wide area network 7200 to retrieve information about a product (e.g., dress 2200 of FIG. 2, jacket 3200 of FIG. 3, or container 4200 of FIG. 4) connected to one of battery-less identification tags 1100. In some embodiments, battery-less identification tag 1100 may receive energy from the same device used to transmit an identification signal. For instance, battery-less identification tag 1100 may receive ambient energy from at least one transmitting-receiving device 1400 for storage as electrical energy in capacitor 6010 and may subsequently use the stored electrical energy to transmit an identification signal to (or via) device 1400.

By way of another non-limiting example, in FIGS. 9A-9C, battery-less identification tag 1100 may control second differential antenna 5300 to broadcast one or more ID signals. For example, battery-less identification tag 1100 may transmit ID signal 1102a in a frequency band around 2.4 GHz (e.g., FIG. 9A), and/or may transmit ID signal 1102c in response to trigger signal 9032 (FIG. 9C), and/or may transmit ID signal 1102b in response to an EAS signal 1512 (FIG. 9B).

Transmitting an identification signal may include one or more of retrieving identifying information (e.g., as a sequence of bytes), converting identifying information to an identifying information-bearing waveform, modulating a carrier signal (e.g., corresponding to a resonant frequency of an antenna) with an identifying information-bearing waveform, and/or transmitting, via an antenna, a carrier signal modulated with an identifying information-bearing waveform. Techniques for modulating a carrier signal with an identifying information-bearing waveform may include analog modulation (e.g., frequency modulation (FM), amplitude modulation (AM), phase modulation (PM), quadrature amplitude modulation (QAM), spatial modulation (SM), or single sideband modulation (SSB)); digital modulation (e.g., amplitude shift keying (ASK), amplitude and phase shifted keying (APSK), continuous phase modulation (CPM), frequency shift keying (FSK), multiple frequency shift keying (MFSK), minimum shift keying (MSK), on-off keying (OOK), pulse position modulation (PPM), phase shift keying (PSK), single carrier frequency domain equalizer (SC-FDE), trellis modulation (TCM), or wavelength division multiplexing (WDM)); hierarchical modulation (e.g., QAM, or WDM); and/or spread spectrum (e.g., chirp spread spectrum (CSS), direct sequence spread spectrum (DSSS), frequency hopping spread spectrum (FHSS), and/or time hopping spread spectrum (THSS)).

For example, a communications chip embedded into a product may store a unique ID for the product as a sequence of bytes. For instance, the unique ID may be stored in a memory of the communications chip, and/or engraved into a substrate (e.g., the same substrate including the communications chip). The communications chip may use electrical energy received from a capacitor (e.g., electrically connected to the communications chip) to retrieve the unique ID and generate a carrier signal modulated with a waveform bearing the unique ID, for instance, using digital modulation. The communications chip may transmit the modulated carrier signal to an antenna (e.g., a differential antenna) for broadcasting. For instance, an antenna associated with a different communications chip (e.g., tuned to the same carrier signal) may receive the broadcasted signal and extract the unique ID to obtain additional information about the product, such as a location, ownership, and/or a transfer of ownership of the product, thereby tracking the product using a battery-less identification tag powered with ambient energy.

By way of a non-limiting example, in FIG. 6A communications chip 6020 may receive energy stored in capacitor 6010 via wires 6012. For instance, communications chip 6020 may use some of the energy to retrieve an identifier for a product, e.g., from a memory structure (not shown). In addition, communications chip 6020 may use energy received from capacitor 6010 to generate a signal carrying the identifier (e.g., using digital modulation) and send the signal to at least one of first differential antenna 5200 and second differential antenna 5300 via wires 5206 and 5306, respectively, for transmission (e.g., to transmitting-receiving device 1400).

Figure 10B:
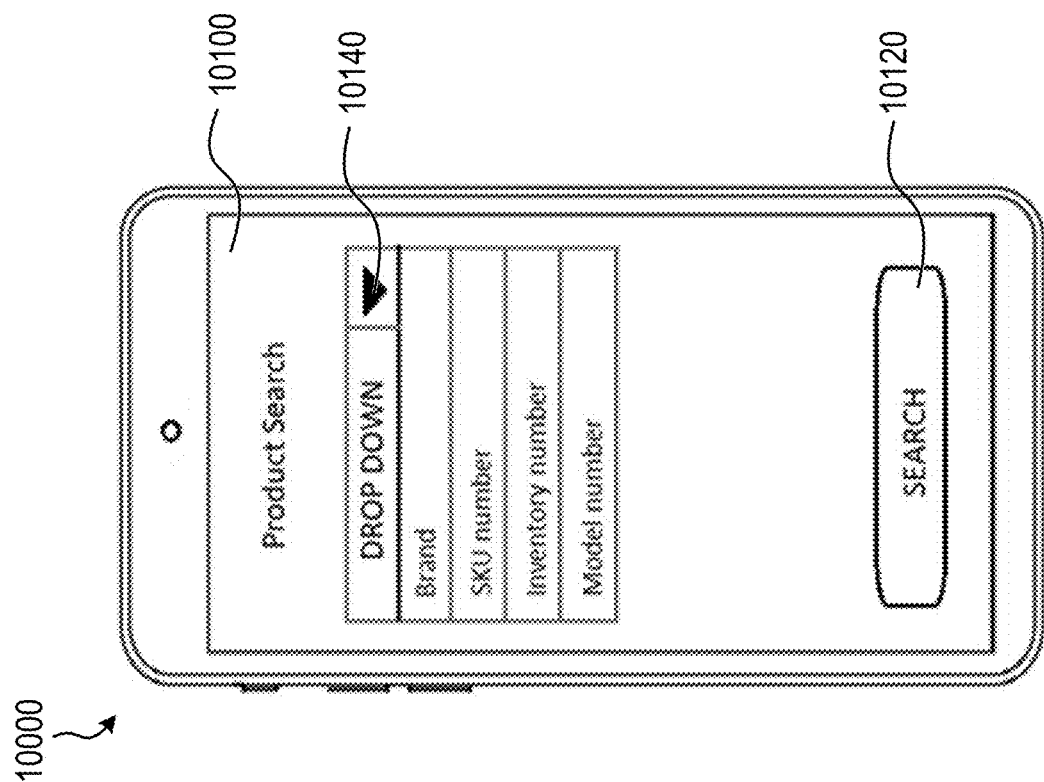
FIG. 10B illustrates a user device displaying a product graphical user interface, consistent with disclosed embodiments.
Figure 10A:
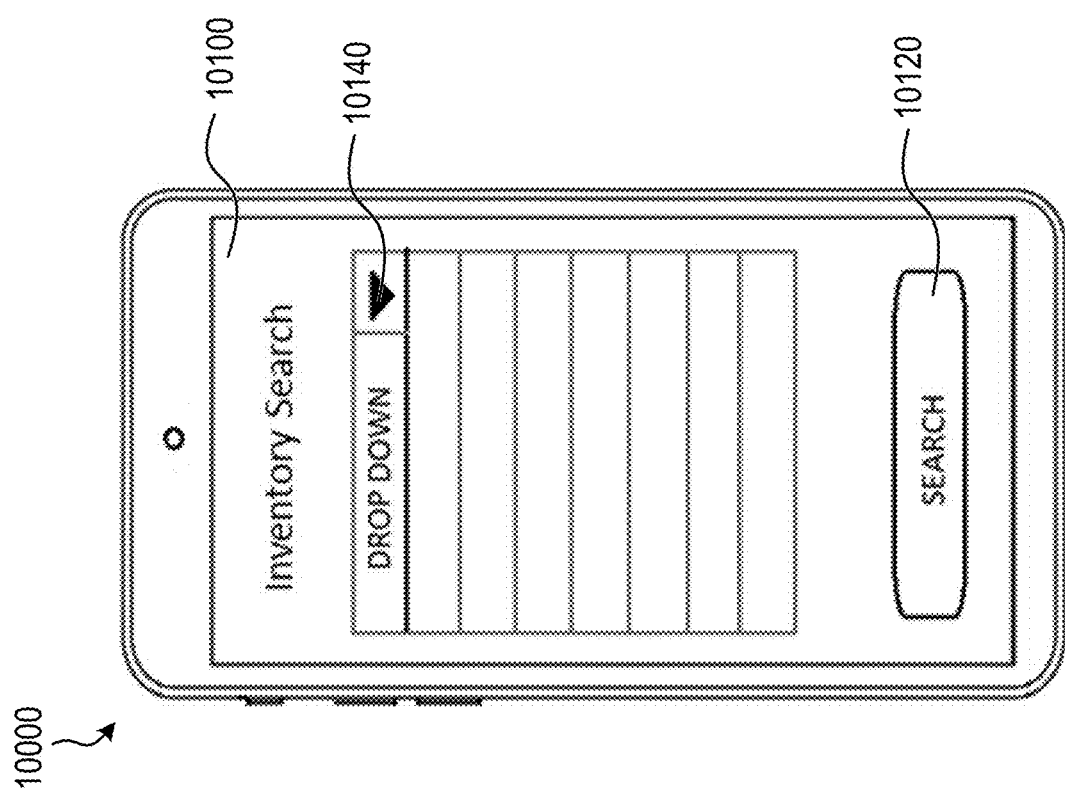
FIG. 10A illustrates a user device displaying an inventory search graphical user interface, consistent with disclosed embodiments.
Figure 10C:
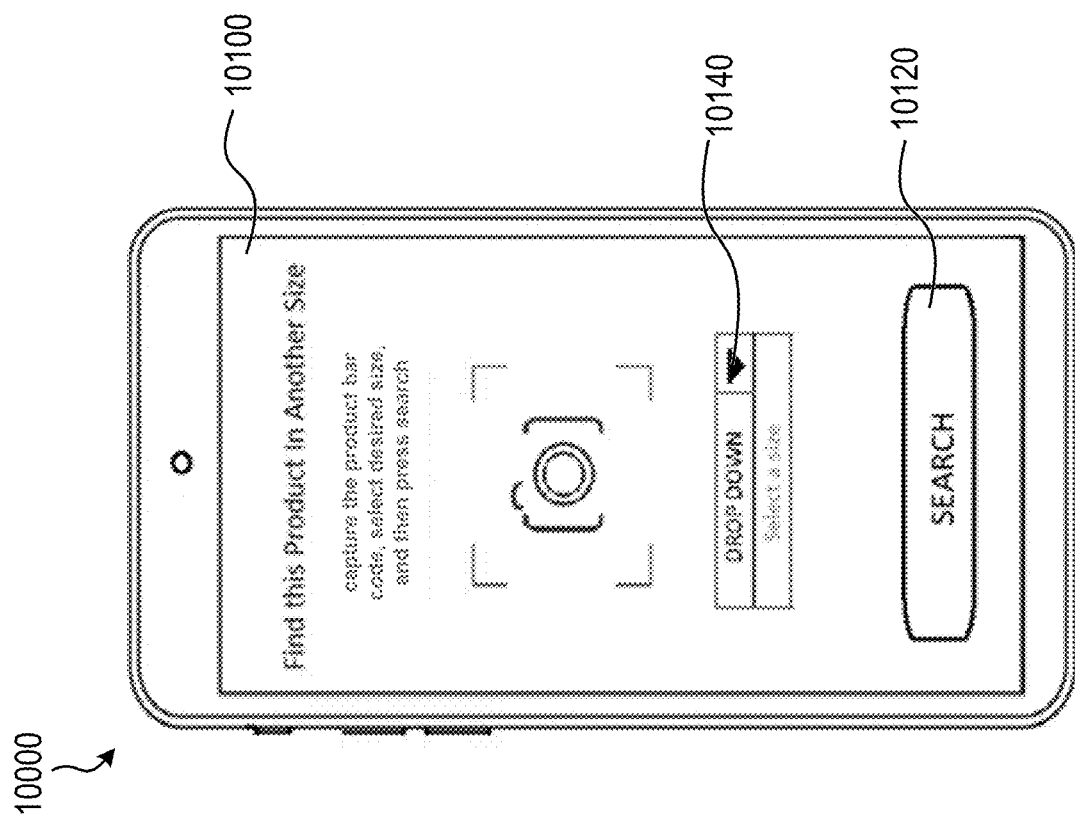
FIG. 10C illustrates a user device displaying a product size search graphical user interface, consistent with disclosed embodiments.

FIGS. 10A-10C illustrate non-limiting examples of graphical user interfaces displayed on a user device, which may, for example, include mobile communications device 7030 of FIG. 7. As a generic example, FIG. 10A is provided for discussion purposes and illustrates user device 10000 displaying a graphical user interface (GUI) 10100 for conducting an inventory search by enabling a user to enter data into the GUI 10100, and activating an element, such as a search button 10120. A search query may be initiated in many ways, such as by typing search text into a field, by scanning a wireless tag 1100 or a scannable code (e.g., bar code) with a scanner in user device 10000, or through the use of a drop-down menu 10140. The drop-down menu may provide the user with selection options in order for the user to define a search. Once the search is defined, search button 10120 may be touched on the touch screen of user device 10000 in order to initiate the search through a wireless transmission to a receiver (e.g., sending a trigger signal 9302 to a proximate wireless tag 1100).

FIG. 10B illustrates user device 10000 displaying a product search GUI 10100. A user searching for a particular product or product family may be provided with dropdown menu 10140. The drop-down menu 10140 may provide the user with various ways to search for a product or product family, by either entering a brand, SKU, inventory number, model number, name, or family number. Sub-menus might appear following an initial selection. For example, if the brand drop-down is selected, successive sub-menus might include a selection of brands to choose from, or category, product, size, color, or any other product distinguishing characteristic. Product images might appear in the GUI, enabling the user to select the product of interest. After the product is identified, search button 10120 may be activated by touch, by voice command, or by any other means supported by user device 10000.

FIG. 10C provides yet another example of a GUI 10110 with an activatable button for searching. This example addresses the common scenario where a customer physically locates a product of interest, such as a clothing item, however the item is not in the customer's size. Instead of searching endlessly for the product in the correct size, the GUI 10100 may prompt the user to enter information about the product of interest. In this example, the customer (or employee of the establishment) may be prompted to take a picture of the barcode or QR code on the product (or on the product's package, or a price-tag or other tag attached to the product) identified by the customer. The user may next be prompted via dropdown menu 10140 to input a desired size, color or other variation of the product. After the search is defined, search button 10120 may be touched to initiate the search.

Following a look up, user device 10000 may return alternative sources of information, depending on the nature of the query, system design and/or user permissions. For example, the GUI may be caused to display that the requested product is either out of stock or in stock. If the product is out of stock, the GUI might identify a location where the product is in stock or may provide an ability to order the product for shipment to the customer. If the product is in stock, the GUI might indicate the name of another area where the product is located. It may provide a map of the establishment, indicating a general location of the product. The GUI may provide walking directions directing the user to the area of the product. In some instances, as the user approaches the product's location, the tag 1100 associated with the product may transmit a signal either directly to user device 10000 or via a device installed as fixed infrastructure in the establishment, to enable the user to hone-in on the product's location.

Figure 11:
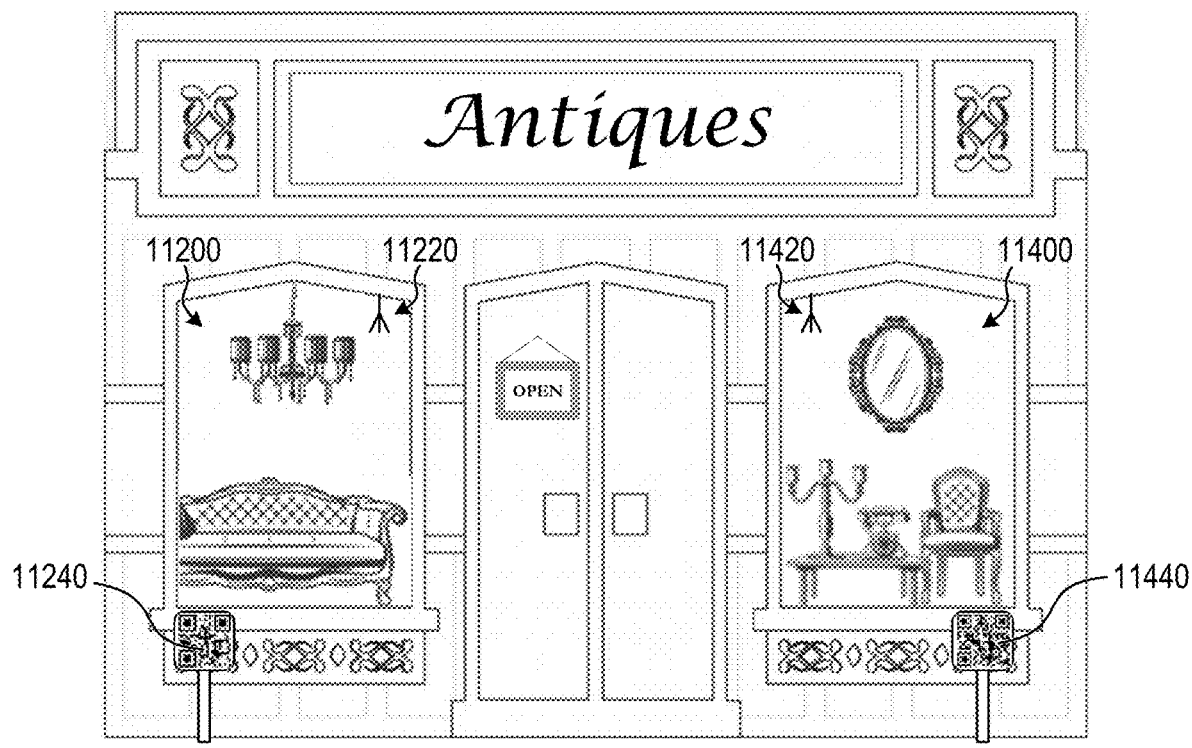
FIG. 11 illustrates an example of a retail establishment with multiple display areas for displaying offered products, consistent with disclosed embodiments.

FIG. 11 depicts an example of a retail establishment including two display areas 11200 and 11400, each of which may display one or more items offered for sale by the establishment. In the example shown, display areas 11200 and 11400 may be configured as window displays. In alternative embodiments, a display area may include a mannequin wearing one or more items for sale, a display of items inside the establishment (e.g., items displayed on a table or pedestal), or a printed or digital advertisement. In some embodiments, one or more items in each display area may have a corresponding wireless tag 1100. In addition, each display area may include a receiver for wireless communication with the tags 1100 in the display area and with user devices (e.g., a mobile communications device 7030) of users viewing the display area. As an example, FIG. 11 shows receiver 11220 associated with display area 11200 and receiver 11420 associated with display area 11400; in the example shown, the receivers may be located within their respective display areas.

In some embodiments, each display area 11200, 11400 may have an associated unique identifier displayed within or near the display area so that the identifier may be scanned or photographed by devices with imaging components (e.g., by a camera on a smartphone or laptop). For example, a display area's unique identifier may be displayed on a sign, sticker, banner, flag, post, hanging tag, or any other display mechanism on which the unique identifier is perceptible to the public. In the example of FIG. 11, first display area 11200 may have a corresponding first display area identifier 11240 (which may be configured as a scannable graphical code, such as a QR code, provided on a sign), and second display area 11400 may have a corresponding second display area identifier 11440. In some embodiments, a person wishing to receive additional information of products shown in a particular one of the display areas may scan the corresponding display area identifier using a smart device and may receive the requested information on their smart device in response.

Figure 12:
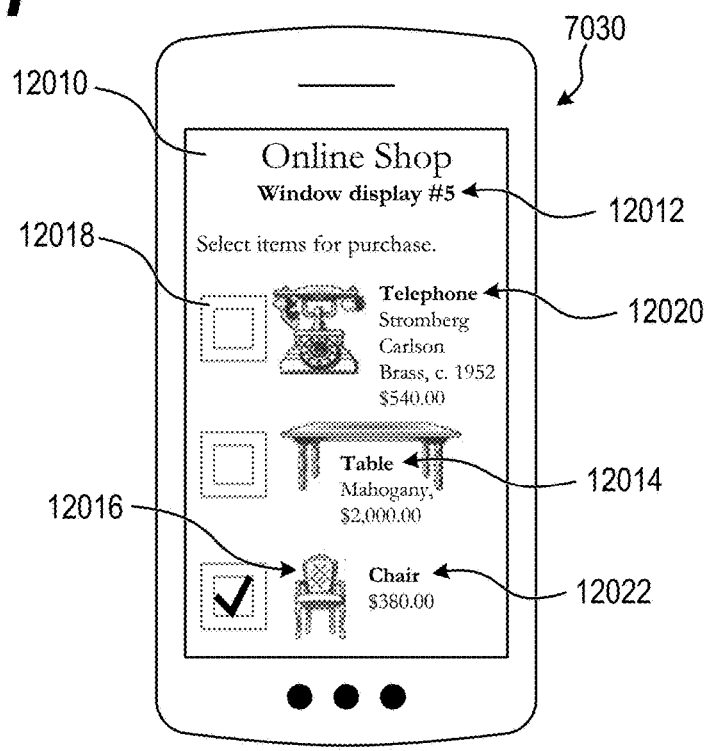
FIG. 12 illustrates a user device displaying a graphical user interface associated with a display area depicted in FIG. 11, consistent with disclosed embodiments.

FIG. 12 illustrates a non-limiting example of a graphical user interface (GUI) 12010 displayed on a user device, such as mobile communications device 7030. GUI 12010 may display product-related information of products associated with display area 11400 of FIG. 11. In the example shown in FIG. 12, GUI 12010 may be configured as an online purchase interface for the purchase of products in display area 11400 and may be retrieved and displayed on device 7030 in response to scanning the second display area identifier 11440 with device 7030. However, in alternative embodiments, GUI 12010 may be configured to display the product-related information separate from an interface for making online purchases. In disclosed embodiments, GUI 12010 may display the product-related information with at least one of images, photographs, textual information about the products, or other identifiers of, or information about, the products. In the example of FIG. 12, GUI 12010 may include an identifier 12012 of the particular display area where the products are on display. GUI 12010 may include textual information 12014, such as a written description of each product offered in display area 11400. GUI 12010 may also include graphical information 12016, such as photographs or images of each item. GUI 12010 may also include fields 12018 (e.g., check boxes) that the user may select to purchase specific products.

In some embodiments, some or all of the products in a given display area (e.g., products 12014, 12020, and 12022 in display area 11400) may each be attached to, or otherwise associated with, a wireless tag 1100. Receiver 11420 may be configured for wireless communication with the tags on the displayed products. Further, at least one system processor (such as processor 7010) may receive information of the tagged products from receiver 11420 and from other data sources associated with the retail establishment, and may use the received information about the tagged products to update GUI 12010. For example, and as discussed elsewhere in the present disclosure, the at least one processor may receive an indication of the sale of one of the tagged products (e.g., from a mobile communications device 7030 or from an inventory database of the establishment) and may, as a result, update GUI 12010 by removing the sold product from GUI 12010. As another example, the at least one processor may monitor the locations of tagged products 12014, 12020, and 12022, which may have an assigned location in display area 11400. When one of the tagged products is determined to be missing (i.e., when ID signals are not received from one of the tagged products), the at least one processor may be configured to determine a likelihood that the missing tagged product remains present at display area 11400 (discussion about the determination of this likelihood is discussed elsewhere in the present disclosure). When the determined likelihood is high (i.e., when the missing product is likely to still be located in display area 11400), the at least one processor may continue to include the missing product in GUI 12010. However, when the determined likelihood is low (i.e., when the missing product is likely to have been removed from display area 11400), the at least one processor may update GUI 12010 by removing the missing product from GUI 12010.

Disclosed embodiments include a system for electronically tracking conversion scores of wirelessly tagged products. The system includes at least one processor configured to perform one or more operations as described herein. As further described below, a conversion score may refer to, for example, any rating, metric, grade, percentage, or value associated with two or more processes of transactions (e.g., for a product family or category). A conversion score may include, for example, a measurement of a likelihood that a product may be purchased after a customer tries on the product, tests out the product, and/or evaluates the product. A conversion score may include, for example, a likelihood that a customer may purchase clothes after the customer tries on the clothes, or a likelihood that a customer may purchase a car after the customer takes the car for a test drive. A high conversion score for a product family may suggest that customers like the products in the product family. A conversion score may be represented in any of one or more desired forms, such as a rate (e.g., measured relative to a fixed standard, in the form of percentages, or in the form of an average of rates over a certain period of time), an absolute count (e.g., an indication of an engagement count and/or a sale count), an arbitrary metric such as a star scale (e.g., 1-5 stars), a mathematical indication of a likelihood, any other type of desired indication.

As further described herein, a retail establishment may include products (e.g., placed in various locations for display to customers), and wireless tags may be attached to the products (e.g., for monitoring the locations of the products by at least one processor, for example, using wireless signals transmitted by the wireless tags). Electronically tracking conversion scores of wirelessly tagged products may include, for example, using location information of the products to determine customer engagement with products and, based on the engagement information and sale information of the products, calculating and tracking conversion scores for the products (and/or product families), as described in greater detail below.

Disclosed embodiments include accessing a retail establishment layout. In some embodiments, at least one location in the retail establishment layout is designated as a fitting room. A retail establishment may refer to, for example, any establishment associated with sale of goods to customers. A retail establishment may include, for example, a retail store, a clothing store, a convenience store, a grocery store, a shop, a mall, a shopping mall, a strip mall, a shopping center, a shopping arcade, a galleria, a plaza, a restaurant, a pharmacy, an art gallery, or any other type of business facility associated with sale of goods to customers. A retail establishment may be associated with sale of goods to the public. A retail establishment may involve sale of goods to the public on premises (e.g., for use or consumption rather than for resale), or a retail establishment may involve solely the display of goods to be purchased via other channels (e.g., a retail establishment may include a showroom, display area, gallery, etc.). A retail establishment may include, for example, a business, a firm, a company, a corporation, an institution, a group, an operation, or any other organization associated with retail. An example of a retail establishment is described in connection with FIG. 8.

A retail establishment layout may refer to, for example, a spatial arrangement of a retail establishment. A retail establishment layout may include, for example, the way in which a retail establishment and/or parts thereof may be arranged or positioned. A retail establishment layout may include a map, a design, a structure, a diagram, a chart, an outline, a blueprint, a sketch, a pattern, a drawing, a plan, a floor plan, or any other spatial information for a retail establishment. A retail establishment layout may be to scale (e.g., a retail establishment layout may be with a uniform reduction or enlargement from the corresponding retail establishment), and/or may indicate the relationships among rooms, halls, hallways, lobbies, corridors, entrances, passages, spaces, windows, doors, walls, fixtures, patterns, or other physical features of the retail establishment. In some examples, a retail establishment layout may indicate measurements of the physical features of the retail establishment, such as the lengths, widths, and/or heights of the physical features. A retail establishment layout may include a two-dimensional layout (e.g., showing a view from above of one floor level of the retail establishment) or a three-dimensional layout (e.g., showing the retail establishment in a simulated three-dimensional space).

A computing device may access a retail establishment layout. A retail establishment layout may be stored using file(s), folder(s), data structure(s), database(s), or any other suitable data format, and may be accessed by the computing device. In some examples, the retail establishment layout may be stored in a memory of the computing device, and the computing device may access the retail establishment layout stored in the memory. In some examples, the retail establishment layout may be stored in another device (e.g., a device located locally to or remotely from the computing device), and the computing device may access the retail establishment layout stored in the other device via a network (e.g., a wired network, a wireless network, a cellular network, a Wi-Fi network, a WiMAX network, a satellite network, a near-field communication (NFC) network, a Bluetooth network, a low-power wide-area networking (LP-WAN) network, a wireless ad hoc network, a telephone network, a mobile network, a terrestrial microwave network, a power-line communication (PLC) network, a coaxial cable network, an optical fiber network, an Ethernet network, a personal area network, a local area network, a metropolitan area network, a wide area network, a global area network, a space network, an Internet Protocol (IP) based network, or any other type of network). The computing device may access the retail establishment layout by, for example, using storage location identifier(s) to determine the storage location(s) where the retail establishment layout may be stored, and receiving the retail establishment layout from the storage location(s).

The computing device may include at least one processor and at least one memory storing instructions that, when executed by the at least one processor, cause the at least one processor to perform various functions described herein. A definition of the term "processor" is provided elsewhere in the present disclosure. The memory may include a non-transitory computer-readable medium that may store instructions. The memory may include, for example, random access memory (RAM), read-only memory (ROM), programmable read-only memory (PROM), erasable programmable read-only memory (EPROM), digital versatile discs (DVDs), non-volatile random-access memory (NVRAM), compact disc read-only memory (CD-ROM), volatile memory, non-volatile memory, hard drives, disks, flash drives, registers, caches, an optical data storage medium, a physical medium with patterns, or networked versions thereof. The computing device may further include at least one network interface (e.g., a modem, a network card, and/or any other device that may be configured to provide data communication via a network). The computing device may further include one or more input devices (e.g., a keyboard, a mouse, a joystick, a touch pad, a touch screen, a microphone, a sensor, one or more buttons, and/or any other device configured to detect and/or receive input). The computing device may further include one or more output devices (e.g., a light source, a light indicator, a display (e.g., a liquid-crystal display (LCD), a light-emitting diode (LED) display, an organic light-emitting diode (OLED) display, or a dot-matrix display), a screen, a touch screen, a speaker, a headphone, a device configured to provide tactile cues, a vibrator, and/or any other device configured to provide output).

In some embodiments, at least one location (e.g., an area or a space) in the retail establishment layout is designated as a fitting room. A fitting room may refer to, for example, any space, area, or room designated for fitting. A fitting room may include, for example, a designated space, area, or room where a customer may try on clothes (e.g., before deciding whether to purchase them), or a space, area, or room designated for changing the clothes of an individual. In some examples, a fitting room may be enclosed by one or more of walls, floors, ceilings, and/or other physical features of a retail establishment, and/or may have one or more entrances. The retail establishment may include at least one location designated as a fitting room. Designating the at least one location as the fitting room may be determined, for example, by an administrator or operator of the retail establishment, and/or may be reflected in the retail establishment layout. For example, the retail establishment layout may include an indication associating a location (e.g., an area or a space) in the retail establishment layout with the fitting room.

As further described herein, the at least one location designated as the fitting room may be used, for example, to determine customer engagement with a product by monitoring whether the product moves to the at least one location. Additionally or alternatively, the at least one location as used in a manner described herein may include other location(s) within the retail establishment in addition to or as an alternative to the fitting room. For example, the at least one location may include the fitting room and a space or area surrounding the fitting room. As another example, in addition to or as an alternative to the fitting room, the at least one location may include a space or area within the retail establishment surrounding or in close proximity to a mirror (e.g., a space or area where a customer may use the mirror to evaluate a product in relation to the customer, for example, by trying on the product or by placing the product close to the customer). Additionally or alternatively, the at least one location may include any space or area within the retail establishment as identified by an administrator or operator of the retail establishment.

Figure 13:
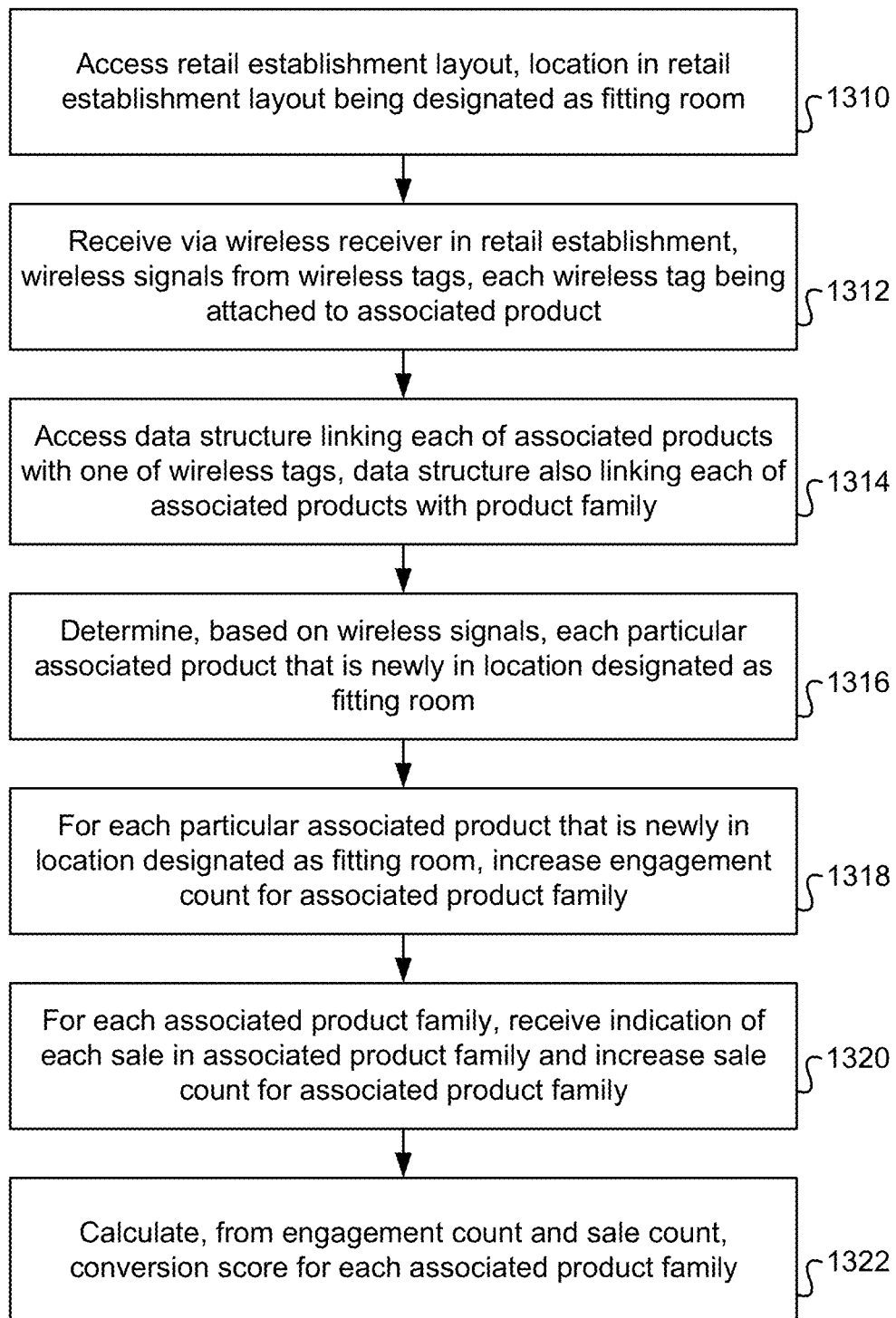
FIG. 13 shows a flowchart of an example method for determining conversion scores for products, consistent with disclosed embodiments.
Figure 14:
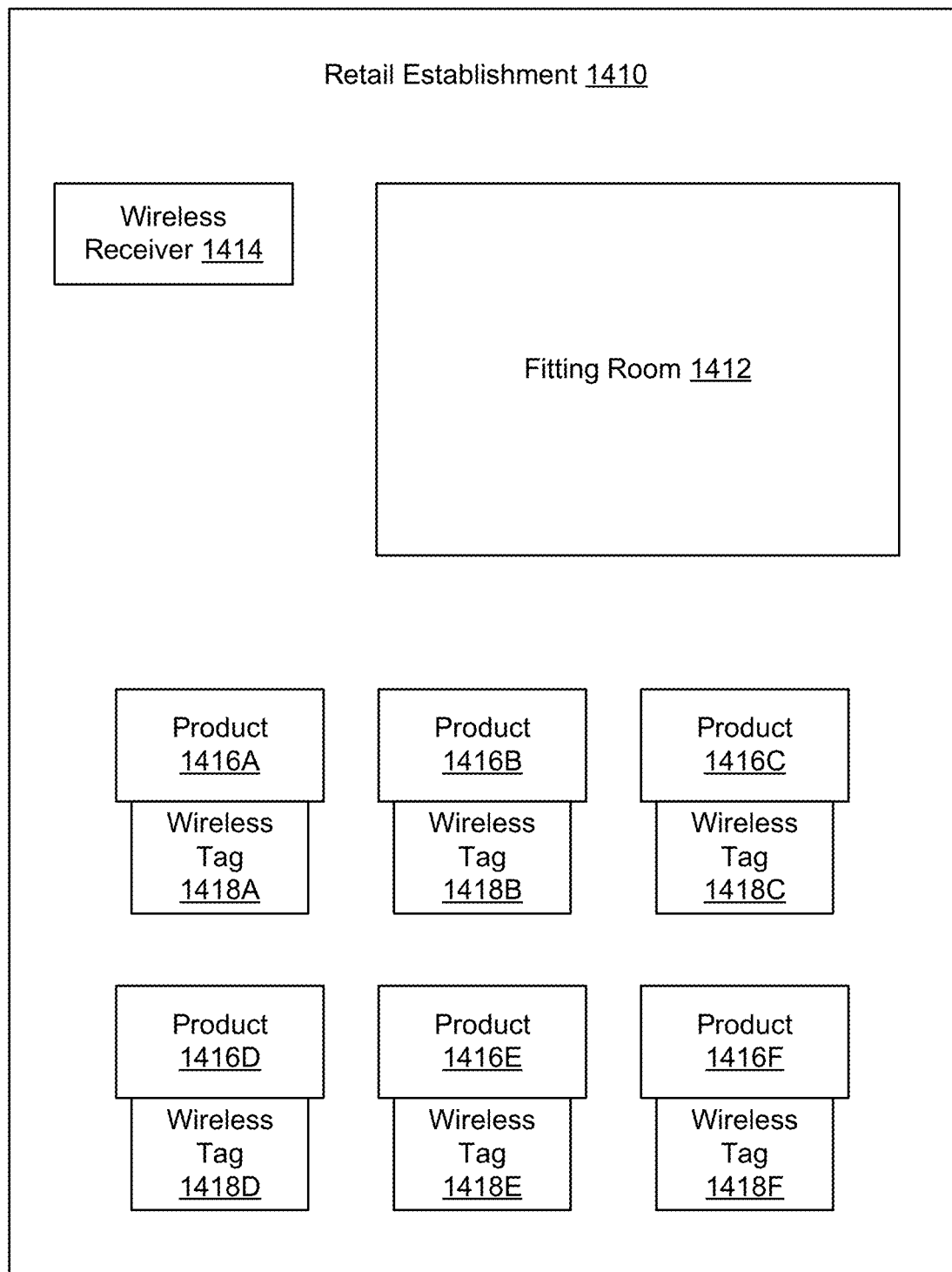
FIG. 14 shows a diagram of an example retail establishment, consistent with disclosed embodiments.

FIG. 13 shows a flowchart of an example method 1300 for determining conversion scores for products, consistent with disclosed embodiments. With reference to FIG. 13, in step 1310, at least one processor may access a retail establishment layout. At least one location in the retail establishment layout may be designated as a fitting room. FIG. 14 shows a diagram of an example retail establishment 1410, consistent with disclosed embodiments. With reference to FIG. 14, at least one location in a layout of the retail establishment 1410 may be designated as a fitting room 1412.

Disclosed embodiments include receiving via at least one wireless receiver in the retail establishment, wireless signals from a plurality of wireless tags. In some embodiments, each wireless tag is attached to an associated product. The at least one wireless receiver may include, for example, any device that may be configured to receive wireless signals. The at least one wireless receiver may include, for example, one or more antennas, filters, amplifiers, demodulators, and/or other suitable elements or components for receiving wireless signals. In some examples, the at least one wireless receiver may be configured to function based on one or more of various protocols for wireless communications, such as Wi-Fi, Bluetooth, Bluetooth Low Energy (BLE), radio-frequency identification (RFID), Zigbee, Z-Wave, cellular (e.g., 3G, 4G, 5G, etc.), or any other suitable protocol. In some examples, the at least one wireless receiver may additionally be configured to transmit wireless signals (e.g., the device may include functionalities for transmitting wireless signals). In some examples, the at least one wireless receiver may include the transmitting-receiving device 1400 or one or more functionalities thereof. In some examples, the at least one wireless receiver may include functionalities to transmit wireless signals to other devices. In some examples, the at least one wireless receiver may be a device separate from a wireless transmitter. The at least one wireless receiver may be located in the retail establishment. Additionally or alternatively, the at least one wireless receiver may be located outside the retail establishment.

The at least one wireless receiver may be configured to and/or may be used to communicate with a plurality of wireless tags. A wireless tag may be understood as described elsewhere in this disclosure (e.g., in connection with FIGS. 1-8 and 9A-9C). A wireless tag may include, for example, the wireless tag 1100, 1100*a*, or 1100*b*. The at least one wireless receiver may receive, from the plurality of wireless tags, wireless signals (e.g., electromagnetic signals or other signals transmitted without the use of an electrical conductor, optical fiber, or other continuous guided medium). An identifier of a wireless tag may be represented and/or included in wireless signals transmitted by the wireless tag, and may be used (e.g., by the at least one wireless receiver, by at least one processor, etc.) to identify which wireless tag transmitted a received wireless signal. A computing device including at least one processor may be communicatively coupled to the at least one wireless receiver (e.g., via any desired type of network, for example, wired or wireless) and may receive, via the at least one wireless receiver, wireless signals from the plurality of wireless tags. For example, the at least one wireless receiver may send, to the computing device including at least one processor, data represented in or associated with the wireless signals from the plurality of wireless tags (e.g., data embedded in the wireless signals received by the at least one wireless receiver, data of received signal strength indications of the wireless signals received by the at least one wireless receiver, data of time stamps or other circumstances of receiving the wireless signals by the at least one wireless receiver, data indicating frequencies or phases associated with the wireless signals received by the at least one wireless receiver, data indicating an angle of arrival of the wireless signals received by the at least one wireless receiver, any data associated with the wireless signals received by the at least one wireless receiver that may be used for determining locations of the plurality of wireless tags, or any other desired data associated with the wireless signals received by the at least one wireless receiver). The computing device including at least one processor may receive the data from the at least one wireless receiver.

In some embodiments, each wireless tag is attached to an associated product. A product may refer to, for example, any goods, article, substance, merchandise, artifact, or commodity. In some examples, a product may include clothes, shoes, or other items that an individual may wear. In some examples, a product may include an object that the retail establishment may sell. For example, various products may be displayed in the retail establishment (e.g., for customers to view, evaluate, test, and/or purchase). Each wireless tag of the plurality of wireless tags may be attached to a product associated with the wireless tag. Attaching the wireless tag to the associated product may include, for example, embedding the wireless tag into the product, sewing the wireless tag into the product, clipping the wireless tag onto the product, gluing the wireless tag onto the product, incorporating the wireless tag into the product, attaching the wireless tag to the product's packaging or inserting the wireless tag into the product's packaging, or any other desired method for spatially associating the wireless tag closely with the product. One or more examples of attaching a wireless tag to a product are described elsewhere in this disclosure (e.g., in connection with FIGS. 1-4, 8, and 9A-9C). Attaching a wireless tag to a product may allow identifying the location of the product based on identifying the location of the wireless tag attached to the product, and/or may allow identifying a movement of the product based on identifying a movement of the wireless tag attached to the product.

With reference to FIG. 13, in step 1312, at least one processor may receive via at least one wireless receiver in the retail establishment, wireless signals from a plurality of wireless tags. Each wireless tag may be attached to an associated product. With reference to FIG. 14, at least one wireless receiver 1414 in the retail establishment 1410 may be configured to communicate with a plurality of wireless tags 1418A through 1418F. Each of the plurality of wireless tags 1418A through 1418F may be attached to an associated product of a plurality of products 1416A through 1416F, respectively. For example, the wireless tag 1418A is attached to the product 1416A, the wireless tag 1418B is attached to the product 1416B, the wireless tag 1418C is attached to the product 1416C, and so forth. At least one processor may receive via at least one wireless receiver 1414 in the retail establishment 1410, wireless signals from the plurality of wireless tags 1418A through 1418F.

Disclosed embodiments include accessing a data structure linking each of the associated products with one of the plurality of wireless tags. In some embodiments, the data structure also links each of the associated products with a product family. The data structure may refer to, for example, any type of organization, management, and/or storage of data. The data structure may have any desired format, such as a table, a list, an array, a stack, a queue, a linked-list, a graph, a tree, a record, a hash table, or any other desired type (e.g., that may allow for efficient access to data). The data structure may link each of the associated products with one of the plurality of wireless tags. For example, the data structure may indicate a mapping or correspondence between each of the associated products and one of the plurality of wireless tags. As one example, the data structure may link each of the associated products with a wireless tag attached to the associated product by, for example, storing an identifier of the wireless tag and an identifier of the associated product in association with each other in the data structure. For example, the data structure may link a first product with a wireless tag attached to the first product, and may link a second product with a wireless tag attached to the second product. At least one processor may access the data structure linking each of the associated products with one of the plurality of wireless tags. For example, the at least one processor may determine storage location(s) where the data structure may be stored, and the at least one processor may receive data from the storage location(s).

In some embodiments, the data structure also links each of the associated products with a product family. The data structure may, for example, indicate a mapping or correspondence between each of the associated products and a product family. As one example, the data structure may link each of the associated products with a product family which the product may belong to or be associated with. For example, the data structure may link a first product with a product family which the first product may belong to or be associated with, and may link a second product with a product family which the second product may belong to or be associated with.

As used herein, the term "product family" may refer to, for example, any grouping, categorization, characterization, or classification for products. A product family may include, for example, any feature, characteristic, aspect, type, group, or category that a product may have, belong to, or be associated with. In some examples, a product may belong to or be associated with a product family. In some examples, a product may belong to or be associated with multiple product families For example, product family information may include one or more items of data that may describe one or more characteristics of the products offered for sale, which may allow for organizing and/or arranging the products in categories or in hierarchies. Product family information associated with the products (e.g., to which wireless tags may be attached) may be used to group the products into one or more groups or sub-groups in a hierarchical manner such that any product may be assigned a single grouping or family at each hierarchy level. The resulting classification may be arranged in the form of a catalog, which may list all products according to their hierarchical association, down to a final hierarchy level where each product may be assigned a unique code, number, or other identifier.

For example, products within the same family may have a particular characteristic in common, such as the same product name, the same size, color, and/or style of the product, the same price, the same type of the product (e.g., solid, liquid, gel, paste), the same description of the product (e.g., oil, detergent, clothing), the same brand name of the product, the same name of the product manufacturer, a collection name, a collection type (e.g., spring or fall collection), the purpose of the product, the same barcode (e.g., on their price tags), visible information associated with the products, non-visible meta information associated with the products, or any other information associated with the products. Products within a given family may have a combination of different characteristics in common, including, for example, size, style, shape, color, item type, price, and/or other information described above.

In some examples, product family information may be used to help determine the location of an actual product placed in an establishment. For example, product family information may be based on a catalog of items in a clothing store, arranged into first-level hierarchies (e.g., "Men's wear," "Women's wear," "Children's wear," and "Accessories"). The "Women's wear" hierarchy may be further divided into second-level hierarchies (e.g., "Shirts," "Skirts," "Dresses," "Pants," "Underwear," "Footwear," and "Outerwear"). The "Pants" hierarchy may be further divided into third-level hierarchies (e.g., "Denim," "Dress Pants," "Shorts," and "Home Pants"). Additional hierarchical levels may also be included. As another example, product family information may be based on a work-area catalog arranged into first-level hierarchies (e.g., "Powered tools," "Unpowered tools," "Nuts and Bolts," "Screws and Nails," "Consumables," and "Liquids and Canisters"). The "Unpowered tools" hierarchy may be further divided into second-level hierarchies (e.g., "Hammers," "Screwdrivers," "Sharp tools," "Pliers and pincers," and "Delicate tools"). The "Screwdrivers" hierarchy may be further divided into third-level hierarchies (e.g., "Cross-headed," "Flat-headed," "Hexagon-headed," and "Other"). Additional hierarchical levels may also be included. Product family information for a product may include all hierarchy levels the product may be associated with (e.g., in a given catalog).

With reference to FIG. 13, in step 1314, at least one processor may access a data structure linking each of the associated products with one of the plurality of wireless tags. The data structure may also link each of the associated products with a product family. Additionally or alternatively, the data structure may link each of the plurality of wireless tags with a product family for the product to which the wireless tag may be attached. FIG. 15 shows an example of a data structure 1500, consistent with disclosed embodiments. With reference to FIG. 15, the data structure 1500 may link a product with a wireless tag attached to the product and/or may link the product with a product family for the product. An identifier of a product may be indicated under the product header 1510. An identifier of a wireless tag may be indicated under the wireless tag header 1512. An identifier of a product family may be indicated under the product family header 1514. Each row of rows 1520A through 1520F may indicate a product, a wireless tag linked with the product, and a product family linked with the product. For example, the row 1520A may indicate that a product "Product_1416A" may be linked with a wireless tag "Wireless_Tag_1418A" (e.g., which may be attached to the product) and the product may be linked with a product family "Family_A" (e.g., which the product may belong to or be associated with).

Disclosed embodiments include determining, based on the wireless signals, each particular associated product that is newly in the at least one location designated as a fitting room. The wireless signals from the plurality of wireless tags may be used to monitor the locations of the plurality of wireless tags. In some examples, the plurality of wireless tags may be configured to periodically (e.g., every 0.01 seconds, every 0.05 seconds, every 0.1 seconds, every 0.5 seconds, every 1 second, every 2 seconds, every 5 seconds, every 10 seconds, every 30 seconds, every 1 minute, every 2 minutes, etc.) or continuously transmit the wireless signals, so that the locations of the plurality of wireless tags as determined using the wireless signals may be periodically or continuously updated or refreshed. In some examples, at least one processor may use the wireless signals to determine and/or monitor the real-time location information for the plurality of wireless tags. Location information for a wireless tag and/or a product may be represented in any desired form (e.g., using coordinates based on a coordinate system, using distance(s) or angle(s) in relation to other object(s) with known location(s), etc.).

Disclosed embodiments include maintaining a list of current location determinations of each of the associated products. For example, the current location determinations may be based on the wireless signals that may be periodically or continuously transmitted by the plurality of wireless tags. At least one processor may, for example, make location determinations for each of the associated products (e.g., the location of the product may correspond to the location of the wireless tag attached to the product) based on each set of wireless signal(s) as received by the at least one wireless receiver over time. At least one processor may update the list of current location determinations using location determinations based on the most recent set of wireless signal(s) received by the at least one wireless receiver. In some examples, determined locations of each product during past time periods prior to the current (e.g., most recent) time period may be stored. Data of current and historical locations of a product may be used, for example, to determine a movement or trajectory of the product. Disclosed embodiments include comparing the current location determinations with prior location determinations to thereby ascertain whether each associated product is newly in the at least one location designated as the fitting room. At least one processor may, for example, determine whether a product is newly in the at least one location designated as the fitting room based on determining whether the current location of the product is in the at least one location designated as the fitting room and the prior location of the product is outside the at least one location designated as the fitting room. The current and prior location determinations for the product may be used to determine a movement or trajectory of the product over time. At least one processor may, for example, determine whether a product is newly in the at least one location designated as the fitting room based on identifying whether one or more movement patterns are represented in the current and prior location determinations. The one or more movement patterns may include, for example, a pattern of a product being outside the fitting room (and/or being more than a threshold distance (e.g., 0.5 meters, 1 meter, 2 meters, 5 meters, or any other desired distance) away from the fitting room) for at least a first time interval (e.g., 30 seconds, 1 minute, 2 minutes, 5 minutes, or any other desired time length), the product then moving from outside the fitting room into the fitting room, and the product then remaining in the fitting room for at least a second time interval (e.g., 30 seconds, 1 minute, 2 minutes, 5 minutes, or any other desired time length).

Determining a location of a wireless tag based on wireless signals transmitted by the wireless tag may use any desired method. For example, a method that may be used for the location determination may be based on measuring the intensity of the wireless signals as received by wireless receiver(s) (e.g., the received signal strength indication (RSSI)). The measured intensity of received wireless signals may be used to determine a distance between the wireless tag and a wireless receiver receiving the wireless signals based on a propagation model. A distance between the wireless tag and each of multiple wireless receivers may be similarly determined. When the locations of the multiple wireless receivers are known, trilateration or multilateration may be used to determine the location of the wireless tag. Additionally or alternatively, determining a location of a wireless tag based on wireless signals transmitted by the wireless tag may use an angle of arrival based method, a time of flight based method, a fingerprinting based method, a triangulation based method, a trilateration or multilateration based method, or any other desired method for positioning using wireless signals. In some examples, determining the location of a wireless tag based on the wireless signals transmitted by the wireless tag may include using any desired number of wireless receiver(s) that may be configured to receive the wireless signals.

In some embodiments, the current location of each of the associated products is determined from at least one of an amplitude, a phase, an angle of arrival, or a time of arrival of the received wireless signals. For example, an amplitude of the received wireless signals may be used to determine a distance between a wireless tag transmitting the wireless signals and a wireless receiver receiving the wireless signals based on a propagation model. The distance may be used to determine a location of a product to which the wireless tag may be attached, for example, using a trilateration or multilateration based method. As another example, a phase of the received wireless signals may be used to determine an angle of arrival of the received wireless signals, for example, using a phase-shift difference of a received wireless signal arriving at multiple antennas of a wireless receiver. The angle of arrival of the received wireless signals may be used to determine a location of a product to which a wireless tag transmitting the wireless signals may be attached, for example, using a triangulation based method. As another example, a time of arrival of the received wireless signals may be used to determine a location of a product to which a wireless tag transmitting the wireless signals may be attached, for example, using a time of flight based method. For example, the time of arrival (e.g., at a wireless receiver) may be used to determine a time of flight of wireless signals between the wireless tag transmitting the wireless signals and the wireless receiver receiving the wireless signals. The time of flight may be used to determine a distance between the wireless tag and the wireless receiver (e.g., using the speed of propagation of the wireless signals), which may be used to determine the location of the product to which the wireless tag may be attached, for example, using a trilateration or multilateration based method.

At least one processor may determine, based on the wireless signals, each particular associated product that is newly in the at least one location designated as a fitting room. To determine whether a product is newly in the at least one location designated as a fitting room, at least one processor may, based on the wireless signals received by the at least one wireless receiver, keep track of the location of the product in the retail establishment (e.g., which may correspond to the location of the wireless tag attached to the product) and determine updated location information for the product periodically or continuously. The tracking of the location of the product may be used to determine whether the product that is now present in the at least one location designated as a fitting room may be considered newly in the at least one location designated as a fitting room, for example, based on temporal and/or spatial considerations. For example, a product that has left the at least one location designated as a fitting room for a short period of time (e.g., less than a time threshold of 5 seconds, 10 seconds, 30 seconds, 1 minute, 2 minutes, 5 minutes, or any other desired time length) and then has returned to the at least one location designated as a fitting room may be considered as having never left the at least one location designated as a fitting room and may not be considered as being newly in the at least one location designated as a fitting room. Additionally or alternatively, a product that has left the at least one location designated as a fitting room but remained in the vicinity of (e.g., less than a distance threshold away from) the at least one location designated as a fitting room may also be considered as having stayed in the at least one location designated as a fitting room. The distance threshold may be, for example, 0.5 meters, 1 meter, 1.5 meters, 2 meters, 3 meters, 5 meters, or any other desired distance. Spatial and/or temporal considerations may be combined to make the determinations. For example, a product may be considered to be newly in the at least one location designated as a fitting room even if the product has left the at least one location designated as a fitting room for a time period shorter than the time threshold before the product has returned to the at least one location designated as a fitting room, if during the interim between leaving and returning to the at least one location designated as a fitting room, the product is moved to or becomes located in its designated location in the retail establishment (e.g., a designated location on a shelf where the product may be placed for display). Other considerations may be used in the method or algorithm. For example, a larger distance threshold may be used for footwear products than for shirts products, when determining how far a product may be away from the at least one location designated as a fitting room before the product may be determined as newly in the at least one location designated as a fitting room when the product returns to the at least one location designated as a fitting room. Additionally or alternatively, a shorter time threshold may be used for a product whose designated display location in the retail establishment is closer to the at least one location designated as a fitting room (e.g., as compared to other products), when determining how long a time interval may be between when the product leaves the at least one location designated as a fitting room and when the product returns to the at least one location designated as a fitting room, before the product may be considered newly in the at least one location designated as a fitting room when the product returns to the at least one location designated as a fitting room. Additionally or alternatively, a product may be determined to be newly in the at least one location designated as a fitting room, for example, when the product becomes located in the at least one location designated as a fitting room and stays located in the at least one location designated as a fitting room for a period of time that may satisfy (e.g., meet or exceed) a particular time threshold (e.g., 0.5 seconds, 1 second, 2 seconds, 3 seconds, 5 seconds, 10 seconds, 20 seconds, or any other desired time length). In some examples, the particular time threshold may be adjusted based on various factors (e.g., the particular time threshold may have different values for different products or types of products).

With reference to FIG. 13, in step 1316, at least one processor may determine, based on the wireless signals, each particular associated product that is newly in the at least one location designated as a fitting room.

Disclosed embodiments include, for each particular associated product that is newly in the at least one location designated as a fitting room, increasing an engagement count for the associated product family. At least one processor may, for example, determine the product family associated with a product, when the product is determined to be newly in the at least one location designated as a fitting room. For example, the at least one processor may use information in the data structure that may link the product with the product family which the product may belong to or be associated with. The at least one processor may increase an engagement count (e.g., by one (1)) for the product family associated with the product, each time the product is determined to be newly in the at least one location designated as a fitting room. An engagement count may include, for example, any indication of a level of engagement (e.g., by customers) with a product. For example, an engagement count may include a number of times customers have interacted or engaged with product(s). An engagement count for a product family may include, for example, any indication of a level of engagement (e.g., by customers) with any of one or more products in the product family. In some examples, the engagement count may include a number, a quantity, or any other suitable indication.

Engagement may refer to, for example, a show of interest in a product by a customer. In a retail establishment (e.g., a physical store), engagement may include, for example, touching the product, taking the product off from its display (e.g., a shelf, a stack, or any other type of structure where the product may be placed for display), taking the product with the customer to other places in the retail establishment, and/or taking the product to a fitting room to try on the product. In an e-commerce website, engagement may include, for example, clicking a link to a page for the product, staying for a period of time on the page for the product, browsing details on the page for the product (e.g., watching one or more pictures of the product, scrolling the page to view various details, checking the size charts for the product, etc.), clicking a button related to further selection of features (e.g., selecting sizes, styles, colors, shipping options, etc.), and/or placing a cursor (e.g., controlled by a computer mouse or other pointing device) over an "add to cart" or "buy" button. In some examples, taking a product to the register, the self-checkout, or the point of sale in the retail establishment (e.g., a physical store) or adding the product to the cart on the e-commerce website may be considered to be a separate level of interest or intent by a customer (e.g., separate from engagement). In some examples, taking a product to the register, the self-checkout, or the point of sale in the retail establishment (e.g., a physical store) or adding the product to the cart on the e-commerce website, without finalizing the actual transaction or sale of the product, may be considered to still be in the engagement level of interest or intent by a customer. It may be beneficial to distinguish between the various steps of the shopping journey of a customer, even in the later stages of the sale process (e.g., as those stages may be where the cost of losing the interest of a customer may be higher (because a customer may be much more likely to actually intend to complete the purchase if the customer has arrived at those stages)).

Additionally or alternatively, the at least one processor may determine an engagement count for a product family based on other suitable patterns of location changes of products. For example, the at least one processor may increase an engagement count for a product family, when any of one or more products in the product family is moved to a location different from the location where the product may be placed for display (e.g., on a shelf, etc.). In some examples, the at least one processor may increase the engagement count based on determining that the product has moved from the display location of the product to another location in a trajectory having a length above a threshold length (e.g., 5 meters, 10 meters, 20 meters, 30 meters, 50 meters, or any other desired length).

With reference to FIG. 13, in step 1318, at least one processor may, for each particular associated product that is newly in the at least one location designated as a fitting room, increase an engagement count for the associated product family.

Disclosed embodiments include, for each associated product family, receiving an indication of each sale in the associated product family and increasing a sale count for the associated product family. For example, at least one processor may receive, from a device (e.g., associated with the register in the retail establishment, the self-checkout in the retail establishment, the retail establishment's inventory management system, the retail establishment's Enterprise Resource Platform (ERP), or the point of sale in the retail establishment), an indication identifying a product and indicating that the product has been sold, when the transaction or sale of the product is completed. The at least one processor may, for example, determine the product family associated with the product, when the product is determined to have been sold. For example, the at least one processor may use information in the data structure that may link the product with the product family which the product may belong to or be associated with. The at least one processor may increase a sale count (e.g., by one (1)) for the product family associated with the product, when the product is determined to have been sold. The at least one processor may increase the sale count (e.g., by one (1)) for the product family, each time any of one or more products in the product family is determined to have been sold. A sale count may include, for example, any indication of a level of sale of one or more products (e.g., a number of products that have been sold). A sale count for a product family may include, for example, any indication of a level of sale of one or more products in the product family (e.g., a number of products in the product family that have been sold). In some examples, the sale count may include a number, a quantity, or any other suitable indication. The at least one processor may increase a sale count for each product family of a plurality of product families which products in the retail establishment may belong to or be associated with, each time any of one or more products in the product family is determined to have been sold.

In some embodiments, the indication of the sale of at least one associated product is received from a mobile communications device of a purchaser and includes a unique identifier of the wireless tag attached to the at least one associated product. For example, a "Grab & Go" process for buying products may be used. For example, a purchaser may use a mobile communications device (e.g., a smart phone, a tablet, a cell phone, a laptop computer, a smart watch, an extended reality device, etc.) to determine an identifier associated with the product (e.g., via communication with the wireless tag attached to the product, via scanning a barcode of the product, via inputting an identification number of the product, via communicating with an inventory system that may manage products and their associated wireless identification tags, etc.). The identifier associated with the product may include, for example, a unique identifier of the wireless tag attached to the product, and/or any other identifier for the product (e.g., an identification number of the product). The mobile communications device may perform operations for a sale transaction for the product (e.g., by communicating via a network with a device associated with the retail establishment). When the transaction is completed, the mobile communications device may transmit (e.g., to at least one processor) the indication of the sale of the product. The transmitted indication may include the unique identifier of the wireless tag attached to the product.

With reference to FIG. 13, in step 1320, at least one processor may, for each associated product family, receive an indication of each sale in the associated product family and increase a sale count for the associated product family.

Disclosed embodiments include calculating, from the engagement count and the sale count, a conversion score for each associated product family. A conversion score for a product family may refer to, for example, any rating, metric, grade, percentage, or value associated with two or more processes of transactions for the product family. Processes of transactions may include, for example, a customer skimming a product, a customer looking at a product, a customer evaluating a product, a customer taking a product off from its display location, a customer moving a product from its display location to another location, a customer moving a product to a fitting room, a customer trying on a product, a customer discussing a product with another individual, a customer moving a product to the point of sale in a retail establishment, a customer purchasing a product (e.g., completing the sale of the product to the customer), and/or any other action, phase, and/or stage (e.g., as categorized, subdivided, or combined in any desired manner) in transactions. A conversion score may include, for example, a measurement of a likelihood that a product may be purchased after a customer tries on the product, tests out the product, and/or evaluates the product. A conversion score may include, for example, a likelihood that a customer may purchase clothes after the customer tries on the clothes, or a likelihood that a customer may purchase a car after the customer takes the car for a test drive. A high conversion score for a product family may suggest that customers like the products in the product family. A conversion score may be represented in any of one or more desired forms, such as a rate (e.g., measured relative to a fixed standard, in the form of percentages, or in the form of an average of rates over a certain period of time), an absolute count (e.g., an indication of the engagement count and/or the sale count), an arbitrary metric such as a star scale (e.g., 1-5 stars), a mathematical indication of a likelihood, or any other type of desired indication. In some examples, a conversion score may have any value, magnitude, measure, and/or extent (e.g., as determined and/or calculated based on method(s) described herein). In some examples, a conversion score may be zero if a product was engaged with by customers (e.g., tried on by customers) but was never purchased (e.g., by customers). That information may be helpful (e.g., to a retailer), for example, as compared to a product that was never engaged with by customers and was never purchased (e.g., by customers), or a product that was never on display (e.g., in a retail establishment) and was never purchased (e.g., by customers).

At least one processor may calculate, from the engagement count and the sale count, a conversion score for each associated product family. For example, the conversion score for a particular product family may include a ratio, a fraction, or a division between, an ordered pair of, or a value (e.g., a number, a decimal, a percentage, etc.) of a division between, the sale count for the particular product family and the engagement count for the particular product family. The conversion score for the particular product family may use the indications or operations by applying the sale count for the particular product family with respect to the engagement count for the particular product family (e.g., a ratio of the sale count to the engagement count), or by applying the engagement count for the particular product family with respect to the sale count for the particular product family (e.g., a ratio of the engagement count to the sale count). In some examples, the conversion score for a particular product family may be represented using a star scale, thumbs-up scale, or any other type of scale. A comparison between the sale count for the particular product family and the engagement count for the particular product family (e.g., a ratio, a fraction, a division, a number, a decimal, a percentage, etc.) may be mapped to a value in a scale (e.g., 1-5 stars, 1-5 thumbs-ups, etc.) using any desired mapping. The at least one processor may calculate a conversion score for each product family of a plurality of product families which products in the retail establishment may belong to or be associated with, using the engagement count for the product family and the sale count for the product family. In some examples, at least one processor may update (e.g., periodically or continuously) a conversion score, engagement count, sale count, and/or other metric or value, for example, as the at least one processor obtains and/or receives new location information for products and/or new sale information for products (e.g., in real-time).

In some examples, a sales funnel may be considered for evaluating a conversion score. A sales funnel may be associated with advertising, where tracking the various stages that may lead a customer to purchase a product may help plan and/or execute the sale and advertisement process. For example, a sales funnel may start when a customer is exposed to the existence of a product or to information about the product. The sales funnel may proceed at different levels of engagement with the product (or the advertisement), moving to some level of intent to purchase. And the sales funnel may complete with a completed purchase of the product by the customer. At any stage of the sales funnel, some portion of the customers may be considered to exit the sales funnel and may be considered to be lost customers or lost sales. Analytics tools based on the sales funnel may be used to, for example, increase the proportion of customers proceeding to the next stage of the sales funnel at each and every stage, thus maximizing the overall sales. This may be measured using the conversion of customers either between stages of the sales funnel or from a specific stage to the resulting sale. Conversely, the abandonment may be measured at a given stage of the sales funnel as the complementary of the conversion. It may be beneficial (e.g., from a user perspective) to consider the two measures (e.g., the conversion and the abandonment). In some examples, the sales funnel may be created for or be applicable to a retail establishment (e.g., a physical store) or an e-commerce website similarly or in parallel, for various products (e.g., in apparel retail categories).

In some examples, impression may refer to, for example, the first exposure of a customer to a product. In the retail establishment (e.g., a physical store), impression may include a customer seeing a product on display (e.g., on the shelf, on a hanger, on a mannequin, on other display structures, or displayed in any other desired manner). For an e-commerce website, impression may include a customer seeing a picture of a product with a link to a page for the product (e.g., as part of an advertisement, as part of a list of products, or as a recommendation in a product page for another product).

In some examples, purchase or sale may refer to a final step of the sales funnel, where the customer may pay for the product and the transaction may be complete. Purchase or sale may occur for any type of transaction (e.g., at the register, self-checkout, or point of sale of a retail establishment (e.g., a store), or on a checkout page of a website).

In some examples, conversion may occur between each and every stage of the sales funnel. Conversion may include, for example, conversion between impressions to engagements (e.g., which may also be called an engagement rate), conversion between touching the product and taking the product to the fitting room, and/or conversion between engagement and sale. Conversion may be measured, for example, as a rate, as a proportion of the customers reaching a certain stage of the sales funnel that ultimately completed the sale transactions, as an average over a certain period of time, as a rate over a certain category of products (e.g., a certain product family), and/or as a normalized or unitless score (e.g., a score on a five-star scale, or a measure of standard deviations above or below a certain average) that may provide a standard metric to compare between products, categories (e.g., product families), retail establishments (e.g., stores), or other comparison criteria (e.g., that may have different base rates or values associated with the conversion).

With reference to FIG. 13, in step 1322, at least one processor may calculate, from the engagement count and the sale count, a conversion score for each associated product family. FIG. 16 shows examples of conversion scores, consistent with disclosed embodiments. With reference to FIG. 16, in a table 1600, an identifier of a product family may be indicated under the product family header 1610. An engagement count may be indicated under the engagement count header 1612. A sale count may be indicated under the sale count header 1614. A conversion score may be indicated under the conversion score header 1616. Each row of rows 1620A through 1620C may indicate a product family, an engagement count for the product family, a sale count for the product family, and a conversion score for the product family. For example, the row 1620A may indicate that a product family "Family_A" may have an engagement count of 13, a sale count of 6, and a conversion score of 6/13 (46%). The conversion score (e.g., 6/13 in the form of a fraction or ratio) may correspond to the sale count (e.g., 6) divided by the engagement count (e.g., 13). The conversion score may additionally or alternatively be represented in the form of a percentage (e.g., 46%).

Figure 17:
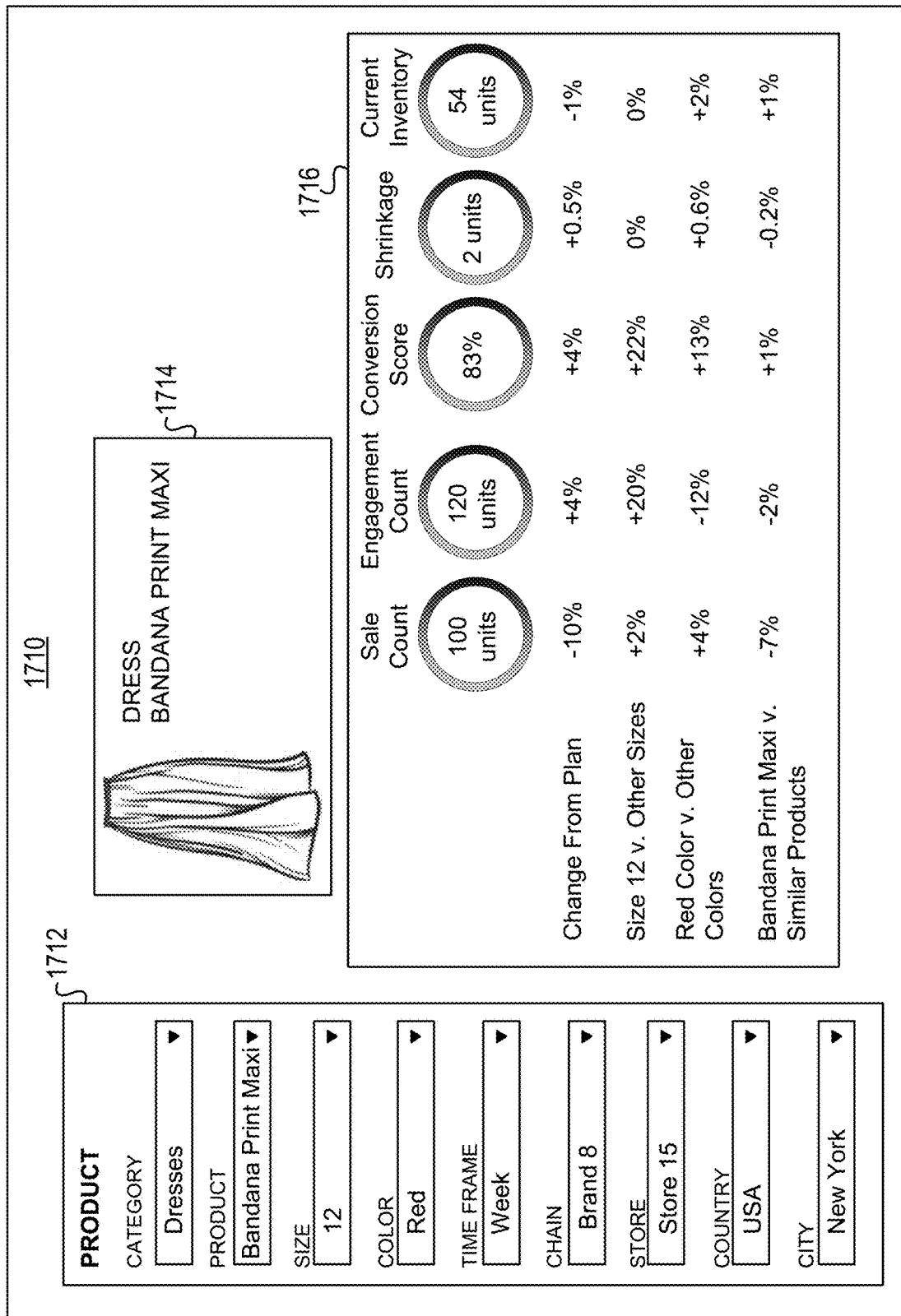
FIG. 17 depicts a first example of a user interface for displaying information related to conversion scores of wirelessly tagged products, consistent with disclosed embodiments.

FIG. 17 shows a first example of a user interface 1710 for displaying information related to conversion scores of wirelessly tagged products, consistent with disclosed embodiments. In the user interface 1710, a section 1712 may allow user input to identify user selections (e.g., via various drop-down lists). For example, a user may select a category of products (e.g., "Dresses"), may select a particular product within the category (e.g., "Bandana Print Maxi"), may select a size for the product (e.g., "12"), and/or may select a color for the product (e.g., "Red"). The user interface 1710 may be configured to provide various types of information (e.g., metrics, statistics, measures, etc.) for the product identified by the user. The section 1712 may additionally or alternatively allow user input to identify, for example, a time frame of the provided information for the product (e.g., "Week," for example, to indicate that the provided information may be from the last week), and/or a retail establishment which the provided information may be gathered from, based on, or associated with (e.g., the retail establishment may be identified by a chain in which the retail establishment may be a member (e.g., "Brand 8"), a store identifier that may identify the retail establishment (e.g., "Store 15"), a country in which the retail establishment may be located (e.g., "USA"), and/or a city in which the retail establishment may be located (e.g., "New York")).

In the user interface 1710, a section 1714 may show an image of the product identified by the user, and/or other indications associated with the identified product (e.g., the category and product name). In the user interface 1710, a section 1716 may show various types of information for the identified product. For example, the section 1716 may show measured metrics or statistics for the identified product, such as a sale count for the identified product (e.g., "100 units"), an engagement count for the identified product (e.g., "120 units"), a conversion score for the identified product (e.g., "83%"), a shrinkage for the identified product (e.g., "2 units"), and/or a current inventory for the identified product (e.g., "54 units"). The shrinkage may indicate, for example, the difference between the starting inventory for the product minus sales of the product and the current inventory for the product. Additionally or alternatively, the section 1716 may show comparisons of measured metrics or statistics of the identified product with planned metrics or statistics for the identified product. Additionally or alternatively, the section 1716 may show comparisons between measured metrics or statistics of the identified product and measured metrics or statistics of, for example, product(s) with the same product name but different sizes, product(s) with the same product name but different colors, or product(s) other than the identified product.

Figure 18:
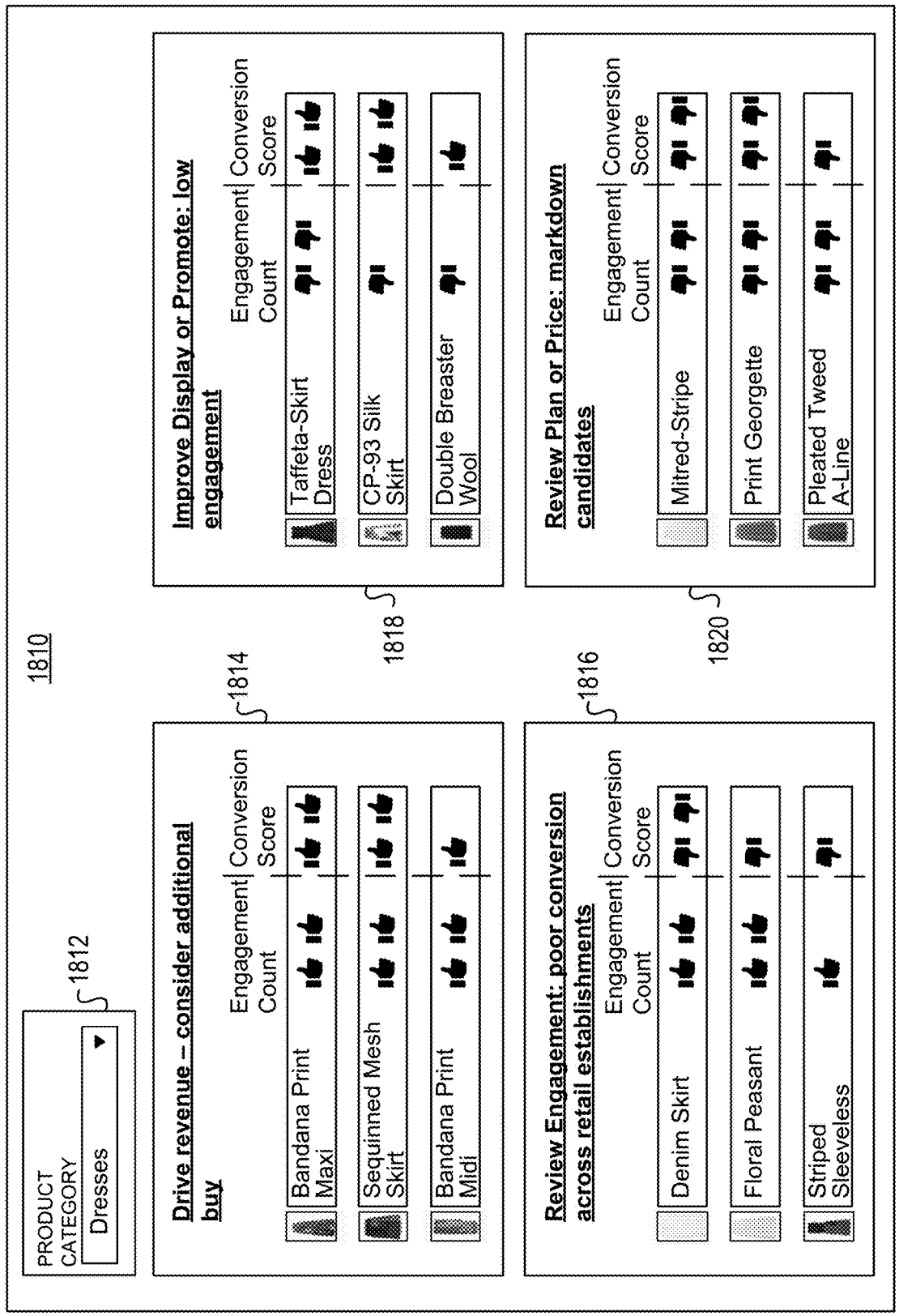
FIG. 18 depicts a second example of a user interface for displaying information related to conversion scores of wirelessly tagged products, consistent with disclosed embodiments.

FIG. 18 shows a second example of a user interface 1810 for displaying information related to conversion scores of wirelessly tagged products, consistent with disclosed embodiments. The user interface 1810 may be configured to show various measurement scenarios for products. In the user interface 1810, a section 1812 may allow user input (e.g., via a drop-down list) to select a product category (e.g., "Dresses") for which various measurement scenarios may be provided in the user interface 1810. The user interface 1810 may show various measurement scenarios, for example, 1814, 1816, 1818, and 1820. The measurement scenarios may be determined based on engagement counts and/or conversions scores as measured for various products in the selected product category. The relative levels or magnitudes of the engagement counts and/or conversions scores may be indicated using thumbs-up indications and/or thumbs-down indications. For example, more thumbs-up indications may indicate a higher engagement count and/or conversion score, and fewer thumbs-up indications may indicate a lower engagement count and/or conversion score. As another example, more thumbs-down indications may indicate a lower engagement count and/or conversion score, and fewer thumbs-down indications may indicate a higher engagement count and/or conversion score.

The measurement scenario 1814 may include products (e.g., in the selected product category) that have high engagement counts and high conversion scores. The measurement scenario 1814 may indicate that the products listed therein (e.g., using images and product names for the listed products) may be drivers of revenue, which may suggest (e.g., to a retailer) to consider additional buy of the listed products (e.g., in wholesale) and/or to further replenish or increase inventory of the listed products.

The measurement scenario 1816 may include products (e.g., in the selected product category) that have high engagement counts and low conversion scores. The measurement scenario 1816 may indicate that the products listed therein (e.g., using images and product names for the listed products) may have poor conversion across retail establishments (e.g., all stores associated with a retailer). The measurement scenario 1816 may suggest (e.g., to a retailer) to review engagement for the listed products (e.g., considering reducing advertising for the listed products, considering moving the listed products to less conspicuous locations in retail establishments, etc.).

The measurement scenario 1818 may include products (e.g., in the selected product category) that have low engagement counts and high conversion scores. The measurement scenario 1818 may indicate that the products listed therein (e.g., using images and product names for the listed products) may have low engagement and high conversion, which may suggest (e.g., to a retailer) to increase advertising for, improve display of, and/or promote the listed products (e.g., including moving the listed products to more conspicuous locations in retail establishments).

The measurement scenario 1820 may include products (e.g., in the selected product category) that have low engagement counts and low conversion scores. The measurement scenario 1820 may indicate that the products listed therein (e.g., using images and product names for the listed products) may have low engagement and low conversion, which may suggest (e.g., to a retailer) to review the plan (e.g., commitment) or price for selling the listed products, and/or to consider the listed products as candidates for markdowns (e.g., to reduce the price to sell listed product(s)).

Disclosed embodiments include determining that a specific associated product has a current location and a prior location within the fitting room, and forgoing increasing the engagement count for the product family associated with the specific associated product. For example, the current location of the product being within the fitting room may not indicate that the product is newly in the fitting room, when the prior location of the product is within the fitting room, which may suggest that the product has remained in the fitting room and has not moved from within to the outside of the fitting room (e.g., to make the current location to be considered to be newly in the fitting room). As a result, at least one processor may forgo increasing the engagement count for the product family associated with the product if the presence of the product in the fitting room is not considered to be newly in the fitting room. When the product has been in the fitting room for a period of time without moving out of the fitting room, even if the current location of the product may be within the fitting room, the engagement count for the product family associated with the product may not be increased (e.g., the product may not be considered to be newly in the fitting room).

In some embodiments, the retail establishment layout includes at least one location designated as a sales floor. A sales floor may include, for example, a space, area, or floor designated for products for sale. At least one location (e.g., a space, area, or floor) in the retail establishment layout may be designated as a sales floor. It is contemplated that the retail establishment may have other locations or floors that may not be dedicated to selling products and that may, therefore, not be designated as a sales floor. For example, such locations (that may not be designated as a sales floor) may be locations or floors in a retail establishment associated with inventory storage, facilities for the use by personnel or employees of the retail establishment, or other areas not involved in sale of products. Disclosed embodiments include identifying that at least one product family is absent from the sales floor, and forgoing an engagement measurement and conversion calculation for the at least one product family. At least one processor may, for example, identify products that may be located in the sales floor, and may determine the product families associated with the identified products (e.g., using information in a data structure linking products with their corresponding product families). The at least one processor may identify at least one product family that may not be included in the determined product families associated with the identified products. Thus, the at least one processor may determine that the identified at least one product family is absent from the sales floor. As a result, the at least one processor may forgo an engagement measurement and conversion calculation for the identified at least one product family (e.g., at least for the duration of time in which the identified at least one product family is determined to be absent from the sales floor). For example, the at least one processor may not create or update an engagement count, sale count, and/or conversion score for the identified at least one product family.

Disclosed embodiments include identifying a first set of at least two associated products located in the fitting room at the same time, and associating the first set of at least two associated products with a single engagement basket. A basket of products may include, for example, multiple products that may be seen together (e.g., as in a "look" display on a mannequin, or when placed together on a single page), engaged with together (e.g., taken together to a fitting room in a retail establishment, or added together to a "save for later" list on a website), or purchased together (e.g., as part of a single transaction, whether in a retail establishment (e.g., a physical store) or on an e-commerce website). Considering baskets of products may help understand the relations between different products, to inform ordering, advertising, placement, and/or other determinations for the products. The single engagement basket may include, for example, any grouping, collection, category, set, or organization of products engaged with by customer(s).

At least one processor may, for example, monitor the locations of the products in the retail establishment and may identify, based on the location information, at least two products that may be located in the fitting room at the same time. For example, the at least one processor may use the current locations and/or prior locations of the products in the retail establishment, to determine which products may be located in the fitting room at the same time or during the same time period. Additionally or alternatively, the at least one processor may use location information to determine movement trajectories of products, and use the movement trajectories to determine whether at least two products are located in the fitting room at the same time and are associated with each other to be placed in the single engagement basket. For example, the at least one processor may determine a degree of similarity between the movement trajectories of the at least two products (e.g., movement trajectories prior to, during, and/or after the at least two products being located in the fitting room). The at least two products may be placed in the single engagement basket if the degree of similarity satisfies (e.g., meets or exceeds) a threshold. The at least two products may not be placed in the single engagement basket if the degree of similarity does not satisfy (e.g., meet or exceed) the threshold. In some examples, the degree of similarity may be determined based on comparing locations of the at least two products for multiple time periods (e.g., prior to, during, and/or after the at least two products being located in the fitting room).

Disclosed embodiments include identifying a second set of at least two associated products sold in the same transaction, and associating the second set of at least two associated products as belonging to a single sale basket. The single sale basket may include, for example, any grouping, collection, category, set, or organization of products that may have been sold to customer(s). At least one processor may, for example, receive information of completed transactions from a device associated with the register, the self-checkout, or the point of sale in the retail establishment. The at least one processor may use the received information to identify the at least two products sold in the same transaction. The at least one processor may determine that the at least two products are sold in the same transaction, for example, by determining that the at least two products are included in the same record (e.g., receipt) for a transaction, are included in a transaction process (e.g., a purchase process) associated with the same customer completed within a short time period (e.g., 2 minutes, 5 minutes, 10 minutes, or any other desired time length), and/or are otherwise related when the products are sold. The at least two products may be indicated as belonging to the single sale basket (e.g., may be identified as associated with the single sale basket, may be placed in the single sale basket, etc.). In some examples, the at least two products may be associated or linked with each other in a data structure, to indicate that the at least two products may belong to the same single sale basket.

Disclosed embodiments include calculating the prevalence of products associated with a first product family in engagement baskets and sale baskets that include products associated with a second product family. At least one processor may, for example, identify engagement baskets and sale baskets that include products associated with the second product family. The at least one processor may determine a first total number of products in the engagement baskets and sale baskets that include products associated with the second product family and determine a second total number of products associated with the first product family in the engagement baskets and sale baskets that include products associated with the second product family. The at least one processor may calculate the prevalence (e.g., a first prevalence), for example, by comparing the second total number and the first total number. The prevalence may be, for example, represented using a ratio, percentage, fraction, division, or any other metric or indication (e.g., a ratio of the second total number to the first total number).

Disclosed embodiments include calculating the prevalence of products associated with the first product family in engagement baskets and sale baskets that do not include products associated with the second product family. At least one processor may, for example, identify engagement baskets and sale baskets that do not include products associated with the second product family (e.g., from all engagement baskets and sale baskets, or from a subset of all engagement baskets and sale baskets, such as from the engagement baskets and sale baskets that include products associated with the first product family, or from the engagement baskets and sale baskets that include products associated with one or more product families comparable to or similar to the first product family). The at least one processor may determine a third total number of products in the engagement baskets and sale baskets that do not include products associated with the second product family and determine a fourth total number of products associated with the first product family in the engagement baskets and sale baskets that do not include products associated with the second product family. The at least one processor may calculate the prevalence (e.g., a second prevalence), for example, by comparing the fourth total number and the third total number. The prevalence may be, for example, represented using a ratio, percentage, fraction, division, or any other metric or indication (e.g., a ratio of the fourth total number to the third total number).

Disclosed embodiments include determining, based on the calculated prevalence, an affinity score between the first product family and second product family. The affinity score may include, for example, any type of indication of an extent of association. At least one processor may, for example, determine, based on the calculated prevalence (e.g., the calculated first prevalence and/or the calculated second prevalence), the affinity score between the first product family and the second product family. In some examples, the affinity score may correspond to the calculated first prevalence. In some examples, the affinity score may correspond to the calculated first prevalence in view of the calculated second prevalence (e.g., in a comparative or relative perspective, for example, to indicate a degree of affinity between the first product family and the second product family as relative to a degree of affinity between the first product family and one or more other product families). In some examples, the affinity score may include a difference, ratio, percentage, or other suitable metric, between the calculated first prevalence and the calculated second prevalence.

Additionally or alternatively, affinity between products (e.g., associated with two product families) may be measured as the relation between (e.g., the prevalence of) baskets in which the products (e.g., associated with two product families) are seen, engaged with, and/or sold together, as compared to when the products (e.g., associated with two product families) are seen, engaged with, and/or sold separately (e.g., as separate products, or as parts of baskets that may include a product associated with one product family and may not include a product associated with another product family). Affinity between products (and/or between product families) may additionally or alternatively be determined to indicate whether products have better or worse conversion scores when the products are in the same basket (e.g., seen, engaged with, and/or sold together) as compared to when the products are not in the same basket (e.g., seen, engaged with, and/or sold separately).

The affinity score may be used in various desired ways. For example, the affinity score may be used for determining recommendations to customers in the retail establishment (e.g., a store), for determining recommendations on a retailer's website or advertising campaigns, for determining display recommendations for visual merchandising, for determining procurement and/or forecasting recommendations for merchandising (e.g., when ordering a quantity of a product, the inventory levels of other products with high affinity scores to the ordered product may be considered, for example, so that the products with high affinity to each other may be paired up), and/or as feedback to product designers to consider the combination of high-affinity products when designing future collections and/or products.

Disclosed embodiments include generating, based on the affinity score, a display pairing recommendation for the first product family and second product family. For example, based on determining that the affinity score indicates that the affinity between the first product family and the second product family satisfies (e.g., meets or exceeds) a threshold, at least one processor may generate the display paring recommendation. The display paring recommendation may include, for example, placing together the products associated with the first product family and the second product family (e.g., on a sales floor), displaying together the products associated with the first product family and the second product family (e.g., in a display window or advertisement), proposing or recommending the products associated with the first product family and the second product family together to customers in the retail establishment (e.g., by sales staff), or any other recommendation to pair up the products associated with the first product family and the second product family (e.g., for display). For example, the display pairing recommendation may include pairing up a product associated with the first product family and a product associated with the second product family (e.g., for display).

Disclosed embodiments include accessing a database linking each product family in the establishment to a predetermined location within the retail establishment layout, the predetermined location being a designated location for at least one product from said product family. The predetermined location may include a location where the at least one product from the product family may be displayed (e.g., to customers). The database may include, for example, any type of organization, management, and/or storage of data, and may link a product family to its predetermined location. For example, an identifier of the product family and an identifier of its predetermined location may be associated or linked with each other in the database. At least one processor may access the database. Disclosed embodiments include determining, based on the wireless signals from the plurality of wireless tags, each particular associated product that is newly not present at the predetermined location linked to its product family. For example, at least one processor may determine a movement of a product from the predetermined location to another location, for example, using location information of the product determined based on the wireless signals. The at least one processor may determine that the product is newly not present at the predetermined location linked to its product family, for example, if the product moves from the predetermined location to another location in the retail establishment. Disclosed embodiments include, for each particular associated product that is newly not present at the predetermined location linked to its product family, increasing a second engagement count for the product family. At least one processor may increase the second engagement count (e.g., by one (1)), for example, when a product is determined to have moved from its predetermined location to another location. Disclosed embodiments include calculating the conversion score for the product family based on the engagement count, the second engagement count, and the sale count. At least one processor may calculate the conversion score for the product family based on the engagement count, the second engagement count, and the sale count, for example, in a similar manner as described above. For example, the conversion score may be based on comparing the second engagement count and the sale count. In some examples, taking a product off from the shelf and trying on the product in the fitting room may both be forms of engagement. In some examples, taking a product to the fitting room may be a stronger indication of engagement than taking a product off from the shelf (e.g., taking a product to the fitting room may be more indicative of a customer's intent to buy the product, compared to just removing the product from its predetermined location). In some examples, the conversion score based on the engagement count, the second engagement count, and the sale count may be similarly determined as the conversion score calculated using the engagement count and the sale count. For example, the conversion score based on the engagement count, the second engagement count, and the sale count may use, for engagement, movements of products into the fitting room, movements of products away from their designated locations, and/or a combination of both. In some examples, conversion may be measured along different stages of the sales funnel as described herein (e.g., conversion from shorter product movements to longer product movements, conversion from product movements to products becoming located in the fitting room, and conversion from each of those stages to product sales).

In some examples, some product families (e.g., jackets or accessories) may not normally be moved to the fitting room to be tried on by customers. To measure engagement for such a product family, movement of products associated with the product family away from its designated location (e.g., where the product family may be designated to be displayed to customers) may be used. Movement of products away from a product family's designated location may be an indication similar to trying on products in the fitting room for other product families (e.g., pants) that may not be normally tried on outside of the fitting room.

In some examples, there may be two or more levels of engagement with a product in a retail establishment. For example, a first, broader level of engagement may include taking a product away from its designated location, and a second level of engagement (e.g., a stronger indication of engagement) may include moving a product into the fitting room and trying on the product. In some examples, a continuum (e.g., not just a binary determination) may be considered for measuring engagement. For example, various factors may be considered to measure a degree of engagement (e.g., an engagement strength indication that may depend on the amount of time for which a product has been away from its designated location, how far a product has travelled from its designated location in the retail establishment, or how often products associated with a product family are moved to the fitting room when products associated with a product family are engaged with in a first view).

Disclosed embodiments include calculating, from the engagement count and sale count for each associated product family, an abandonment score for the product family. Abandonment may include, for example, the complementary of conversion. For example, abandonment may occur when a customer tries on a product in the fitting room but abandons it there without purchasing it, or when a product is added to a shopping cart on a website but the customer then leaves the website, abandoning the cart without completing the transaction. An abandonment count may correspond to, for example, the engagement count subtracted by the sale count. The abandonment score may be based on comparing the abandonment count and the engagement count (e.g., a ratio of the abandonment count to the engagement count).

In some examples, there may be a low abandonment score with a low engagement count. This may indicate that the product may be an attractive product, but there may be an issue with its display location or advertising. In some examples, there may be a low conversion score (or a high abandonment score) with a high inventory in the retail establishment. This may be a case where it may be beneficial to move the inventory to other retail establishments where the associated products may perform better, or to reduce the indicated price of the products. In some examples, there may be a low conversion score (or a high abandonment score) with broken sizes (e.g., some sizes may be missing in the retail establishment, possibly causing people to not complete a purchase because they are not able to find the right fit). In this case, it may be beneficial to move inventory between retail establishments to maintain a full size scale in at least one of the retail establishments.

Disclosed embodiments include outputting a first notification if the abandonment score is greater than a first predetermined threshold. The first notification may, for example, indicate the abandonment score and/or indicate that the abandonment score is greater than the first predetermined threshold. The first notification may indicate (e.g., to a retailer) that there may be a problem with the products associated with the product family (e.g., customers may be trying on the products, but may not likely buy the products). Disclosed embodiments include outputting a second notification if the abandonment score is less than a second predetermined threshold. The second notification may, for example, indicate the abandonment score and/or indicate that the abandonment score is less than the second predetermined threshold. The second notification may indicate (e.g., to a retailer) that the products associated with the product family may be attractive products, and/or that increasing advertising and/or engagement for the products may help increase sale of the products. Disclosed embodiments include outputting a third notification if the engagement count is less than a third predetermined threshold. The third notification may, for example, indicate the engagement count and/or indicate that the engagement count is less than the third predetermined threshold. The third notification may indicate (e.g., to a retailer) that the products associated with the product family may have a low level of engagement, and/or that increasing advertising and/or engagement for the products may help increase sale of the products (e.g., particularly if the products associated with the product family have a low level of abandonment and/or a high level of conversion). The first notification, the second notification, and/or the third notification may be in any desired form (e.g., an email, a text message, a phone call, a window notification, a pop-up notification, a visual notification, an audible notification, a tactile notification, and/or any other type of notification). In some embodiments, the first and second notifications may be based on the conversion score (which may be the complementary of the abandonment score), with the respective changes to the thresholds and the relationship between the thresholds and the conversion score.

Disclosed embodiments include accessing a data structure linking each product family in the establishment to a predetermined location within the retail establishment layout, the predetermined location being a designated location for at least one product from said product family. The predetermined location may include a location where the at least one product from the product family may be displayed (e.g., to customers). The data structure may include, for example, any type of organization, management, and/or storage of data, and may link a product family to its predetermined location. For example, an identifier of the product family and an identifier of its predetermined location may be associated or linked with each other in the data structure. At least one processor may access the data structure. Disclosed embodiments include generating a product engagement heat map of the retail establishment layout using the predetermined location and the engagement count of each product family. A heat map may include a graphical representation of a measured quantity, overlaid over a map or diagram of the area over which the quantity may be measured or observed. The map may be either geographic or architectural (e.g., a map of a country overlaid with temperature or precipitation statistics, or a floorplan of a retail establishment overlaid with sales per square foot numbers), or representative only (e.g., a diagram of the New York City subway system, overlaid with average passenger traffic per hour on each station and leg). The overlaid quantity may be any measure or observation that a creator, operator, and/or administrator of the heatmap may choose to present in relation to the underlying map. A heat map may include a map that may be overlaid with a color gradient corresponding to the measure or observation (e.g., measured or predicted). A heat map may use blue-to-red color gradients to represent lower (e.g., blue color) and higher (e.g., red color) values on the map, but other variations may also be used (e.g., green-to-red color gradients, gray scale gradients, pattern density gradients, etc.). The product engagement heat map may show each product family's engagement count and its predetermined location within the retail establishment. Each product family's engagement count may be displayed in association with (e.g., in or around) its predetermined location in the retail establishment. The product engagement heat map may show an engagement count using any desired format, such as a color scale, a gray scale, indications of numbers, the density of graphical patterns, etc. The product engagement heat map may allow the visualization of better, more attractive, more profitable, and/or more popular places in the retail establishment to display products.

Disclosed embodiments include receiving a query regarding a particular associated product family. For example, at least one processor may receive, from a device and via a network, a query regarding a particular product family. The query may include, for example, an identifier of the particular product family, a request for information of a conversion score associated with the particular product family, an engagement count associated with the particular product family, a sale count associated with the particular product family, and/or any other type of score, count, metric, and/or data associated with the particular product family as described herein. Disclosed embodiments include providing the particular associated product family's conversion score in response to the query. In response to receiving the query, the at least one processor may provide (e.g., transmit to the device sending the query) the particular product family's conversion score. In some examples, in response to the query, the conversion score associated with the particular product family may be retrieved from a data storage storing the conversion score (e.g., by the at least one processor for transmitting to the device sending the query). In some examples, in response to receiving the query, the at least one processor may calculate the conversion score associated with the particular product family as described above (e.g., if the conversion score is not readily available and/or if the conversion score is not stored in a data storage), and may transmit the calculated conversion score associated with the particular product family (e.g., to the device sending the query). In some examples, in response to receiving the query, the at least one processor may provide other types of data as requested in the query (e.g., may transmit the requested data to the device sending the query).

Disclosed embodiments include outputting an advertising recommendation based on the conversion score of at least one associated product family. The advertising recommendation may include, for example, recommending increasing advertising, recommending reducing advertising, recommending a location for advertising, recommending a type of advertising, etc. At least one processor may, for example, output the advertising recommendation. The advertising recommendation may be based on the conversion score of at least one product family. For example, if the conversion score of a product family indicates that products associated with the product family have a high level of conversion from engagement to sale, and if the product family has a low engagement count, the advertising recommendation may include a recommendation to increase advertising for the product family or advertise the product family at a location where there may be a higher amount of customer traffic in the retail establishment. In some embodiments, advertising may include promoting by staff in the retail establishment, presenting the product family more prominently in a retailer's website or app (e.g., software application), creating campaigns in various media to promote the product family (e.g., in print, on the radio, on TV, in product placement in productions, in earned media, in paid media, in social media, in influencer campaigns, etc.), and/or placing items representing the product family (e.g., products associated with the product family) in prominent locations in the retail establishment (e.g., on unique display fixtures, on mannequins, in display windows, etc.).

Disclosed embodiments include outputting a product location recommendation for at least one associated product family based on its conversion score. At least one processor may, for example, output a product location recommendation for at least one product family. The product location recommendation may be based on the conversion score of the at least one product family. For example, the product location recommendation may include a recommendation of a specific location in the retail establishment to display and/or store product(s) associated with the at least one product family. For example, if the conversion score of a product family indicates that products associated with the product family have a high level of conversion from engagement to sale, and if the product family has a low engagement count, the product location recommendation may include a recommendation to place or display products associated with the product family in a more conspicuous location in the retail establishment (e.g., which may allow products associated with the product family to attract more notice or attention from customers). Additionally or alternatively, a product location recommendation may be based on the affinity score of two product families, where the at least one processor may output a recommendation to locate (e.g., to place, to display, etc.) the two product families closer together in order to take advantage of the increased conversion the two product families may experience when engaged with together, as discussed above.

Some embodiments include a system for presence accuracy enhancement in a wireless tag tracking environment. Presence refers to existence, location, continuation, actuality, duration, or any other state or attribute associated with existing or being available for any function. For example, an object's presence may include a position at which it is located. As another example, an object's presence may include a period of time in which it is located at a given position. As yet another example, an object's presence may include its availability to communicate with another object. Presence accuracy enhancement refers to any development, gain, growth, progress, recovery, advancement, or other increase or improvement in a quality, value, or extent of a presence determination. For example, presence accuracy enhancement may involve improving the accuracy of a means of determining presence, such as a device used to determine presence. As another example, presence accuracy enhancement may involve improving the accuracy of a value associated with presence, such as a distance related to presence. A wireless tag tracking environment includes any system, method, status, condition, or domain for checking, following, determining, calculating, establishing, verifying, or otherwise monitoring one or more characteristics of one or more wireless tags. For example, a wireless tag tracking environment may include a device configured to monitor the location of a plurality of wireless tags in a location. As another example, a wireless tag tracking environment may include one or more individuals tasked with checking the functioning of a plurality of wireless tags in a plurality of locations. It may be desirable to enhance presence accuracy in a wireless tag tracking environment to improve the efficiency and accuracy of a wireless tag. For example, presence accuracy may enable a system of wireless tags to configure increased usage of wireless tags that are present as opposed to those that are not. As another example, presence accuracy may enable a system of wireless tags to configure increased dependence of measurement data from wireless tags that are present as opposed to those that are not. As yet another example, higher presence accuracy may enable a wireless tag tracking system to provide more reliable data to upstream users, allowing for better performance or higher quality of such upstream users (e.g. inventory management systems, analytics systems, ordering and supply chain systems etc.).

Disclosed embodiments may relate to at least one processor and a data structure, as defined elsewhere in the present disclosure. In some embodiments, at least one processor is configured to access a data structure linking each of a plurality of wireless identification tags with an associated product, wherein each associated product is linked to an associated product family. As used herein, "wireless tag" also refers to "wireless identification tag," such as wireless tag 1100 disclosed herein.

For example, the at least one processor may be configured to look up a table with rows of wireless tags associated with columns of associated products. It may be desirable to access a data structure linking each of a plurality of wireless identification tags with an associated product, wherein each associated product is linked to an associated product family to organize related information and make it easier for the processor to refer to information related to presence determinations, thereby improving the accuracy and efficiency of presence accuracy enhancement.

FIG. 19 illustrates an example of a data structure 1900 linking a plurality of wireless identification tags 1910 with an associated product 1914 and an associated product family 1916, consistent with disclosed embodiments. A shown in FIG. 19, each of a plurality of wireless identification tags 1910 is linked with an associated product 1914 and an associated product family 1916 in the form of a table, which a processor may access, such as by using a lookup function. In the example shown in FIG. 19, the plurality of wireless identification tags 1910 may include a tag 1 which is linked with an associated product identified as a pair of pants. Tag 2 may be linked with an associated product identified as a shirt. While tags 1 and 2 may be linked with different associated products, they may also be linked with the same associated product family identified as clothing.

In some embodiments, at least one processor is configured to receive in a first time period, first identification transmissions from a first set of at least some of the plurality of wireless identification tags. Identification transmission may include any communication or transfer of data or information associated with an identification of a corresponding wireless tag. For example, an identification transmission may include a wireless signal indicating that a given wireless tag is active. As another example, an identification transmission may include location information of a geographical position of a corresponding wireless tag. As yet another example, an identification transmission may include a name, symbol, sound, graphic, signal, message, or other information that provides any indication of an identity or information related to an identity of a corresponding wireless tag. In another example, an identification transmission may be a measurement signal generated by a given wireless tag. The measurement signal may be a signal generated by the measurement of a quantity measurable by the wireless tag or a device associated with the wireless tag. A first set of at least some of the plurality of wireless identification tags may include some or all of the wireless identification tags. For example, a first set of at least some of the plurality of wireless identification tags may include a first tag from a first location and a second tag from the first location. As another example, a first set of at least some of the plurality of wireless identification tags may include a first tag from a first location and a second tag from a different, second location. As another example, a first set of at least some of the plurality of wireless identification tags may include a first tag linked with a first associated product and a second tag linked with a second associated product. In another example, a first set of at least some of the plurality of wireless identification tags may include a first tag linked with a first associated product and a second tag linked with the first associated product. Although only two tags (e.g., first tag and second tag) have been described above, the first set of at least some of the plurality of wireless identification tags may include any number of tags.

In some embodiments, at least one processor is configured to determine locations of the first set of wireless identification tags during the first time period based on the received first identification transmissions. A location of a wireless tag may include a point, region, scene, site, venue, area, environment, orientation, plane, or any other indication of a position of a wireless tag. For example, the location may be an address. As another example, the location may be a room in a building. As another example, the location may be a quadrant of a space. As another example, the location may be a direction, such as north, east, south, or west. The at least one processor may determine locations of the first set of wireless identification tags during the first time period based on the received first identification transmissions by any positioning method, including but not limited to techniques involving local area networks (WLANs), personal area networks (WPANs), and Wide Area Networks (WWAN). In one example, a WLAN-based technique may be used to determine the location. WLAN protocols (such as Wi-Fi) use wireless communications, usually in an unlicensed Radio Frequency (RF) spectrum to communicate with various devices and assets, including for example wireless tags. A WLAN system may consist of an access point which includes a transceiver (transmitter and receiver), and one or more "client devices" or "stations," each including a compatible transceiver as well. When triggered by a wireless signal from the access point, such as one associated with the at least one processor, the wireless tag associated with the access point may transmit identification transmissions, such as an identifying inventory number, back to the access point. This transmission may be used to determine a location of the wireless tag. In one example, the at least one processor may determine the location using trilateration. Trilateration may be accomplished by recording the time of arrival of a signal from a tag at three or more access points, and then calculating the tag's location based on the amount of time it took for the signal to reach each access point.

In some embodiments, at least one processor is configured to receive in a second time period, following the first time period, second identification transmissions from a second set of at least some of the plurality of wireless identification tags. Second identification transmissions may include identification transmissions similar to those described elsewhere in this disclosure. The first identification transmissions and second identification transmissions may be the of the same type or different. For example, the first identification transmissions may include names of corresponding wireless tags and the second identification transmissions may include locations of corresponding wireless tags. As another example, the first identification transmissions may include locations of corresponding wireless tags and the second identification transmissions may also include locations of corresponding wireless tags. Like the first set of at least some of the plurality of wireless identification tags, a second set of at least some of the plurality of wireless identification tags may include some or all of the wireless identification tags. A second set of at least some of the plurality of wireless identification tags may be a set of wireless identification tags that are partially or completely different from the first set of at least some of the plurality of wireless identification tags. For example, the first set may include tags 1, 2, 3, and 4, and the second set may include tags 4, 5, 6, and 7. As another example, the first set may include tags 1, 2, 3, and 4, and the second set may include tags 3, 4, 5, and 6. In some embodiments, at least one processor is configured to determine locations of the second set of wireless identification tags during the second time period based on the received second identification transmissions. The location determination for the second set of wireless identification tags may include any technique as described above to determine the locations of the first set of wireless identification tags.

In some embodiments, at least one processor is configured to determine, based on a difference between the first identification transmissions and the second identification transmissions, a cessation of reception of a missing wireless identification tag. A difference between the first identification transmissions and the second identification transmissions may include a change, contrast, discrepancy, disparity, divergence, inequality, variation, anomaly, deviation, variance, or any other distinction between one or more of a value, point, or other characteristic of the first identification transmissions and the second identification transmissions. For example, the first identification transmissions may include five "ON" messages from five wireless tags and the second identification transmissions may include four "ON" messages from four wireless tags and one "OFF" message from one wireless tag. In this example, the difference may be the reduced number of "ON" messages. As another example, the first identification transmissions may include five status signals from five wireless tags and the second identification transmissions may include four status signals from five wireless tags. In this example, the difference may be the loss of one of the status signals. As another example, the first identification transmissions may include transmissions from tags A, B and C, and the second identification transmissions may include transmissions from tags B, C and D. In this example, the difference may be the absence of transmission from tag A in the second set, and the addition of transmission from tag D in the second set (that was not included in the first set). A cessation of reception of a missing wireless identification tag may include a break, halt, interruption, blockage, resistance, or any other stopping or pausing of reception of transmissions from a missing wireless identification tag. For example, a cessation of reception of a missing wireless identification tag may include a reduced strength of reception of transmissions from a missing wireless identification tag. As another example, a cessation of reception of a missing wireless identification tag may include a reduced period of reception of transmissions from a missing wireless identification tag. In another example, a cessation of reception of a missing wireless identification tag may include no reception of transmissions from a missing wireless identification tag.

In some embodiments, at least one processor is configured to determine a likelihood that the missing wireless identification tag remains present at a particular location of the missing wireless identification tag, the particular location being a determined location of the missing wireless identification tag during the first time period. A likelihood that the missing wireless identification tag remains present at a particular location may include a probability, tendency, likeliness, or other indication of a missing wireless identification tag's presence at or absence from a particular location. In one example, a tag whose transmission was just received may have a 100% likelihood of being present at the location from which the transmission was received. After a certain period of time (for instance, if a tag is known to transmit every 5 minutes, and a transmission from it was not received for 30 minutes), the tag may be defined as "missing", and the likelihood of it being present at the location from which the transmission was received may become 0%. In some embodiments, other sources of data may be used to change the time threshold until a tag is defined "missing", without using any other likelihood values. For instance, if a tag is known to be attached to an item containing a significant amount of metal, which interferes with wireless transmissions, the threshold for declaring the tag as missing may be extended to a given time period, such as an hour, twelve hours, a day, or a week. As another example, the processor may consider the history of transmissions of a given tag to determine that the tag has consistently transmitted every five minutes without gaps for many days. In this example, the threshold to declare the tag as missing may be shortened to a given time period, such as twenty minutes, fifteen minutes, or ten minutes. In another example, the likelihood may be determined to be a numerical value between 0% and 100%, depending on a variety of data. For example, for a tag that consistently transmits every five minutes, but due to certain limitations, one out of every five transmissions is not received by the system, the processor may determine a 100% likelihood of being present for five minutes after the last transmission, 20% of being present for the next five minutes if no transmission was received, 4% (20% squared) of being present for the five minutes after that, and so forth. As another example, for a tag that transmits at random intervals, uniformly distributed between 5 and 15 minutes, the processor may determine having a 100% likelihood of being present for 5 minutes after its last transmission was received, and between 5 and 15 minutes it can be said to have a linearly decreasing likelihood of being present, going down from 100% after 5 minutes to 90% after 6 minutes, 80% after 7 minutes and so on, until it can be declared as having a 0% likelihood of being present after 15 minutes have passed from its last transmission.

In some embodiments, determining the likelihood is based on at least two of: the particular location of the missing wireless identification tag during the first time period, other products detected during the second time period in proximity to a previously known location of the missing wireless identification tag, locations determined during the second time period of other wireless identification tags linked to associated products of a same product family as the missing wireless identification tag, identification transmissions received during the second time period from other wireless identification tags linked to associated products of the same product family as the missing wireless identification tag whose identification transmissions were not received during the first time period, structures in proximity to the particular location of the missing wireless identification tag during the first time period, a total number of other products in the product family of the missing wireless identification tag detected during the second time period, or a total number of products in the product family of the missing wireless identification tag expected to be present during the second time period.

The particular location of the missing wireless identification tag during the first time period may include a point, region, scene, site, venue, area, environment, orientation, plane, or any other indication of a position of the missing wireless identification tag during the first time period. For example, the particular location of the missing wireless identification tag during the first time period may be a specific room of a building in which the missing wireless tag was present during the first time period. As another example, the particular location of the missing wireless identification tag during the first time period may be a north, east, south, or west direction in which the missing wireless tag was present during the first time period.

Other products detected during the second time period in proximity to a previously known location of the missing wireless identification tag may include any products with a closeness, adjacency, concurrence, contiguity, togetherness, or any other nearness in space, time, or relationship to the previously known location of the missing wireless tag, and may depend on the related products and location or a desired accuracy of a location determination. For example, if a desired accuracy of a location determination is in which room a tag may be found, then any other tags in the same room may be considered "in proximity" to the tag. As another example, for location accuracy on the order of 10 cm or less, tags placed 10 cm, 20 cm, or 50 cm apart may be considered "in proximity" to each other. In another example, for wireless tags associated with large items (such as large coats or large kitchen appliances), the tags may be considered "in proximity" even if they are spaced half a meter, one meter, or two meters apart. In another example, for wireless tags associated with small items (such jewelry, watches, cosmetics articles, or medicine bottles), the tags may only be considered "in proximity" if they are placed 5 cm, 10 cm, or a few centimeters apart. The location of the tags may also have a similar impact on the proximity consideration. For example, in an establishment where items associated with wireless tags are placed in bins, only items (and in turn, their associated wireless tags) in the same bin might be considered "in proximity" to each other. As another example, where items associated with wireless tags are placed on shelves, the processor may determine that items (and in turn, their associated wireless tags) located on the same shelf are "in proximity" even if they are spaced a meter apart. In this example, if the tags are spaced on different shelves one above the other, the tags may not be considered "in proximity" to each other regardless of the physical distance between the tags. The "previously known location" may include: the missing tag's location in the first time period, an assigned or designated location of the tag or associated product (such as one designated in a plan for a store's layout), locations where other tags from the same product family are located, or the missing tag's previous location two or more time periods ago and not its most recent location. For example, if the processor received multiple transmissions from a tag while it was being moved from its assigned location to a location where it disappeared, the processor may be configured to use the missing tag's assigned location as the previously known location.

Disclosed embodiments may relate to a product family and to product family information, as defined elsewhere in the present disclosure. For example, locations determined during the second time period of other wireless identification tags linked to associated products of a same product family as the missing wireless identification tag may include a point, region, scene, site, venue, area, environment, orientation, plane, or any other indication of a position of one or more wireless identification tags linked to associated products of a same product family as the missing wireless identification tag.

Identification transmissions received during the second time period from other wireless identification tags linked to associated products of the same product family as the missing wireless identification tag whose identification transmissions were not received during the first time period may include any communication or transfer of data or information associated with an identification received during the second time period from other wireless identification tags linked to associated products of the same product family as the missing wireless identification tag whose identification transmissions were not received during the first time period. One example of these identification transmissions may include status signals received from tags linked to associated products of the same product family as the missing wireless identification tag whose identification transmissions were not received during the first time period. In this example, receiving status signals from the tags linked to the associated products may indicate that the missing tag, which is associated with the same product family, should also be transmitting status signals because it should function similarly to the tags linked to associated products. Thus, in this example, the processor may use the status signals received from tags linked to associated products to determine that it is less likely that the missing wireless identification tag remains present at a particular location of the missing wireless identification tag.

Structures in proximity to the particular location of the missing wireless identification tag during the first time period may include an object, building, room, person, or any other tangible entity with a closeness, adjacency, concurrence, contiguity, togetherness, or any other nearness in space, time, or relationship to the particular location. As an example, a structure in proximity to the particular location of the missing wireless identification tag during the first time period may include a metal statue near the particular location. Since metal may interfere with wireless signal transmission, the processor may use the presence of the metal statue near the particular location as a factor in determining that it is more likely that the missing wireless identification tag remains present at a particular location of the missing wireless identification tag.

A total number of other products in the product family of the missing wireless identification tag detected during the second time period may include a sum, aggregate, or other whole number or amount of other products in the product family of the missing wireless identification tag detected during the second time period. For example, the product family of the missing wireless identification tag may be clothing. In this example, the processor may consider the total number of wireless tags associated with clothing items such as pants, shirts, and jackets, in determining whether it is likely that the missing wireless identification tag remains present at a particular location (e.g., location during the first time period) of the missing wireless identification tag.

A total number of products in the product family of the missing wireless identification tag expected to be present during the second time period may include a sum, aggregate, or other whole number (or amount) of products in the product family of the missing wireless identification tag expected to be present during the second time period. For example, the processor may determine that fifty clothing-related tags are expected to be present during the second time period. The processor may then use a determined total number of thirty clothing-related tags that are actually present during the second time period to determine that it is less likely that the missing wireless identification tag remains present at a particular location (e.g., location during the first time period) of the missing wireless identification tag.

In some embodiments, at least one processor is configured to adjust an inventory based on the determined likelihood. It may be desirable to adjust an inventory based on the determined likelihood to account for a missing product in an inventory. A missing product may include a product that is expected to be in the retail establishment, but the system has determined that it is likely no longer present there. This likelihood determination may be made based on various characteristics of the pattern of transmissions received from the wireless identification tag attached to the item, for instance after a tag that has been transmitting regularly for a significant period of time, has stopped transmitting for a length of time long enough to not be attributable to chance, or when a tag was received transmitting from a series of locations indicating a path towards an exit from the establishment, and then ceases to be received after the last transmission was determined to come from the vicinity of the exit itself. In this example, the system may direct the processor to adjust the inventory based on the determined likelihood to reduce an inventory number.

In some embodiments, when the determined likelihood is equal to or greater than an upper limit value, adjusting the inventory includes at least one of: designating the particular location of the missing wireless identification tag during the first time period as a current location of the missing wireless identification tag; designating the particular location of the missing wireless identification tag during the first time period as a current location of the associated product linked to the missing wireless identification tag; or changing a count of the total number of products in the product family that are present in a retail establishment. When the determined likelihood is equal to or greater than an upper limit value, the system may determine that the item is not missing and that its tag's transmissions are just not being received. For example, the upper limit value may be 100%. In other examples, the upper limit value may be 99%, 90%, 80%, or 50%. When the determined likelihood is equal to or greater than an upper limit value, it may be desirable for the processor to adjust the inventory to reflect the fact that the wireless identification tag is not actually missing. Thus, the processor may adjust the inventory by performing actions that do not reflect a missing wireless tag, such as designating the particular location of the missing wireless identification tag during the first time period as a current location of the missing wireless identification tag; designating the particular location of the missing wireless identification tag during the first time period as a current location of the associated product linked to the missing wireless identification tag; or changing a count of the total number of products in the product family that are present in a retail establishment. Designating the particular location of the missing wireless identification tag during the first time period as a current location of the missing wireless identification tag may include updating a location of the missing wireless identification tag to be the particular location of the missing wireless identification tag during the first time period. The processor may update the location of the wireless identification tag in this way to reflect the fact that the wireless tag is not missing and is still present at the location of the tag during the first time period. Changing a count of the total number of products in the product family that are present in a retail establishment may include increasing the count. The processor may increase the count in this way to correct for an erroneous count of the total number of products in the product family that are present in a retail establishment based on an incorrect assumption that the associated product linked with the wireless tag is missing.

In some embodiments, when the determined likelihood is less than or equal to a lower limit value, adjusting the inventory includes at least one of: generating a missing product alert; changing a count of the total number of products in the product family that are present in a retail establishment; or generating a replenishment request for the associated product linked to the missing wireless identification tag. When the determined likelihood is less than or equal to a lower limit value, the system may determine that the item is missing and not that its tag's transmissions are just not being received. For example, the lower limit value may be 0%. In other examples, the lower limit value may be 1%, 5%, 10%, 20% or 50%. When the determined likelihood is less than or equal to a lower limit value, it may be desirable for the processor to adjust the inventory to reflect the fact that the wireless identification tag is actually missing. Thus, the processor may adjust the inventory by performing actions that reflect a missing wireless tag, such as generating a missing product alert; changing a count of the total number of products in the product family that are present in a retail establishment; or generating a replenishment request for the associated product linked to the missing wireless identification tag. A missing product alert may include one or more of a visual, auditory, or tactile indication that a product is missing. A missing product alert may include visual alerts (such as a blinking light at a gate), audible alerts (such as sirens or pre-recorded messages), or other forms (such as notifications on a store employee's mobile device, update of a database of attempted thefts, or instant messages and automated phone calls to local security). A missing product alert may also include an indication or message to a system or user to perform a specific activity. For example, a missing product alert may be a signal that directs the processor to perform an action when a product is missing, such as closing the doors of a specific room in which the missing product was last present. Changing a count of the total number of products in the product family that are present in a retail establishment may be desirable to update product statistics for stocking and record-keeping. For example, changing a count of the total number of products in the product family that are present in a retail establishment may include reducing the count from 80 shirts to 79 shirts. By doing this, the processor enables efficient record-keeping so that additional shirts can be stocked to return the total number of shirts to a desired number such as 80. A replenishment request may include any notification indicating that a replenishment action needs to be performed. This request may be sent to a store employee directing them that a product needs to be brought from a storage area of the establishment to a display area of the establishment, so the product would be available for sale. In some embodiments, the replenishment request may be sent to a store employee directing them that a product needs to be ordered from a warehouse because it is no longer available in the store and needs to be replenished. As another example, the replenishment request may be sent from an inventory management system in the establishment to a central ordering system of the organization, generating an automatic order to replenish inventory at the establishment.

In some embodiments, the at least one processor is configured to: receive an indication of a sale in the product family of the missing wireless identification tag; determine that the missing wireless identification tag corresponds to a product purchased in the sale, based on the total number of other products in the product family detected during the second time period and the total number of products in the product family expected to be present during the second time period; and forgo adjusting the inventory for the missing wireless identification tag. An indication of a sale may include any information associated with a sale, such as the date of the sale, the name of the product, the description of the product, the point of origin, the place of sale, a description of the customer, the name of the salesperson, the price of the product, and the net profit from the sale. The indication of a sale may be of an actual sale, the initiation of a sale, an inquiry by a user to sell, an explicit or implicit desire to sell, and so forth. The indication of a sale may be associated with a sale transaction, and may occur before, during, or after the sale. The indication of a sale may be received by the processor from a consumer, a merchant, a point of sale device, a merchant website, and so forth, such as in the form of a user input or interaction with the processor or a device associated with the processor. The processor may determine that the missing wireless identification tag corresponds to a product purchased in the sale, based on the total number of other products in the product family detected during the second time period and the total number of products in the product family expected to be present during the second time period. For example, the processor may refer to a data structure that contains the total number of other products in the product family detected during the second time period and the total number of products in the product family expected to be present during the second time period. Further, the processor may determine a difference or discrepancy between the total number of other products in the product family detected during the second time period and the total number of products in the product family expected to be present during the second time period. Alternatively, the processor may determine that the missing wireless identification tag corresponds to a product purchased in the sale, based on the total number of other products in the product family detected during the second time period and the total number of products in the product family expected to be present during the second time period. The processor may do so based on a user input or interaction with the processor of a device associated with the processor. The user input or interaction may be indicative of a difference or discrepancy between the total number of other products in the product family detected during the second time period and the total number of products in the product family expected to be present during the second time period. It may be desirable for the processor to forgo adjusting the inventory for the missing wireless identification tag when it receives an indication of a sale in the same product family because it is likely that the wireless identification tag is missing because the product to which it is attached was sold. Thus, adjusting the inventory for the missing wireless identification tag may improve the accuracy and efficiency of the presence accuracy enhancement. As an example, the processor may receive a notification that a blouse in the "tops" family of the missing wireless identification tag was sold, determine that the missing wireless identification tag corresponds to a blouse, and forgo adjusting the inventory for the missing wireless identification tag because the tag is not missing, but accounted for as attached to a sold blouse.

In some embodiments, the at least one processor is configured to: detect an identification transmission received during the second time period from a specific wireless identification tag whose identification transmission was not received during the first time period; access in the data structure the associated product family linked to the specific wireless identification tag; and determine the likelihood based on: the associated product family of the specific wireless identification tag, and at least one of the particular location of the missing wireless identification tag during the first time period, or a determined location of the specific wireless identification tag during the second time period. This type of likelihood determination may be desirable to address the problem of stacking, in a retail context. For instance, when a stack of items from the same product family is placed on a metal shelf, the bottom tag may often not be able to transmit. When the bottom item is removed from the stack and the item that was on top of it becomes the bottom one, the total number of items detected from the specific stack and product family does not change, because one tag is switched for another and now the bottom tag becomes the top tag and is able to transmit. This results in a missing tag, and this problem may be identified and corrected for by configuring the processor to determine the likelihood based on: the associated product family of the specific wireless identification tag, and at least one of the particular location of the missing wireless identification tag during the first time period, or a determined location of the specific wireless identification tag during the second time period. In this type of likelihood determination, the processor may determine the likelihood based on the associated product family of the specific wireless identification tag, and at least one of the particular location of the missing wireless identification tag during the first time period, or a determined location of the specific wireless identification tag during the second time period by determining whether either or both of the locations is related to the location of the associated product family. This is because tags within the same associated product family may be more likely to be stacked on top of each other and therefore, may face this stacking issue. In some embodiments, a data structure linking the wireless identification tags to the products they are attached thereto and their respective product families, may also include information on which products and/or product families may be stacked together in a particular retail establishment, thus enabling the at least one processor to make this determination with a greater degree of accuracy.

In some embodiments, the at least one processor is configured to determine if the particular location of the missing wireless identification tag during the first time period corresponds to a location of an interference structure. An interference structure may refer to an object, building, room, person, or any other tangible entity that may cause an obstruction, interruption, disruption, disturbance, reflection, refraction, cessation, or any other effect on the reception of a signal from a wireless identification tag. For example, metallic objects may interfere with the reception of a signal from a wireless identification tag. If the particular location of the missing wireless identification tag during the first time period includes an interference structure such as a metal column in a room, then the processor may determine that it is more likely that the missing wireless identification tag remains present at a particular location of the missing wireless identification tag, because the metal column may just be interfering with a signal from the missing wireless identification tag. In some embodiments, the processor may determine whether the particular location of the missing wireless identification tag during the first time period corresponds to a location of an interference structure. The processor may be configured to do so based on a user input or interaction with the processor or a device associated with the processor, indicating that the particular location of the missing wireless identification tag during the first time period corresponds to a location of an interference structure. Such a user input may include, for example, clicking a button on a screen of a computer associated with the processor. In other embodiments, the processor may determine whether the particular location of the missing wireless identification tag during the first time period corresponds to a location of an interference structure based on input from a position or location sensor, such as an infrared or ultrasound sensor, associated with the interference structure.

In some embodiments, the at least one processor is configured to set the likelihood equal to a first predetermined value when: the missing wireless identification tag and the specific wireless identification tag are determined to be linked to the same associated product family, and the missing wireless identification tag and the specific wireless identification tag are determined to have respective locations corresponding to the location of the interference structure. The first predetermined value may be a high number because it indicates a high likelihood that the wireless identification tag is still present in its designated location and not actually missing, but its transmission is being obstructed by the interference structure. The first predetermined value may be a percentage such as 100%, a number such as 1.00, a proportion, or a ratio. For example, the first predetermined value may be 98%, 95%, or 90%. In some embodiments, the first predetermined value may be greater than the lower limit value. Additionally, or alternatively, the first predetermined value may be equal to or greater than the upper limit value. The processor may determine that the missing wireless identification tag and the specific wireless identification tag are linked to the same associated product family by accessing a data structure that relates wireless identification tags to associated product families, such as the data structure illustrated in FIG. 19. The processor may determine that the missing wireless identification tag and the specific wireless identification tag have respective locations corresponding to the location of the interference structure by comparing the location of the interference structure to the respective locations of the missing wireless identification tag and the specific wireless identification tag. For example, the processor may determine that missing wireless identification tag and the specific wireless identification tag are linked to the same associated product family of clothing. The processor may also determine that the missing wireless identification tag and the specific wireless identification tag are located in the same room as the interference structure. In this example, the processor may set the likelihood equal to a first predetermined value, thereby indicating that the missing wireless identification tag is not actually missing, because it is likely that the interference structure caused the missing wireless identification tag's identification transmission to not be received.

In some embodiments, the determined likelihood is equal to or greater than an upper limit value, the at least one processor is configured to adjust the inventory to include both the missing wireless identification tag and the specific wireless identification tag. When the determined likelihood is equal to or greater than an upper limit value, it is more likely that the wireless identification tag is still present in its designated location and not actually missing. Thus, the processor may adjust the inventory to include both the missing wireless identification tag and the specific wireless identification tag in the inventory to reflect a situation where the missing wireless identification tag and the specific wireless identification tag were stacked on top of each other and the missing wireless identification tag was actually still present in its designated location and not missing. For example, when the determined likelihood is equal to or greater than the upper limit value, the at least one processor may adjust an original inventory count of 50 tags to include both missing wireless identification tag and the specific wireless identification tag by increasing the inventory count to 51 tags.

In some embodiments, the at least one processor is configured to: calculate a signal frequency score of the missing wireless identification tag based on a frequency of identification transmissions received from the missing wireless identification tag prior to the second time period; establish a time threshold based on the calculated signal frequency score; and determine the likelihood based on the established time threshold and a timestamp of the identification transmission received from the missing wireless identification tag during the first time period. A signal frequency score may refer to any value, percentage, ratio, or proportion indicative of a number of times a transmission from a wireless identification tag was received. For example, if a transmission from a wireless identification tag was received five times, the signal frequency score may be 5. As another example, if a transmission from a wireless identification tag was received for 18 out of 24 hours in a day, the signal frequency score may be 18/24 or 75%. Another example, if a tag transmits on average every 5 minutes, the signal frequency score may be 1/12 (representing an average of 12 transmissions per hour). As yet another example, if a tag transmits at an unpredictable rate, ranging from one minute between transmission to one hour between transmission, the signal frequency score may be 3600, representing the greatest number of seconds expected between transmissions. A time threshold may refer to the length of time that the processor may wait before determining that a tag is missing. For example, a tag may be known to only transmit every half hour. For such a tag, the processor may calculate a signal frequency score of 50% and based on that signal frequency score, may determine that a time threshold for an hour may be 30 minutes. Thus, if the tag does not transmit after 10 minutes, the processor may not automatically determine that the tag is missing, since the tag is known to not transmit that frequently.

A timestamp of the identification transmission received from the missing wireless identification tag during the first time period may include any indication of a time associated with the identification transmission received from the missing wireless identification tag during the first time period. For example, the timestamp may be the time that identification transmission was received from the missing wireless identification tag during the first time period, such as 5 PM. As another example, the timestamp may be the date that identification transmission was received from the missing wireless identification tag during the first time period, such as January 1. The timestamp may be stored, calculated and/or used at a desired level of precision or resolution. For instance, the timestamp may be rounded to the nearest minute, to the nearest second, to the nearest millisecond (one thousandth of a second) or to the nearest nanosecond (one billionth of a second), or any other desired precision. The timestamp may be used to determine a period of time that has passed since the last transmission was received, so that the processor may compare this period of time to the time threshold to determine the likelihood that the missing wireless identification tag is present at its previously determined location.

In some embodiments, the at least one processor is configured to set the likelihood equal to a second predetermined value when a length of time following the identification transmission from the missing wireless identification tag during the first time period exceeds the time threshold. A length of time following the identification transmission from the missing wireless identification tag during the first time period may include any period of time between a time when the identification transmission from the missing wireless identification tag during the first time period was received and another reference time. For example, the length of time may be a period of time between a time when the identification transmission from the missing wireless identification tag during the first time period was received and a time that the processor determines the likelihood. As another example, the length of time may be a period of time between a time when the identification transmission from the missing wireless identification tag during the first time period was received and a beginning of the second time period. The second predetermined value may be a low number because it indicates a high likelihood that the tag is actually missing (e.g., has been stolen or otherwise removed from the establishment). The second predetermined value may be a percentage such as 0% or a value such as 0. In some examples, the second predetermined value may be 1%, 2%, or 5%. In some embodiments, the second predetermined value may be less than the upper limit value. Additionally, or alternatively, the second predetermined value may be less than or equal to the lower limit value.

In some embodiments, the at least one processor is configured to: receive in a third time period, following the second time period, third identification transmissions from a third set of at least some of the plurality of wireless identification tags; calculate, when the third identification transmissions include an identification transmission of the missing wireless identification tag, an updated signal frequency score of the missing wireless identification tag based on the identification transmission of the missing wireless identification tag during the third time period; and establish an updated time threshold of the missing wireless identification tag based on the updated signal frequency score.

Third identification transmissions may include identification transmissions similar to those described elsewhere in this disclosure, and may be the same as or different from first identification transmissions and second identification transmissions. It may be desirable for the processor to establish an updated time threshold of the missing wireless identification tag based on an updated signal frequency score to improve the accuracy of determining presence or absence of the wireless identification tag to account for changing wireless tag characteristics. For example, a given tag may initially transmit more frequently, and thus have a higher signal frequency score. Over time, the tag may transmit less frequently, and thus have a lower signal frequency score. Configuring the processor to establish an updated time threshold of the missing wireless identification tag based on the updated signal frequency score may account for such changes in transmission frequency by updating the time threshold to account for changing tag behavior.

In some embodiments, the at least one processor is configured to: receive information of one or more interference structures in proximity to the particular location of the missing wireless identification tag during the first time period; and determine the likelihood based on at least one of a number of the one or more interference structures, a material of the one or more interference structures, a shape of the one or more interference structures, and a distance between the particular location of the missing wireless identification tag and a location of each of the one or more interference structures. An interference structure may refer to an object, building, room, person, or any other tangible entity that may cause an obstruction, interruption, disruption, disturbance, cessation, or any other effect on the reception of a signal from a wireless identification tag, as described herein. Some structures may reflect the energy emitted from wireless tags and create interference for tag communication, such as RFID, BLE, Wi-Fi, Zigbee or other technologies. For example, metal may reflect the energy emitted from wireless tags and create interference for tag communication. Thus, it may be desirable to determine the likelihood that a wireless identification tag is present at its previously determined location based on at least one of a number of factors. These factors may include one or more interference structures, a material of the one or more interference structures, a shape of the one or more interference structures, and/or a distance between the particular location of the missing wireless identification tag and a location of each of the one or more interference structures. For example, the likelihood that the missing wireless identification tag remains present at a particular location of the missing wireless identification tag may be higher if there are more interference structures present blocking the wireless tag transmissions, as there would be a higher chance of the tag being present and transmitting, without those transmissions being received (due to the interference structures). As another example, the likelihood that the missing wireless identification tag remains present at a particular location of the missing wireless identification tag may be higher for a metal interference structure than a wooden interference structure. In one example, the at least one processor may be configured to receive information of one or more interference structures from a database containing the location of interference structures in an establishment to determine their proximity to a missing tag. In another example, the at least one processor may be configured to receive information of one or more interference structures from one or more sensors configured to measure information such as light, distance, or movement to determine the shape or material of one or more interference structures. For example, distance information may be used to determine the shape of an interference structure by determining the distances of various locations on an interference structure and correlating those distances to determine a shape of the interference structure.

In some embodiments, the at least one processor is configured to: access in the data structure attributes of the specific associated product linked to the missing wireless identification tag, the attributes including at least one material of the specific associated product; and determine the likelihood based on the at least one material of the specific associated product. When a wireless identification tag is attached to material such as metal, the tag may or may not overcome of the problems traditional wireless tags suffer when near metal, such as detuning and reflecting of the wireless identification transmission, which can cause poor tag read range, phantom reads, or no read signal at all. Thus, it may be desirable for the processor to determine the likelihood that a wireless identification tag is present at its previously determined location, based on the at least one material of the specific associated product. For example, the processor may be configured to access in the data structure a material of the specific associated product linked to the missing wireless identification tag and determine that the material is a metal. In this example, the processor may determine that the likelihood that the missing wireless identification tag remains present at a particular location of the missing wireless identification tag is higher because the tag's attachment to metal may cause problems such as signal reflection. Determining the likelihood that a wireless identification tag is present at its previously determined location based on the material of an associated product may improve functioning of the system by the accuracy of determining presence or absence of the wireless identification tag.

In some embodiments, the at least one processor is configured to receive the first identification transmissions from the first set of wireless identification tags and the second identification transmissions from the second set of wireless identification tags via at least one reader in a retail establishment, the at least one reader being configured to automatically receive signals transmitted by the wireless identification tags. The reader may be portable or permanently attached to a structure. The reader may use wireless waves, such as electromagnetic waves, to transmit signals that activate a wireless identification tag. Once activated, the wireless identification tag may occasionally, periodically, continuously or in any other manner transmit an electromagnetic signal back to the reader, where the reader converts the received signal into data. Mobile readers may be implemented as handheld devices that allow for flexibility when reading wireless identification tags while still being able to communicate with a host computer or smart device. It may be desirable to receive the first identification transmissions from the first set of wireless identification tags and the second identification transmissions from the second set of wireless identification tags via at least one reader in a retail establishment since retail establishments often use a large quantity of tags to track products. For example, as shown by the data structure in FIG. 19, the wireless identification tags may be associated with retail items such as clothing. In such a retail environment, it may be desirable to receive identification transmissions from the wireless identification tag using a handheld mobile reader used by a shopkeeper who walks around the retail environment. By using a handheld mobile reader for this function, the shopkeeper is not limited in his or her movement and does not require using a new reader for each area. Additionally, or alternatively, fixed readers permanently attached to a structure, may, if the range of their reception is wide enough, be sufficient to cover the entire establishment and receive wireless identification signals from any and all wireless identification tags attached to products in the establishment. In this case such fixed readers would save a shopkeeper the labor and time of walking around the retail establishment carrying a handheld or portable mobile reader.

In some embodiments, the at least one reader includes at least one of a handheld scanner or a fixed scanner. Handheld scanners are portable units that integrate an antenna, transmit receive circuitry, a control processor (typically programmable), a battery, and communication mediums. As with mobile scanners, handheld scanners are fully capable of independent operation and additionally are capable of interacting with a server to exchange information there between. One advantage of handheld scanners over mobile scanners is their portability. Fixed readers may remain in one location and are typically mounted on walls, on desks, into portals, or other stationary locations. In contrast, handheld readers are portable and can be transported with ease. One advantage of fixed readers is that they are capable of automatically collecting information over long periods of time without the involvement of staff or the need for an operator.

In some embodiments, the wireless identification tags lack batteries. Wireless identification tags that lack batteries may have no energy or power source of their own and operate by harvesting energy from an external source, such as light, movement, thermal differences, or ambient (or intentional) Radio Frequency (RF) energy. Wireless identification tags that lack batteries may communicate with the reader by storing the energy harvested (e.g. in a capacitor integrated in the tag) over some period of time, and expending it periodically by powering a transmitter. Wireless identification tags that lack batteries may be advantageous for their smaller size and reduced cost.

Some embodiments include a non-transitory computer readable medium containing instructions that when executed by at least one processor cause the at least one processor to perform operations for presence accuracy enhancement in a wireless tag tracking environment. The operations may include accessing a data structure linking each of a plurality of wireless identification tags with an associated product, wherein each associated product is linked to an associated product family; receiving in a first time period, first identification transmissions from a first set of at least some of the plurality of wireless identification tags; determining locations of the first set of wireless identification tags during the first time period based on the received first identification transmissions; receiving in a second time period, following the first time period, second identification transmissions from a second set of at least some of the plurality of wireless identification tags; determining locations of the second set of wireless identification tags during the second time period based on the received second identification transmissions; determining, based on a difference between the first identification transmissions and the second identification transmissions, a cessation of reception of a missing wireless identification tag; determining a likelihood that the missing wireless identification tag remains present at a particular location of the missing wireless identification tag, the particular location being a determined location of the missing wireless identification tag during the first time period; and adjusting an inventory based on the determined likelihood.

Determining the likelihood may be based on at least two of: the particular location of the missing wireless identification tag during the first time period, other products detected during the second time period in proximity to a previously known location of the missing wireless identification tag, locations determined during the second time period of other wireless identification tags linked to associated products of a same product family as the missing wireless identification tag, identification transmissions received during the second time period from other wireless identification tags linked to associated products of the same product family as the missing wireless identification tag whose identification transmissions were not received during the first time period, structures in proximity to the particular location of the missing wireless identification tag during the first time period, a total number of other products in the product family of the missing wireless identification tag detected during the second time period, or a total number of products in the product family of the missing wireless identification tag expected to be present during the second time period.

The operations may include detecting an identification transmission received during the second time period from a specific wireless identification tag whose identification transmission was not received during the first time period; accessing in the data structure the associated product family linked to the specific wireless identification tag; and determining the likelihood based on: the associated product family of the specific wireless identification tag, and at least one of the particular location of the missing wireless identification tag during the first time period, or a determined location of the specific wireless identification tag during the second time period.

Some embodiments include a method for presence accuracy enhancement in a wireless tag tracking environment. The method may include accessing a data structure linking each of a plurality of wireless identification tags with an associated product, wherein each associated product is linked to an associated product family; receiving in a first time period, first identification transmissions from a first set of at least some of the plurality of wireless identification tags; determining locations of the first set of wireless identification tags during the first time period based on the received first identification transmissions; receiving in a second time period, following the first time period, second identification transmissions from a second set of at least some of the plurality of wireless identification tags; determining locations of the second set of wireless identification tags during the second time period based on the received second identification transmissions; determining, based on a difference between the first identification transmissions and the second identification transmissions, a cessation of reception of a missing wireless identification tag; determining a likelihood that the missing wireless identification tag remains present at a particular location of the missing wireless identification tag, the particular location being a determined location of the missing wireless identification tag during the first time period; and adjusting an inventory based on the determined likelihood.

Determining the likelihood may be based on at least two of: the particular location of the missing wireless identification tag during the first time period, other products detected during the second time period in proximity to a previously known location of the missing wireless identification tag, locations determined during the second time period of other wireless identification tags linked to associated products of a same product family as the missing wireless identification tag, identification transmissions received during the second time period from other wireless identification tags linked to associated products of the same product family as the missing wireless identification tag whose identification transmissions were not received during the first time period, structures in proximity to the particular location of the missing wireless identification tag during the first time period, a total number of other products in the product family of the missing wireless identification tag detected during the second time period, or a total number of products in the product family of the missing wireless identification tag expected to be present during the second time period.

The method may include detecting an identification transmission received during the second time period from a specific wireless identification tag whose identification transmission was not received during the first time period; accessing in the data structure the associated product family linked to the specific wireless identification tag; and determining the likelihood based on: the associated product family of the specific wireless identification tag, and at least one of the particular location of the missing wireless identification tag during the first time period, or a determined location of the specific wireless identification tag during the second time period.

Figure 20:
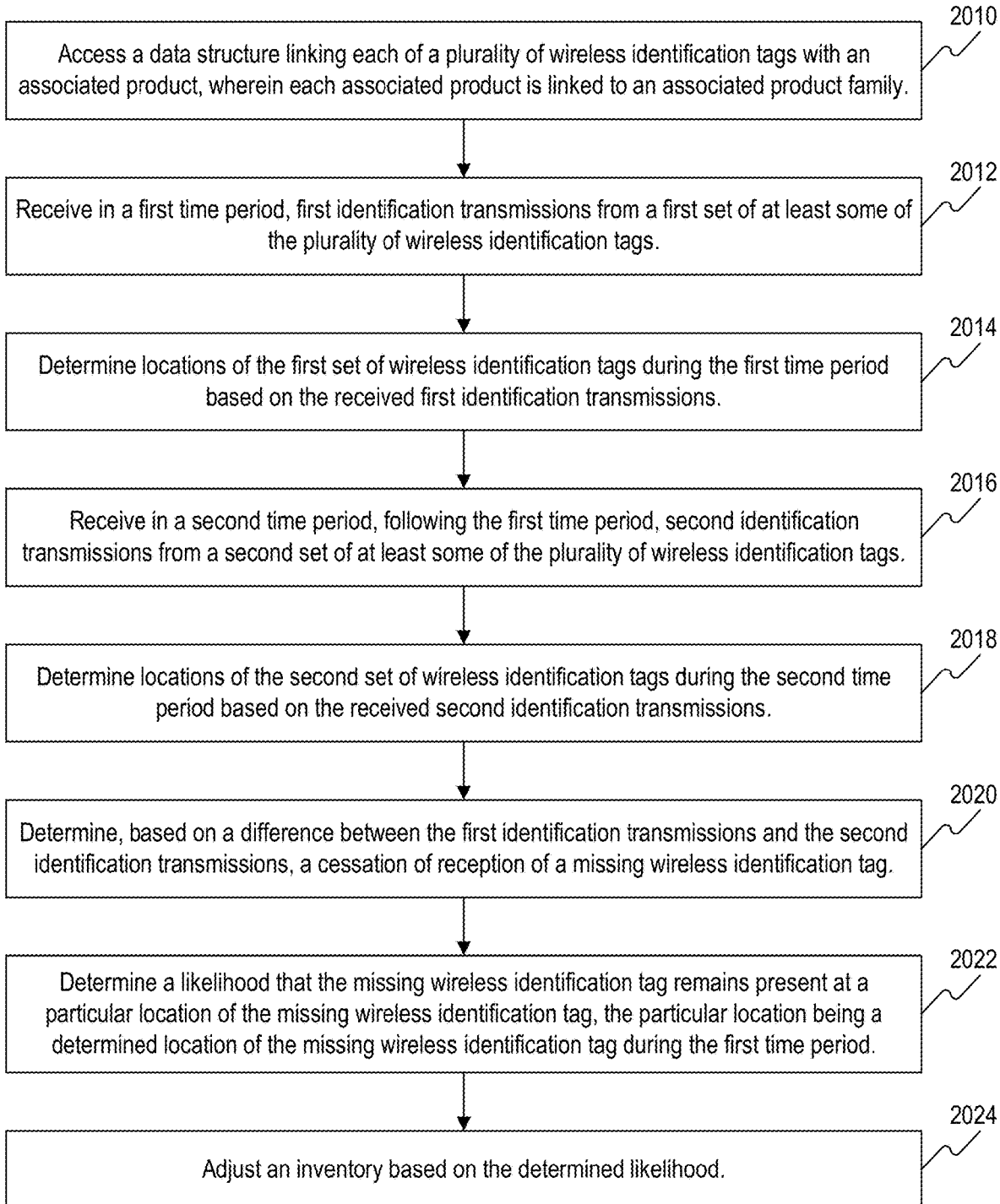
FIG. 20 illustrates a flowchart of a method for presence accuracy enhancement in a wireless tag tracking environment, consistent with disclosed embodiments.

FIG. 20 illustrates a flowchart of a method 2000 for presence accuracy enhancement in a wireless tag tracking environment, consistent with disclosed embodiments. Method 2000 may include step 2010 of accessing a data structure linking each of a plurality of wireless identification tags with an associated product, wherein each associated product is linked to an associated product family. Method 2000 may include step 2012 of receiving in a first time period, first identification transmissions from a first set of at least some of the plurality of wireless identification tags. Method 2000 may include step 2014 of determining locations of the first set of wireless identification tags during the first time period based on the received first identification transmissions. Method 2000 may include step 2016 of receiving in a second time period, following the first time period, second identification transmissions from a second set of at least some of the plurality of wireless identification tags. Method 2000 may include step 2018 of determining locations of the second set of wireless identification tags during the second time period based on the received second identification transmissions. Method 2000 may include step 2020 of determining, based on a difference between the first identification transmissions and the second identification transmissions, a cessation of reception of a missing wireless identification tag. Method 2000 may include step 2022 of determining a likelihood that the missing wireless identification tag remains present at a particular location of the missing wireless identification tag, the particular location being a determined location of the missing wireless identification tag during the first time period. Method 2000 may include step 2024 of adjusting an inventory based on the determined likelihood.

Figure 21:
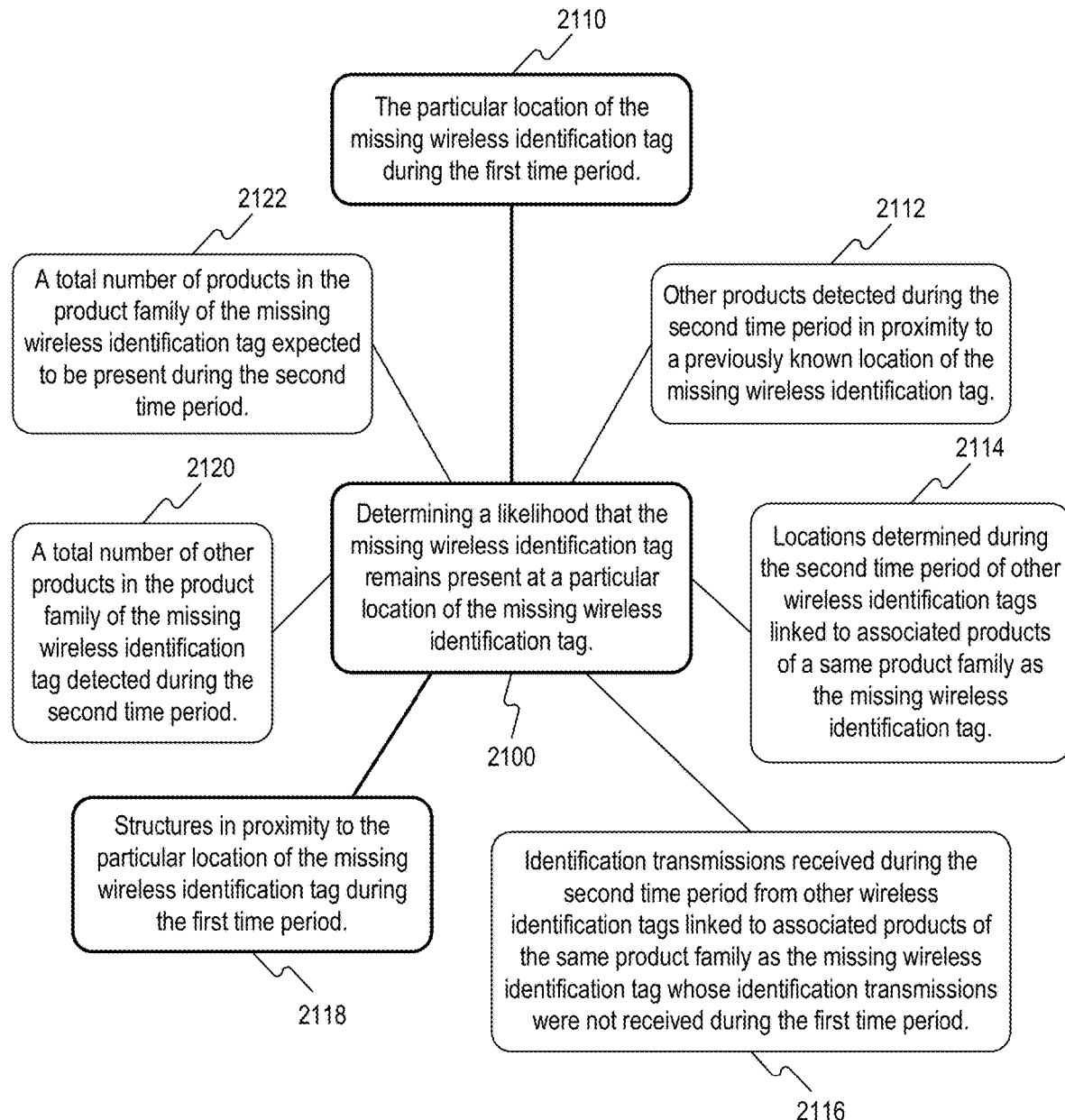
FIG. 21 illustrates exemplary components of a step of determining the likelihood that the missing wireless identification tag remains present at a particular location of the missing wireless identification tag, consistent with disclosed embodiments.

FIG. 21 illustrates exemplary components of a step 2100 of determining the likelihood that the missing wireless identification tag remains present at a particular location of the missing wireless identification tag, disclosed embodiments. Step 2100 is based on at least two of factors 2110, 2112, 2114, 2116, 2118, 2120, or 2122. Factor 2110 may include the particular location of the missing wireless identification tag during the first time period. Factor 2112 may include other products detected during the second time period in proximity to a previously known location of the missing wireless identification tag. Factor 2114 may include locations determined during the second time period of other wireless identification tags linked to associated products of a same product family as the missing wireless identification tag. Factor 2116 may include identification transmissions received during the second time period from other wireless identification tags linked to associated products of the same product family as the missing wireless identification tag whose identification transmissions were not received during the first time period. Factor 2118 may include structures in proximity to the particular location of the missing wireless identification tag during the first time period. Factor 2120 may include a total number of other products in the product family of the missing wireless identification tag detected during the second time period. Factor 2122 may include a total number of products in the product family of the missing wireless identification tag expected to be present during the second time period. In the example shown in FIG. 21, the step 2100 of determining the likelihood that the missing wireless identification tag remains present at a particular location of the missing wireless identification tag is based on the particular location of the missing wireless identification tag during the first time period 2110 and structures in proximity to the particular location of the missing wireless identification tag during the first time period 2118. However, any combination of at least two of these factors may be used to determine the likelihood that the missing wireless identification tag remains present at a particular location of the missing wireless identification tag.

The past couple of decades has shown the exponential growth of e-commerce as an additional venue for retail, on top of physical stores. In many market segments, the convenience of e-commerce and its frictionless nature have shifted a significant share from physical to digital channels, and the recent global pandemic accelerated these trends to some extent. One other significant advantage of current e-commerce platforms (at least for the retailers) is the wealth of data that is generated in every visit of a customer to the website or app, and the analytics and insights that can be gleaned from such data. This is in contrast to physical stores, where the only data that is easily available is the bottom-line sales data, which ignores the entire customer journey up until the point of actual sales (and is blind to the numerous customers who come in the store but end up not buying anything).

The need for more detailed customer journey data in the physical store can be addressed by tagging items using wireless, energy-harvesting tags which transmit periodically, enabling a system to track the location of every tag in the store. This may provide information regarding which items are on display, which items are taken to a fitting room, and what items are taken "for a spin" but then abandoned at a random location in the store. Such a system may still lack a sense of the number of shoppers entering the store, where they walk (and, not less important, where they do not walk), and where they stop to look at items. To provide complete sales-funnel data to retailers, such a capability is critical and normally this would be achieved using cameras placed in the store. Such camera infrastructure may be expensive (as it needs to cover each and every corner of the store), and in clothing stores there is extreme sensitivity around fitting rooms, which would effectively make such a camera installation impossible.

However, when a system utilizing wireless tags on each item is installed in the store, a new avenue is opened to gather traffic data of shoppers in the store, by using the radio signals received from the tags. Such a system may rely on the fact that while there is no traffic in the store (for example, during night-time hours when the store is closed), the characteristics of a tag's transmissions as received by various receivers placed in the store are relatively stable. During such a time, the system may gather "fingerprinting" data on the amplitudes, phases, and directions of the received transmissions, determine the location of each tag in the store, and determine a baseline for reception characteristics for each location. After the baseline is determined, whenever a person enters the store, their body creates new interference in the radio characteristics (in the form of blockages, attenuations, reflections, etc.) that may be measured by the system, traced to the location of the tags whose readings were interfered with, and translated to a traffic activity estimation at each location in the store or an assumed location of each person in the store.

This information may then be used to generate heatmaps of activity in the store that in turn may help determine optimal placement of items in the store based on the heatmap, determine customer journey routes and link other engagement data (e.g., item movement, fitting room entries, etc.) to "baskets" based on their association with a specific route, inform staffing decisions based on measured traffic patterns, and more.

As used herein, the term "human traffic" refers to the aggregate measure of the number of people, their direction of movement, their speed, and their tendency to stop or proceed at given points and locations, as measured over a period of time. In a physical store, or any other retail establishment, the main utility of the space is to allow for the interaction between the products for sale and the potential customers coming into the store. To meet this goal, the space will usually be divided into areas where products are displayed, and between them passages enabling potential customers to see the products, engage with the products in some manner (possibly touching the products, taking the products, or otherwise interacting with the products), and finally selecting a product for purchase. In this sense, the "negative space" between the display areas (the passages or "aisles") are spaces where customers can move between areas of the store and choose which products and at which locations they wish to interact with. These spaces form the "transportation network" of the store, similar to how roads and streets in a city form the transportation network for vehicular traffic between neighborhoods, zones, and locations around the city. This human traffic represents the various aggregate behaviors of customers in the store, as dictated by the layout of the display areas and passages, the distribution of products in the store and other functions (such as mirrors, registers, fitting rooms, restrooms, etc.).

Embodiments of the present disclosure may relate to systems, methods, devices, and computer readable media for detecting human traffic in a retail establishment based on reception of wireless identification signals transmitted by a plurality of wireless tags. For ease of discussion, in some instances related embodiments are described below in connection with a system or method with the understanding that the disclosed aspects of the system and method apply equally to each other as well as devices and computer readable media. Some aspects of a related method may occur electronically over a network that is wired, wireless, or both. Other aspects of such a method may occur using non-electronic means. In the broadest sense, the systems, methods, and computer readable media disclosed herein are not limited to particular physical and/or electronic instrumentalities, but rather may be accomplished using many differing instrumentalities.

In some embodiments, a system for detecting human traffic is based on reception of wireless identification signals transmitted by a plurality of wireless tags. The system includes at least one processor configured to perform operations. In some embodiments, a non-transitory computer readable medium contains instructions that when executed by at least one processor cause the at least one processor to perform operations for detecting human traffic based on reception of wireless identification signals transmitted by a plurality of wireless tags. In some embodiments, a method is provided for detecting human traffic based on reception of wireless identification signals transmitted by a plurality of wireless tags and includes operations performed by a processor.

At least one processor may constitute any physical device or group of devices having electric circuitry that performs a logic operation on an input or inputs. For example, the at least one processor may include one or more integrated circuits (ICs), including application-specific integrated circuits (ASICs), microchips, microcontrollers, microprocessors, all or part of a central processing unit (CPU), a graphics processing unit (GPU), a digital signal processor (DSP), a field-programmable gate array (FPGA), a server, a virtual server, or other circuits suitable for executing instructions or performing logic operations. The instructions executed by at least one processor may, for example, be pre-loaded into a memory integrated with or embedded into the processor or may be stored in a separate memory. The memory may include a Random-Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically, or by other means that permit them to interact. For example, at least one processor may be associated with one or more retail establishments, and/or with a software application associated with facilitating unassisted purchasing of wirelessly tagged products in a retail establishment.

As used herein, the term "human traffic" may include an estimate of a number of people present in a location, as will be described in detail below. The wireless tags may include the wireless tags 1100 as described above. The wireless identification signals may include one or more signals sent from the wireless tags to one or more receivers (e.g., transmitting-receiving device 1400) as described above.

The at least one processor is configured to receive, during a first period of limited traffic activity, first signals transmitted from a plurality of wireless tags to a plurality of receivers within an establishment. For example, the "first period of limited traffic activity" may occur while the retail establishment is closed, such as during overnight hours when there are no people in the establishment, or may occur during low-activity hours (such as early morning hours, or other times when the establishment regularly receives less visitors and/or is staffed by less personnel). The term "limited traffic activity" refers to zero to few people (customers and/or employees) moving around in the establishment. For example, "few people" may include five or fewer people in the establishment. In some embodiments, "few people" may be a configurable parameter and may be related to a physical size of the establishment. For example, in a small establishment, "few people" may be three or fewer people, while in a large establishment, "few people" may be seven or fewer people. In some embodiments, "few people" may be related to a number of people in the establishment during a high traffic period. For example, if during a high traffic period, there are over 100 people in the establishment, then "few people" may be ten or fewer people.

As will be described in detail below, by having no people or few people in the establishment, it may be possible to obtain "baseline" signal measurements (e.g., obtain signal measurements without interference caused by people but accounting for interference caused by fixtures in the establishment such as shelf 8010, rack 8012, or other physical structure) and when people are in the establishment, the people cause interference with the signal measurements. The difference in the signal measurements between the baseline and the interfered—with measurements may be used to estimate a number of people in the establishment (i.e., the human traffic in the establishment). As another example, the "period of limited traffic activity" may occur at a different time, provided there is a long enough difference in time between the period of limited traffic activity and a period of high traffic activity.

The first signals are received during the first period of limited traffic activity (i.e., a first period of time). The first period of time may be a period of time long enough to receive the signals from all the wireless tags present in the establishment, from most of the wireless tags in the establishment, or from enough wireless tags in each area of the establishment to enable establishing a representative baseline. The plurality of receivers may include a plurality of transmitting-receiving devices 1400 which may be placed in different locations throughout the establishment such that the plurality of transmitting-receiving devices 1400 may receive wireless signals from all (or most) of the plurality of wireless tags 1100 present in the establishment. In some embodiments, only a subset of the plurality of transmitting-receiving devices 1400 may receive each individual wireless signal. In yet other embodiments, the same subset of the plurality of transmitting-receiving devices 1400 may receive wireless signals from a group of wireless tags present in the same location in the establishment, while in other embodiments a different subset of the plurality of transmitting-receiving devices 1400 may receive wireless signals from each individual tag, even when several tags are placed in the same location in the establishment. As used herein, the term "establishment" may include a retail establishment (e.g., a store), a warehouse, or other location where it is desired to estimate the number of people present.

The at least one processor is configured to determine, based on the first signals, baseline signal characteristics for at least one location within the establishment. Signal characteristics may refer to one or more measurable attributes or properties of a signal. For example, signal characteristics may include measurable or discernable characteristics of a signal waveform. Examples of signal characteristics may include signal amplitude, frequency, phase, repetition period, signal duration, signal direction, and angles of arrival and departure, as well as the stability (or lack thereof) over time of such characteristics. In embodiments where the signal includes data, signal characteristics may also include the data content of the signal that may be represented by variations of amplitude, frequency, phase, or angles of arrival and departure over time.

Baseline signal characteristics may refer to measurements or values of one or more of the attributes or properties of the signal when there is no interference with the signal and/or no alteration of those attributes or properties. Regarding the baseline signal characteristics, where the information being sought is manifested in the changes and variations of a signal or a measured quantity (rather than the actual value at a given point in time), it is required to establish a basis around which such changes and variations can be measured. This baseline may be usually measured in the form of a long-term average of the measured signal, or as a measurement performed in a period (or location) where less changes and variations are expected. Examples of this kind of analysis can be found in earthquake and volcano forecasting (where the source of information is a rise in the frequency, duration, or magnitude of micro-tremors in the area, as compared to the long-term averages), in identifying planets revolving around distant star systems (where minute changes in the brightness of the star, caused by the passing of the planet in front of it, can indicate its existence), or in identifying emerging trends in fashion stores (where dips or rises in the sales numbers of particular items, styles, or colors can indicate the start of a new trend). In all these examples, one would need to first perform measurements during some representative period to establish the signal baseline (a period of no seismic activity in the first case, a long-term average of star brightness in the second case, or an average sale rate in the third case) and follow that measurement with an observation period in which deviations from the baseline are measured.

The "at least one location" within the establishment may include any predetermined area within the establishment, ranging from a small area (e.g., a single display rack or shelf section) to a larger area (e.g., a women's section of a clothing store) to the entire area of the establishment. For example, an area of coverage may be based on a range of each receiver in the establishment, a number of receivers in the establishment, and the placement of each receiver in the establishment. In some embodiments, the size of the "at least one location" may be determined by user settings entered via, for example, a user interface associated with the system.

By determining the baseline signal characteristics during a period of limited human traffic activity in the retail establishment, the baseline signal characteristics can be clearly captured without interference created by human traffic. In some embodiments, the baseline signal characteristics may be determined on a periodic basis. For example, the at least one processor may be configured to the baseline signal characteristics by analyzing the attributes or properties of signals received from one or more wireless tags every night while the store is closed. Because products may be moved to a different location within the retail establishment while the establishment is open (for example, by customers or by employees), determining the baseline signal characteristics every night may enable a more accurate determination of the location of each wireless tag and therefore a better baseline. As another example, when a product is sold, the wireless tag associated with the sold product may either be removed from the product and reused or may be deactivated. As such, the wireless tag is no longer associated with the same product and the signal characteristics from this wireless tag would no longer be accurate. In some embodiments, determining the baseline signal characteristics may be triggered manually by a user of the system, for example, via a user interface associated with the system.

In some embodiments, the at least one processor is configured to determine the baseline signal characteristics for the at least one location based on first location determinations of the wireless tags and at least one of amplitude data of the first signals, phase data of the first signals, direction data of the first signals, angle of arrival data of the first signals, angle of departure data of the first signals, and data content of the first signals.

First location determination of a wireless tag indicates a physical location in the environment where the wireless tag is located. For example, the first location determination may indicate that the wireless tag is associated with a product hanging on a particular rack or with a product placed on a particular shelf.

Amplitude data of the first signal may include information relating to a magnitude of a signal, e.g., a distance between maximum and minimum points of a time varying signal (e.g., measured as a distance). A signal may weaken as a distance from a transmitting-receiving device increases. In some embodiments, amplitude information (e.g., measuring signal strength) may be used to determine a distance of a wireless tag from a transmitting-receiving device.

Phase data of the first signal may include information relating to a stage in a repeating pattern of a time varying signal (e.g., measured in degrees or radians). For example, two identical signals emitted at different times may exhibit a different phase. As another example, a broadcasted signal received by two different transmitting-receiving devices at differing locations may be received at a different incident phase by each transmitting-receiving device.

Direction data of the first signal may include information relating to a direction from which the wireless signal was received at the transmitting-receiving device. For example, the direction data may include information relating to an angle of receipt the wireless signal from the wireless tag relative to an axis of the transmitting-receiving device.

Angle of arrival data of the first signal may include a direction from which a wireless signal may be received (e.g., by an antenna of the transmitting-receiving device) from the wireless tag, for example, measured as Azimuth and Elevation. Angle of departure data of the first signal may include a direction from which a wireless signal may be transmitted (e.g., by an antenna of the transmitting-receiving device) to the wireless tag, for example, measured as Azimuth and Elevation. Additionally, or alternatively, angle of arrival data and angle of departure data may be measured in a complementary manner from the perspective of the tag and related to the tag antenna (e.g. as Azimuth and Elevation from an axis of the tag, towards the direction from which a signal was received from a transmitting-receiving device, or to which a signal was sent to the transmitting-receiving device).

Data content of the first signal may include information carried by the first signal, such as price, item code, discount code, location, and/or any other information included in an identifying signal. For example, data content may be embedded in the first signal by producing an information bearing waveform from the data content and convoluting the information bearing waveform with a carrier signal of an antenna (e.g., using AM, FM, and/or PM modulation). In some embodiments, the data content of the first signal may be used to identify a particular wireless tag.

By measuring the signal characteristics while the establishment is empty (or substantially empty), the baseline signal characteristics (i.e., the signal characteristics without interference caused by people) may be determined. For example, without people causing interference, it may be possible to measure the signal characteristics and determine interference sources caused by fixtures in the establishment (e.g., a rack, a shelf, a table, or other physical fixture located in the establishment). By determining interference caused by fixtures, that interference may be distinguished from interference caused by people in the establishment, leading to a more accurate estimate of a number of people present in the establishment, as will be described in detail below.

Figure 22:
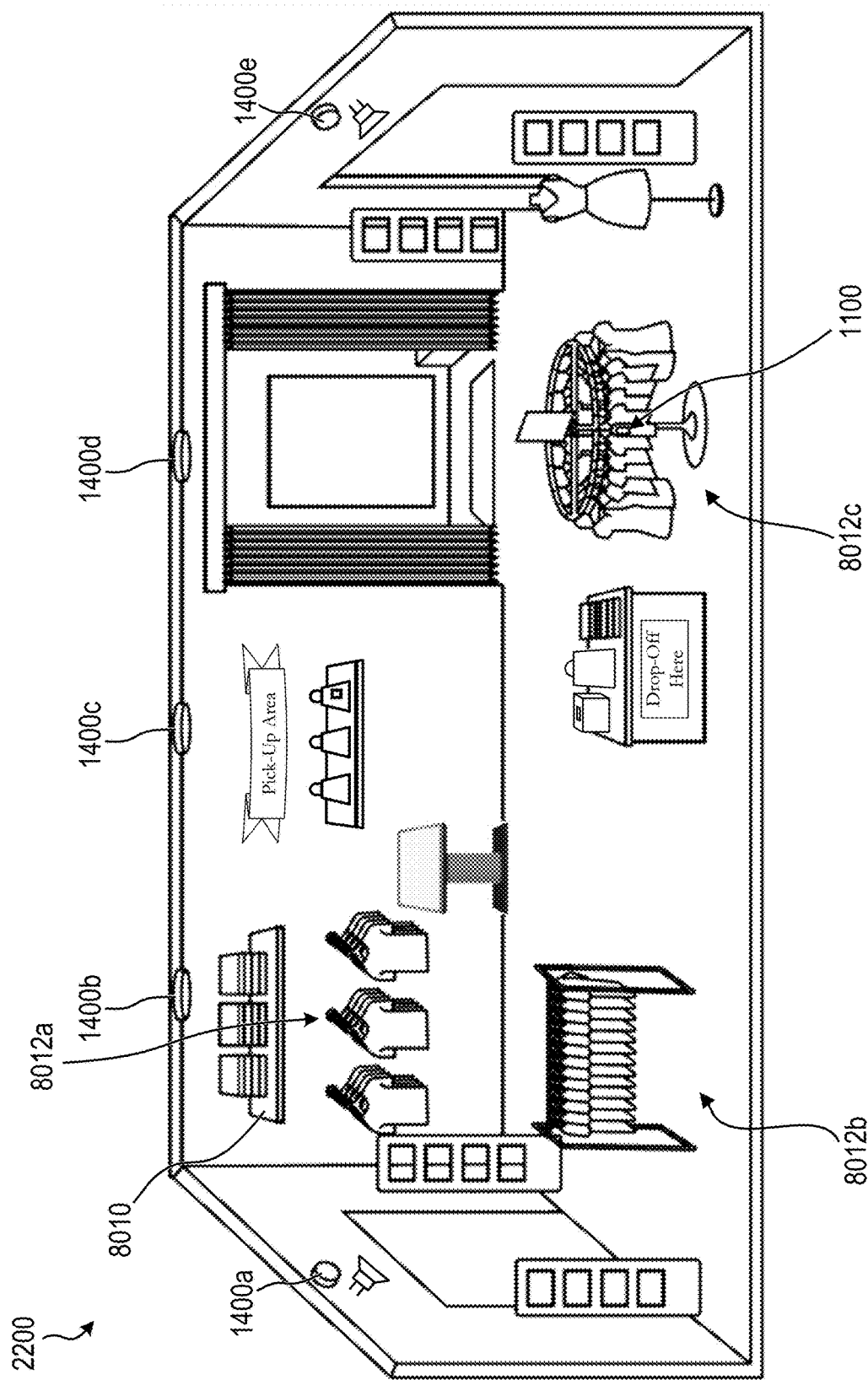
FIG. 22 is an exemplary perspective view of a retail establishment during a first period of limited traffic activity, consistent with disclosed embodiments.

FIG. 22 is an exemplary perspective view of a retail establishment 2200 during a first period of limited traffic activity, consistent with disclosed embodiments. In the first period, retail establishment 2200 is empty (i.e., there are no customers or employees in the retail establishment). For example, the first period may be when the retail establishment is closed, such as during overnight hours. The first signals from the plurality of tags 1100 may be received by transmitting-receiving devices 1400a-1400e without interference from people being in retail establishment 2200. While an ideal scenario is for retail establishment 2200 to be completely empty of customers or employees, it is possible for transmitting-receiving devices 1400a-1400e to receive the first signals during a time period when there are few customers or employees in retail establishment 2200.

The first signals may be received by one or more transmitting-receiving devices 1400a-1400e that are located near wireless tags 1100. For example, for wireless tags 1100 associated with products on shelf 8010, any one or more of transmitting-receiving device 1400b may receive the first signals. As another example, for wireless tags 1100 associated with products on rack 8012, any one or more of transmitting-receiving devices 1400a or 1400b may receive the first signals. As another example, for wireless tags 1100 associated with products on rack 8020, any one or more of transmitting-receiving devices 1400a, 1400b, or 1400c may receive the first signals. As another example, for wireless tags 1100 associated with products on rack 8022, any one or more of transmitting-receiving devices 1400c, 1400d, or 1400e may receive the first signals. It is noted that the signals from the wireless tags 1100 may be received by any transmitting-receiving device 1400a-1400e that is within range of the transmitting-receiving device. It is possible for multiple transmitting-receiving devices to receive the wireless signal from the same wireless tag. In cases where multiple transmitting-receiving devices 1400a-1400e receive the wireless signal from the same wireless tag 1100, it may be possible to more accurately estimate a location (e.g., with a finer granularity) of interference of signals received from the wireless tags 1100.

The at least one processor is configured to receive, during a second period of increased traffic activity, second signals transmitted from the plurality of wireless tags to the plurality of receivers within the establishment. The second period of increased traffic activity may be any later time period or point in time after the first period in which the baseline signal characteristics have been established. For example, the second period may be a length of time, e.g., 12:00 μm to 12:30 pm on Saturday. Other lengths of time may be used by the system to determine the second period of increased traffic activity without altering the overall operation of the system. As another example, the second signals may be continuously received, i.e., the second period may begin at any time after the baseline signal characteristics have been determined and may extend over any period of time. The second signals are similar to the first signals in that the signals are wireless signals received by transmitting-receiving devices 1400a-1400e from the plurality of wireless tags 1100. The difference between the second signals and the first signals is that the second signals are received at a later point in time than the first signals. Thus, the second signals may be received by transmitting-receiving devices 1400a-1400e in manner similar to reception of the first signals by transmitting-receiving devices 1400a-1400e.

The at least one processor is configured to determine, based on the second signals, signal characteristics for the at least one location during the second period. In some embodiments, the signal characteristics determined during the second period may be similar to the baseline signal characteristics determined during the first period. For example, if the baseline signal characteristics were determined using only the amplitude data of the first signals, then the signal characteristics during the second period may also be determined using only the amplitude data of the second signals. Using the same signal characteristics during the first period and the second period may enable better comparison of the signal characteristics between the first period and the second period.

The "at least one location during the second period" may be the same location as the at least one location used in the first period to determine the baseline signal characteristics. In some embodiments, to enable a better comparison between the signal characteristics measured during the first period and the signal characteristics measured during the second period, the same location is used in both the first time period and the second time period. For example, if the establishment is a clothing store and it is desired to measure traffic near one or more racks including products on sale, the at least one location may be defined to be an area around the physical location of the one or more racks. In some embodiments, the area may be defined by a user through a user interface of the system, including, for example, identifying the one or more racks either by a rack identifier, by a map, or by selecting an area on a graphical representation of a layout of the establishment.

Figure 23:
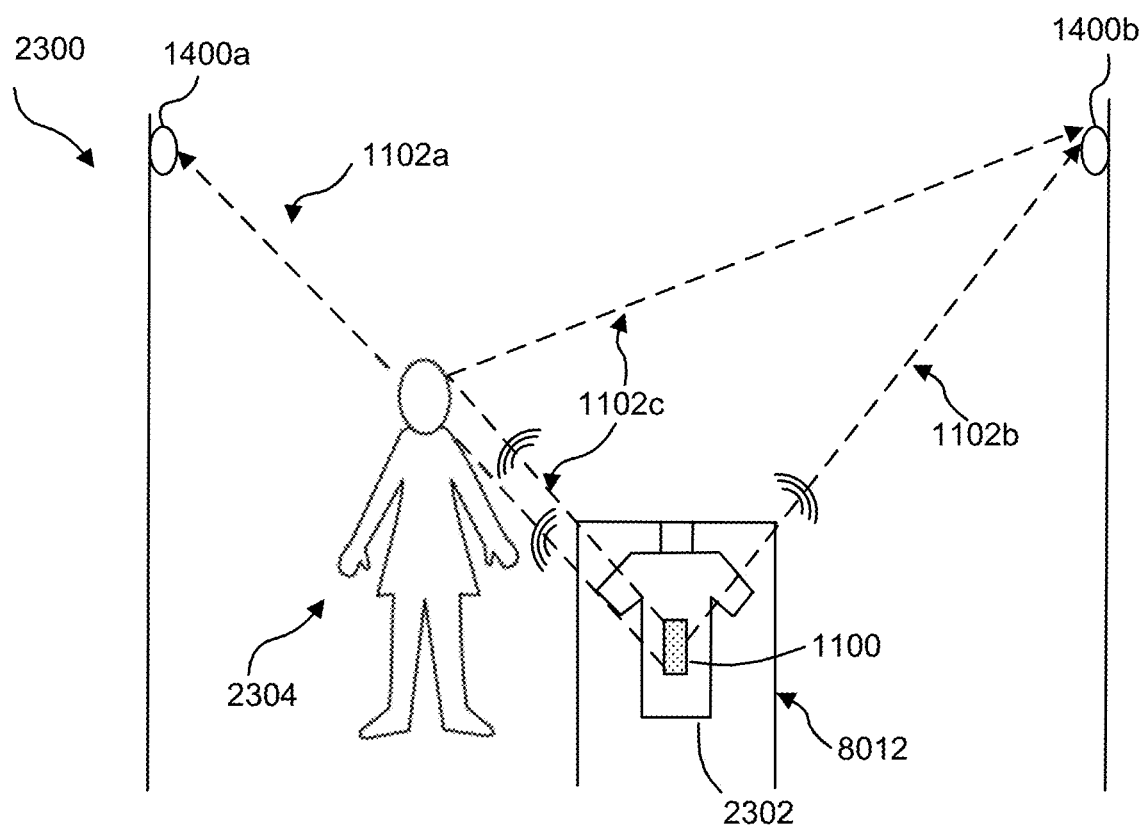
FIG. 23 is an exemplary side view of a portion of the retail establishment during a second period of increased traffic activity, consistent with disclosed embodiments.

FIG. 23 is an exemplary side view of a portion of a retail establishment 2300 during a second period of increased traffic activity, consistent with disclosed embodiments. During the second period, second signals from the plurality of wireless tags 1100 are received by transmitting-receiving devices 1400a and 1400b. When there are customers in the retail establishment, the customers interfere with the second signals, resulting in changes in the received signal characteristics of the second signals as compared to the first signals, as will be described below.

For example, customer 2304 stands near rack 8012 which includes several products, each with its own wireless tag 1100 (for example, a shirt 2302). As shown in FIG. 23, customer 2304 is positioned between rack 8012 and transmitting-receiving device 1400a such that the signal characteristics of a second wireless signal 1102a received by transmitting-receiving device 1400a from a wireless tag 1100 located on rack 8012 are affected by the presence of customer 2304. The presence of customer 2304 is detected by the deviations of the signal characteristics of the second signals from the baseline signal characteristics. For example, customer 2304 creates interference in the signal characteristics (in the form of blockages, attenuations, reflections, etc.) that may be measured by transmitting-receiving device 1400a, traced to the location (e.g., rack 8012) of wireless tags 1100 whose readings were interfered with, and translated to a traffic activity estimation of the location near rack 8012.

A second wireless signal 1102b may also be received by transmitting-receiving device 1400b and whether transmitting-receiving device 1400b measures similar signal characteristics as transmitting-receiving device 1400a may be used to more accurately estimate the location of customer 2304 relative to rack 8012. In some embodiments, second wireless signal 1102a may be the same signal as second wireless signal 1102b with the difference between the signals 1102a and 1102b being which transmitting-receiving device receives the signal. For example, if rack 8012 contains multiple different products, by more accurately estimating the location of customer 2304 relative to rack 8012, it may be possible to determine which products customer 2304 was looking at or interacting with based on the products' location on rack 8012 (which may be able to be determined from the baseline signal characteristics).

In some cases, the customer 2304 can cause some of the energy of signal 1102a (which may have a trajectory towards device 1400a) to be reflected back towards transmitting-receiving device 1400b in the form of a third signal, 1102c. This may cause signals 1102b and 1102c to be received together by transmitting-receiving device 1400b, which (depending on the signal characteristics of the two signals 1102b and 1102c) may cause the total received signal to be different than the signal 1102b when received by itself (e.g., in the first time period when the customer 2304 was not present). This difference can further be used to more accurately estimate the location of customer 2304, and to better determine the level of engagement that should be assigned to customer 2304 with regard to items on rack 8012.

The at least one processor is configured to compare the baseline signal characteristics to the signal characteristics during the second period to determine deviations from the baseline signal characteristics in the at least one location. The comparison may be performed using any known comparison method. In some embodiments, a "deviation" from the baseline signal characteristics may be a percentage difference or may be an absolute difference between the signal characteristics during the second period and the baseline signal characteristics. In some embodiments, for a difference between the signal characteristics during the second period and the baseline signal characteristics to be considered a "deviation," the difference may need to exceed a predetermined threshold. For example, the difference may need to exceed 5% to be considered to be a deviation from the baseline signal characteristics. Other values for the threshold may be used, e.g., 10%, 20%, or more. In some embodiments, the threshold may be determined by user settings entered via, for example, a user interface associated with the system.

The at least one processor is configured to estimate a level of traffic activity in each location of the at least one location based on the deviations from the baseline signal characteristics in the at least one location. Because the human traffic in the retail establishment interferes with the signals received from the wireless tags (e.g., in the form of blockages, attenuations, reflections, etc.), it is possible to estimate where and when people are moving around the retail establishment. By determining the baseline signal characteristics of all the wireless tags in the retail establishment, the location of all the wireless tags may be determined and the respective signals measured by the signal characteristics. As people are moving around in the retail establishment, the measured signal characteristics from the wireless tags may be different. Knowing the baseline signal characteristics and the location of each of the wireless tags may enable the system to estimate the level of traffic activity in each location in the retail establishment.

In some embodiments, the at least one processor is further configured to generate a traffic heatmap for the establishment based on the deviations from the baseline signal characteristics in the at least one location. A heatmap is a graphical representation of a measured quantity, overlaid over a map or diagram of the area over which the quantity was measured or observed. The map can be either geographic or architectural (e.g., a map of the country overlaid with temperature or precipitation statistics, or a floorplan of a mall overlaid with sales per square foot numbers), or representative only (e.g., a diagram of the New York City subway system, overlaid with average passenger traffic per hour on each station and leg). The overlaid quantity may be any measure or observation that the creator of the heatmap may choose to present in relation to the underlying map. The name "heatmap" is derived from the common use in weather forecasting and observation, where a map of a geographical area is overlaid with a color gradient corresponding to the measured (or forecasted) temperature. Because of these origins, it is most common to use blue-to-red color gradients to represent lower (blue) and higher (red) values on the map, but other variations may also be used (e.g., green-to-red color gradients, white-to-black brightness gradients, pattern density gradients, etc.). Similarly, the traffic heatmap generated herein may be a graphical representation of human traffic in the retail establishment. As discussed above, the level of traffic activity may be determined based on the difference in the signal characteristics in the second period relative to the baseline characteristics. The difference may be plotted in the form of a heatmap to visually depict the level of traffic activity in the retail establishment.

Figure 24:
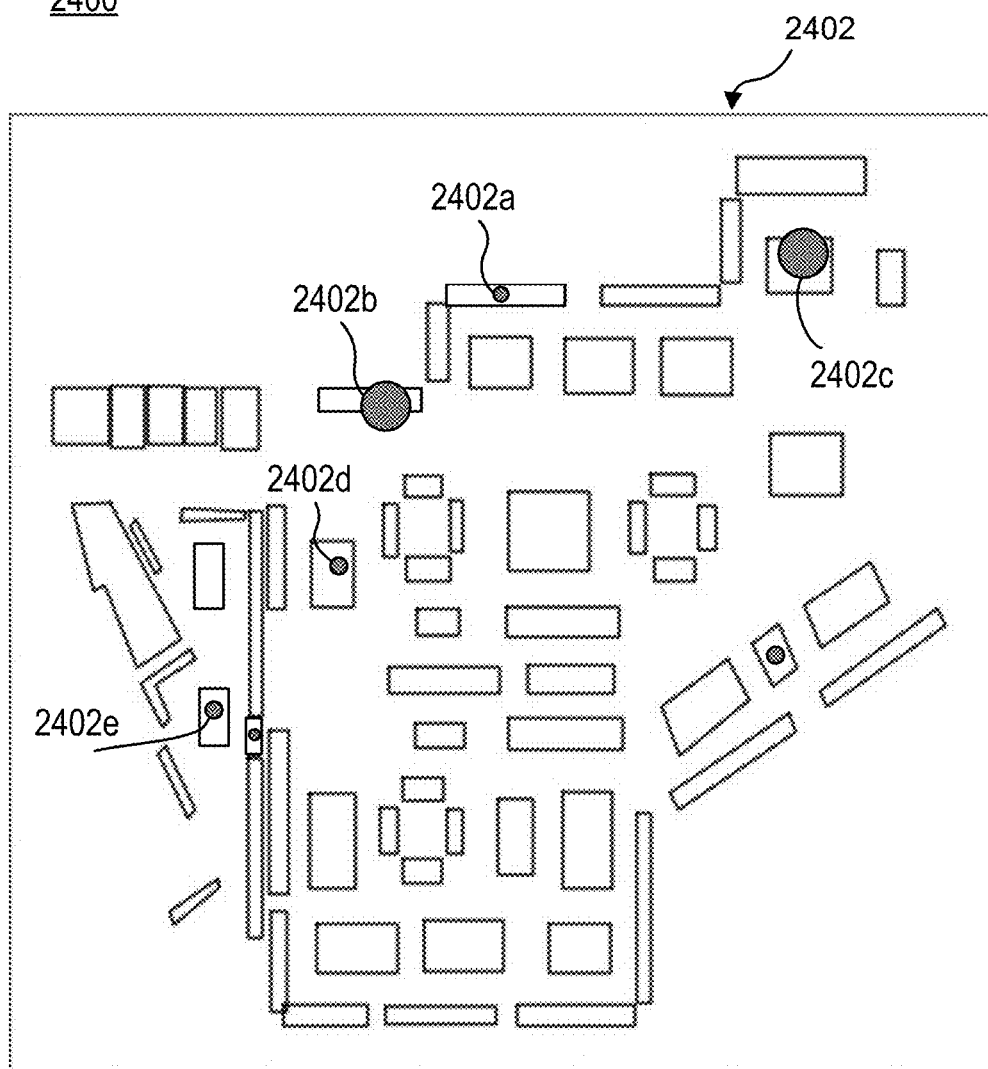
FIG. 24 is an exemplary overhead view of a retail establishment with a heatmap of estimated human traffic in the retail establishment, consistent with disclosed embodiments.

FIG. 24 is an overhead view of a retail establishment 2400 with a heatmap 2402 of estimated human traffic in the retail establishment, consistent with disclosed embodiments. As shown in FIG. 24, heatmap 2402 includes several clusters of estimated human traffic, shown as 2402a through 2402e wherein a size of the cluster represents more estimated human traffic in a given location in the retail establishment. For example, heatmap 2402 may represent a specific point in time (e.g., 5:15 pm) and at this point in time, there are higher levels of human traffic in areas 2402b and 2402c as shown by the larger cluster sizes.

While FIG. 24 shows an overhead view of retail establishment 2400, heatmap 2402 may be displayed over other views of the retail establishment, including a portion of the overhead view (e.g., one section or department of the retail establishment), a perspective view of the entire retail establishment (such as retail establishment 2200 in FIG. 22) or a portion of the retail establishment, or a side view of a portion of the retail establishment. Other views are possible within the scope of the disclosed embodiments. Moreover, as discussed above, the heatmap may also be displayed in the form of colored contour maps instead of the clusters as illustrated in FIG. 24.

In some embodiments, the at least one processor is further configured to recommend positioning of products in the establishment based on the heatmap. A recommendation may be a type of notification that may include a possible action that the receiver of the notification may choose to perform. A notification may be a signal generated by a component of one system, used to alert another component of the system, a different system, or a person (or any combination of the above) of the occurrence of a certain event. The notification may be audible (e.g., beeping or another alarm sound), visual (e.g., flashing lights, colored light display), another sensory signal (such as vibration or other haptic signals), or a digital signal (such as a notification signal to an app on a mobile device) among other forms.

The recommendation may include a graphical indication of high traffic areas on the heatmap. Further, the recommendation may include specifying those high traffic areas one or more locations at which particular products should be placed to drive up sales of those products because there is higher traffic at those one or more locations. In some embodiments, the products to be recommended for positioning may be manually selected by a user of the system. For example, in a clothing store, the user may select a product category of "sweaters" to sell when seasons change and customers are more likely to be shopping for sweaters. The recommendation may then identify high traffic areas on the heatmap and include suggested locations to place the sweaters where the sweaters are more likely to be seen by customers.

In some embodiments, the products to be recommended for positioning may be automatically selected by the system based on criteria selected by the user. For example, the user may want to increase sales of products priced over $30. The recommendation may then identify high traffic areas on the heatmap and include suggested locations to place the products priced over $30 (regardless of the products' categories) where the products are more likely to be seen by customers. Other criteria may be selected by the user without affecting the overall operation of the system. For example, the other criteria may include any one or more of: price, color, size, style, category, and other product characteristics that may be used to categorize or quantify the product.

In some embodiments, the at least one processor is further configured to calculate a plurality of traffic activity level estimates over time. For example, the traffic activity level estimates may extend over a period of time, such as an hour (e.g., 12:00 μm to 1:00 pm), a portion of a day that the retail establishment is open for business (e.g., 10:00 am to 1:00 pm), one entire day that the retail establishment is open for business (e.g., 10:00 am to 6:00 pm), or any other time period. As another example, the traffic activity level may be calculated periodically (e.g., over every 30 minutes or over another length of time) during a longer time period (e.g., the longer time period may span several hours or an entire day that the retail establishment is open for business). As another example, the traffic activity level estimates may be calculated on a continuous basis, e.g., in real-time, in near real-time, or as a moving-average calculation, such that in real-time or in near real-time an average is calculated for the last hour, the last fifteen minutes, the last four hours, or any other time period. For example, receiving the second signals and performing the calculations may take a short period of time such that the estimates can be generated in near real-time. The traffic activity level estimates may be recorded, e.g., in a memory in the system or in a memory remote from the system, such as a cloud-based storage. A recording of the traffic activity level estimates may be played back at a later point in time, for example, like a "movie" of the traffic activity level estimates over any desired period of time during which the estimates were calculated.

In some embodiments, the at least one processor is further configured to recommend staffing of the establishment based on the plurality of traffic activity level estimates over time. For example, if the plurality of traffic activity level estimates over a certain time period (e.g., 12:00 μm to 3:00 pm on weekdays) indicate a relatively low traffic activity level in the establishment, the recommendation may indicate that a fewer number of employees need to be present to handle the traffic level in the establishment. As another example, traffic activity level estimates may be made over several predetermined time periods (e.g., from 9:00 am to 12:00 μm, from 12:00 pm to 3:00 μm, from 3:00 μm to 6:00 μm, and from 6:00 μm to 9:00 pm). The traffic activity level estimates during these predetermined time periods may then be compared to each other to determine the recommended staffing of the establishment. For example, if the time period from 6:00 µm to 9:00 pm indicates a higher traffic activity level than the time period from 12:00 µm to 3:00 µm, then the recommended staffing of the establishment may include recommending more employees be present from 6:00 µm to 9:00 pm than are present from 12:00 µm to 3:00 µm.

In some embodiments, the recommended staffing of the establishment may also be based on historical information regarding staffing levels and user-specified parameters, such as a minimum number of employees or a maximum number of employees. For example, if the user specifies that there should be at least six employees in the establishment and the traffic activity level estimates recommend five employees, the recommendation may be changed to indicate the minimum six employees. As another example, the recommendation may indicate five employees based on the traffic activity level estimates while also noting to the user that the user had set a minimum level of six employees. In such circumstances, the user may wish to adjust the minimum number of employees to accommodate the traffic activity level estimates.

In some embodiments, the at least one processor is further configured to receive information on a number of staff present in the establishment and adjust the estimated level of traffic activity to omit staff-related traffic activity. By adjusting the estimated level of traffic activity to omit staff-related traffic activity, it may be possible to obtain a more accurate estimate of customer-related traffic activity in the establishment. For example, if there are currently six staff members working in the establishment, then the estimated traffic activity level may be reduced by six people, to properly account for the number of staff members currently working so that the estimates more accurately reflect customer traffic activity levels. Continuing this example, if the traffic activity levels estimate that there are 22 people in the establishment at a given point in time and there are six staff members present, then the customer traffic activity level at the given point in time may be estimated to be 16 people. The number of staff members present may be entered into the system by a user via a user interface associated with the system or may be automatically derived from staff schedules accessible by the system. In some embodiments, the number of staff members present may be derived from a staff presence system used by the establishment (such as a card reader where staff need to "punch in" and "punch out" as they enter or leave the establishment, respectively), or directly from the traffic estimates, where human traffic measured just before opening of the establishment or just after closing may be used to indicate the presence of staff at the establishment at those times.

In some embodiments, the at least one processor is further configured to identify, from the deviations from the baseline signal characteristics in the at least one location, trajectories of individual persons passing through the establishment. A trajectory of a person is the path of movement of the person through the establishment. For example, the trajectory may refer to a sequence of locations of a person over a period of time. The trajectory of an individual person may refer to a sequence of positions or locations of that person over a period of time, which together may represent a path over which that person followed as that person moved around the physical layout of the retail establishment.

For example, based on a timestamp (e.g., a specific point in time, such as 12:05 pm) associated with each of the deviations from the baseline signal characteristics, it may be possible to identify the trajectory of an individual person as that person moves through the establishment. For example, referring to FIG. 22, if a first deviation from the baseline signal is detected by transmitting-receiving device 1400a at a first time (e.g., indicating that a customer is near rack 8020) and a second deviation from the baseline signal is detected by transmitting-receiving device 1400b at a second time later than the first time (e.g., 15 seconds later, though other time intervals are possible and contemplated, and indicating that the customer is now near rack 8012), it may be possible to determine that the trajectory of the customer is from near rack 8020 to near rack 8012. In some embodiments, the granularity of the trajectory (e.g., the accuracy of the path of movement in the establishment) may be based on the number of tags 1100 in the establishment, their distribution in the establishment, and the rate of transmission. In other embodiments, the granularity and accuracy of the trajectory may be determined by the accuracy of the system's location estimation of the tags and the distribution of transmitting-receiving devices 1400 in the establishment.

In some embodiments, the at least one processor may be configured to determine which wireless tags are being interfered with, but not necessarily from which direction. This may occur, for example, when multiple tags experience interference that the processor may analyze to determine where a person is standing in the store. As an example, there may be a minimum density of tags (e.g., a minimum number of wireless tags in a given location in the establishment) and/or a minimum transmission rate for the wireless tags that allows the processor to detect traffic at a high enough accuracy to generate a person's trajectory in the establishment.

Determining a person's trajectory in the establishment may be possible based on the known locations of the plurality of wireless tags as determined when the baseline signal characteristics are determined. By knowing the locations of the wireless tags, a timestamp of when the deviations from the baseline signal characteristics occur, and the location of the transmitting-receiving device (or the multiple transmitting-receiving devices) in the establishment that received the second signals, a person's trajectory through the establishment may be identified. In some embodiments, the trajectories of individual persons may be displayed as an overlay to a graphical representation of a layout of the establishment, in a similar manner as the heatmap described in FIG. 24. In some embodiments, the trajectories may be displayed at the same time as the heatmap. For example, the different trajectories may be displayed as lines with different colors (e.g., red, green, blue, etc.) or line patterns (e.g., solid, dashed, dotted, etc.).

In some embodiments, the at least one processor is further configured to identify a plurality of particular products in the establishment associated with engagement events. A "particular product" is a product that the customer engages with and may be identified by tracking the wireless tag associated with the product as the customer moves in the establishment with or near the product. "Engagement" is the show of interest in the product by the customer. In the physical store this might include, for example, touching the product, taking the product off of its display (a shelf, a stack, or another display type), taking the product with the customer to other places in the store, and taking the product to a fitting room to try on. Under some engagement schemes, taking a product to the register in the physical store without finalizing the actual transaction may still indicate that the customer is in an "engagement" phase. It may be beneficial to discern between the various steps of the journey even in those later stages of the sale process, as this is where the "cost" of losing a customer is highest (as they are much more likely to actually want to complete the purchase if they arrived at this point).

For example, the engagement event may include a customer standing near a product for a predetermined length of time (e.g., longer than one minute). The length of time constituting an engagement event may be user configurable and may vary depending on the type of product or how the product is displayed. For example, clothing displayed on a rack or a shelf may have a shorter length of engagement time than a book or a product in a box (e.g., a toy or a small appliance).

In some embodiments, the at least one processor is further configured to assign at least two of the particular products to a single engagement basket, based on a correlation between the at least two particular products and the trajectory of at least one individual person through the establishment. A "single engagement basket" may include a group of items that one or more customers may engage with or that may be related to each other in some way. For example, the single engagement basket may include several products (e.g., at least two products) that were seen together (e.g., as in a "look" displayed on a mannequin in the establishment), engaged with together (e.g., taken together to the establishment's fitting room), or purchased together (as part of a single transaction). Additionally, or alternatively, the single engagement basket may include several products (e.g., at least two products) that were engaged with by a single customer at different points during the customer's journey (or trajectory) through the establishment, such as one product seen on a mannequin and one that was seen on a shelf, or one product that was taken from one display and a second product taken by the same customer from a different display, or any other combination of two or more engagement events by the same customer in the same journey (or trajectory). Considering baskets of products may help a retailer understand the relations between different items in their collection and to inform ordering, advertising, and placement decisions.

In addition to identifying the trajectory of an individual moving through the establishment, the deviations from the baseline signal characteristics of the wireless tags may also be used to track movement of one or more products through the establishment based on their associated wireless tags, thereby establishing a correlation between the products and the trajectory (i.e., the correlation between the products and the trajectory is an engagement event). For example, if a customer selects pants and a shirt to try on in a fitting room, it may be possible to identify the trajectory of the customer and the selected pants and shirt from the locations in the establishment where the customer initially picked up the pants and shirt and how that customer moved through the establishment to the fitting room. Because the customer selected the pants and shirt and carried them together to the fitting room, the selected pants and shirt may be considered to belong to a "single engagement basket." It is noted that any number of products may be part of the single engagement basket. By tracking the products in the single engagement basket together with the trajectory of the customer, it may be possible to collect data about combinations of products that customers like to browse, try on, and purchase together.

In some embodiments, the processor may store an indication of the products in a single engagement basket in a database associated with the establishment, where the pairings may be analyzed. For example, a basket data structure may be created and include identifiers of each of the products in the single engagement basket. As another example, a product data structure may include fields to identify related products from a single engagement basket. Other ways to associate the products in a single engagement basket are contemplated.

In some embodiments, the at least one processor is further configured to recommend a display pairing of the particular products in the single engagement basket. A "display pairing" may include a recommendation to place and or display the particular products together on the sales floor, a recommendation to display the particular products together in a display window or advertisement, or a recommendation to display the particular products together on the store's website either next to one another in a product browsing screen or as recommendations for the customer when looking at the product page of one of the particular products.

For example, if the same two products appear in multiple single engagement baskets (e.g., either as an absolute number of occurrences or a number of occurrences over a predetermined period of time), then a recommendation may be made to display those two products together. As an example, if ten customers over a two hour time period select the same combination of pants and a shirt, then the recommendation may be made to display the pants and shirt near each other in the establishment. For example, by placing the pants and shirt on a same display table or dressing a display mannequin to wear the pants and shirt. For example, the recommendation may be presented to the user of the system as a notification in a user interface. In some embodiments, the display pairing recommendation may be combined with a recommended location in the establishment (e.g., based on the heatmap) to place the display pairing.

In some embodiments, the at least one processor is further configured to identify the trajectory of a non-purchaser through the establishment. A "non-purchaser" may include a person who is at least one of: a customer that did not buy anything, a staff member, or another person who is not a potential customer, such as cleaning staff, security personnel, or a vendor representative. For example, a "non-purchaser" may include any person whose trajectory through the establishment does not match the trajectory of any products (e.g., no product trajectory associated with a wireless tag's trajectory through the establishment matches the person's trajectory). As another example, a "non-purchaser" may include a person whose trajectory matches at least one of the products (e.g., product trajectory associated with a wireless tag's trajectory through the establishment matches the person's trajectory) but where no sale was completed. The trajectory of a non-purchaser may be identified in a manner similar to identifying the trajectory of at least one individual person as discussed above.

As another example, if the trajectory of a large number of wireless tags matches a person's trajectory, then that person may be considered a "non-purchaser." For example, if an employee is moving a stack of ten shirts from a storeroom to a display location, that movement may be considered to be the movement of a "non-purchaser." In some embodiments, this determination may be assisted by additional data from the wireless tags such as a product identifier. For example, if ten shirts of the same style and size (as indicated by their associated wireless tags) are moving through the establishment together, it may be considered that this movement is likely caused by an employee.

In some embodiments, the at least one processor is further configured to adjust the estimated level of traffic activity based on the trajectory of the non-purchaser. Traffic activity levels that are derived from non-purchasers (rather than from customers) may be removed from the estimated level of traffic activity (i.e., "adjusting" the estimated level of traffic activity), making it a more accurate measure of customer traffic activity. For example, the trajectories of non-purchasers may be removed from the identified trajectories of customers to more accurately estimate the level of traffic activity in the establishment. For example, the trajectory of each person in the establishment may be recorded as a data structure in a database associated with the establishment. The trajectory of a non-purchaser may be identified via a flag or similar indicator in the data structure. When the trajectories of people in the establishment are displayed, the trajectories of non-purchasers may be identified by the flag or similar indicator and not displayed.

In some embodiments, the at least one processor is configured to receive location information of a plurality of products within the establishment. For example, the location information for each of the plurality of wireless tags may be received during the first period and during the second period, thereby determining the location of the associated products. For example, the location information of a wireless tag may be determined based on which transmitting-receiving device receives the first signal or the second signal from the wireless tag and corresponding signal characteristics, such as angle of arrival data or angle of departure data.

In some embodiments, the at least one processor is configured to calculate, from the location information of the plurality of products and the level of traffic activity in each location of the at least one location, an impression score for each product. An "impression" is the first exposure of the customer to the product. In the physical store, this may include a customer seeing a product on display (whether on the shelf, on a hanger, on a mannequin, or other display feature). The impression score may be measured either as a rate, as a proportion of the customers receiving the impression, either as an average over a certain period of time or as a rate over a certain category of products, or as a normalized or unitless score (such as on a five-star scale, or a measure of standard deviations above or below a certain average) that provides a standard metric to compare between products, categories, stores, or other comparison criteria that might have different base rates. For example, the impression score may be based on a count of the number of customers or the proportion of total number of customers in the establishment at a given point in time who walk past (or stop next to) the display where the product is located. For example, if the traffic activity level near the display for the product is high, then a high impression score may be calculated for that product. For example, referring to FIG. 8, because multiple customers are near rack 8020, a product located on rack 8020 may have a high impression score (e.g., a score of 95 on a scale of 1-100).

In some embodiments, the at least one processor is further configured to receive, during the first period, a first signal transmitted from a given one of the wireless tags at a first location. For example, the first location may include an initial location for the given wireless tag and its associated product when the establishment opens for business. For example, prior to opening for business, the given wireless tag may be associated with a shirt located on a particular rack in the establishment and the first signal may be used to determine the baseline signal characteristics for the given wireless tag. During the first period, the first location of the shirt (i.e., the particular rack) may be received. In some embodiments, the first signal from the given wireless tag may be received at a later point in time than the wireless signal from the given wireless tag used to determine the baseline signal characteristics. For example, the baseline signal characteristics may be determined at 8:00 am and the first signal may be received at any time after 8:00 am (e.g., 11:00 am).

The at least one processor is further configured to receive, during the second period, a second signal transmitted from the given one of the wireless tags at a second location different from the first location. For example, between the time the first signal is received and the time the second signal is received, the product associated with the given wireless tag may be moved from the first location in the establishment to the second location in the establishment. For example, a customer may pick up a shirt from one display area (i.e., the first location as identified by the first signal transmitted by the wireless tag during the first period) and then place the shirt in a second display area or a "return to shelf" area (i.e., the second location as identified by the second signal transmitted by the wireless tag during the second period) for an employee to return the shirt to its correct display area.

The at least one processor is further configured to determine the deviations from the baseline signal characteristics based, at least in part, on the first signal and the second signal. The first signal is used to determine the baseline signal characteristics. The second signal is used to determine the deviations from the baseline signal characteristics. The deviations from the baseline signal characteristics may be used to determine that the second location is different from the first location. The transmitting-receiving device 1400*a*-1400*e* that received the signal from wireless tag 1100 during the first period in the first location to establish the baseline signal characteristics does not need to be the same transmitting-receiving device that receives the signal from wireless tag 1100 during the second period or in the second location (i.e., the second signal). For example, referring to FIG. 22, transmitting-receiving device 1400*e* may receive the first signal from wireless tag 1100 located on rack 8022 during the first period, indicating that the first location of the wireless tag is rack 8022. Transmitting-receiving device 1400*a* may receive the second signal from wireless tag 1100 located near rack 8020 during the second period, indicating that the second location of the wireless tag is rack 8020. For example, a customer may have taken the product associated with wireless tag 1100 from rack 8022 after the first period and may be holding the product and standing near rack 8020 during the second period.

In some embodiments, the at least one processor is further configured to estimate the level of traffic activity in each of the at least one location independent of image data of the at least one location. The system, method, and non-transitory computer-readable medium described herein do not require cameras to take images of the establishment to estimate a level of traffic activity in the establishment. As described herein, the plurality of wireless tags and measurements of signal characteristics from the wireless tags may be used to estimate the level of traffic activity in the establishment.

In some embodiments, each wireless tag is configured to transmit a unique ID signal and is attached to an associated product within the establishment. The unique ID signal may be part of the data content of the first signal and the second signal and may be transmitted in a similar manner. The unique ID may be associated with the product when the wireless tag is attached to the product, for example, by scanning the wireless tag before the wireless tag is attached to the product or by scanning the wireless tag after the wireless tag is attached to the product. The wireless tag may be attached to the product as discussed elsewhere in this disclosure, for example, in connection with FIGS. 2-4. By associating a unique ID with each product, data relating to impressions, engagement, and the contents of an engagement basket may be collected and processed as described herein. The wireless tag may be attached to the associated product within the establishment or prior to the associated product's arrival in the establishment in any manner as described herein.

Figure 25:
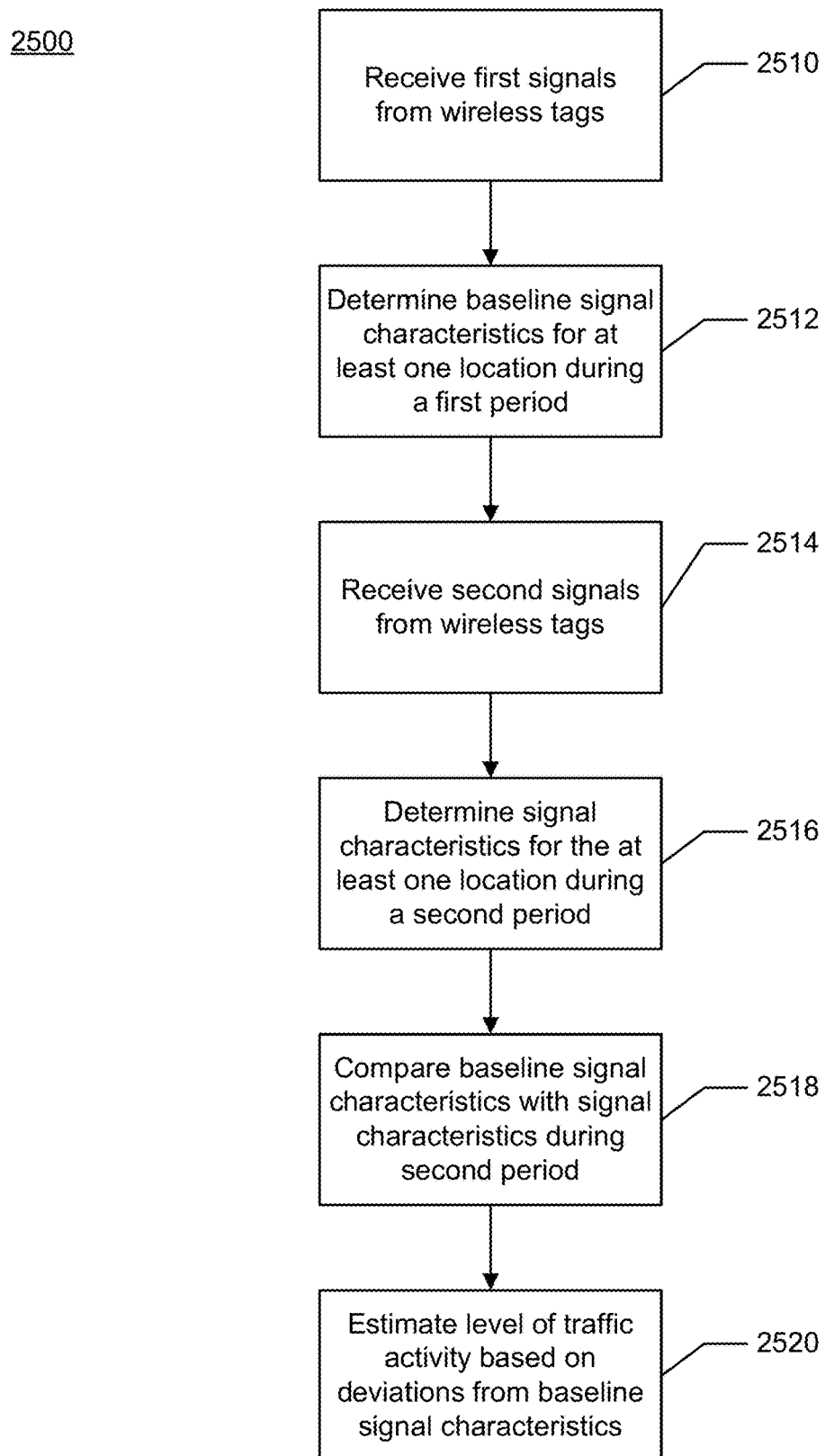
FIG. 25 is a flowchart of an exemplary method for detecting human traffic in an establishment, consistent with disclosed embodiments.

FIG. 25 is a flowchart of a method 2500 for detecting human traffic in an establishment, consistent with disclosed embodiments. First signals from a plurality of wireless tags are received (step 2510). For example, the first signals may be received by a plurality of transmitting-receiving devices during a first period of limited traffic activity in the establishment. The first period may be a period of time when the establishment is closed or when there is little human traffic in the establishment.

Baseline signal characteristics for at least one location in the establishment during the first period are determined based on the first signals (step 2512). Signal "characteristics" may include measurable or discernable characteristics of a signal waveform, or indications relating to the circumstances of the reception of the signal (e.g., a timestamp of the reception, which transmitting-receiving devices received the signal, etc.). The baseline signal characteristics for the at least one location may be based on first location determinations of the wireless tags and at least one of: amplitude data of the first signals, phase data of the first signals, direction data of the first signals, angle of arrival data of the first signals, angle of departure data of the first signals, or data content of the first signals. For example, the data content may include a unique ID of the wireless tag.

Second signals from the plurality of wireless tags are received (step 2514). For example, the second signals may be received by the plurality of transmitting-receiving devices during a second period of increased traffic activity in the establishment. The second period may be a specific point in time or a period of time during which the establishment is open for business and customers and employees are moving around in the establishment. Signal characteristics for at least one location in the establishment during the second period are determined based on the second signals (step 2516).

The baseline signal characteristics are compared with the signal characteristics during the second period (step 2518). The comparison may be performed using any known comparison method. As used herein, a "deviation" from the baseline signal characteristics may be a percentage difference or may be an absolute difference between the signal characteristics during the second period and the baseline signal characteristics.

The level of traffic activity in the establishment is estimated based on deviations of the signal characteristics during the second period from the baseline signal characteristics (step 2520). Because the human traffic in the retail establishment interferes with the signals received from the wireless tags (in the form of blockages, attenuations, reflections, etc.), it is possible to estimate where and when people are moving around the retail establishment. By determining the baseline signal characteristics of all the wireless tags in the retail establishment, the location of all the wireless tags can be determined and the respective signals measured by the signal characteristics. As people are moving around in the retail establishment, the measured signal characteristics are different. Knowing the baseline signal characteristics and the location of each of the wireless tags enables the system to estimate the level of traffic activity in each location in the retail establishment.

The growth and convenience of e-commerce have shifted retails sales from physical to digital channels unassisted by agents representing an interest of retail establishments, potentially increasing a risk of fraud and theft. Disclosed embodiments provide a system for unassisted purchasing in a retail establishment. The system may include a plurality of wireless identification tags connected to (e.g., or otherwise associated with) a plurality of items for sale. These wireless identification tags may facilitate tracking items offered for sale in a retail establishment until completion of a sale. Tracking by the wireless identification tags may facilitate unassisted purchasing (e.g., self-checkout) in a retail establishment while hampering attempts of fraud or theft.

Some embodiments involve a system for unassisted purchasing of wirelessly tagged products in a retail establishment. A purchase (or purchase transaction, e.g., purchasing) may include an economic transaction where one party (a seller) provides a product or a service (the purchased product) to a second party (the buyer), and the second party provides compensation (money, money-equivalent assets, another product or service, or a commitment to provide such compensation at some future time) in return. A purchase (or purchase transaction) may be performed in a place of business of the seller (e.g., a store), where the product or service is provided to the buyer immediately, or remotely as in over a phone call or internet connection, where the product or service is committed to be provided to the buyer at some future time (e.g., by delivery, or by the buyer coming to the seller's place of business or to some other agreed-upon location, to receive the product or service). A purchase may be performed with assistance from the seller (or a representative of the seller, such as a sales associate, clerk or store staff), or it may be performed without such assistance (e.g., unassisted purchasing). Unassisted purchasing may include implementing a transaction without participation of an agent representing an interest of a seller, for example, by substituting a seller with a digital platform. Examples of unassisted purchasing may include directly purchasing goods or services via a seller's website or other e-commerce platform, using a self-service kiosk or similar apparatus located in a retail establishment, and/or using a self-checkout application installed on a mobile or portable device used by the buyer.

An establishment may include an organization, an institution, a business, and/or a building or portion thereof, e.g., associated with an organization or an institution. An establishment may be associated with one or more activities. For example, such activities may include one or more supervisory, regulatory, administrative, governmental, medical, environmental, economic, financial, monetary, for-profit, commercial, business, trade, marketing, advertising, management, safety, and/or fraud and theft preventative activities. Retail may include trade activities (e.g., buying and selling) between a commercial establishment and an individual consumer. A retail establishment may include an organization associated with supplying one or more products to individual consumers in exchange for financial payment (e.g., cash, credit, electronic transfer, and/or e-currency) or a promise for financial payment (e.g., a contract). A retail establishment may include a physical store, shop, or premises supplying goods (e.g., tangible, or physical articles) to customers in exchange for payment or a promise thereof, and/or an associated online platform allowing customers to purchase one or more products, e.g., for subsequent delivery or pick-up from a physical store or premises.

A product (or products) may include an article, substance, and/or good manufactured, developed, cultivated, and/or refined for commercial trade. Wireless (e.g., communication) may include a transfer of information between two or more points in an absence of a physical guiding medium connecting the two or more points, for example in the absence of an electrical conducting cable or wire, and/or an optical fiber. Examples or wireless communication may include electromagnetic radiation (e.g., EMR) signals, such as radio signals (e.g., amplitude modulation or AM, frequency modulation or FM, phase modulation or PM, Wi-Fi, Bluetooth, cellular signals, Terahertz signals, and/or satellite signals), optical signals (e.g., visible and/or infrared light), and/or audio signals (e.g., within and/or external to an audio frequency range for perception by humans, such as ultrasound signals). Wirelessly tagged products may include products attached, connected, embedded, and/or otherwise associated with a label or ticket (e.g., a tag) configured to communicate information using wireless means (e.g., using one or more antennas associated with the tag). For example, the wirelessly communicated information may facilitate unassisted purchasing of the wirelessly tagged product in a retail establishment by a consumer.

By way of a non-limiting example, FIG. 8 shows electronic tracking system 8000 for facilitating unassisted purchasing of wirelessly tagged product 8200a in a retail establishment. Customer 1002a may complete a purchase of a product 8200a using mobile device 7030 (e.g., without assistance of a sales representative).

Some embodiments involve at least one processor, as defined elsewhere in the present disclosure. For example, at least one processor may be associated with one or more retail establishments, and/or with a software application associated with facilitating unassisted purchasing of wirelessly tagged products in a retail establishment.

Some embodiments may involve at least one processor configured to receive from a mobile communications device, scanned data of a printed code associated with a particular item to be purchased. A code may include information that may be associated with an object, for instance to identify and/or characterize an object. In some embodiments, a code may allow to uniquely identify an object or item. It is to be noted that unique, as used herein, may be limited to a given context (e.g., a system for unassisted purchasing of wirelessly tagged products). In some embodiments a code may allow identifying an object or item as belonging to a group or family of similar objects or items, e.g., without differentiation between the members of the group. For example, several shirts of the same style, size and color may bear the same SKU code, but might not be associated with a serial number uniquely identifying each one. Possible uses for a code may include authentication, validation, confirmation, identification, and/or to acquire additional information about an object, e.g., by using a code as a query term to search a database. A code may include any combination of alphanumeric characters, graphics, images, and/or icons, which may be converted to a digital format, e.g., as a sequence of bytes. Examples of codes may include bar codes, QR codes, alphanumeric codes (e.g., passport or social security numbers), icons, images, machine-readable formats, biometric codes (e.g., fingerprints, retina scans), regulatory codes, safety codes, global trade item numbers (GTIN), universal product codes (UPC), European article numbers (EAN), Japanese article numbers (JAN), stock keeping units (SKU), North American Industry Classification System codes (NAICS), promotional codes, care label codes, and/or product codes.

A printed code may include a code embedded on a substrate (e.g., paper, fabric, plastic, metal, and/or semiconducting material) using a colored substance or solution to produce a visible pattern expressing the code. A code may be transformed from one type of medium to another. For example, a printed code may be transformed to a digital format for storing on a computer memory using a scanning device. As another example, a digital code stored on disk may be transformed to an electromagnetic radiation (EMR) signal for wireless transmission by an antenna (e.g., using modulation to embed a code inside a carrier signal of an antenna). A printed code in a retail establishment may be used to access information about a product, for instance, by converting a printed code to a digitized token for querying a database storing information about items offered for sale in a retail establishment. Information that may be accessed via a printed code may include a category for a product (e.g., apparel versus appliances), a department, area (e.g., location), or exhibit within a retail establishment where a product may be offered for sale, a price for a product, an inventory level for a product, a sale or promotion for a product, or any other information relevant to a buyer and/or seller of a product. In some embodiments, a printed code may be associated with one or more transceivers in a retail establishment (e.g., location-based transceivers). A printed code may be associated with a single item for sale, multiple identical items for sale (e.g., a rack of identical t-shirts), a collection of multiple different items for sale (e.g., a set of camping gear which may be purchased as a kit or each item separately), a promotion, a sale, an employee (e.g. responsible for manufacturing, checking, packing or shipping an item, or one assigned to assist in a sale of an item), and/or any other criteria for associating a printed code with one or more items in a retail establishment. In some embodiments, the printed code associated with the particular item includes a two-dimensional code. A two-dimensional code may include a code expressed visually in two-dimensions (e.g., as a polygon or closed shape having a curved side) using a combination graphic motifs or patterns (e.g., bars, dots, circles, and/or squares). Examples of two-dimensional codes may include QR codes. In some embodiments, the code is printed on at least one of the particular item, packaging of the particular item, a tag attached to the particular item, or the particular wireless identification tag associated with the particular item.

Printing (e.g., printed) may refer to a process of depositing a pattern of ink or dye onto a substrate (e.g., paper, plastic, metal, semiconductor, stone, wood, or any other substance suitable for printing) using a template or mask to produce a visible copy of the pattern on the substrate. For instance, a QR code may be printed directly onto a cover of a book (e.g., directly on an item), onto a box containing an electrical appliance (e.g., on packaging of an item), onto a user guide placed alongside the item inside the packaging, onto a warranty sticker glued onto a computing device (e.g., on a tag or label attached to an item), and/or onto a wireless identification tag sewn onto a garment (e.g., on a particular wireless identification tag associated with a particular item).

Purchasing (or a purchase) may include acquiring a good in exchange for payment (e.g., buying) or another form of compensation, such as with money, goods, raw materials, or services. An item to be purchased may include a good or product supplied by a vendor (e.g., a retail establishment) for the purpose of transferring ownership to a customer in exchange for payment, or a promise of payment. Examples of items to be purchased may include produce, clothing, and electronic devices. A printed code associated with a particular item to be purchased may include a printed code displayed in a manner to link the code to a specific item offered for sale. Examples of a printed code associated with a particular item to be purchased may include a barcode printed on a hanging tag attached to a product, a QR code displayed on a rack of items, a nutrition symbol printed on food packaging, and/or a care symbol printed on a label of a garment.

Scanning (e.g., scanned) may include copying, duplicating, creating a digital representation of, or creating a replica of information, e.g., using a scanning device. Examples of scanning devices may include a drum scanner, a handheld scanner, a flatbed scanner, optical character recognition, magnetic ink character recognition, an image scanner, a light pen, and/or a barcode or QR code reader. For example, a mobile device configured with a camera and/or a scanning application may function as an optical scanning device. Optical scanning may include the action of using a camera or other optically sensitive device to capture an image or a series of images of an object, including an area where data is imprinted in or near the visible light spectrum, and deciphering the imprinted data from the image or series of images. The two most common forms of optical scanning use the common forms of data imprinting known as barcodes and QR codes (the latter also known as 2-D codes). The imprinting can be performed in a variety of methods, including many forms of printing (inkjet printing, die sublimation, thermal printing, offset printing etc.), including etching, engraving, deposition or other methods, collectively referred to as "printing" on the item or object. In the case of barcode data, the printed data is arranged in a series of parallel lines of various thicknesses but identical lengths, where an optical scanning may be performed by moving a directed source of light across the printed code and measuring the reflections, such that the optical scanner can discern the different reflections from lines (or bars) of varying thicknesses (each such reflection being in effect a single image in the series of images captured by the scanner). In the case of the QR code, the data is arranged in a series of cells in a grid, colored in two different colors (often black and white, though other pairings are possible), and including a fixed pattern allowing the scan to align the grid to a known orientation, where each cell represents one bit of data (the two colors corresponding to either a binary "zero" or a binary "one"). The optical scanning in this case may be performed by capturing an image of the QR-code using a camera, in high enough resolution to be able to discern the individual cells in the grid, aligning the image (using image processing) according to the alignment pattern, identifying the grid size and resolution, and deciding, for each cell in the grid, the binary data it represents, and then collecting the data from the individual cells based on the conventions of the QR code protocol.

Data may include information encoded digitally as a sequence of bytes. Scanned data may include a replica or copy of data (e.g., an image of data) acquired by a scanning device, such as a mobile communications device configured with a camera and a scanning application. For instance, scanning a physical image may convert a pattern of the physical image to an image file format (e.g., a sequence of bytes) for storing on a computer memory. Image file formats for storing scanned data may include a bit map, Portable Document Format (PDF), Tag Image File Format (TIFF), Joint Photographic Expert Group image (JPEG), Portable Network Graphics (PNG), Graphics Interchange Format (GIF), or Scalable Vector Graphics (SVG). Scanned data of a printed code associated with a particular item to be purchased may include a byte sequence conforming with an image file format representing a printed code associated with a product. Examples of scanned data of a printed code may include a PDF file storing a bar code scanned using an optical scanner, or a bitmap storing a QR code scanned using a mobile device. In some embodiments the scanned data may include a replica or copy of the data represented by or encoded in the image. For example, a scan of a QR code representing a URL or web address may cause the URL or web address (e.g., a link) to be stored, rather than storing a graphical representation of the QR code. Similarly, a scan of a barcode may cause an SKU or EAN represented by the barcode to be stored (e.g., as a string of digits and/or characters), rather than storing the graphical representation of the bar code.

Receiving may refer to accepting delivery of, acquiring, retrieving, obtaining or otherwise gaining access to. For example, information or data may be received in a manner that is detectable by or understandable to a processor. The data may be received via a communications channel, such as a wired channel (e.g., cable, fiber) and/or wireless channel (e.g., radio, cellular, optical, IR). The data may be received as individual packets or as a continuous stream of data. The data may be received synchronously, e.g., by periodically polling a memory buffer, queue or stack, or asynchronously, e.g., via an interrupt event. For example, data may be received from an input device or sensor, from a mobile communications device, from a remote processing unit, or from any other local and/or remote source. In some examples, data may be received from a memory unit, may be received from an external device, and/or may be generated based on other information. A mobile communications device may include any movable or unfixed device, structure, or combination of devices configured to receive and transmit wired and/or wireless communication signals. Examples of a mobile communications device may include a cellular phone, smartphone, tablet, personal computer, PDA, smart glasses, handheld scanner, wearable device, a combination of any of the forgoing or any other mobile electronics configured for sending and/or receiving data. Receiving from a mobile communications device, scanned data of a printed code associated with a particular item to be purchased may include performing one or more operations. Such operations may include, for example, scanning a printed code using an optical detector (e.g., associated with a mobile communications device), and converting a scanned code to a digital format. Such operations may additionally include generating an EMR signal including a code (e.g., by convoluting a waveform representing a digitally formatted code with a carrier signal for an antenna), and/or transmitting an EMR signal including a code to at least one processor using an antenna, e.g., of a mobile communications device.

By way of a non-limiting example, FIG. 9A shows a printed code 9104 displayed in a retail establishment offering a plurality of items 9200 and 9202 for sale. Referring to FIG. 7, a customer may use a camera associated with mobile communications device 7030 to scan printed code 9104 and convert printed code 9104 to a digital format (e.g., scanned data of a printed code). At least one processor configured with mobile communications device 7030 may convert the scanned data of code 9104 to an EMR signal and transmit the EMR signal (e.g., via transmitting-receiving device 1400*d*) to at least one processor 7010 over local network 7000. In some embodiments, mobile communications device 7030 may transmit an EMR signal including a code to a remote processing unit (e.g., associated with one or more of data structure 7230, business office 7250, retail establishment 7210, banking platform 7240, and/or other locations 7220) via wide area network 7200.

Some embodiments may involve at least one processor configured to access at least one data structure linking each of a plurality of wireless identification tags with an associated item available for purchase in the retail establishment. An item available for purchase in a retail establishment may include a product, merchandise, or a good supplied by a retail establishment for the purpose of allowing a consumer to acquire the product in return for financial payment or a promise thereof, or an obligation of future purchase (such as a gift card, service certificate, warranty card etc.). An identification tag may refer to a label, ticket, badge, or card including characterizing or distinguishing information (e.g., including one or more descriptors, alphanumeric characters, symbols, and/or graphic images (e.g., icons) or patterns, for example, a QR code and/or bar code) that allows for determining and/or establishing (e.g., uniquely determine and/or uniquely establish) an association between the identification tag and another entity or quantity (e.g., one or more of a product, a person, an account, a location an establishment, a computing device, or any other entity that may be associated with an identification tag). For example, an identification tag attached to a product may include information about the product and/or an identifying code (e.g., a uniquely identifying code) allowing retrieval of information about the product, for example, from a database. Examples of information about a product that may be obtained using an identification tag may include one or more of a uniquely identifying code, a proprietor (e.g., a vendor), a state of transfer of ownership (e.g., from a vendor to a customer), a type, a size, a season, a location, a discount or promotion, care instructions, one or more product materials, a product origin, marketing or promotional slogans, inventory data, and/or any other information about the product attached thereto. In some embodiments, an identification tag may be configured to emit identification signals to allow tracking a product attached thereto.

In some embodiments, a wireless identification tag may include an identifying or characterizing label or ticket configured to transmit information wirelessly, e.g., using one or more antennas configured therewith. A wireless identification tag may include at least one antenna for sending and receiving data. In some embodiments, a wireless identification tag may include a plurality of antennae, each corresponding to a different carrier frequency or waveband. In some embodiments, each item for purchase in a retail establishment may be associated with a dedicated wireless identification tag (e.g., identifiable by a unique identifier included thereon). In some embodiments, a single wireless identification tag may be associated with multiple items for purchase (e.g., multiple identical items, or multiple differing items). For example, a particular wireless identification tag may be associated with multiple garments sold together (e.g., a package of socks). As another example, a particular wireless identification tag may be associated with a toolkit including differing tools sold together. In some embodiments, a particular wireless identification tag may be associated with a particular item (or items) by connecting the particularly wireless identification tag to the item (e.g., by stitching, gluing, stapling, embedding, or otherwise attaching the wireless identification tag to an item).

Linking may include associating, correlating, or otherwise establishing a relationship between two different entities. Linking each of a plurality of wireless identification tags with an associated item available for purchase may include establishing or defining a relationship between each wireless identification tag and one or more items available for purchase. In some embodiments, each wireless identification tag may be linked to a different item for purchase in a unique, (e.g., one-to-one) association. In some embodiments, a wireless identification tag may be linked to multiple items for purchase (e.g., allowing for bundling a purchase of multiple items).

In disclosed embodiments, a data structure linking each of a plurality of wireless identification tags with an associated item available for purchase in a retail establishment may include a memory for storing information about a plurality of wireless identification tags, a plurality of items available for purchase and one or more associations (e.g., links or relationships) there between. For example, the links may be implemented using one or more data organization techniques expressing associations between data items. Such techniques may include one or more pointers, rows and/or columns of a table or an array (e.g., an n-dimensional array), linked lists, hierarchical structures (e.g., trees), and/or traversable graphs. In some embodiments, the associations and/or data structure may be indexed using a plurality of identifiers enabling retrieval of one or more associations by querying for an identifier, e.g., as a database key. For instance, a unique identifier included on each wireless identification tag may be used to create a database key for retrieving an associated item available for purchase. As an example, a table may include a first column for storing unique identifiers for a plurality of wireless identification tags and a second column for storing unique identifiers for items for purchase. Each row of the table may associate a specific wireless tag with a specific item, based on the unique identifiers stored in the first and second columns. Searching the table for a particular unique identifier for a wireless identification tag may return the unique identifier for the associated item for purchase. The unique identifier for the associated item may be used for a subsequent query to access information about the item (e.g., a price, location, availability, or discount). Accessing a data structure linking each of a plurality of wireless identification tags with an associated item available for purchase in a retail establishment may include establishing a connection (e.g., via local and/or global communications network) with a data structure storing a plurality of associations between a plurality of wireless identification tags and a plurality of items available for purchase, implementing one or more authentication, security, authorization, and/or validation protocols with a data structure, and/or submitting a query to the data structure.

In some embodiments, the printed code is linked to at least one particular wireless identification tag. A particular wireless identification tag may refer to a distinct or individually identifiable wireless identification tag, e.g., configured and/or associated with a unique identifier and/or with a particular item. For instance, a particular wireless identification tag may be associated with a particular item targeted by a customer for purchase. A printed code linked to at least one particular wireless identification tag may refer to an association or relationship between a printed code (e.g., a bar code or a QR code) and at least one specific wireless identification tag. For example, a link between a printed code and a particular wireless identification tag may be based on a first association between the printed code and a particular item for purchase and a second association between the particular item for purchase and the particular wireless identification tag. As another example, a link between a printed code and a particular wireless identification tag may be based on a first association between the printed code and a family or group of items for purchase and a second association between a particular member of the family or group of items for purchase and the particular wireless identification tag. As another example, a link between a printed code and a particular wireless identification tag may be based on an association between the printed code with a unique identifier of the wireless tag in a data structure. A link between a printed code and a particular wireless identification tag may be implemented by attaching the printed code to the particular wireless identification tag, printing the printed code on the particular wireless identification tag, placing an item connected to the particular wireless identification tag in proximity to the printed code, associating a printed code to a specific transceiver in a retail establishment and placing the particular wireless identification tag in communication distance of the specific transceiver, and/or any other method for linking a printed code to a particular wireless identification tag. In some embodiments, a printed code may be associated with a single wireless identification tag (e.g., in an exclusive one-to-one relationship). In some embodiments, a printed code may be associated with a plurality of wireless identification tag (e.g., in a one-to-many relationship).

In some embodiments, the printed code identifies the particular wireless identification tag associated with the particular item. Identifying (e.g., identifies) may include determining or establishing an association with a known entity. For instance, a printed code may be used to generate a unique token for accessing characterizing or distinguishing information about an object. For example, a customer may scan a printed code and use the scanned data to generate a token (e.g., or use the scanned data directly) for use as a key to query a database to identify a particular wireless identification tag for a particular item associated with the printed tag.

Disclosed embodiments may relate to a product family and product family information, as defined elsewhere in the present disclosure. In some embodiments, the particular item is associated with a product family in the retail establishment and wherein the printed code identifies the product family of the particular item.

In some embodiments, items belonging to a product family may be exhibited together in a retail establishment with a printed code associated with the entire product family such that querying a database using the printed code allows accessing information for each item in the product family. For example, differently scented detergents manufactured by a single manufacturer under the same brand may be displayed on a shelf with a common bar code, or a rack of identically styled jackets in differing colors may be associated with a single QR code, or a stack of shirts of the same style and color but having different sizes might carry the same bar code on their price labels.

By way of a non-limiting example, in FIG. 9A, QR code 9104 may be associated with multiple items available for purchase, such as an item 9200 (e.g., a tunic) attached to a wireless identification tag 1100*c* and an item 9202 (e.g., another tunic) attached to a wireless identification tag 1100*d*. Item 9200 and item 9202 may belong to the same product family and may both be associated with printed code 9104, thereby linking printed code 9104 with both of wireless identification tags 1100*c* and 1100*d*. Referring to FIG. 7, a customer may use mobile communications device 7030 to scan QR code 9104 to query data structure 7020 to identify wireless identification tags 1100*c* and 1100*d* associated with items 9200 and 9202, respectively. In some embodiments items 9200 and 9202 may be associated with the same bar code (e.g., by having the same bar code printed on a price label for item 9200 and on a price label for item 9202). For instance, price labels for item 9200 and item 9202 may be separate from identification tags 1100*c* and 1100*d*, or may be printed directly onto identification tags 1100*c* and 1100*d*. A customer may use mobile communications device 7030 to scan the bar code to query data structure 7020 to identify wireless identification tags 1100*c* and 1100*d* associated with items 9200 and 9202, respectively.

In some embodiments, the particular wireless identification tag is attached to the particular item, to packaging of the particular item, or to a tag of the particular item with at least one of an adhesive, a fastener, or stitching. Attached may include affixed or connected to. Packaging may refer to a cover, wrapping, insulating material encasing an item, e.g., to protect the item for transporting and storage. Examples of packaging may include a cardboard, metal, or wooden box or crate, shrink-wrap, bubble wrap, Styrofoam, plastic, paper, or nylon bags, foil and/or plastic wrap. A wireless identification tag may be attached to a package (e.g., to a surface or an interior side of a package) containing an item. An adhesive may include a substance configured to bind or fuse two materials together, such as glue, cement, epoxy, solder, or welding material. A fastener may include an object configured to mechanically join two items together, for example, a pin, a staple, a clip, a barb, a screw, a latch, a button, a buckle, a string, a zipper, and/or a snap. A tag of a particular item may include a ticket or label made of a substrate (e.g., paper, plastic, or nylon) attached to an item, e.g., for providing information about the item (e.g., a price, code, sale, type, expiration date, safety precautions, and/or any other information about an item). Stitching may refer to a series of loops of thread inserted into one or more material using a needle or other device capable of guiding the thread through a material (or through dedicated holes in an item), for example to bind two materials together. For instance, a particular wireless identification tag may be attached to a particular item by sewing the wireless identification tag into a seam of the item, pinning, tacking, tying, or clipping the wireless identification tag to the item, or embedding the wireless identification tag between layers of material of the item. As another example, a particular wireless identification tag may be attached to packaging of a particular item by gluing the wireless identification tag to a box containing the item or embedding the wireless identification tag between layers of plastic wrapping the item. As a further example, a particular wireless identification tag may be attached to a tag of a particular item by stapling the wireless identification tag to a hanging price tag tied to the item.

In some embodiments, the particular wireless identification tag is integrated into the particular item. Integration (e.g., integrated) may include embedding, encasing, enclosing, or incorporating, e.g., an object with another object. For instance, a tag may be manufactured together with an item, incorporating the tag with the item such that the tag may be inseparable from the item. As another example, a tag may be embedded with one or more layers of material of an item (e.g., between fabric layers of an article of clothing). As a further example, a tag may be bonded to an item using a longstanding material, such as epoxy, or welded to an item.

By way of a non-limiting example, FIG. 2 illustrates a wireless identification tag affixed to garment tag 2202 of dress 2200. FIG. 3 illustrates a wireless identification tag incorporated into layers of the material of jacket 3200. FIG. 4 illustrates a wireless identification tag adhered a container 4200 holding a product.

Some embodiments may involve at least one processor configured to cause generation of at least one trigger signal for triggering the at least one particular wireless identification tag to transmit a responsive identification signal. An identification signal may include a message or notification including a code (e.g., a unique sequence of bytes) allows for determining or making one or more associations based on the code. For example, a code included in an identification signal may be used to query one or more data structures and/or databases for information pertaining to an object associated with emitting the identification signal (e.g., the object emitting the identification signal and/or another object associated therewith). For instance, an identification signal transmitted by a particular wireless identification tag may be used to access information about an item connected thereto. Transmitting a responsive identification signal may include one or more of receiving a request for an identification signal (e.g., as a trigger signal), retrieving an identifying code (e.g., from a memory of a wireless identification tag), generating a signal bearing the identifying code (e.g., by convoluting a carrier signal of an antenna with a waveform bearing the identifying code), and/or using an antenna (e.g., of a wireless identification tag) to transmit a signal bearing the identifying code. A trigger (e.g., a trigger signal) may include a prompt, an alert, a notification, and/or input received by a device, a sub-system of a device or a circuit (see above) within a device, which may cause or invoke the device, sub-system or circuit to perform an action in response to the trigger. The complexity and level of abstraction of a trigger may depend on the complexity and level of abstraction of a circuit, sub-system or device receiving the trigger, as well as on the source of the trigger. In some embodiments, a trigger signal may be handled by a receiving device, a sub-system of a device or a circuit within a device as an interrupt event provoking an action (e.g., an asynchronous action) in response, e.g., the action may be performed in real-time.

In some embodiments, the transmitted identification signal is encrypted. Encryption (e.g., encrypted) may involve applying a cipher or key to obscure information contained in a message such that deciphering the information without using the cipher may be very difficult. For instance, encrypting an identification signal may prevent unauthorized parties from learning about a transaction and/or accessing financial information related to a transaction, e.g., to prevent theft or fraud. An identification signal may be encrypted in accordance with a cryptographic protocol (e.g., Kerberos, Secure Shell, IPSec, Internet Key Exchange) using a combination of one or more primitives, such as asymmetric encryption algorithms, symmetric encryption algorithms, and/or one-way (e.g., cryptographic) hash functions. An asymmetric encryption algorithm may be based on a public key infrastructure (PKI) protocol. Examples of asymmetric encryption algorithms may include RSA, Diffie-Hellman key exchange, or Elliptic Curve cryptography. A symmetric encryption algorithm may use a common key accessible to both communicating parties. Examples of asymmetric encryption algorithms may include AES, Twofish, Serpent, Blowfish, Camellia, Salsa20, ChaCha20, CASTS, Kuznyechik, RC4, DES, 3DES, Skipjack, Safer, and IDEA. Examples of a one-way hash functions that may include keyed hash functions (e.g., BLAKE2, BLAKE3, HMAC, KMAC, or MD6) and/or unkeyed hash functions (e.g., BLAKE-256, BLAKE-3, FSB, MD2, RIPEMD, or SHA-256). For instance, a protocol to verify an identification signal using one-way hash function may including hashing an identification code, sending an identification signal including the hashed identification code to a receiving party, and comparing, by the receiving party, the hashed identification code received in the identification signal with a hash of an identification code store in memory.

A trigger signal for triggering at least one particular wireless identification tag to transmit a responsive identification signal may include a request to at least one particular wireless identification tag to transmit an identifying code via an antenna associated therewith. The request may cause the at least one particular wireless identification tag to generate a responsive identification signal and transmit the responsive identification signal via an antenna. Generating a responsive identification signal may include retrieving an identifying code for the particular wireless identification tag (e.g., from memory), converting the identifying code to an information bearing waveform, producing a transmissible signal using the information bearing waveform (e.g., by convoluting a carrier signal with the information bearing waveform), and/or transmitting the signal via an antenna. In some embodiments, a trigger signal may be broadcast to multiple wireless identification tags in range of a transceiver associated with (e.g., based on proximity to) a printed code. In some embodiments, a trigger signal may be broadcast to any wireless identification tag in range of a transceiver associated with a printed code. In some embodiments, a trigger signal may target a single (e.g., particular) wireless identification tag exclusively associated with a printed code. In some embodiments, a trigger signal may be transmitted to one or more particular wireless identification tags using a specific frequency or code reserved for the one or more particular wireless identification tags. In some embodiments, the at least one processor may select a receiver for transmitting a trigger signal based on a location of a QR code in the retail establishment. In some embodiments the trigger signal may include a series of consecutive trigger signals, each targeted to a single (e.g. particular) wireless identification tag, where each of the targeted wireless identification tags may be attached to a particular item associated with the same printed code. For instance, the series of consecutive trigger signals may encode information as any of a number, a frequency, a duration, or data content of a series of trigger signals. Aligning the times of reception of the identification signals transmitted by the wireless identification tags with the times of transmission of the consecutive trigger signals in the series, may allow differentiating between different wireless identification tags attached to particular items associated with the same printed code (e.g., by using the timing alignment to determine a distance from a transmitting or receiving device, such as a mobile communications device). Causing generation of a trigger signal for triggering at least one wireless identification tag to transmit a responsive identification may include creating a trigger signal targeting one or more wireless identification tags and/or transmitting a trigger signal, e.g., to cause a processor of the wireless identification tag to transmit an identification signal in response.

For example, a printed code may be associated with a specific area in a retail establishment configured with a specific transceiver (e.g., identifiable by a unique ID). Upon receiving scanned data of the printed code, at least one processor may access a data structure to identify the specific transceiver. The at least one processor may transmit a trigger signal exclusively to the specific transceiver such that only wireless identification tags in communication range of the specific transceiver may receive the trigger signal. As another example, a printed code may be associated with one or more wireless identification tags configured to receive signals according to a particular encoding scheme, data content included in the trigger signal and/or frequency. Upon receiving scanned data of the printed code, at least one processor may broadcast or transmit a trigger signal using the encoding scheme, data content, and/or frequency such that only the wireless identification tag or tags associated with the printed code may respond to the trigger signal.

By way of a non-limiting example, in FIG. 9A at least one processor (e.g., processor 7010) may transmit a trigger signal via transmitting-receiving device 1400*d* to wireless identification tags 1100*c* and 1100*d* requesting an identifying signal. In some embodiments, the trigger signal may be broadcast for receiving only by identification tags 1100*c* and 1100*d* (e.g., based on associations between identification tags 1100*c* and 1100*d*, items 9200 and 9202, and printed code 9104 stored in data structure 7020). For instance, the at least one processor may select transmitting-receiving device 1400*d* to exclusively transmit the trigger signal to wireless identification tags 1100*c* and 1100*d* based on a location of printed code 9104 in communication range of transmitting-receiving device 1400*d*. As another example, the trigger signal may include a frequency, a data content, or code detectable only by wireless identification tags 1100*c* and 1100*d*. In response to the trigger signal, each of wireless identification tags 1100*c* and 1100*d* may transmit signals bearing unique identifiers for each of wireless identification tags 1100*d* and 1100*d* to the at least one processor via transmitting-receiving device 1400*d*. Referring to FIG. 9C, in a similar manner, mobile communications device 7030 may be used to transmit a trigger signal to one or more wireless identification tags 1100 and may receive one or more identification signals 1102*c* from the one or more wireless identification tags 1100 in response.

Some embodiments may involve at least one processor configured to receive the transmitted identification signal from the at least one particular wireless identification tag. The at least one processor may receive the identification signal from the at least one particular wireless identification tags via one or more transceivers (e.g., including routers, boosters, and/or modems) located in the retail establishment. For example, the at least one processor may be located in the retail establishment or connected to the retail establishment via a communications network. The communications network may include a plurality of transceivers, each configured with a Wi-Fi router connected to a modem (e.g., connected to a network, such as a VPN and/or the Internet). The at least one particular wireless identification tag may be within communication range of one or more or the plurality of transceivers. Upon receiving the trigger signal from the at least one processor, the at least one particular wireless identification tag may transmit an identification signal in response, e.g., using a carrier signal receivable by the one or more transceivers within range of the at least one particular wireless identification tag. The identification signal may be received by the one or more transceivers, and the one or more transceivers may send a copy of the identification signal for receiving by the at least one processor. In some embodiments, prior to sending the copy of the identification signal, the one or more transceivers may transmit the identification signal to a computing device associated with the establishment (e.g., a server), and the computing device may transmit the identification signal to the at least one processor, either directly or via the one or more transceivers.

By way of a non-limiting example, in FIG. 9A, at least one processor (e.g., at least one processor 7010 of FIG. 7) may receive the identification signal from wireless identification tags 1100*c* and 1100*d* via transmitting-receiving device 1400*d* and local network 7000. In some embodiments, the at least one processor may be located remotely (e.g., with an associated retail establishment 7210, such as a main office of the retail establishment) and may receive the identification signal via wide area network 7200. In a similar manner, in FIG. 9C, mobile communications device 7030 may receive identification signals from one or more wireless identification tags (e.g., wireless identification tags 1100*c* and 1100*d*) via transmitting-receiving device 1400*b* and local network 7000

Some embodiments may involve at least one processor configured to determine, based on the received identification signal, an identity of the particular wireless identification tag associated with the particular item to be purchased. Determining (e.g., determine) may include ascertaining, identifying, or establishing. Determining an identity of a particular wireless identification tag may include singling out or distinguishing a specific wireless identification tag associated with a particular item from other wireless identification tags associated with other items, e.g., based on an identification signal (e.g., a unique identifier). For instance, the identification signal may include a uniquely identifying code differentiating or distinguishing the identification signal of the particular wireless identification tag from received identification signals transmitted by other wireless identification tags, different than the particular wireless identification tag.

For example, a retail establishment may include multiple items (e.g., identical items) for sale (e.g. multiple shirts of a certain style and color and all of the same size, or packages of the same perfume or lotion, or several bottles of the same wine), where each item may be associated with the same (e.g., shared or common) product code (e.g. EAN, SKU, EPC etc.). In some embodiments, multiple items for sale, collectively associated with the same code (e.g., a printed code), may be designated as a set of candidate items. Each candidate item may be associated with a candidate wireless identification tag, and each candidate wireless identification tag may be associated with a unique identifying code. For instance, the unique identifying codes for a set of candidate wireless identification tags (e.g., corresponding to candidate items associated with the same printed code) may include a sequence of bits exclusively associated therewith. A particular item of a set of candidate items may be selected for purchase by scanning the associated printed code. The scanned code may allow identifying the particular wireless identification tag corresponding to the particular item based on an identification signal received therefrom in response to one or more trigger signals.

In some embodiments, each item may include a copy of the printed code (e.g., included on a label or tag attached thereto, or with the item itself). When a mobile communications device scans a copy of a printed bar code or QR code included with a particular item, the scanned code may fail to uniquely identify the particular item selected for purchase from the set of candidate items. Similarly, the scanned code may fail to uniquely identify the particular wireless identification tag associated with the particular item from the set of candidate wireless identification tags. Instead, the scanned code may only allow identifying the associated set of candidate items in the establishment, requiring the at least one processor to differentiate or distinguish the particular item from the other candidate items.

In some embodiments, a particular item may be distinguished from a set of candidate items based on proximity of a mobile communications device (e.g., used to scan a particular copy of a printed code associated with the particular item), to a particular wireless identification tag associated therewith, e.g., based on one or more characteristics of multiple identification signals received in response to at least one trigger signal, where a stronger received identification may be associated with a closer wireless identification tag. Accordingly, in some embodiments, the strongest identification received in response to a trigger signal may be used to identify the particular wireless identification tag associated with the particular item selected for purchase, e.g., based on proximity to the mobile communications device.

In some embodiments, the at least one processor may use inventory data (e.g., stored in a data structure associated with the establishment) to identify a set of candidate wireless identification tags corresponding to a set of candidate items collectively associated with a printed code (e.g., a particular copy of which may be scanned by a mobile communications device to purchase a particular item). For instance, the at least one processor may use a scanned code in a query to retrieve a set of unique identifiers for a set of candidate wireless identification tags associated therewith. The at least one processor may generate a trigger signal to exclusively target the set of candidate wireless identification tags to cause transmission of identification signals in response. For instance, the at least one processor may encode in the trigger signal, a sequence of bits exclusively associated with the unique identifiers of the set of candidate wireless identification tags (e.g., by masking out any uncommon bits). Additionally or alternatively, the at least one processor may trigger each candidate wireless identification tag individually (e.g., sequentially, by emitting multiple series of trigger signals, each series targeting a different candidate wireless identification tag), and/or by using any other technique for targeting (e.g., exclusively) a set of candidate wireless identification tags associated with a printed code.

Upon triggering the set of multiple candidate wireless identification tags and/or upon receiving identification signals from the set of multiple candidate wireless identification tags in response, the at least one processor may analyze the received identification signals to identify the particular candidate wireless identification tag associated with the particular item selected for purchase. For example, the at least one processor may use signal characteristics of the received identification signals to identify the particular wireless identification tag from the other candidate wireless identification tags, e.g., based on signal strength indicating proximity. Examples of characteristics for measuring signal strength may include one or more of an amplitude, a phase, a frequency, a time of arrival, an angle of arrival, and/or any other signal characteristic indicating signal strength, distance, proximity, and/or location.

In some embodiments, the at least one processor may transmit one or more trigger signals to a set of candidate wireless identification tags via the mobile communications device, and the set of candidate wireless identification tags may respond by transmitting identification signals to the mobile communications device. The at least one processor may analyze the identification signals received by the mobile communications device to differentiate the particular wireless identification tag (e.g., associated with the particular item selected for purchase) from the other candidate wireless identification tags (e.g., associated with the other candidate items) based on proximity of the particular wireless identification tag to the mobile communications device.

In some embodiments, a collection of candidate items may be associated with a single copy of a printed code, e.g., displayed on a shelf or rack including the collection of candidate items for purchase. As described earlier, when a mobile communications device scans the printed bar code or QR code, the scanned code may fail to uniquely identify a particular item for purchase. In some embodiments, a particular item may be distinguished from a set of candidate items based on identification signals received from associated candidate wireless identification tags in response to one or more trigger signals. Upon scanning a printed code, at least one processor may identify multiple candidate items and associated wireless identification tags associated therewith by querying a data structure using the scanned code, as described earlier. The at least one processor may select or otherwise determine a particular item for purchase from the candidate items based on one or more criteria, such as inventory, proximity of the particular item to the mobile communications device, convenience, and/or any other criteria for identifying the particular item from the collection of candidate items. For instance, the at least one processor may select as the particular item the topmost item in a stack of identical candidate items, the item closest to the mobile communications device, the item with the shortest expiration date or earliest delivery date or based on any other criteria for selecting a particular item from a collection of candidate items. The at least one processor may transmit one or more trigger signals targeting the particular wireless identification tag associated with the particular item, causing the particular wireless identification tag to transmit an identification signal in response. The identification signal may allow distinguishing the particular item from the collection of candidate items, e.g., by emitting a sound, a haptic signal and/or an optic signal, by highlighting a corresponding item displayed via a GUI of a mobile device, and/or using any other technique to indicate the particular item to the user. Additionally, or alternatively, the at least one processor may select some subset of the multiple candidate items (based, for instance, on proximity to the mobile communications device, inventory state, or preferences of the customer as stored in the customer's profile in an app) to display to the customer via a GUI of the mobile communications device, such that the customer may select the particular item they would like to purchase.

By way of a non-limiting example, in FIG. 9A, mobile communications device 7030 may scan printed code 9104 associated with items 9200 and 9202 and may transmit the scanned code to at least one processor (e.g., processor 7010 and/or mobile communications device 7030). The at least one processor may query data structure 7020 to retrieve unique identifying codes associated with candidate wireless identification tags 1100c and 1100d associated with candidate items 9200 and 9202, respectively, thereby identifying candidate wireless identification tags 1100c and 1100d. The at least one processor may emit one or more trigger signals targeting wireless identification tags 1100c and 1100d, causing wireless identification tags 1100c and 1100d to transmit identification signals in response. Based on the identification signals received via mobile communications device 7030, the at least one processor may determine that item 9200 is close to mobile communications device 7030 than item 9202. The at least one processor may identify item 9200 as the particular item for purchase from candidate items 9200 and 9202. The at least one processor may cause particular wireless identification tag 1100c associated with particular item 9200 to emit a signal indicating item 9200 as the particular item. For instance, wireless identification tags 1100c associated with particular item 9200 may switch on an LED, whereas a corresponding LED of wireless identification tag 1100c may remain in an off state, allowing a user (e.g., user 1002) to identify item 9200 as the particular item selected for purchase from the collection of candidate items 9200 and 9202.

By way of another example, each of wireless identification tags 1100c and 1100d may include a copy of code 9104 printed thereon. Mobile communications device 7030 may scan the copy printed code 9104 included on wireless identification tag 1100c and may transmit the scanned code to at least one processor (e.g., processor 7010 and/or mobile communications device 7030). The at least one processor may use the scanned code to query data structure 7020 to retrieve unique identifying codes associated with candidate wireless identification tags 1100c and 1100d, both associated with printed code 9104 to thereby identify candidate wireless identification tags 1100c and 1100d associated with candidate items 9200 and 9202, respectively. The at least one processing device may transmit at least one trigger signal targeting wireless identification tags 1100c and 1100d via mobile communications device 7030, for instance by encoding into the at least one trigger signal a unique sequence of bits exclusive to the unique identifying codes associated with candidate wireless identification tags 1100c and 1100d. Each of candidate wireless identification tags 1100c and 1100d may respond to the at least one trigger signal by transmitting to mobile communications device 7030 an identification signal. The at least one processor may analyze the identification signals received by mobile communications device 7030 from each of wireless identification tags 1100c and 1100d to determine that wireless identification tag 1100c is closer to mobile communications device 7030 than wireless identification tag 1100c, e.g., based on signal strength indicating proximity. Based on the proximity determination, the at least one processor may determine that item 7020 is the particular selected for purchase by user 1002 from the set of candidate items 9200 and 9202.

Some embodiments involve at least one processor configured to cause generation of the at least one trigger signal for triggering a plurality of wireless identification tags associated with items in the product family of the particular item to each transmit a responsive identification signal. For example, a product family may be associated with a printed code. The product family may additionally be associated with a specific encoding scheme, data or frequency, allowing for targeting or signals for receipt by wireless identification tags associated with items in the product family using the specific encoding scheme, data content or frequency. Upon receiving scanned data of a printed code associated with a particular item to be purchased, at least one processor may use the scanned data to identify the product family and the associated encoding scheme, data or frequency. The at least one processor may broadcast a trigger signal generated using the associated encoding scheme, data content or frequency such that only wireless identification tags associated with items in the product family may respond to the trigger signal. In response to receiving the trigger signal, each wireless identification tag associated with the product family may transmit an identification signal, where each identification signal may include a unique identifier for the transmitting wireless identification tag. In a similar manner, a product family may be associated with a printed code positioned in a specific location of a retail establishment configured with one or more identifiable transceivers. Upon receiving scanned data of a printed code associated with a particular item to be purchased, at least one processor may transmit a trigger signal to the one or more identifiable transceivers to target the wireless identification tag associated with the product family. In response to the trigger signal, only the wireless identification tag associated with the product family may transmit an identification signal in response.

Some embodiments involve at least one processor configured to determine the identity of the particular wireless identification tag associated with the particular item based on the responsive identification signals received. For instance, the responsive identification signals may include information allowing to determine the particular wireless identification tag associated with the particular item. In some embodiments, the at least one processor is configured to determine the identity of the particular wireless identification tag based on at least one of amplitude information of the responsive identification signals, frequency information of the responsive identification signals, phase information of the responsive identification signals, angle of arrival information of the responsive identification signals, data content of the responsive identification signals, reception time information of the responsive identification signals, or an identity of at least one receiver that receives the responsive identification signals from the plurality of wireless identification tags. Amplitude information may include information relating to a magnitude of a signal, e.g., a distance between a maximum and minimum points of a time varying signal (e.g., measured as a distance). A signal may weaken as a distance from a transceiver increases. In some embodiments, amplitude information (e.g., measuring signal strength) may be used to determine a distance of a wireless identification tag from a transceiver, thereby facilitating identification of a particular wireless identification tag based on location. In some embodiments, using radio fingerprinting of the retail establishment may increase the accuracy of this location determination, despite the impacts of indoor radio propagation which may cause such distance determination to be inaccurate based on amplitude measurements alone. In some embodiments, such radio fingerprinting may be performed using Machine Learning (ML) algorithms, to deduce the location of a received transmission based on tagged training data. In some embodiments, amplitude information may include information about the particular wireless identification tag (e.g., encoded as an amplitude modulated or AM signal) to facilitate identifying the particular wireless identification tag. Frequency information may include information relating to a number of occurrences of a repeating pattern in a signal per unit of time (e.g., measured as one divided by seconds). Frequency information may be used to select an antenna (e.g., as a carrier frequency) and/or to select a transceiver for conveying a signal. In some embodiments, a specific frequency associated with a specific transceiver may be used to determine a location of a wireless identification tag, based on proximity of the wireless identification tag to the specific transceiver, thereby facilitating identification of a particular wireless identification tag. In some embodiments, frequency information may be used to determine a motion of a wireless identification tag (and an item attached thereto) based on a Doppler shift detected with the responsive identification signal. In some embodiments, frequency information may include information about the particular wireless identification tag (e.g., encoded as a frequency modulated or FM signal) to facilitate identifying the particular wireless identification tag. Phase information may include information relating to a stage in a repeating pattern of a time varying signal (e.g., measured in degrees or radians). For example, two identical signals emitted at different times may exhibit a different phase. As another example, a broadcasted signal received by two different devices at differing locations may be received at a different incident phase by each device. In some instances, phase information may be used to determine a location or distance of one or more wireless identification tags from a transmitter, for instance, by including a phase of a received trigger signal in a responsive identification signal, thereby facilitating identification of a particular wireless identification tag. In some embodiments, phase information may include information about the particular wireless identification tag (e.g., encoded as a phase modulated or PM signal) to facilitate identifying the particular wireless identification tag. Angle of arrival information may include a direction from which a wireless signal may be received (e.g., by an antenna or by an antenna array), for example, measured as Azimuth and Elevation. In some embodiments, an angle of arrival may be used to determine a location of a receiving device relative to a transceiver, thereby facilitating identification of a particular wireless identification tag. Data content of a signal may include information carried by a signal, such as price, item code, discount code, location, and/or any other information included in an identifying signal. For example, data content may be embedded in a signal by producing an information bearing waveform from the data content and convoluting the information bearing waveform with a carrier signal of an antenna (e.g., using AM, FM, and/or PM modulation). In some embodiments, data content of a signal may be used to identify a particular wireless identification tag. Reception time may refer to a moment of arrival of an identification signal by a receiving device. In some embodiments, reception time may be used to determine a location of a receiving device, e.g., based on latency for transmitting a signal, thereby facilitating identification of a particular wireless identification tag. An identity of a receiver may include a unique receiver ID, allowing to distinguish a particular receiver from other receivers based on the unique ID. For instance, the unique ID may be added to notifications conveyed via the receiver allowing to associate the notification with the particular receiver. Positioning a uniquely identifying receiver at a specific location in a retail establishment may allow identifying a particular wireless identification tag based on a unique receiver ID included in the responsive identification signal. In some embodiments, multiple receivers may be used to identify a particular wireless identification tag (e.g., using triangulation).

By way of a non-limiting example, in FIG. 9A, at least one processor (e.g., processor 7010 and/or mobile communications device 7030) may use attributes of identification signals transmitted by wireless identification tags 1100c and 1100d to distinguish between wireless identification tags 1100c and 1100d and select wireless identification tag 1100c as a particular wireless identification tag 1100c associated with particular item 9200 for purchase. The attributes may include amplitude information, phase information, frequency information, angle of arrival, data content, reception time, and/or an identify of one or more receivers used to convey the trigger signal and/or the responsive identification signals.

Some embodiments may involve at least one processor configured to process a sale of the particular item by updating the at least one data structure to account for removal of the particular item from an inventory. A sale (e.g., a purchase) may include a final step of a sales funnel for completing a transaction by having a customer pay for an item. A sale may occur at a register (or self-checkout) of a retail establishment, via a checkout page of a website, or via another software application, such as a third-party shopping platform. An inventory may include a list or record of goods in stock. Removal may include elimination, erasure, and/or deletion. Removal of an item from an inventory may involve selling an item such that the item may no longer be available at a retail establishment. Accounting for (e.g., account for) may include to reflect or indicate, e.g., a change of status. Accounting for removal of the particular item from an inventory may include changing an entry or record of an inventory associated with an item and/or with a wireless identification tag associated therewith to indicate the item is no longer available (e.g., by adding or changing an attribute of the entry or record indicating the item as sold), and/or deleting an entry or record of an inventory associated with an item. Updating may involve amending or revising (e.g., a record in a database or data structure). Process a sale of the particular item by updating the at least one data structure to account for removal of the particular item from an inventory may involve one or more of receiving an indication of payment for an item (e.g., from a digital payment platform), issuing a receipt of payment for an item, updating a database record of an item to indicate a sale of an item to a customer, deleting a database record of an item to indicate a sale of an item to a customer, deleting a record of an item from an inventory of a retail establishment, and/or changing a database record associated with the item and/or a wireless identification tag associated therewith to indicate the item as sold.

By way of a non-limiting example, in FIG. 7, at least one processor (e.g., processor 7010 and/or mobile communications device 7030) may process a sale of item 9200 (FIG. 9A). For instance, the sale may be processed via an application installed on mobile communications device 7030 linking mobile communications device 7030 to digital wallet platform 7240 via wide area network 7200. In some embodiments, a confirmation of the sale may be transmitted to the at least one processor, e.g., to record the transaction in data structure 7020. The at least one processor may update data structure 7010 and/or data structure 7230 to account for removing item 9200 from an inventory of the retail establishment.

Some embodiments may involve at least one processor configured to cause a notification to be sent to the mobile communications device, the notification indicating a concluded sale of the particular item. A notification may include a message, a packet, and/or a signal (e.g., transmitted wirelessly or via any other medium). A concluded sale may indicate a completed sale, e.g., after clearing a transaction, and issuing a receipt or confirmation of the sale. A notification indicating a concluded sale of an item may include a message confirming completion of a sale, and/or a digital receipt indicating details of the sale (e.g., a date, time, price, item number, quantity, payment method, and/or any other detail related to a sale). For example, a notification indicating a concluded sale of an item may be sent to a mobile communications device in an attachment (e.g., via an email or electronic message), as a shared document (e.g., via a messaging application), and/or as a link that may be used to download a document (e.g., a receipt or confirmation) indicating a concluded sale of an item. In some embodiments, a notification indicating a concluded sale may be sent from a clearinghouse associated with the retail establishment offering the item for sale. For instance, the clearinghouse may be in a different physical location of the retail establishment (e.g., in a main office).

By way of a non-limiting example, in FIG. 7, at least one processor (e.g., processor 7010 located in business office 7250) may cause a notification (e.g., a receipt) indicating a concluded sale of item 9200 to mobile communications device 7030 via wide area network 7200 and/or local network 7000.

In some embodiments, a financial account is associated with the mobile communications device and wherein the at least one processor is further configured to debit the financial account in an amount corresponding to a price of the particular item. A financial account may refer to a ledger or record of monetary transactions associated with a specific user (or enterprise) and a specific financial institution. Debit may refer to reducing a balance of a financial account by an amount owed, e.g., to complete a sale. A price may refer to a monetary valuation assigned to a good for the purpose of trade. For instance, debiting a financial account by an amount corresponding to a price of an item (e.g., and crediting a financial account of the retail establishment offering the item by a corresponding amount) may finalize a sale of the item. In some embodiments, a financial account may be associated with a mobile communications device of a user, e.g., by way of a dedicated software application, such as a peer-to-peer (P2P) payment applications (e.g., Venmo®, PayPal®, Zelle®, or Cash App®) and/or an API suite such as Stripe® allowing to the user to perform financial transactions via the mobile communications device. For instance, a P2P payment application may be linked to a credit card or bank account belonging to the user allowing the user to charge the credit card or debit the bank account via a GUI, e.g., to purchase an item. After authenticating a customer and confirming details of a transaction to purchase an item, the mobile communications device may communicate with a processor of a financial institution linked to the financial account of the user (e.g., via the payment application) to record the debit on a ledger of the financial account.

For example, in response to receiving a trigger signal, the particular wireless identification tag (e.g., associated with the particular item for purchase) may transmit an identification signal to a mobile communications device (e.g., the same mobile communications device used to scan the printed code). The identification signal may include details about the item, such as a price, characterizing information, a location, and an identifying code. Additionally, or alternatively, the identification signal may include a unique identifier that can be used to query a database in order to retrieve details about the item, such as a price, characterizing information, a location, and an identifying code. Receiving the identification signal by mobile communications device may invoke a P2P payment application with the details about the item, allowing a user to purchase the item via the P2P payment system. As another example, an internet-based shopping platform associated with the retail establishment may be invoked with the details about the item, allowing the user to purchase the item via the shopping platform.

By way of a non-limiting example, in FIG. 7, a digital wallet may be installed on mobile communications device 7030, associating a financial account maintained at digital wallet platform 7240 with mobile communications device 7030. Mobile communications device 7030 may receive an identification signal from wireless identification tag 1100 associated with item 9200 to be purchased. The identification signal may include at least a uniquely identifying code for item 9200. Receiving the identification signal may invoke a P2P payment application on mobile communications device 7030 with the price of item 9200 automatically filled into a payment field (either directly gathered from the identification signal, or queried from a data structure associated with the retail establishment linking unique identifiers to characteristics of the items they are associated with, including price), allowing for completion of a sale of item 9200 using mobile communications device 7030, e.g., unassisted by a sales representative or a proprietary checkout kiosk of the retail establishment. Upon receiving a confirmation of the transaction, mobile communications device 7030 may communicate with at least one processor (e.g., processor 7010) of digital wallet platform 7240 to debit the financial account associated with mobile communications device 7030 by an amount corresponding to the price for item 9200.

In some embodiments, causing generation of the at least one trigger signal includes activating the mobile communications device to generate the at least one trigger signal. Activating may include prompting or invoking, e.g., to perform an action. Generating (e.g., generate) may include producing or creating, e.g., a notification or trigger signal. For example, a mobile communications device may be configured with a software application associated with the retail establishment and/or with the plurality of wireless identification tags. Accessing the data structure linking the plurality of wireless identification tags with associated items (e.g., based on the scanned data of the printed code) may return information enabling targeting a subset of the plurality of wireless identification tags, e.g., including at least the particular wireless identification tag. In some embodiments, the information may include encoding information allowing to select the subset of the plurality of wireless identification tags for receiving the trigger signal (e.g., such that wireless identification tags excluded from the subset may be unable to respond to the trigger signal). For instance, the information may include a code or data, a frequency, a phase, and/or an amplitude exclusively associated with the subset of the plurality of wireless identification tags. In some embodiments, accessing the data structure may be performed by at least one processor, and the information required to correctly generate the trigger signal may be sent to the mobile communications device with the notification sent from the at least one processor. The information may be received by the mobile communications device and may invoke an event handler associated with the software application causing the mobile communications device to generate a trigger signal targeting the subset of the plurality of wireless identification tags using the encoding information and transmit the trigger signal via an antenna. The trigger signal may be received by the subset of the plurality of wireless identification tags directly (e.g., from the antenna of the mobile communications device) and/or via a plurality of receivers (e.g., Wi-Fi routers or dedicated transmitting-receiving devices) positioned nearby.

By way of a non-limiting example, in FIG. 7, in some embodiments, at least one processor (e.g., processor 7010) may transmit a notification to mobile communications device 7030 to transmit a trigger signal to wireless identification tags 1100*c* and 1100*d*. In some embodiments, a software application configured with mobile communications device 7030 for facilitating unassisted purchasing of wirelessly tagged products may invoke mobile communications device 7030 to transmit a trigger signal to wireless identification tags 1100*c* and 1100*d*.

In some embodiments, causing generation of the at least one trigger signal includes activating at least one device installed in the retail establishment to generate the at least one trigger signal. A device may refer to an electronic computing device configured with one or more antennas for wireless communication, for example, a transceiver, a communications device, a modem, and/or a router. An installed device may refer to a device positioned, configured, initialized, and/or powered for operation within a retail establishment. For example, a retail establishment may be equipped with one or more transceivers, communications devices, modems, and/or routers. One or more of these devices in the retail establishment may transmit a trigger signal upon receiving a command, signal, or notification from the at least one processor. One or more wireless tags in the retail establishment may receive the trigger signal and may in response transmit an identification signal.

By way of a non-limiting example, in FIG. 7, at least one processor (e.g., processor 7010 and/or mobile communications device 7030) may transmit a notification to transmitting-receiving device 1400*d* (in FIG. 9A) installed in retail establishment 7210 to transmit a trigger signal to wireless identification tags 1100*c* and 1100*d* (in FIG. 9A).

In some embodiments, processing the sale of the particular item includes disabling an anti-theft alarm for the particular wireless identification tag associated with the particular item. Disabling may involve switching off, immobilizing, and/or preventing a device from operating. An alarm may include at least a speaker configured to produce a sound, a warning light configured to produce a visual signal, or a vibrating device configured to produce a haptic response, e.g., as an alert. An anti-theft alarm may include at least a detector coupled to speaker such that when the detector detects a theft attempt, the speaker produces a sound to alert of the theft attempt. For example, a detector of an anti-theft alarm sensing an identification signal emitted by a wireless identification tag in proximity to a security gate may determine a theft attempt and invoke a speaker to produce a sound. Disabling an anti-theft alarm for a particular wireless identification tag may involve transmitting an identifier (e.g., a unique identifier) for a particular wireless identification tag to an anti-theft alarm (and/or to a data structure associated therewith) with an indication to avoid producing a sound when the particular wireless identification transmits an identification signal in proximity to the anti-theft alarm. In some embodiments, an anti-theft alarm may be enabled and/or disabled by at least one processor associated with processing a sale of a particular item associated with a particular wireless identification tag. For instance, upon detecting proximity of a particular wireless identification tag associated with a particular item to an anti-theft alarm, if the at least one processor has received a confirmation that a sale for the particular item has been completed, the at least one processor may transmit a signal to disable the anti-theft alarm, otherwise, the at least one processor may transmit a signal to activate the anti-theft alarm, or refrain from transmitting the signal disabling the anti-theft alarm.

By way of a non-limiting example, in FIG. 1, upon processing a sale of item 9200 (FIG. 9A) via mobile communications device 7030 (FIG. 7), at least one processor (e.g., processor 7010 and/or mobile communications device 7030) may transmit a notification to alarm 1530 including an identifier for wireless identification tag 1100*c* associated with item 9200. The notification may instruct alarm 1530 to withhold producing a sound when wireless identification tag 1100*c* transmits an identification signal in proximity to security gate 1500 (FIG. 1). In some embodiments, alarm 1530 may access data structure 7020 and/or data structure 7203 to determine whether to sound an alarm upon detecting a particular identification signal. In such a case, upon processing a sale of item 9200, the at least one processor may update data structure 7020 and/or data structure 7203 of the sale to prevent alarm 1530 from producing a sound upon receiving an identification signal from wireless identification tag 1100*c*. In yet another example, alarm 1530 may be configured to receive an alarm activation signal directly from the at least one processor (e.g., only when the at least one processor determines that an alarm needs to be sounded does the at least one processor send an "alarm activation" notification to alarm 1530). In such a case, disabling an anti-theft alarm may involve removing the unique identifier of wireless identification tag 1100*c* associated with purchased item 9200 from the list of unique identifiers referenced by the at least one processor to notify alarm 1530 to sound an alarm.

In some embodiments, processing the sale of the particular item includes removing the particular wireless identification tag associated with the particular item from an inventory of wireless identification tags in the retail establishment. Removing may involve eliminating, erasing, and/or deleting, e.g., an entry from a list. An inventory of wireless identification tags in a retail establishment may include a list (e.g., stored in a computer memory) identifying any (e.g., active) wireless identification tags currently associated with one or more items for sale in a retail establishment. For instance, the list may include a unique identifier for each wireless identification tag currently associated with an item for sale in a retail establishment. For instance, upon completing a sale for a particular item, the at least one processor may erase a unique identifier for a particular wireless identification tag associated with the particular item from a list storing any wireless identification tag currently associated with an item for sale. In some embodiments, removing a particular wireless identification tag from an inventory of wireless identification tags may disable an anti-theft alarm of a retail establishment. It is also contemplated that in some embodiments instead of erasing the unique identifier, the at least one processor may associate information (e.g., a flag or a notation) with the unique identifier (e.g., by storing a flag or notation in the list in association with the unique identifier) to indicate that a particular wireless identification tag has been removed from the set of active wireless identification tags.

By way of a non-limiting example, in FIG. 7, upon completing a sale for item 9200 via mobile communications device 7030, at least one processing device (e.g., processor 7010 and/or mobile communications device 7030) may remove a unique identifier for wireless identification tag 1100*c* from an inventory of wireless identification tags stored in data structure 7020. For instance, removing the unique identifier from the inventory may cause alarm 1530 to ignore an identification signal transmitted by wireless identification tag 1100*c* while passing through security gate 1500. In some embodiments removing the unique identifier from the inventory stored in data structure 7020 may include adding the unique identifier to a list of items previously included in the inventory, thereby enabling the creation of an ownership history of identification tags and the items associated therewith.

In some embodiments, processing the sale of the particular item includes linking in the at least one data structure the particular wireless identification tag with a unique identifier of a purchaser of the particular item. A purchaser may include a user or a customer offering payment in return for ownership of an item. A unique identifier may include a rare or uncommon code for creating an exclusive association with an item, such that the item may be distinctly identified based on the code. A unique identifier of a purchaser of a particular item may refer to a unique code distinctly identifying (e.g., in a one-to-one association) a customer using a mobile communications device to purchase an item.

Examples of such unique identifiers for purchasers may include a customer name, a social security number, a passport number, a phone number, an email address, a device identifier (e.g., associated with a mobile communications device of a customer), biometric token, a username, a credit card number or bank account number, and/or another identifier assigned to the customer for conducting transactions with a retail establishment. For example, the disclosed wireless identification tags may facilitate record keeping of sales in the retail establishment, e.g., to send purchasers promotional material and improve inventories and supply chains. After completing the sale of a particular item by a purchaser, the link between a particular wireless identification tag and the associated particular item (e.g., stored in the data structure) may be modified to include a unique identifier for the purchaser. For instance, a field associated with the link may be added or filled with the unique identifier of the purchaser. The modified link may be used for future reference, e.g., to recommend other items to the purchaser, or offer a discount the next time the purchaser buys an item from the retail establishment.

By way of a non-limiting example, in FIG. 7, while processing a sale of item 9200 by user 1002 (FIG. 1), at least one processor (e.g., processor 7010 and/or mobile communications device 7030) may link wireless identification tag 1100*c* with a phone number for mobile communications device 7030 (e.g., a unique identifier for user 1002) in data structure 7020 and/or data structure 7230. The at least one processor may use the link to subsequently target user 1002 with promotional content and discounts, and/or improve inventories at the retail establishment.

In some embodiments, the at least one processor is configured to receive signals transmitted from the plurality of wireless identification tags via a plurality of receiving devices in the retail establishment, the plurality of receiving devices being configured to automatically receive signals transmitted by the wireless identification tags. A receiving device may include at least one antenna for detecting a wireless signal. In some embodiments, a receiving device may include a plurality of antennas, each configured to receive signals in a different frequency band. In some embodiments, a receiving device may include a processor for performing logical operations (e.g., routing and/or filtering), and a booster for amplifying signals to improve transmission. In some embodiments, a receiving device may also function as a transmitting device (e.g., a transceiver). Automatically receive may refer to receiving without performing intervening steps, e.g., requiring human intervention, machine actions or introducing delays. For instance, a plurality of receivers including antennas tuned for receiving signals from wireless identification tags may be powered on continuously to allow continuous detection of transmitted identification signals, without requiring performance of additional steps. For example, a plurality of wireless identification tags in a retail establishment may transmit identifying signals at regular time intervals. The signals may be detected by any of a plurality of receivers in the retail establishment allowing for tracking locations of items associated with the wireless identification tags based on characteristics of signals (e.g., incident angle, amplitude, phase, frequency, receiver identity, reception time, and/or data content included therein) received via the plurality of receivers.

In some embodiments, the plurality of receiving devices includes at least one of a handheld scanner or a fixed reader. A handheld scanner may refer to a device configured for being grasped or supported by a human hand for detecting one or more predefined frequency bands of the EMR spectrum. In some embodiments, a handheld scanner may be wireless. A fixed reader may refer to a device configured to be affixed to an object, such as a ceiling, a wall or a fixture in the establishment for detecting one or more predefined frequency bands of the EMR spectrum.

For example, each receiver in a retail establishment may be associated with a unique code. Each signal transmitted by a wireless identification tag and detected by a particular receiver may be transmitted to at least one processor with the unique code of the particular receiver. The at least one processor may use characteristics of the signal and the unique code to track a location for each wireless identification tag. For example, a particular incident angle and amplitude of a signal received by one or more specific receivers may indicate a position of a wireless identification tag (e.g., using triangulation). As another example, a Doppler shift in a signal received by one or more receivers may indicate motion of a wireless identification tag. As a further example, differing phase shifts detected by different receivers receiving the same signal broadcast by a particular wireless identification tag may indicate a location of an item associated therewith. The at least one processor may regularly store and update locations of wireless identification tag in the retail establishment based on signals received from the plurality of receiving devices to track locations of items associated therewith.

By way of a non-limiting example, FIG. 8 illustrates multiple transmitting-receiving devices 1400*a*-1400*e* (e.g., devices configured for both transmitting and receiving wireless signals) configured to automatically receive signals transmitted by wireless identification tags 1100*a* to 1100*d*. At least one processor (e.g., processor 7010 and/or mobile communications device 7030) may receive signals transmitted from plurality of wireless identification tags 1100*a* to 1100*d* via the plurality of transmitting-receiving devices 1400*a*-1400*e* in the retail establishment. For example, the at least one processor may use the received signals to track locations of tags 1100*a* to 1100*d* in the retail establishment.

Some embodiments involve a non-transitory computer readable medium containing instructions that when executed by at least one processor cause the at least one processor to perform operations for unassisted purchasing of wirelessly tagged products in a retail establishment, the operations comprising: receiving from a mobile communications device, scanned data of a printed code associated with a particular item to be purchased; accessing at least one data structure linking each of a plurality of wireless identification tags with an associated item available for purchase in the retail establishment, wherein the printed code is linked to at least one particular wireless identification tag; causing generation of at least one trigger signal for triggering the at least one particular wireless identification tag to transmit a responsive identification signal; receiving the transmitted identification signal from the at least one particular wireless identification tag; determining, based on the received identification signal, an identity of the particular wireless identification tag associated with the particular item to be purchased; and processing a sale of the particular item by updating the at least one data structure to account for removal of the particular item from an inventory.

By way of a non-limiting example, in FIG. 7, at least one processor (e.g., processor 7010 and/or mobile communications device 7030) may perform one or more operations for unassisted purchasing of wirelessly tagged products in a retail establishment. For example, the at least one processor may receive from mobile communications device 7030, scanned data of printed code 9104 (FIG. 9A) associated with particular item 9200 to be purchased. The at least one processor may access at least one data structure (e.g., data structure 7020 and/or data structure 7230), e.g., via local network 7000 and/or wide area network 7200. The at least one data structure may include one or more databases linking each of wireless identification tags 1100c and 1100d with associated items 9200 and 9202 available for purchase in the retail establishment, respectively. Printed code 9104 may be linked to at least one particular wireless identification tag (e.g., wireless identification tags 1100c and 1100d). The at least one processor may cause generation of at least one trigger signal for triggering wireless identification tags 1100c and 1100d to each transmit a responsive identification signal (e.g., via transmitting-receiving device 1400d and/or receiver 1400). The at least one processor may receive the transmitted identification signals from wireless identification tags 1100c and 1100d. The at least one processor may determine, based on the received identification signals, an identity of particular wireless identification tag 1100c associated with particular item 9200 to be purchased. The at least one processor may process a sale of particular item 9200 by updating the at least one data structure (e.g., data structure 7020 and/or data structure 7230) to account for removal of particular item 9200 from an inventory.

Figure 26:
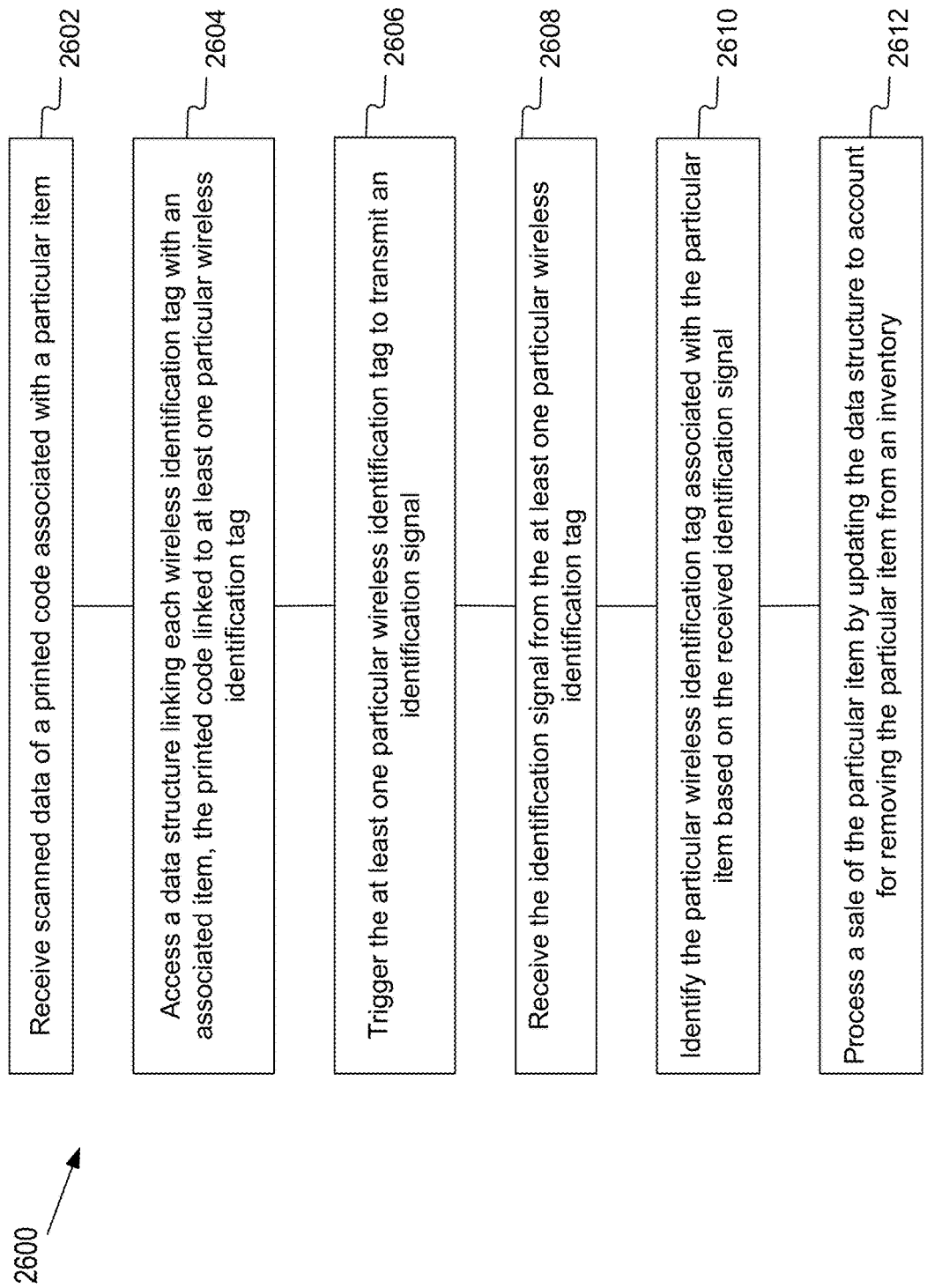
FIG. 26 illustrates a flowchart of an exemplary process for unassisted purchasing of wirelessly tagged products in a retail establishment, consistent with disclosed embodiments.

FIG. 26 illustrates a flowchart of an exemplary process 2600 for unassisted purchasing of wirelessly tagged products in a retail establishment, consistent with embodiments of the present disclosure. In some embodiments, process 2600 may be performed by at least one processor (e.g., processing device 7010) to perform operations or functions described herein. In some embodiments, some aspects of process 2600 may be implemented as software (e.g., program codes or instructions) that are stored in a memory (e.g., memory device 7012 shown in FIG. 7) or a non-transitory computer readable medium. In some embodiments, some aspects of process 2600 may be implemented as hardware (e.g., a specific-purpose circuit). In some embodiments, process 2600 may be implemented as a combination of software and hardware.

Referring to FIG. 26, process 2600 may include a step 2602 of receiving, from a mobile communications device, scanned data of a printed code associated with a particular item to be purchased. Process 2600 may include a step 2604 of accessing at least one data structure linking each of a plurality of wireless identification tags with an associated item available for purchase in the retail establishment, wherein the printed code is linked to at least one particular wireless identification tag. Process 2600 may include a step 2606 of causing generation of at least one trigger signal for triggering the at least one particular wireless identification tag to transmit a responsive identification signal. Process 2600 may include a step 2608 of receiving the transmitted identification signal from the at least one particular wireless identification tag. Process 2600 may include a step 2610 of determining, based on the received identification signal, an identity of the particular wireless identification tag associated with the particular item to be purchased. Process 2600 may include a step 2612 of processing a sale of the particular item by updating the at least one data structure to account for removal of the particular item from an inventory.

Disclosed embodiments may include any one of the following bullet-pointed features alone or in combination with one or more other bullet-pointed features, whether implemented as a system and/or method, by at least one processor, and/or stored as executable instructions on non-transitory computer readable media. a battery-less identification tag;
- a tag for embedding into products;
- a flexible substrate;
- a first differential antenna being of a first size;
- a first meandering arm;
- a second meandering arm;
- a second differential antenna being of a second size smaller than a first size;
- a third meandering arm;
- a fourth meandering arm;
- at least one communications chip connected to a first differential antenna and a second differential antenna;
- at least one capacitor on a flexible substrate;
- at least one capacitor electrically connected to a communications chip;
- a capacitor incorporated within a communications chip;
- at least one of a first differential antenna or a second differential antenna configured to receive ambient energy for storage in a capacitor;
- a communications chip configured to be powered with energy stored in a capacitor;
- a communications chip configured to transmit identification signals via at least one of a first differential antenna or second differential antenna;
- an inductor on a substrate;
- an inductor electrically connected to a communications chip;
- an inductor printed on a substrate and electrically connected to a communications chip;
- a communications chip configured to sense a time varying magnetic field;
- a crystal electrically connected to a communications chip;
- at least one of a first differential antenna or a second differential antenna configured for energy harvesting;
- at least one of a first differential antenna or a second differential antenna configured to transmit wireless signals using harvested energy;
- a substrate formed of a material including PET;
- a first differential antenna and a second differential antenna formed of at least one of aluminum or copper;
- a first differential antenna and a second differential antenna formed on a substrate through at least one of printing, depositing, etching, photolithography, or milling;
- a tag encapsulated in a flexible, electrically insulating material;
- a trace connected to a communications chip;
- a trace passing through a portion of a tag configured to be connected to a product;
- a communications chip configured to identify continuity of a trace;
- a tamper trace around an edge of a tag;
- a tamper trace that is wider than 1 mm so that puncture by a sewing needle of less than 1 mm is incapable of severing the tamper trace;
- meandering arms of at least one of a first differential antenna and a second differential antenna connected to a loop trace;
- a width of a trace of a first differential antenna greater than a width of a trace of a second differential antenna;
- first and second meandering arms that are symmetrical;
- third and fourth meandering arms that are symmetrical;
- a system for electronically tracking conversion scores of wirelessly tagged products;
- at least one processor;

accessing a retail establishment layout;
at least one location in a retail establishment layout that is designated as a fitting room;
at least one wireless receiver in a retail establishment;
receiving wireless signals from a plurality of wireless tags;
a wireless tag attached to an associated product;
accessing a data structure linking associated products with one of a plurality of wireless tags;
a data structure linking associated products with a product family;
determining, based on wireless signals, each particular associated product that is newly in at least one location designated as a fitting room;
increasing an engagement count for an associated product family;
receiving an indication of each sale in an associated product family;
increasing a sale count for an associated product family;
calculating, from an engagement count and a sale count, a conversion score for an associated product family;
maintaining a list of current location determinations of associated products;
comparing current location determinations of associated products with prior location determinations;
ascertaining whether an associated product is newly in at least one location designated as a fitting room;
determining a current location of an associated product from at least one of an amplitude, a phase, an angle of arrival, or a time of arrival of a received wireless signal;
determining that a specific associated product has a current location and a prior location within a fitting room;
forgoing increasing an engagement count for a product family;
a product family associated with a specific associated product;
a retail establishment layout including at least one location designated as a sales floor;
identifying that at least one product family is absent from a sales floor;
forgoing an engagement measurement and conversion calculation for at least one product family;
identifying a first set of at least two associated products located in a fitting room at a same time;
associating a first set of at least two associated products with a single engagement basket;
identifying a second set of at least two associated products sold in a same transaction;
associating a second set of at least two associated products as belonging to a single sale basket;
calculating a prevalence of products associated with a first product family in engagement baskets and sale baskets that include products associated with a second product family;
calculating a prevalence of products associated with a first product family in engagement baskets and sale baskets that do not include products associated with a second product family;
determining, based on a calculated prevalence, an affinity score between a first product family and second product family;
generating, based on an affinity score, a display pairing recommendation for a first product family and second product family;
accessing a database linking each product family in an establishment to a predetermined location within a retail establishment layout;
a predetermined location being a designated location for at least one product from a product family;
determining, based on wireless signals from a plurality of wireless tags, each particular associated product that is newly not present at a predetermined location linked to its product family;
for each particular associated product that is newly not present at a predetermined location linked to its product family, increasing a second engagement count for the product family;
calculating a conversion score for a product family based on an engagement count, a second engagement count, and a sale count;
calculating, from an engagement count and sale count for an associated product family, an abandonment score for the product family;
outputting a first notification if an abandonment score is greater than a first predetermined threshold;
outputting a second notification if an abandonment score is less than a second predetermined threshold;
outputting a third notification if an engagement count is less than a third predetermined threshold;
accessing a data structure linking each product family in an establishment to a predetermined location within a retail establishment layout;
a predetermined location being a designated location for at least one product from a product family;
generating a product engagement heat map of a retail establishment layout using a predetermined location and an engagement count of a product family;
an indication of a sale of at least one associated product received from a mobile communications device of a purchaser;
an indication of a sale including a unique identifier of a wireless tag attached to a at least one associated product;
receiving a query regarding a particular associated product family;
providing a particular associated product family's conversion score in response to a query;
outputting an advertising recommendation based on a conversion score of at least one associated product family;
outputting a product location recommendation for at least one associated product family based on its conversion score;
a non-transitory computer readable medium containing instructions that when executed by at least one processor cause a at least one processor to perform operations for electronically tracking conversion scores of wirelessly tagged products;
a method for electronically tracking conversion scores of wirelessly tagged products;
a system for presence accuracy enhancement in a wireless tag tracking environment;
at least one processor;
accessing a data structure linking each of a plurality of wireless identification tags with an associated product;
an associated product linked to an associated product family;
receiving in a first time period, first identification transmissions from a first set of at least some of a plurality of wireless identification tags;
determining locations of a first set of wireless identification tags during a first time period based on received first identification transmissions;

receiving in a second time period, following a first time period, second identification transmissions from a second set of at least some of a plurality of wireless identification tags;
determining locations of a second set of wireless identification tags during a second time period based on received second identification transmissions;
determining, based on a difference between first identification transmissions and second identification transmissions, a cessation of reception of a missing wireless identification tag;
determining a likelihood that a missing wireless identification tag remains present at a particular location of a missing wireless identification tag;
a particular location being a determined location of a missing wireless identification tag during a first time period;
determining a likelihood;
a particular location of a missing wireless identification tag during a first time period;
other products detected during a second time period in proximity to a previously known location of a missing wireless identification tag;
locations determined during a second time period of other wireless identification tags linked to associated products of a same product family as a missing wireless identification tag;
identification transmissions received during a second time period from other wireless identification tags linked to associated products of a same product family as a missing wireless identification tag;
a missing wireless identification tag whose identification transmissions were not received during a first time period;
structures in proximity to a particular location of a missing wireless identification tag during a first time period;
a total number of other products in a product family of a missing wireless identification tag detected during a second time period;
a total number of products in a product family of a missing wireless identification tag expected to be present during a second time period;
adjusting an inventory based on a determined likelihood;
adjusting an inventory when a determined likelihood is equal to or greater than an upper limit value;
designating a particular location of a missing wireless identification tag during a first time period as a current location of the missing wireless identification tag;
designating a particular location of a missing wireless identification tag during a first time period as a current location of an associated product linked to the missing wireless identification tag;
changing a count of a total number of products in a product family that are present in a retail establishment;
adjusting an inventory when a determined likelihood is less than or equal to a lower limit value;
generating a missing product alert;
changing a count of a total number of products in a product family that are present in a retail establishment;
generating a replenishment request for an associated product linked to a missing wireless identification tag;
receiving an indication of a sale in a product family of a missing wireless identification tag;
determining that a missing wireless identification tag corresponds to a product purchased in a sale;
a total number of other products in a product family detected during a second time period;
a total number of products in a product family expected to be present during a second time period;
forgoing adjusting an inventory for a missing wireless identification tag;
detecting an identification transmission received during a second time period from a specific wireless identification tag whose identification transmission was not received during a first time period;
accessing in a data structure an associated product family linked to a specific wireless identification tag;
determining a likelihood;
an associated product family of a specific wireless identification tag;
a particular location of a missing wireless identification tag during a first time period;
a determined location of a specific wireless identification tag during a second time period;
at least one processor configured to determine if a particular location of a missing wireless identification tag during a first time period corresponds to a location of an interference structure;
at least one processor configured to set a likelihood equal to a first predetermined value;
a missing wireless identification tag and a specific wireless identification tag determined to be linked to a same associated product family;
a missing wireless identification tag and a specific wireless identification tag determined to have respective locations corresponding to a location of an interference structure;
at least one processor configured to adjust an inventory when a determined likelihood is equal to or greater than an upper limit value;
at least one processor configured to adjust an inventory to include both a missing wireless identification tag and a specific wireless identification tag;
calculating a signal frequency score of a missing wireless identification tag based on a frequency of identification transmissions received from a missing wireless identification tag prior to a second time period;
establishing a time threshold based on a calculated signal frequency score;
determining a likelihood based on an established time threshold and a timestamp of an identification transmission received from a missing wireless identification tag during a first time period;
at least one processor configured to set a likelihood equal to a second predetermined value when a length of time following an identification transmission from a missing wireless identification tag during a first time period exceeds a time threshold;
receiving in a third time period, following a second time period, third identification transmissions from a third set of at least some of a plurality of wireless identification tags;
third identification transmissions including an identification transmission of a missing wireless identification tag;
calculating an updated signal frequency score of a missing wireless identification tag based on an identification transmission of a missing wireless identification tag during a third time period;
establishing an updated time threshold of a missing wireless identification tag based on an updated signal frequency score;

receiving information of one or more interference structures in proximity to a particular location of a missing wireless identification tag during a first time period;
determining a likelihood based on a number of one or more interference structures;
determining a likelihood based on a material of one or more interference structures;
determining a likelihood based on a shape of one or more interference structures;
determining a likelihood based on a distance between a particular location of a missing wireless identification tag and a location of each of one or more interference structures;
accessing in a data structure attributes of a specific associated product linked to a missing wireless identification tag;
attributes including at least one material of a specific associated product;
determining a likelihood based on at least one material of a specific associated product;
at least one processor configured to receive first identification transmissions from a first set of wireless identification tags and second identification transmissions from a second set of wireless identification tags via at least one reader in a retail establishment;
at least one reader configured to automatically receive signals transmitted by wireless identification tags; at least one reader including at least one of a handheld scanner or a fixed scanner;
wireless identification tags lacking batteries;
a non-transitory computer readable medium containing instructions that when executed by at least one processor cause the at least one processor to perform operations for presence accuracy enhancement in a wireless tag tracking environment;
a method for presence accuracy enhancement in a wireless tag tracking environment;
a system for detecting human traffic based on reception of wireless identification signals;
wireless identification signals transmitted by a plurality of wireless tags;
receiving, during a first period of limited traffic activity, first signals transmitted from a plurality of wireless tags to a plurality of receivers within an establishment;
determining, based on first signals, baseline signal characteristics for at least one location within an establishment;
receiving, during a second period of increased traffic activity, second signals transmitted from a plurality of wireless tags to a plurality of receivers within an establishment;
determining, based on second signals, signal characteristics for at least one location during a second period; comparing baseline signal characteristics to signal characteristics during a second period to determine deviations from the baseline signal characteristics in at least one location;
estimating a level of traffic activity in at least one location based on deviations from baseline signal characteristics in the at least one location;
generating a traffic heatmap for an establishment based on deviations from baseline signal characteristics in at least one location;
recommending positioning of products in an establishment based on a heatmap;
calculating a plurality of traffic activity level estimates over time;
recommending staffing of an establishment based on a plurality of traffic activity level estimates over time;
receiving information on a number of staff present in an establishment;
adjusting an estimated level of traffic activity to omit staff-related traffic activity;
identifying, from deviations from baseline signal characteristics in at least one location, trajectories of individual persons passing through an establishment;
identifying a plurality of particular products in an establishment associated with engagement events;
assigning at least two particular products to a single engagement basket;
a correlation between at least two particular products and a trajectory of at least one individual person through an establishment;
recommending a display pairing of particular products in a single engagement basket;
identifying a trajectory of a non-purchaser through an establishment;
adjusting an estimated level of traffic activity based on a trajectory of a non-purchaser;
receiving location information of a plurality of products within an establishment;
calculating, from location information of a plurality of products and a level of traffic activity in at least one location, an impression score for each product;
determining baseline signal characteristics for at least one location based on first location determinations of wireless tags;
determining baseline signal characteristics for at least one location based on at least one of amplitude data of first signals, phase data of first signals, direction data of first signals, angle of arrival data of first signals, angle of departure data of first signals, and data content of first signals;
receiving, during a first period, a first signal transmitted from a given wireless tag at a first location; receiving, during a second period, a second signal transmitted from a given wireless tag at a second location different from a first location;
determining deviations from baseline signal characteristics based, at least in part, on a first signal and a second signal;
estimating a level of traffic activity in at least one location independent of image data of the at least one location;
a wireless tag configured to transmit a unique ID signal;
a wireless tag attached to an associated product within an establishment;
a non-transitory computer readable medium containing instructions that when executed by at least one processor cause the at least one processor to perform operations for detecting human traffic based on reception of wireless identification signals transmitted by a plurality of wireless tags;
a method for detecting human traffic based on reception of wireless identification signals transmitted by a plurality of wireless tags;
a system for unassisted purchasing of wirelessly tagged products in a retail establishment;
a mobile communications device;
receiving scanned data of a printed code associated with a particular item to be purchased;
accessing at least one data structure linking each of a plurality of wireless identification tags with an associated item available for purchase in a retail establishment;

a printed code linked to at least one particular wireless identification tag;
causing generation of at least one trigger signal;
at least one trigger signal for triggering at least one particular wireless identification tag to transmit a responsive identification signal;
receiving a transmitted identification signal from at least one particular wireless identification tag;
determining an identity of the particular wireless identification tag associated with a particular item to be purchased;
determining an identity of a particular wireless identification tag based on a received identification signal;
processing a sale of a particular item;
updating at least one data structure to account for removal of a particular item from an inventory;
causing a notification to be sent to a mobile communications device;
a notification indicating a concluded sale of a particular item;
a printed code associated with a particular item including a two-dimensional code;
a code printed on at least one of a particular item, packaging of a particular item, a tag attached to a particular item, or a particular wireless identification tag associated with a particular item;
a financial account associated with a mobile communications device;
debiting a financial account in an amount corresponding to a price of a particular item;
a printed code identifying a particular wireless identification tag associated with a particular item;
a particular item associated with a product family in a retail establishment;
a printed code identifying a product family of a particular item;
causing generation of at least one trigger signal;
triggering a plurality of wireless identification tags associated with items in a product family of a particular item to each transmit a responsive identification signal;
determining an identity of a particular wireless identification tag associated with a particular item based on responsive identification signals received;
determining an identity of a particular wireless identification tag based on amplitude information of responsive identification signals, frequency information of responsive identification signals, phase information of responsive identification signals, angle of arrival information of responsive identification signals, data content of responsive identification signals, reception time information of responsive identification signals, or an identity of at least one receiver that receives responsive identification signals from a plurality of wireless identification tags;
activating a mobile communications device to generate at least one trigger signal;
activating at least one device installed in a retail establishment to generate at least one trigger signal; a transmitted identification signal that is encrypted;
disabling an anti-theft alarm for a particular wireless identification tag associated with a particular item;
removing a particular wireless identification tag associated with a particular item from an inventory of wireless identification tags in a retail establishment;
linking in at least one data structure a particular wireless identification tag with a unique identifier of a purchaser of a particular item;
a particular wireless identification tag that is attached to a particular item, to packaging of a particular item, or to a tag of a particular item with at least one of an adhesive, a fastener, or stitching;
a particular wireless identification tag that is integrated into a particular item;
receiving signals transmitted from a plurality of wireless identification tags via a plurality of receiving devices in a retail establishment;
a plurality of receiving devices configured to automatically receive signals transmitted by wireless identification tags;
a plurality of receiving devices including at least one of a handheld scanner or a fixed reader;
a non-transitory computer readable medium containing instructions that when executed by at least one processor cause the at least one processor to perform operations for unassisted purchasing of wirelessly tagged products in a retail establishment; and
a method for unassisted purchasing of wirelessly tagged products in a retail establishment.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents may be resorted to, falling within the scope of the disclosure.

Computer programs based on the written description and methods of this specification are within the skill of a software developer. The various functions, scripts, programs, or modules may be created using a variety of programming techniques. For example, programs, scripts, functions, program sections or program modules may be designed in or by means of languages, including JAVASCRIPT, C, C++, JAVA, PHP, PYTHON, RUBY, PERL, BASH, or other programming or scripting languages. One or more of such software sections or modules may be integrated into a computer system, non-transitory computer readable media, or existing communications software. The programs, modules, or code may also be implemented or replicated as firmware or circuit logic.

Moreover, while illustrative embodiments have been described herein, the scope may include any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A battery-less identification tag for embedding into products, the identification tag comprising:
    a flexible substrate;
    a first differential antenna on the flexible substrate, the first differential antenna including a first meandering arm and a second meandering arm, and the first differential antenna being of a first size;
    a second differential antenna on the flexible substrate, the second differential antenna including a third meandering arm and fourth meandering arm, and the second differential antenna being of a second size smaller than the first size;
    at least one communications chip connected to the first differential antenna and the second differential antenna; and
    at least one capacitor on the flexible substrate, the at least one capacitor electrically connected to the communications chip, wherein at least one of the first differential antenna or the second differential antenna is configured to receive ambient energy for storage in the capacitor.

2. The identification tag of claim 1, wherein the capacitor is incorporated within the communications chip.

3. The identification tag of claim 1, wherein the communications chip is configured to be powered with the energy stored in the capacitor, to transmit identification signals via at least one of the first differential antenna or the second differential antenna.

4. The identification tag of claim 1, further comprising an inductor on the substrate, the inductor being electrically connected to the communications chip.

5. The identification tag of claim 4, wherein the inductor is printed on the substrate and electrically connected to the communications chip.

6. The identification tag of claim 4, wherein the communications chip is configured to sense a time varying magnetic field.

7. The identification tag of claim 1, further comprising a crystal, wherein the crystal is electrically connected to the communications chip.

8. The identification tag of claim 1, wherein at least one of the first differential antenna or the second differential antenna is configured for energy harvesting, and at least one of the first differential antenna or the second differential antenna is configured to transmit wireless signals using the harvested energy.

9. The identification tag of claim 1, wherein the substrate is formed of a material including PET.

10. The identification tag of claim 1, wherein the first differential antenna and the second differential antenna are formed of at least one of aluminum or copper.

11. The identification tag of claim 10, wherein the first differential antenna and the second differential antenna are formed on the substrate through at least one of printing, depositing, etching, photolithography, or milling.

12. The identification tag of claim 1, wherein the tag is encapsulated in a flexible, electrically insulating material.

13. The identification tag of claim 1, wherein the tag further includes a trace connected to the communications chip, the trace passing through a portion to the tag configured to be connected to a product, and wherein the communications chip is configured to identify continuity of the trace.

14. The identification tag of claim 13, wherein the trace comprises a tamper trace around an edge of the tag.

15. The identification tag of claim 13, wherein the trace includes a tamper trace that is wider than 1 mm so that puncture by a sewing needle of less than 1 mm is incapable of severing the tamper trace.

16. The identification tag of claim 1, wherein the meandering arms of at least one of the first differential antenna or the second differential antenna are connected to a loop trace.

17. The identification tag of claim 1, wherein a width of a trace of the first differential antenna is greater than a width of a trace of the second differential antenna.

18. The identification tag of claim 1, wherein the first and second meandering arms are symmetrical.

19. The identification tag of claim 1, wherein the third and fourth meandering arms are symmetrical.

* * * * *